(12) United States Patent
Watanabe et al.

(10) Patent No.: US 10,785,022 B2
(45) Date of Patent: Sep. 22, 2020

(54) NETWORK WITHOUT ABUSE OF A PRIVATE KEY

(71) Applicant: Hiroshi Watanabe, Kanagawa-ken (JP)

(72) Inventors: Hiroshi Watanabe, Kanagawa-ken (JP); Te-Chang Tseng, Zhubei (TW); Yukihiro Nagai, Hokkaido (JP); Riichiro Shirota, Kanagawa-ken (JP)

(73) Assignee: Hiroshi Watanabe, Kanagawa-ken (JP)

( * ) Notice: Subject to any disclaimer, the term of this patent is extended or adjusted under 35 U.S.C. 154(b) by 460 days.

(21) Appl. No.: 15/700,280

(22) Filed: Sep. 11, 2017

(65) Prior Publication Data
US 2018/0076957 A1    Mar. 15, 2018

Related U.S. Application Data

(60) Provisional application No. 62/393,721, filed on Sep. 13, 2016.

(51) Int. Cl.
*H04L 9/08* (2006.01)
*G06Q 20/38* (2012.01)
(Continued)

(52) U.S. Cl.
CPC ............ *H04L 9/0866* (2013.01); *G06F 7/588* (2013.01); *G06F 21/602* (2013.01); *G06F 21/73* (2013.01);
(Continued)

(58) Field of Classification Search
CPC ..... H04L 9/0866; G06F 7/588; G06F 21/602; G06F 21/73; G06Q 20/363
(Continued)

(56) References Cited

U.S. PATENT DOCUMENTS 9,292,710 B2  3/2016  Kim et al.
9,729,324 B2  8/2017  Yamamoto et al.
(Continued)

FOREIGN PATENT DOCUMENTS

JP    2009519473 A    5/2009
JP    2013131868 A    7/2013
(Continued)

OTHER PUBLICATIONS

Improving DPOP with function filtering Israel Brito, Pedro Meseguer AAMAS '10: Proceedings of the 9th International Conference on Autonomous Agents and Multiagent Systems: vol. 1—May 2010, pp. 141-148 (Year: 2010).*

(Continued)

*Primary Examiner* — Kambiz Zand
*Assistant Examiner* — Mohammad S Shams
(74) *Attorney, Agent, or Firm* — Alan D. Kamrath; Karin L. Williams; Mayer & Williams PC

(57) ABSTRACT

A network includes a logical network and a physical network. The logical network includes a plurality of logical nodes. Each logical node is connected to a respective identification core. Each identification core includes at least one semiconductor chip having a physical randomness. Each semiconductor chip generates one of a plurality of pairs of private keys and public keys based on the physical randomness thereof according to an input received by the one of the at least one semiconductor chip under a public key cryptography. One of the public keys is regarded as a logical address of one of the logical nodes, which is connected to one of the identification cores. The physical network includes a plurality of physical nodes. Each identification core is one of components in each physical node. The logical network is uniquely linked to the physical network by the pairs of private keys and public keys.

31 Claims, 118 Drawing Sheets

(51) Int. Cl.
G06F 7/58 (2006.01)
H04L 9/32 (2006.01)
G06Q 20/36 (2012.01)
G06F 21/60 (2013.01)
G06F 21/73 (2013.01)
G06F 21/44 (2013.01)

(52) U.S. Cl.
CPC ....... *G06Q 20/363* (2013.01); *G06Q 20/3823* (2013.01); *G06Q 20/3825* (2013.01); *G06Q 20/3827* (2013.01); *G06Q 20/3829* (2013.01); *H04L 9/32* (2013.01); *H04L 9/3236* (2013.01); *H04L 9/3278* (2013.01); *G06F 21/44* (2013.01); *H04L 2209/38* (2013.01); *H04L 2209/805* (2013.01)

(58) Field of Classification Search
USPC ........................................................ 713/150
See application file for complete search history.

(56) References Cited

U.S. PATENT DOCUMENTS

| | | | | |
|---|---|---|---|---|
| 2004/0091114 | A1* | 5/2004 | Carter | G06F 21/606 |
| | | | | 380/259 |
| 2008/0237506 | A1 | 10/2008 | Ophey et al. | |
| 2009/0187757 | A1* | 7/2009 | Kerschbaum | G06Q 10/10 |
| | | | | 713/153 |
| 2009/0198792 | A1* | 8/2009 | Wittenschlaeger | G06F 9/54 |
| | | | | 709/215 |
| 2010/0284539 | A1* | 11/2010 | Roy | H03K 19/17768 |
| | | | | 380/278 |
| 2012/0180106 | A1* | 7/2012 | Baskerville | H04L 9/3263 |
| | | | | 726/1 |
| 2013/0047209 | A1 | 2/2013 | Satoh et al. | |
| 2014/0056123 | A1* | 2/2014 | Prieto Castro | H04L 45/28 |
| | | | | 370/221 |
| 2015/0257179 | A1* | 9/2015 | Kim | H04L 41/0803 |
| | | | | 370/328 |
| 2015/0277856 | A1* | 10/2015 | Payne | G06F 7/588 |
| | | | | 708/255 |
| 2016/0359622 | A1* | 12/2016 | Bunch | H04L 9/0822 |
| 2017/0075693 | A1* | 3/2017 | Bishop | G06F 9/4881 |
| 2017/0289036 | A1* | 10/2017 | Vasudevan | H04L 45/7453 |
| 2018/0285840 | A1* | 10/2018 | Hasan | G06Q 20/0655 |
| 2018/0287965 | A1* | 10/2018 | Sindhu | H04L 45/22 |
| 2019/0313479 | A1* | 10/2019 | Myhre | H04W 80/12 |

FOREIGN PATENT DOCUMENTS

| | | |
|---|---|---|
| JP | 2015139010 A | 7/2015 |
| WO | WO2011118548 A1 | 9/2011 |

OTHER PUBLICATIONS

Static typing with value space-based subtyping Alexander Paar, Stefan Gruner SAICSIT '11: Proceedings of the South African Institute of Computer Scientists and Information Technologists Conference on Knowledge, Innovation and Leadership in a Diverse, Multidisciplinary Environment. pp. 177-186 (Year: 2011).*

Michael Corkery, Hackers' $81 Million Sneak Attack on World Banking, The New York Times, Apr. 30, 2016, 5 pages, https://nyti.ms/1Nbk7XY.

http://bitcoin-with.com/bitcoin-mining.html#rekishi.

http://pc/mogeringo.com/archives/1826.

http://www.e-stat.go.jp/SG1/estat/List.do?lid=000001150496, National Police Agency Traffic Bureau in Japan.

Fatemeh Tehranipoor, Nima Karimian, Kan Xiao and John Chandy, DRAM based Intrinsic Physical Unclonable Functions for System Level Security, 2015, 6 pages, Association for Computing Machinery (ACM), Philadelphia, PA, USA.

* cited by examiner input code: $\{a(i), b(j)\}$ output code: $c(i,j) = mod(a(i) + b(j) + d(i,j), 2)$

| $a(i)$ | $b(j)$ | $d(i,j)$ | $c(i,j)$ |
|---|---|---|---|
| 0 | 0 | 0 | 0 |
| 0 | 1 | 0 | 1 |
| 1 | 0 | 0 | 1 |
| 1 | 1 | 0 | 0 |
| 0 | 0 | 1 | 1 |
| 0 | 1 | 1 | 0 |
| 1 | 0 | 1 | 0 |
| 1 | 1 | 1 | 1 |

FIG. 30 input code:   $\{a(i)\}$ output code:  $c(i) = mod(a(i) + d(i), 2)$

| $a(i)$ | $d(i)$ | $c(i)$ |
|---|---|---|
| 0 | 0 | 0 |
| 0 | 1 | 1 |
| 1 | 0 | 1 |
| 1 | 1 | 0 |

FIG. 80

NETWORK WITHOUT ABUSE OF A PRIVATE KEY

CROSS REFERENCE TO RELATED APPLICATIONS

The application claims the benefit of U.S. provisional application No. 62/393,721, filed on Sep. 13, 2016, and the entire contents of which are incorporated herein by reference.

BACKGROUND OF THE INVENTION

1. Field of the Invention

The present disclosure is related to preventing the abuse of the private key in order to be applied to financial services, Peer-to-Peer (P2P) businesses, and so forth, and also related to technologies to apply a block chain to the Internet-of-Things (IoT).

2. Description of the Related Art

In the financial business sector, the technologies related to or realizing the aggressive usage of Information Technologies (IT) on financial services are generically named FinTech. The IT has led the development of current FinTech. While FinTech 1.0 is regarded as currently being used for online transaction among the banking institutions, FinTech 2.0 may be regarded as having more extensive use of the encryption communication technologies as a central role. A typical example is the encryption currency like a bitcoin. The core technology of the bitcoin is then the block chain.

However, both of them use the encryption communication technologies which form the basis of Information Technologies. However, the configuration of the communication network may distinguish FinTech 2.0 from FinTech 1.0.

In FinTech 1.0, the banking institution is assumed and thus all transactions are processed via the banking institution. Accordingly, the network structure should be a client-server type. Here, the server corresponds to the banking institution and the client corresponds to the account holder who owns his/her account in the banking institution, that is, the end user of the service produced by FinTech 1.0.

Since the account is assumed, the banking institution that provides the server function saves the account information that links the identification information of the end users being clients (i.e., the account holders) and the status after transaction (balance, debt, transaction record and so forth) on the service. The banking institution earning the profit by providing FinTech 1.0 is obligated to securely manage the account information and to take the full responsibility for managing this service.

The number of the end users possessing the accounts in a banking institution (account holders) is not limited and the quantity of the account information to be managed by a banking institution is also not limited. The banking institution must save and manage the list of the account information while satisfying such conditions.

Furthermore, the number of the banking institutions that provide the service of FinTech 1.0 is not limited and thus the number of the servers connecting to the network is also not limited.

In summary of the above mentioned viewpoints, the basic structure of the network may be described below.

First, what is connected to the network may be called the "node." The account holders (clients) having their accounts and thus using the service provided by the banking institutions (servers) as well as the servers playing a role of the banking institutions may be nodes. In other words, the terminals that the account holders use to access the service may be also called a "node." The servers may identify the clients with the corresponding account information. The banking institutions may be the management matrix that manages or administrates the services provided by the corresponding servers. In particular, the servers are called "main-stem nodes" and the clients are called "peripheral nodes."

In FIG. 1, the first client 5510, the second client 5520, the third client 5530 and so forth are connected to the server 5000. The first client 5510 may send the passcode (P, S, T . . . ) to the server 5000. The second client 5520 may send the passcode (R, O, A . . . ) to the server 5000. The third client 5530 may send the passcode (X, A, U . . . ) to the server 5000. The server 5000 may compare the received codes with the stored information of the passcodes 5020 and thus determines whether or not the received codes are sent from the regular clients. After the determination, the server 5000 may provide a predetermined service to the first client 5510, the second client 5520, the third client 5530, and so forth. Finally, the server 5000 may save the transaction records generated according to the service as statuses after the transaction with regard to each account, respectively.

Thus, the server 5000 may notify the whole or a part of statuses after the last transaction to each client with a predetermined method.

Here, the account information may include a passcode 5020 with respect to each client and status after the last transaction 5030. For example, in the case of the first client 5510, the account information may be (P, S, T . . . ; P1, S1, T1 . . . ). In the case of the second client 5520, the account information may be (R, O, A . . . ; R1, O1, A1 . . . ). In the case of the third client 5530, the account information may be (X, A, U . . . ; X1, A1, U1 . . . ). Thus, the list of the account information may be saved in the storage of the server 5010 that the banking institution manages and administrates.

Plural clients are able to connect to the main-stein server. This is similar to the fact that the accounts are registered to a banking institution. There is no theoretical limitation in the number of the accounts.

In such a structure of the network (client-server type), at least one server is necessary for a certain client to remit the money to another client. In order to remit the money to a client possessing an account in another banking institution, the transaction between the banks, that is, between the servers, should be performed in a safe way. For example, the online partnership or multi-payment network (MPN) may be used for domestic transactions between the banks.

On the other hand, the service provided by Society for Worldwide Interbank Financial Telecommunication (SWIFT) is necessary to remit the money to an account in a foreign banking institution. Currently, any international transaction is executed with the transaction system provided by SWIFT (This service may be called SWIFT hereinafter). However, the SWIFT is being exposed to a big security risk. See "Hackers'$81 Million Sneak Attack on World Banking" which can be reached at http://www.nytimes.com/2016/05/01/business/dealbook/hackers-81-million-sneak-attack-on-world-banking.html?_r=0.

In February, 2016, 8.1M-US$ was illegally transferred and lost from the account of the Bangladesh central bank in the Federal Reserve Bank of New York. The client (Bangladesh central bank in this case) was infected by a type of computer virus customized from malware. It was reported that the server (the core network of SWIFT) is not infected.

However, this news brought a big impact as the SWIFT system that serves as a base for all international transactions was found to be vulnerable. Thus, the measure to the vulnerability of the present system in short term and the system to replace SWIFT in long term have begun to be considered.

In the case of the Bangladesh central bank, the week point of the client server type network was attacked. In other words, the attacking target was a client with less security resource, compared with the server under a strict central control.

Then, a network structure under a completely different concept has begun to be investigated. It is called the Peer-to-Peer (P2P), where no server taking a role of the network core is assumed. All nodes connecting to the network are equal. All equal nodes monitor each other to ensure the security of the network. In other words, there is no server to be core in the network. The network includes only non-core nodes different from the servers. The representative transaction method under P2P may be currently regarded as a block chain used in bitcoin.

The bitcoin is one of the encryption currencies. The transaction record and the name of the account taking initiative of the corresponding transaction are combined and then encrypted to form an electronic signature. This electronic signature is transferred and then a new transaction is completed. Accordingly, any banking institution is unnecessary to execute transaction. The updated transaction record may be monitored by a plenty of other non-core nodes in the network and then certified in a manner similar to the majority decision.

The transfer of the transaction record may be a synonym with the transfer of the currency. Then, the certified transaction record may be regarded as currency. The remittance may thus be able to be carried out with no core node like a bank.

The encryption used to form the electronic signature distributed in the network is the public key cryptography, which is a generic encryption method and famous with the metaphor of Alice and Bob. As illustrated in FIG. 2, Alice sends her own public key to Bob in advance. She may have no problem even though this public key would be stolen by anyone in the network. Bob may encrypt a message to Alice with her public key and send it to her. The private key forming a counterpart of Alice's public key is necessary to decrypt the message encrypted by her public key. Accordingly, as long as the encryption is not cracked, the message cannot be read even though it is stolen by anyone in the network. It is because only Alice holds her private key. Alice can read the message from Bob by decrypting it with her private key.

Like this, the public key is permitted to be exposed in the network. Accordingly, not only Bob but also others in the network can receive the public key from Alice. However, only Alice can read the message encrypted by her public key, as long as the encryption is not cracked. While the public key and the private key are generated to form a pair, it is actually impossible to reproduce a private key from the corresponding public key. Vice-versa, the message encrypted by a private key can be decrypted by the corresponding public key. The difference between the public key and the private key is only dependent of whether or not it is open to the public.

Another important role of the public key may be the address to which someone sends a message to Alice, that is, Alice's address in the network. If Bob exposes an encrypted message to the network, anyone in the network can receive it. However, if he cannot decode the encrypted message, he cannot read it. Having the lack of ability to read it in any wise is the same as no reception of it. Accordingly, if only Alice can decrypt it, then only Alice can receive it. By this way, it may be inherent that another role of the public key is an address in the network. Therefore, the public key used in bitcoin is called bitcoin address.

FIG. 3 illustrates an example of a basic concept of a wallet to hold the electronic money and so forth. It is a common concept among the encryption currencies like bitcoin. The address in the network may be allocated to the wallet in advance. Something valuable (currency, or the coin having the same value as the currency) may be stored in the wallet. Furthermore, the contents and the address of the wallet may be combined and then encrypted to form the electronic signature to be attached to the wallet with some encryption technology.

As illustrated in FIG. 4, such a wallet may be, for example, used by installing a dedicated application into the hardware like a personal computer, a tablet, a smartphone, a smart card and so forth. Then, the contents of the wallet may be stored as digital data in the storage space of the hardware in which the dedicated application is installed. In the example of the electronic transaction under P2P, the digital data must be managed by the supervisor or the owner of the hardware by his obligation. This point is different from the client-server type network. In the client-server type network, the banking institutions must manage such digital data by full obligation. In the electronic transaction under P2P, any core substance like banking institutions is unnecessary.

FIG. 5 illustrates that a plurality of transactions is carried out among a plurality of wallets. As an example, the explanation may begin with the situation that 1000 yen has been already stored in the wallet 1 and the electronic signature 0 has been attached to the wallet 1. However, 1000 yen is an example and not beyond. Any digital information may replace 1000 yen as long as it has equivalent monetary value as or is exchangeable with the currency. The wallet 1 may have 1000 yen as the contents of the wallet 1, the private key 1 to form the next electronic signature, and the public key 1 forming a counterpart of the private key 1. As mentioned above, the public key 1 may be the address of the wallet 1 in the network. As an example, it may be the bitcoin address.

On the other hand, to include the record that someone remits 1000 yen to the wallet 1, the record of this transaction may be the contents of the wallet 1. Anyway, the hash value 1 may be generated from the public key 1, the contents of the wallet 1, and the electronic signature 0 using a hash function (SHA-256 as an example). This hash value 1 may be transferred to the wallet 2 and then the wallet 2 may store it as the content of the wallet 2. On the other hand, the public key 2 (which is the address of the wallet) and the hash value 1 may be combined and then encrypted together to form the electronic signature 1 using the private key 1 of the wallet 1. This electronic signature 1 may be transferred to the wallet 2 together with the hash value 1.

By this way, the wallet 2 may include the hash value 1, the electronic signature 1, and the pair of the public key 2 and the private key 2, which are proper to the wallet 2. Thus, the remittance of 1000 yen from the wallet 1 to the wallet 2 may be completed.

The hash value 1 may have to include the information that this 1000 yen came from the wallet 1. However, since the inverse transformation of the hash function is impossible, as is opposed to the encryption, it must be impossible to read the information by decrypting the hash value 1. Then, the electronic signature 1 is attached. This electronic signature 1 is formed by combining the public key 2 and the hash value 1 and then encrypting them together by the private key 1. To check if this electronic signature 1 is really owned by the user of the wallet 1, this electronic signature 1 may be decrypted by the public key 1 and then compared with the public key 2 and the hash value 1, which are stored in the wallet 2. As long as the encryption is not cracked, if they are consistent, the electronic signature 1 may be confirmed as being encrypted by the private key 1. Otherwise, the electronic signature may be found as a lie. Or, if it is consistent with those decrypted by another public key (for example, the public key 4), then it may be found that the user owning the wallet 4 whose address is the public key 4 carries out an improper transaction.

However, another method is necessary to prove that no improper transaction has occurred in the past transaction record. It is because the electronic signature cannot prevent regular owner of the private key from acting wrong. For example, the abuse of the private key by private key owner should matter. In the bitcoin assuming P2P, the Proof of Work (PoW) is expected to suppress the abuse of the private key by private key owner.

In the client-server type network, a trustworthy third party is generally necessary to confirm the transactions. It may be a reliable banking institution and then take a central role of the core node (server) in the network assuming reliable communication. In other words, the owner of the wallet 1 is able to remit the money to the owner of the wallet 2 via a certain trustworthy banking institution. However, there is no way to perfectly prove that the core nodes are really reliable. Therefore, the confirmation is requested to the remitting party in every remittance. Considering the remittances via a plurality of banking institutions, the number of the confirmation requests like this may be enormous. Furthermore, each confirmation procedure costs a designated amount. Thus, the commission rate for remittance must be more expensive than the designated lower bound. For example, this lower bound is assumed to be 500 yen, the remitting party must be required to pay the additional 500 yen to remit even less than 500 yen. Thereby, it is found that the client-server type network is not suitable for a business having a numberless small amount of remittances.

Subsequently in FIG. 5, the hash value 2 may be formed from the public key 2, the contents of the wallet 2 (e.g., the hash value 1), and the electronic signature 1 by using the hash function (SHA-256 as an example). The wallet 2 may transfer this hash value 2 to the wallet 3 and thus the hash value 2 may be stored as the content of the wallet 3. On the other hand, the wallet 2 may encrypt the public key 3, which is the address of the wallet 3, and the hash value 2 together with the private key 2, thereby generating the electronic signature 2. Subsequently, the electronic signature 2 may be transferred to the wallet 3 together with the hash value 2.

As mentioned above, it is found that the content of the wallet 2 is the hash value 1 which stores the latest record before the transaction 1, 2 from the wallet 1 to the wallet 2. Similarly, the content of the wallet 3 is the hash value 2 which stores the latest record before the transaction 2, 3 from the wallet 2 to the wallet 3. By this way, the content of the wallet (N) may store the latest record before the transaction (N−1, N) from the wallet (N−1) to the wallet (N). N is an arbitrary natural number.

FIG. 6 illustrates the chain of the transactions (N−2, N−1), (N−1, N), and (N, N+1) . . . , where the transaction (N−2, N−1) is some kind of processing from the wallet (N−2) to the wallet (N−1), the transaction (N−1, N) is some kind of processing from the wallet (N−1) to the wallet (N), and the transaction (N, N+1) is some kind of processing from the wallet (N) to the wallet (N+1). The content of the wallet (N+1) is the hash value (N) which includes the hysteresis up to the transaction (N−1, N). The content of the wallet (N) is the hash value (N−1) which includes the hysteresis up to the transaction (N−2, N−1). It is thus found that the content of an arbitral wallet may include the record of all of the past transactions in a similar manner to the chain reaction. That is, the latest hash value may be the representative of the record of all of the past transactions.

On the other hand, as is different from FIGS. 5 and 6, the number of the wallets to remit the money to a wallet is not only one. Occasionally, a plurality of wallets may remit the money to a wallet. Moreover, a wallet may remit the money to a plurality of wallets, too. Accordingly, the transaction hysteresis may be complicated. Then, the client-server type network service may have to cost much more since the confirmation should be required in every transaction.

In addition, if all of the past transactions had to be recorded in the P2P service, it might appear that each node must store all the past transaction records of all of the nodes all over the world. This may saturate the storage of the hardware to be installed with the designed application for the wallet. However, there must be only one hash value including the latest transaction record. It is called the root of Merkle or Merkle root. Accordingly, it must be possible that any past transaction is dated back from the Merkle root. As illustrated in FIG. 7 as an example, a tree diagram may thereby be obtained. This is called the Merkle tree. The hash value (ABCD) that is the Merkle root in this example is connected to the records corresponding to the hash value (AB) and the hash value (CD). The hash value (AB) is further connected to the records corresponding to the hash value (A) and the hash value (B), that is, connected to the transaction (A) and the truncation (B), respectively. The hash value (CD) is further connected to the records corresponding to the hash value (C) and the hash value (D), that is, connected to the transaction (C) and the truncation (D), respectively.

However, it is impossible to inversely transform the hash value. Then, it must be impossible to date back by decrypting the hash values. For example, in order to date back the past hysteresis of the content of the wallet (N) from the hash value (N−1), another wallet (M) may be selected, the electronic signature (N−1) may be decrypted by the public key (M), and then the resultant data may be compared with the public key (N) and the hash value (N−1). If they are not consistent, another wallet (M+1) may be selected, and the similar procedure may be repeated with the public key (M+1). If the resultant data here is consistent with the public key (N) and the hash value (N−1), it may be confirmed that the transaction (N−1, N) is the remittance from the wallet (M+1) to the wallet (N), where M+1 should be N−1. Subsequently, the public key (N−2) of the wallet (N−2) including the hash value (N−3) may be searched in a similar manner By repeating this procedure, it may be possible to date back the hysteresis of the past transactions. However, M and N may be arbitral natural numbers.

By this way, it may be theoretically possible to date back the hysteresis of the past transactions. However, it may be generally unnecessary to date back the past transaction record one-by-one with the hash values. Rather than this, from several hundreds to about thousands of transactions may be collected to form a group, and then all of the transactions are confirmed as being actually existent using some kind of method. Specifically, the hash values other than the Merkle roots may all be excluded from the group, and then the latest hash value (ABCD) may be used as a mark of the group. The group of the certified transactions is called block. Thus, it may be possible that the storage space of the hardware in which the designated application software is installed is saved.

By this way, a group of the past transactions, which is represented by the Merkle root (the hash value (ABCD) in the above example), may be certified by attaching a timestamp. Subsequently, the certified block may be open to the public in the network. This may be a similar work to the date of the authentication where a document is enveloped with the certificated date at the notary public's office. In terms of bitcoin, the publication of the new block is called registration. Those who register the new blocks may be awarded with a designated amount of reward. 50 BTC is awarded for each registration until the 210,000-th registration, where BTC is a unit of bitcoin. 25 BTC is awarded from the 210,001-th to the 420,000-th registrations. That is, the amount may be cut by half every 210,000 registrations. Accordingly, it is designed that the award is reduced to be zero at the 6,929,999-th registration. In June, 2016, 25 BTC is awarded for each registration.

There is no notary public's office in P2P. The unspecified large number of the bitcoin users may accordingly certify a group of transactions with a timestamp for the notary. However, only one user can open (register) a new block to the public in the network at one time. Therefore, a plurality of users may scramble to take the lead in order to earn the award by the registration.

As an example in FIG. 8, the registration process is illustrated briefly. First, a certain hash value is obtained with regard to the corresponding past block that has been certified. Next, a group of the uncertified transactions existing in the network is found and then the Merkle root (a hash value) is obtained with regard to the group. A block hash is formed by further hashing this hash value (the Merkle root) together with a nonce value, where the hash function may be SHA-256 in the example of bitcoin. Of course, other hash functions may be applicable to form the block hash.

A nonce value is generally an arbitrary 32 bit value. The hash value (block hash here) generated with this nonce value is a 256 bit value. Two to the power of 256 is larger than 10 to the power of 77. It is thus found that the block hash has a huge freedom. Here, the first several bits of the block hash can be made all zero by tuning the nonce value. As an example, the probability that the first 16 bits are all zero in a newly generated block hash is turned out to be the inverse of two to the power of 16, that is, 1 to 65,536. This is much lower than the probability of death with traffic accidents in 2015 in Japan (1 to 30,000). In other words, it must be almost impossible that the first 16 bits become all zero by accident. To mine such a nonce value, a reasonable computation must be required. See "the generation statistics of the traffic accidents in 2015" from National Police Agency Traffic Bureau in Japan, which can be reached at http://www.e-stat.go.jp/SG1/estat/List.do?lid=000001150496.

However, the hash function is irreversible. It is therefore impossible to obtain a nonce value to make the first several bits all zero in the hash value (block hash here) by the inverse transformation. In other words, it is required to repeat the hashing operation while tuning the nonce value until the first several bits become all zero. It is thus found that a designated computational load is indispensable to determine a nonce value to form a block. Those who generate a block are awarded with a designated amount of bitcoins in exchange for the computational load to be spent. This work is called mining because it is similar to mine gold. The users (of bitcoin) who mine to aim this award are called miners.

In the P2P network, those to mine are not limited to the nodes having a special core function. Any user is able to mine the bitcoins as long as they have a designated computational resource. The miners, more precisely, the nodes to be used by the miners in the P2P network, look for (mine) a group of the uncertified transactions in the network by the round robin search. However, the first several bits are made all zero in the hash value generated while changing the nonce values. In other words, the miners smell around (mine) the network while changing the nonce values. Like this, it is unnecessary to tune a nonce value with regard to a specified group of the uncertificated transactions.

A block hash, where the first several bits (16 bits in this example) of which are all zero, is mined by this way. The group of the uncertified transactions corresponding to this block hash is regarded as a newly certified block and then permitted to link to the previous block of the certified transactions. In other words, the condition to link a new block to a previous one is to make first several bits all zero. The miner who first mined a new block hash to satisfy the condition is permitted to register the new block. This procedure (mining) is repeated to generate a plurality of blocks, forming a block chain.

As mentioned above, the reliability of the currency is the reliability of the past transaction record in bitcoin. The block chain assures the reliability for a notary. As the block chain gets longer, it may become more difficult to manipulate the transaction record. For example, if the data of a block is manipulated, the link condition to the preceding and succeeding blocks (i.e., the first several bits of the block hash must be all zero) is broken. Thus, it is required to tune the nonce values of the preceding and succeeding blocks simultaneously to recover the link condition. Since the hash function is irreversible, as mentioned above, this tuning may cost a reasonable computational load. However, once the nonce values of the preceding and succeeding blocks change, the nonce values connecting those blocks are further required to be changed. Consequently, it may be found that all of the nonce values of the whole block chain are required to be changed, in order to manipulate a part of the data. This may consume a huge computational load. Thereby, the reliability may be improved as the block chain gets longer.

On the other hand, the currency falsification is the manipulation or the illegal copy of the transaction record. Because an electronic signature is attached to the transaction record as an evidence of the successful verification of the transaction, the currency falsification is the falsification of the electronic signature. As long as the encryption is not broken, those who can form an electronic signature must be only the owner of the previous wallet holding the private key that has been used to form the electronic signature. Or, even though the encryption is not broken, those who regularly own the private key are able to manipulate the record of the previous transactions. However, once the block chain is constituted as mentioned above, even a regular user of the private key is hardly able to manipulate all of the nonce values to link the block chain. As the block chain gets longer, the difficulty is drastically increased. In other words, once the block chain gets longer, it must be almost impossible to manipulate the past transaction record.

However, at the moment that a new transaction is made, a regular user of the private key is able to make improper transaction. FIG. 9 illustrates an example of the improper transaction that the owner of the wallet (N) abuses the private key (N). A regular transaction is processed from the wallet (N) to the wallet (N+1), whereas the owner of the wallet (N) abuses the private key (N) to make the improper transaction from the wallet (N) to the wallet (M). That is, the transaction (N, M) is the improper transaction. The owner of the wallet (M) believes in the electronic signature (N') and then processes forward, i.e., to remit money to the wallet (M+1). The owner of the wallet (N+1) believes in the electronic signature (N) and then processes forward, i.e., to remit money to the wallet (N+2). Here, only the transaction (N, M) is improper. Thereby, it is able to illegally issue the currency by copying the content of the wallet (N) with the private key (N). This is the issue of "double transaction."

After the transaction (N−1, N), the double transaction thus causes a block whose Merkle root (the latest record of the past transaction) is the hash value (M) as well as a block whose Merkle root is the hash value (N). Those blocks may exist simultaneously in the network. In other words, the block chain taking over the hash value (N−1) of the content of the same wallet bifurcates after the transaction (N−1, N). In the block chain, the double transaction like this is illustrated as an improper increase of Merkle roots. In the left illustration of FIG. 10, three block chains are configured by two double transactions at the second and fifth blocks from the left. It may be inherent that the falsification occurred in the upper and lower chains among those three block chains. Accordingly, a central chain must be a regular block chain.

Furthermore, in FIG. 10, the improper transactions are depicted with rectangle lines. Then, the number of the improper transactions is two in this example. On the other hand, the regular transactions are depicted with straight lines. Accordingly, the number of the regular transactions is 12 in this example. The 9 lines among them are included in the regular block chain.

Experimentally, an improper transaction is permitted to be made whenever a regular block is certified. In FIG. 11, for example, the number of the improper transactions is 9 while the number of the regular transactions inside the regular block chain is 9. On the other hand, the longest block chain in FIG. 11 is the regular block chain at the center.

To further increase the number of the improper transactions, the rectangle lines may be allocated to the blocks that have no improper transactions. That is, in FIG. 12, the number of the improper transactions increases under the condition that the number of bifurcation at each block is only one. However, the longest block chain is the regular block chain at the center.

Finally, multiple bifurcations are permitted at each block. Nevertheless, the longest block chain is the regular block chain at the center. By this way, in the above-mentioned "Proof-of-Works" (PoW), the longest block chain should be certificated as being regular.

To make a block chain longer than the regular block chain, for example like FIG. 14, the chain bifurcating from the regular chain by improper transaction needs to be lengthened at faster pace than the regular chain. For this aim, it must be necessary to dominate the computer resource overwhelming the other miners. For example, if a malicious miner dominates 51% of the mining ability, the improper chain may be able to get longer than the regular chain. Then, this is called 51% attack.

It has been regarded that the 51% attack is unrealistic from the viewpoint of cost effectiveness. However, in the case that the 51% attack is performed as a cyber attack to worsen the financial base of a certain organization, the cost effectiveness doesn't matter. For example, in the case that FinTech 2.0 assuming the block chain has been popularized in a certain big country, a small country may be able to invest the national defense expenditure to the mining for paralyzing the financial system of the big country. In this event, the small country may be able to make the cost lower than the development of the nuclear weapon. Moreover, some business units may be able to temporally dominate 51% of the mining ability with the development of cloud-mining Actually, it is reported that GHash.io's ability to lengthen the block chain ever became higher than 51% twice in the past. It is by no means an unrealistic problem. This can be seen at http://bitcoin-with.com/bitcoin-mining html#rekishi.

The transaction record is shared in the P2P network, and then the certification process is left to the miners for ensuring the reliability of transaction. The concept of the block chain like this has been expected to be useful to popularize the applications other than bitcoin. It is because the manipulation of the past transaction is in fact made impossible at the lowest cost. The data base that is actually free from any manipulation may be demanded by, for example, the healthcare business to use the stored medical data that accumulates day after day, by the stock exchange to use the stored transaction data that accumulates day after day, by all possible information services to use the larger amount of the stored data that accumulates day after day, and so forth.

It is noted that most of the P2P business using the block chain uses a public key for logical address such as IP address, and then constructed above the communication layer in the TCP/IP network. The inherent weak point of the block chain is, first, that the private key is appropriated by breaking the encryption. Next, as long as encryption is not broken, it may be the abuse of the private key by the regular users. Furthermore, the measure to prevent the abuse of the private key has a weak point that 51% attack is succeeded.

As mentioned above, the public key is open to the public in the network. (It is called bitcoin address in the case of bitcoin.) If the encryption is broken to reproduce the private key from the public key, it may be possible to falsify the electronic signature with other's account and then to make improper transaction. Due to the invalidity of the electronic signature, all transactions are made impossible.

The greatest threat of the encryption is the quantum computer. If a block is generated every 10 minutes, the last bitcoin may be mined in year 2140. After that, the successors of today's miners may earn the profit from the settlement fee and so forth. On the other hand, it may be possible that the quantum computer will be realized before year 2140. In this event, the electronic signature assuming today's encryption becomes invalid and then the block chain may not be used before the last bitcoin is mined. However, there may be yet a long time from those days. Anyway, it may be, a-priori, expected that the block chain is popularized all over the world during the period of 10 years to several 10 years.

Even though the encryption is not broken, it is undeniable that the owner of the private key makes the improper transaction as illustrated in FIG. 9. The measure for this is "Proof-of-Works". Accordingly, it is important how to prevent the 51% attack.

There is a couple of points to prevent the 51% attack. First, the number of the nodes to be used by the attack should be limited (not infinity). It may be possible for the attacker to acquire a limitless number of the attacking nodes, if the address allocated to the nodes is logical address like IP address. Accordingly, the nodes connected to the P2P network should be allocated with physical addresses all linked to CPUs etc. This is called One-CPU-One-Vote (OCOV). For example, one voting sheet for one person should be indispensable in the majority decision system. However, the MAC address that has been extensively used as a physical address is an editable code to be allocated to the Ethernet board and then easy to be manipulated. Accordingly, the MAC address cannot ensure One-CPU-One-Vote.

By this way, it is decisively found that a new technology to prevent even the owner of the private key from abusing the private key is necessary. First of all, it must be necessary to link the private key with an individual authentication having a physical substance. Next, the owners or users must be required to manage the information apparatuses that have the physical substances. This may be also a characteristic of the P2P network. However, as mentioned above, the private key is generated from the software technology and is not related to any physical substance. The software is inherently designated to function similarly in any information apparatus where the software is installed, as long as those information apparatuses are designed and manufactured with the same specification. Accordingly, the software itself is free from any physical substance. Nevertheless, the network is composed of numberless information apparatuses and wired or wireless transmission pathways, which pathways link those information apparatuses and thus exchange the electronic data among them. It is inherent that not only the information apparatuses but also the signal transmission pathways are physical substances. Here is a hint to associate the private key to the physical substance.

The communication layer is discussed here.

In general, the information communication by the internet may be the exchange of the appropriate-sized pieces cut out from the digital data between the information terminals (nodes) in the network. The protocol data unit is formed by attaching this piece of data with the management information necessary to the management of the network. The format is to regulate the alignment of the piece of data and the management information. The format itself and the usage of the format are provided by a kind of procedure, called protocol. Any two nodes that communicate with each other must be subject to the protocols that have a certain degree of consistency.

For example, as illustrated in FIG. 15, the first node 2001 and the second node 2002 may exchange the protocol data unit via the signal transmission pathway 1000. Those first and second nodes 2001 and 2002 may treat the protocol data unit in compliance with the protocols that have a certain degree of consistency.

The protocol data unit may be called like a frame, a packet, a segment and so forth. Those names are distinguished according to the communication layers and defined by the total concept of the network system. For example, as illustrated in FIG. 16, there are physical layer (layer-1), data link layer (layer-2), network layer (layer-3), transport layer (layer-4), and upper layer (layer-5) from the bottom up. However, this layer structure is one of the examples and not beyond. For example, in a different concept, the transport layer may be further divided into three layers to form a seven-layered structure. Anyway, the protocol data unit is generally called frame, packet, and segment in the data link layer (layer-2), the network layer (layer-3), and the transport layer (layer-4), respectively.

From now on, the five-layer structure illustrated in FIG. 16 is used for the discussion.

First, the original information to be transmitted may be divided into a plurality of appropriate-sized data, which may form a group of data. The communication layer to which those data is belonged is the upper layer (layer-5) in FIG. 16.

The TCP header may be attached to those data. The TCP is an abbreviation of transmission control protocol, that is, a kind of protocol. By this way, what is formed by attaching the data with the TCP header may be called segment. The communication layer that deals with the segments may be the transport layer (layer-4).

The IP header may be attached to the segment and then the protocol data unit is called packet. The communication layer that deals with the packets is the network layer (layer-3). The protocol is IP. There are a couple of versions of IP, for example, IPv4, IPv6, and so forth.

The Ethernet protocol header may be attached to the packet and then the protocol data unit is called frame. The communication layer that deals with the frames is the data link layer (layer-2). The protocol is Ethernet.

In the Ethernet standard, the transformation to the physical layer at the bottom (layer-1) may also be defined, that is, the transformation to the optical signal or the electronic signal. The frames after the transformation may be turned over to the communication lines such as 10BASE-T and so forth.

The communication layers may form a nesting structure, whereas each layer is free from the others. Specifically, as illustrated in FIG. 16, the format of the segment in the layer-4 (transport layer) may include the format of the layer-5 (upper layer) with no revision. Since a segment is formed by attaching the TCP header to the data, the format of the layer-5 is just an original data. Thereby, TCP header and the original data are not irreversibly combined. In a similar way, the format of the packet in the layer-3 (network layer) may include the format of the layer-4 (transport layer) with no revision. Since a packet is formed by attaching the IP header to a segment, the format of the layer-4 is just a segment. Thereby, the IP header and the segment are not confused irreversibly. In addition, the format of the frame in the layer-2 (data link layer) may include the format of the layer-3 (network layer) with no revision. Since a frame is formed by attaching the Ethernet header and the FCS to a packet, the format of the layer-3 is just a packet, where FCS is the abbreviation of Frame Check Sequence and has been used to confirm if the packet is appropriately received. Thereby, the Ethernet header, the FCS, and the packet are not confused irreversibly.

In such a structure, the upper layers may not be affected at all, even though the protocol or the format is revised in the lower layers.

For example, in FIG. 16, the original data may not be affected at all, even though the TCP header is replaced with a different header. That is, the layer-5 (upper layer) may not be affected at all, even though some kind of change is added to the layer-4 (transport layer).

Similarly, the segment may not be affected at all, even though the IP header is replaced from IPv4 to IPv6 in the layer-3 (network layer). That is, the layer-4 (transport layer) may not be affected at all, even though some kind of change is added to the layer-3 (network layer). Since the layer-4 (transport layer) has no change, the layer-5 (upper layer) may not be changed at all.

In addition, the packet may not be affected at all, even though the Ethernet header is replaced with some other header in the layer-2 (data link layer). For example, nothing may change even though the protocol is replaced from the Ethernet to the Point-to-Point Protocol (PPP). Accordingly, nothing may change in the layer-3 (network layer) even though some kind of change is added to the layer-2 (data link layer). Since nothing may change in the layer-3 (network layer), the layer-4 (transport layer) may be unchanged. Since nothing may change in the layer-4 (transport layer), the layer-5 (upper layer) may also be unchanged.

Furthermore, the layer-2 (data link layer) may not be changed at all, even though some kind of change may be added to the layer-1 (physical layer). For example, the signal transmission pathway may be replaced from the optical fiber to wireless LAN. Even in this event, the contents of the information to be transmitted in the optical fibers must be identical to that to be transmitted in wireless LAN. Since nothing may change in the layer-2 (data link layer), the layer-3 (network layer) may not be changed at all. Since nothing may change in the layer-3 (network layer), the layer-4 (transport layer) may not be changed at all. Since the layer-4 (transport layer) may be unchanged, the layer-5 (upper layer) may not be changed at all.

By this way, even though anything is changed in a lower communication layer, nothing may change in any upper communication layer. It is because the communication layer structure is designed not to limit the coining technological innovation.

On the other hand, the present disclosure is related to the bottom two layers, i.e., the physical and the data link layer. By this way, any data to be transmitted in the logical layers (higher than the layer-3) may not be affected at all.

In order to constitute the network as a physical substance, the information apparatuses that serve as the nodes in the network and the signal transmission pathways that link the nodes are required. The signal transmission pathways may be wired or wireless. Furthermore, there may possibly be several kinds of signals. For a rough classification, there may be electrical signals and optical signals, for example. That is, the wired or wireless electrical signal transmission pathways or the optical signal transmission pathways may physically link the nodes to each other in the network. The layer that regulates the physical connection and the method of connection is the physical layer (layer-1).

The protocols to be adopted in the same communication layer must have a certain degree of consistency with each other, but they need not be consistent with each other for different layers. That is, designing the layers may be regarded as designing the relationship among the protocols. In the above, it has been assumed that the physical layer and the data link layer are different from each other (layer-1 and layer-2), whereas they may be regarded as a unified layer to simultaneously satisfy the same Ethernet protocol in a different concept of communication layer. In this event, the number of the layers may be reduced as four by one. Furthermore, the formats of the transport layer (layer-4) and the network layer (layer-3) may be unified to form the TCP/IP format. On the contrary, a certain layer may be able to be divided. In the OSI reference model, for example, the upper layer may be further divided into three layers, which are respectively the session layer (layer-5), the presentation layer (layer-6), and the application layer (layer-7) from the bottom up.

In general, the linkage structure of the network may be complicated; but both ends of any signal transmission pathways must be terminated with a node. FIG. 15 illustrates a simplest example. First, the information that has been input from some kind of source to the first node 2001 may be transformed (coded) into a protocol data unit in a predetermined format and then transmitted to the second node 2002 via the signal transmission pathway 1000. The second node 2002 may inversely transform (decode) the received protocol data unit according to a certain format consistent with the format of the first node 2001. By this way, the original information before being input to the first node 2001 may be reproduced. Consequently, a piece of data that has been transformed (coded) into a protocol data unit may be transmitted in the network. This is the basic mechanism of data transmission.

As mentioned above, in FIG. 15, two nodes terminating at two ends of the signal transmission pathway 1000 (the first node 2001 and the second node 2002) must be subject to the protocols that have a certain consistency. If those protocols do not have a certain degree of consistency, the signal transmission pathway 1000 may regard the first node 2001 and the second node 2002 as being disconnected.

In the case that the communication shown in FIG. 15 belongs to the transport layer (layer-4), the protocol data unit is a segment and the transform protocol is the TCP. For example, if the first node 2001 receives the data, it may attach the TCP header to the received data according to the TCP format so as to form a segment. This segment may be transferred into the second node 2002 via the signal transmission pathway 1000. The second node 2002 may receive the segment and then inversely transform (decode) it according to the format of TCP. The original data may be thereby reproduced. Specifically, the second node 2002 may remove the TCP header from the segment.

In the case that the communication shown in FIG. 15 belongs to the network layer (layer-3), the protocol data unit is a packet and the transform protocol is the IPv4, IPv6, and so forth. For example, if the first node 2001 receives the data (segment in this case), it may attach the IP header to the received data according to the IPv4 or IPv6 format so as to form a packet. This packet may be transferred into the second node 2002 via the signal transmission pathway 1000. The second node 2002 may receive the packet and then inversely transform (decode) it according to the format of IPv4, IPv6, or others. The original segment may be thereby reproduced. Specifically, the second node 2002 may remove the IP header from the packet. Or, the TCP header may be also removed simultaneously to reproduce the original data.

In the case that the communication shown in FIG. 15 belongs to the data link layer (layer-2), the protocol data unit is a frame. For example, if the first node 2001 receives the data (packet in this case), it may attach the Ethernet header to the received data according to the Ethernet format so as to form a frame. In the Ethernet format, the Frame Check Sequence (FCS) may also be attached to confirm if the packet is appropriately received. The frame formed like this may be transferred to the second node 2002 via the signal transmission pathway 1000. The second node 2002 may receive the frame and then inversely transform (decode) it according to the Ethernet format. The original packet may be thereby reproduced. Specifically, the second node 2002 may check the FCS to confirm if the packet is appropriately transmitted. The repair and re-transmission may be thus required as necessary. If the appropriate transmission is confirmed, the Ethernet header and the FCS may be removed.

The above-mentioned data transmission is assumed to take place in one direction, i.e., from the first node 2001 to the second node 2020. However, if the direction is reversed, the use of the protocol does not change at all. In this event, the information that has been input to the second node 2002 may be transformed (coded) into a protocol data unit according to a predetermined format and then transferred to the first node 2001 via the signal transmission pathway 1000. The first node 2001 may inversely transform (decode) the received protocol data unit to reproduce the original data before being input to the second node 2002.

In FIG. 17, the first node 2001 and the second node 2002 are relayed by the third node 2003. In this event, the digital data is input from some kind of source to the first node 2001. The first node 2001 is linked to the third node 2003 via the first signal transmission pathway 1001. The third node 2003 is linked to the second node 2002 via the second signal transmission pathway 1002.

The connection between the first node 2001 and the third node 2003 via the first signal transmission pathway 1001 may be similar to the connection between the first node 2001 and the second node 2002 via the signal transmission pathway 1000, as illustrated in FIG. 15. However, the third node 2003 functions partially different. That is, in the case that the third node 2003 serves as a relay to connect other two nodes, as illustrated in FIG. 17, (e.g., the relay between the first node 2001 and the second node 2002), the third node 2003 may not decode the received protocol data unit from the first node 2001 via the first signal transmission pathway 1001 and then is able to forward it to the second node 2002 via the second signal transmission pathway 1002 with no revision. Or, it may also forward the received protocol data unit with some revision. As a result of the revision, a code to notify that the data is relayed via the third node 2003 may be attached to the protocol data unit.

By this way, the data that has been input to the first node 2001 may be transformed into a protocol data unit according to a predetermined format and then transferred to the third node 2003 via the first signal transmission pathway 1001. The third node 2003 may not inversely transform (decode) the received protocol data unit and then forward it to the second node 2002 via the second signal transmission pathway 1002. Or, the third node 2003 may edit a part of the received protocol data unit (e.g., the header) and then forward it to the second node 2002 via the second signal transmission pathway 1002. The second node 2002 may inversely transform (decode) the received protocol data unit according to a predetermined format and then reproduce the original data before being input to the first node 2001.

In the case that the third node 2003 edits the received protocol data unit and then forward it to the second node 2002 via the second transmission pathway 1002, more specifically, the header related to the communication layer may be edited and then forwarded. For example, in the case that the third node 2003 belongs to the data link layer (layer-2), the Ethernet header of the frame may be edited and then the frame may be forwarded. More specifically, at least a predetermined authentication of the third node 2003 that serves as a relay may be attached to the Ethernet header. The relay location may be certified as an address having a physical substance (physical address). This physical address may be particular called MAC address. The MAC address is a specified address to the Ethernet apparatus (e.g., Ethernet card). The Ethernet apparatuses are equipped in the information apparatuses and then is regarded as having a physical substance.

Or, in the case that the third node 2003 belongs to the network layer (layer-3), TCP/IP header of the packet may be edited and then the packet may be forwarded. For example, at least a predetermined authentication of the third node 2003 corresponding to the system may be appended. By this way, when the second node 2002 receives a protocol data unit, it may be possible to trace where the received protocol data unit has come from and how it has transferred to here. The transmission points may serve as the addresses which are free from any physical substance (logical addresses). This logical address is particularly called IP address. The IP address is, for example, a proper address allocated to an operating system. The addresses in the layers higher than the layer-3 (network layer) are all logical addresses and then totally free from any physical substance.

In other words, in the network of the TCP/IP formulation (higher than the network layer), both nodes and signal transmission pathways are defined logically and are all virtual substances; which are free from any physical substance. On the contrary, in the network of the Ethernet formulation (data link layer), both nodes and signal transmission pathways all have physical substances. For example, the node is linked to which terminal? The signal transmission pathway is linked to which LAN cable? These questions could be answered.

For example, in the case that a packet is transferred from the third node 2003 in the network layer (layer-3) to the first node 2001 on the data link layer (layer-2), the packet may be transformed into a frame according to the Ethernet formulation and then forwarded to the second node 2002 via the signal transmission pathway 1000 in the network layer. In this event, it is noted that all of the first node 2001, the second node 2002 and the signal transmission pathway 1000 have a physical substance.

Or, in the case that a segment is transferred from the third node 2003 on the transport layer (layer-4) to the first node 2001 in the network layer (layer-3), the segment may be transformed into a packet according to the IP formulation and then forwarded to the second node 2002 via the signal transmission pathway 1000 in the network layer. In this event, it is noted that all of the first node 2001, the second node 2002 and the signal transmission pathway 1000 are logical substances and then free from any physical substance.

It may be inherent how the physical address and the logical address different from each other with the following illustration. For example, in the case that the information apparatus that constitutes the third node 2003 (old apparatus) is replaced with another apparatus (new apparatus), the operating system that has been installed into the old apparatus should be re-installed into the new apparatus to constitute the third node 2003 after the replacement. Thus, the physical address specific to the apparatus having the physical substance must be replaced. On the other hand, the logical address specific to the operating system can be left as an IP address of the third node 2003 after the replacement. This is the reason that the logical network (e.g., TCP/IP network) is adopted.

The physically unclonable function is discussed below.

FIG. 18 illustrates a basic structure of the information apparatus 140. For example, there are a plurality of (e.g, N) semiconductor chips (the first chip 110, the second chip 120 . . . the N-th chip 130).

Unlike the IP address and the public key, the information apparatuses have physical substances. To associate those information apparatuses with the network, then, the first chip 110 has a chip identification device 60. In this regard, the first chip 110 may be regarded as the identification core of the information apparatus 140. FIG. 19 illustrates the first node 2001, which is the information apparatus 140, and the second node, which is the communication partner, are linked to each other via the signal transmission pathway 1000. Thus, the first chip 110 may be the identification core of the first node 2001 or the information apparatus 140. Furthermore, the first chip 110 may be linked to the signal transmission pathway 1000 via the external input-output 50.

The chip identification device 60 may output the output code in reply to the call (input code) to be received from the external input-output 50. The returned output code may be generated by using the physical randomness. Furthermore, it is characteristic that a different input code causes a different output code even with the same chip identification device 60. In this regard, the chip identification device may be different from the MAC address stored in a nonvolatile memory of an Ethernet card. In other words, the MAC address is unable to change output according to input code.

A technology that has drawn a considerable attention to have such a function in the recent years may be what is called Physically Unclonable Function (PUF). It may serve as individual authentication of the semiconductor chips by using the physical properties which are specific to each semiconductor chip. It may be analogical to an individual authentication of a person using bio-information such as a fingerprint, a retina and so forth. The major requirements for this may be: (1) different inputs to the same PUF must cause different outputs, (2) different PUFs to be input with the same input must cause different outputs, (3) It must be impossible to predict the output in response to an unknown input, even though a set of inputs and outputs is stolen. 4 The relation between the input and output must be stable and reliable. Among them, the requirement 4 may be inherent as long as PUF is in the product level. In addition, the requirements (1) and (2) may be combined and then regarded as having the chameleon property.

In the case of the IC chip products (semiconductor chip products), there are two types of PUF as follows: One is to use the optical characteristics of forming an agent sealing chip (coating PUF). The other is to use the characteristics related to the chip itself (chip PUF). In the recent years, the theft of the encryption keys and the chip counterfeit have been more concerned. The technologies that are combined with the chip PUF of the counterfeited chip have drawn more attention. For example, the active code generated by inputting an encryption key, and the PUF data to be output from PUF in reply to an appropriately selected input code, may be stored in the inner memory of the chip. The active code may be generated only once before the chip is shipped or when the chip is registered in advance. After generating the active code, the encryption key may be reproduced by inputting the active code stored in the chip and the PUF data into the key generator as necessary. In this method, neither the encryption key nor the input code to be used for reproducing the encryption key needs to be stored in the inner memory. Accordingly, it must be impossible to thieve the encryption key as long as the chip is not hacked during the encryption process. On the other hand, it is possible to thieve the active code, but the stolen active code cannot reproduce the encryption key without the PUF data. In other words, the above requirement (1) and (3) can prevent the encryption key from being copied, as long as the input code that is used to acquire the PUF data is unknown. Like this, one of the merits of PUF is found to make it difficult to copy the encryption key.

However, the most popular usage of the PUF is the individual authentication of the IC chip. Here, the above requirement (2) must be indispensable. That is, the PUF must output the identification specific to the chip (PUF data) in reply to the lead signal to be input to the PUF (input code in this event).

The next topic may be the number of the nodes. In theory, the number of the logical nodes is limitlessly increased. However, the actual number is defined by the standard. For example, the number of IPv4 addresses is 4,294,967,296 at the maximum since the IPv4 is the standard of 32 bits. The IPv4 is an oldest protocol that was designed only for the government, the army, and the research institutes in USA, and had already been used up. Then, it is being upgraded to IPv6 with 128 bit standard. The information quantity of 128 bits is 3.4 times ten to the power of 38. However, the nodes having a physical substance (physical nodes) are much less. To roughly estimate the number of the physical nodes, the physical addresses to be respectively allocated to the physical nodes may be considered as follows.

The physical address is discussed below.

The physical address that has been extensively used is called MAC address, which is a specific management number allocated to an Ethernet card equipped in the information apparatus. The MAC address is standardized by the Institute of Electrical and Electronical Engineers (IEEE). FIG. 20 illustrates an example, that is, a 48 bits (6 bytes) sequence of 0 and 1 with the information quantity of 280 trillion. The upper 24 bits (the left half in FIG. 20) is called a vendor code 3071 and allocated to the vendors. The lower 24 bits (the right half in FIG. 20) is called serial number 3072 and allocated to the products with no duplication by the vendor. The last two bits of the vendor code 3071 are UL bit and IG bit. The MAC address is represented by dividing such a 48-bit sequence including the UL bit and the IG bit into six bytes, each of which byte is represented by a hexadecimal number.

In the case that a MAC address is a global address, the UL bit is 1. Otherwise, the UL bit is 0. In other words, the MAC addresses must be allocated to the information apparatuses all over the world with no deplumation in the case of the global address (UL bit=1). It should be noted that the MAC addresses must be allocated with no duplication including not only the active information apparatuses that are currently being used, but also the discarded and missing ones that are no longer used all over the world. It is because each MAC address is allocated to the information apparatus that has a physical substance.

Another one out of the 24 bits of the vendor code is allocated to IG bit. In the case that the IG bit is zero, it means the unicast communication. Otherwise, it means the multicast communication. The unicast communication is to transfer the data (frame) to the uniquely selected destination in the network of the information apparatuses. On the contrary, the multicast communication is to transfer the data (frame) to a plurality of destinations selected in the network of the information apparatuses. In this way, the residual 46 bits other than the two bits for UL bit and IG bit among the 48 bits may be the actual freedom to be allocated to the MAC address. It can be converted to have a number of 70 trillion.

Currently, the MAC addresses have not been used up. However, more than 10 trillion physical nodes are regarded as being actively connected to the network in the period of the Internet-of-Things (IoT). It is however noted that MAC addresses under no use due to some reasons can be re-used since MAC addresses are editable. It might thus appear that the exhaustion of the MAC addresses can be avoided, but the editing of the MAC address makes it easy to counterfeit and hijack the MAC addresses. See http://pc.mogeringo.com/archives/1826.

Accordingly, the number of the population (the nodes having the physical substances), which PUF can individually authenticate for the MAC address, must be extremely large. The following condition should therefore be added to the above requirements of PUF (1)-(4). That is, (5) the pattern of the outputs in reply to an input should actually be a limitlessly large number (At least more than 100 trillion).

By this way, it may be possible to use PUF for realizing the physical authentication of the chips in the incredibly huge IoT.

Here, it may be supposed that the coating PUF satisfies the requirements of (1)-(5). However, the reading operation of the coating PUF is carried out by optically stimulating the package. Accordingly, it is impossible to electronically read the individual authentication of the chips via the network. Then, the following condition should be further added. That is, (6) the individual authentication of the IC chips in the network should be carried out by the chip PUF.

Mainly two types of the chip PUF satisfying the above condition (6) are reported in the literature. One is a circuit PUF to use the variation of the circuits. The other is to use the variation of the miniaturized micro-structure other than the circuits (fabrication PUF) (See Japan Patent Publication No. 2015-201884). The circuit PUF is further divided into a delay PUF to use the wiring delay of the circuits (See WO2011118548A1) and a metastability PUF to use the metastability of the circuits (See Japan Patent Publication No. 2013-131868). The delay PUF is to use the uncontrollable variation of the operational time of a plurality of circuits integrated with the same design specification in IC. The typical examples of the circuits used are an arbiter circuit, a glitch circuit, a ring oscillation circuit and so forth. The circuit used in the metastability PUF is mainly Static Random Access Memory (SRAM hereinafter) and the latch circuit (butterfly circuit).

The weak point of the circuit PUF is that the individual difference is too small. Second, the output is unstable so that it is difficult to satisfy the condition (4). Furthermore, it is too sensitive to the external environment such as the temperature change, and is weak against the fault attack. Then, it is necessary to append an amplifier circuit and a temperature sensor circuit. In this way, the load in the designing is increased, resulting a large limit in the length of the PUF data. It may therefore be difficult to satisfy the above condition (5). If the PUF data itself is short, the number of the chips to be authenticated may be limited even though the output is random.

The fabrication PUF is to use the randomness caused by the process variation of the inter-layer via that is to be integrated on purpose. It may be possible to solve most of the weak points of the circuit PUF. However, it is necessary to integrate the special structures that have never been used in the conventional semiconductor products, and then may generally increase the load in the fabrication process. Therefore, it may be difficult to popularize the technology.

Apart from the above, the reliability of the electron devices is used to form PUF (See Japan Patent No. 2015-139010), but the reliability itself is low and does not satisfy the condition (4). Furthermore, another PUF is reported, which uses the variation of the capacitors of the dynamic random access memory (DRAM hereinafter) when turning the switch on. This can be referred to "DRAM based Intrinsic Physical Unclonable Functions for System Level Security" as published by Fatemeh Tehranipoor, Nima Karimian, Kan Xiao, John Chandy in GLSVLSI'15 Proceedings of the 25th edition on Great Lakes Symposium on VLSI, pp. 15-20, 2015.

This theoretically has a common problem with the latch circuit PUF. That is, the individual difference is too small to resist the fault attack that uses the environmental change.

As mentioned above, even though there are a plenty of problems that should be solved respectively, it may be regarded that the PUF itself is useful in realizing the physical authentication of the smallest units of the nodes (semiconductor chips or chips) having the physical substance without using the MAC address among the mutual linkage in the network.

Nevertheless, the essential requirement related to the present disclosure is not always what has been generally regarded as PUF as mentioned above and is a function of physical chip identification (PCID) which satisfies a part or the whole conditions as similar to PUF. Such a device related to the present disclosure may be conveniently called PUF device hereinafter or also called PCID device more precisely. The terms of PUF device and PCID device are identical to each other.

Next, the conditions to be satisfied by the PUF devices related to the present disclosure may be described.

The property for independent input is described herein.

This may correspond to the above-mentioned condition of PUF (1). That is, if different input codes are input to the same PUF device, different output codes may be output, respectively. For example, as illustrated in FIG. 21, if the input code "C is input to the PUF device 600, the output A is output. If the input code D is input to the same PUF device 600, the output code B is output. However, the output code A and the output code B are different from each other, as long as the input code C and the input code D are different from each other.

The property for independent output is described below.

This may correspond to the above-mentioned condition of PUF (2). First, the response to the same input to two different PUF devices may be specified. As illustrated in FIG. 22, the same input code Q is input to two different PUF devices, i.e., the first PUF device 21 and the second PUF device 22. In this event, the first PUF device 21 outputs the output code A, while the second PUF device 22 outputs the output code B. However, the output codes A and B are different from each other. In this regard, although the input codes are identical, different PUF devices output different output codes.

The property for output unpredictability is described below.

This may correspond to the above-mentioned condition of PUF (3). As illustrated in FIG. 23, when n input codes (Q1, Q2 . . . Qn) are input to the same PUF device 600, the output codes (R1, R2 . . . Rn) to be respectively output in response to these input codes are all known. In this event, it must be impossible to predict the output code Rn+1 to be output in response to the input code Qn+1 that is different from any of n input codes (Q1, Q2 . . . Qn) before inputting the input code Qn+1. However, n is an integer number larger than 2.

In the case that the PUF device 600 generates an output according to some kind of algorithm, that is, the software returns the authentication, the output code must be generated in response to the input code according to some kind of algorithm. However, as long as the program is designed by algorithm, no program can satisfy the property of the output unpredictability. This is, it is impossible to generate a perfect random number with any program. By this way, it is found that the PUF device 600 must adopt the physical randomness. In other words, this is the requirement for physical randomness.

The property of the input-output reliability is described below.

This may correspond to the above-mentioned condition of PUF (4). As illustrated in FIG. 24, the input code error 31 (ΔQ) may be involved in the input code Q due to the uncontrollable noise related to the circuit that controls the input code Q. On the contrary, the output code error 32 (ΔR) may be involved in the output code R due to not only the input code error 31 (ΔQ) but also the uncontrollable noise related to the circuit that controls the output code. In this event, the absolute values of the difference between two different input codes (e.g. Q1 and Q2) is assumed to be larger than the maximum of the absolute value of the input code error 31 (ΔQ). Thus, the absolute values of the difference between the output code R1 (generated from the input code Q1) and the output code R2 (generated from the input code Q2) must be larger than the absolute value of the output code error 32 (ΔR).

The PUF device related to the present disclosure should satisfy all of the four conditions of the above-mentioned properties of independent input, independent output, output unpredictability, and input-output reliability. That is, the property of independent input is the same as: (1) different inputs to the same PUF must cause different outputs. The property of independent output is the same as: (2) different PUFs to be input with the same input must return different outputs. The property of the output unpredictability is the same as: (3) it must be impossible to predict the output in response to an unknown input, even though a set of inputs and outputs is stolen. The property of the input-output reliability is the same as: (4) the relation between the input and the output must be stable and reliable. As mentioned above, in order to handle the network including an extremely huge number of physical nodes, the PUF device related to the present disclosure must further satisfy the fifth and sixth conditions: (5) the pattern of the outputs in reply to an input should actually be a limitlessly large number and (6) the individual authentication of the IC chips in the network should be carried out by the chip PUF.

FIG. 25 is a drawing in which the chip identification device 60 in FIG. 18 is replaced by the PUF device 600. FIG. 26 is a drawing in which the chip identification device 60 in FIG. 19 is replaced by the PUF device 600. Accordingly, the first chip 110 is the identification core of the information apparatus 140 or the first node. Like this, as long as all of the physical nodes connecting to the network are electronic apparatuses including the IC chips, it may be inherent that (6) is satisfied. Accordingly, the PUF device related to the present disclosure may be configured to satisfy the five conditions (1)-(5).

The QR code type is described below.

The PUF device (or PCID device) included in the identification core related to the present disclosure may include a plurality of PUF cells (or PCID cells) distributed in a cell array of the semiconductor devices. Here, the PUF cell may be assumed to output a signal corresponding to either "1" or "0", for example.

However, it is probabilistic that each PUF device may output a signal of "1" or "0." In addition, the probability must be regarded as being physically random, as long as it is free from any algorithm. That is, a plurality of PUF devices in the above-mentioned cell array may output a physically random set of "1" and "0". Thus, the above-mentioned condition (3), i.e., the property of the output unpredictability, may be satisfied. Here, the outputs from these PUF devices may be plot in the cell array while representing "1" and "0" by black and white, respectively. In this way, the checkerboard pattern of white and black may be obtained, as illustrated in FIG. 27.

A random set of "1" and "0" may be the same as generating the digital randomness. Since it is digital, the above-mentioned condition (4), i.e., the property of the input-output reliability illustrated in FIG. 24, may be satisfied, as long as "1" and "0" are not exchanged in any uncontrollable manner.

In order to satisfy the condition (5), the pattern of the outputs in reply to an input should actually be a limitlessly large number. It is necessary that the number of the cells in the cell array is large enough.

The property of the independent input and the property of the independent output, that is, the chameleon property, may be satisfied if the white-black random pattern on the checkerboard is appropriately utilized. The specific description may be as follows.

FIG. 28 illustrates the cell distribution of the cell array for PUF 960 for realizing FIG. 27. There are L word lines 503 in the row directions which are in the vertical direction in the figure. There are M bit lines 902 which are perpendicular to the word lines. The PUF cells 977 are distributed at the cross-points of the L word lines 503 and the M bit lines 902. The row decoder 972 is in the row direction and the column decoder 973 is in the column direction. They are connected to the input-output PIN 971 via the external input-output controlling circuit 980.

FIG. 29 shows that N word lines 503 and N bit lines 902 are extracted from the cell array of the PUF 960 shown in FIG. 28. In general, N may be an integer number smaller than or equal to L or M. In this figure, the row is in the horizontal direction and the column is in the vertical direction. The input code (P, S, T . . . ) is converted to a binary notation: $(a(1), b(1), a(2), b(2), \ldots, a(N), b(N))$. Accordingly, the values of $a(i)$ and $b(i)$ are either "0" or "1", where i is an integer number from 1 to N. Dividing the input code into the sequence a and the sequence b, the elements of $(a(1), a(2), \ldots a(N))$ correspond to the rows in an order starting from the first row. Likewise, the elements of $(b(1), b(2), \ldots, b(N))$ correspond to the column in an order starting from the first column.

The output from the PUF cell 977 existing at i-th row and j-th column may be represented by $d(i, j)$ in response to an input including a set of $a(i)$ and $b(j)$. For example, $d(i, j)$ must be either "1" or "0", where i and j are natural numbers from 1 to N. Here, a set of natural numbers $(i, j)$ corresponds to an address of the PUF cell 977. In the example of FIG. 29, an element $d(5, N-2)$ is shown. Here, an ensemble of $d(i, j)$, which is depicted as $\{d(i, j)\}$, may be a random number code which is a random aggregation of "0" and "1". When the value of $d(i, j)$ is "1", the corresponding address $(i, j)$ may be depicted as black. Otherwise, the corresponding address $(i, j)$ may be depicted as white. In this way, a random checkerboard pattern of white and black may be obtained, as shown in FIG. 27.

It may be possible to associate an input code with the addresses of the PUF cells by dividing the input code into two parts and then both of them are related to rows and columns, respectively. In this manner, the dividing of the input code may be executed according to a predetermined format. Of course, it may be inherent that the sequences a and b are exchanged with each other as an example. There may be limitlessly methods to divide the input code. The method described here, in which the sequence a and the sequence b are alternatively extracted from the input code, is one of the examples and not beyond. In addition, the numbers of the elements of the sequences a and b may not be generally equal. However, in order to input the total elements of the input code, the sum of the numbers of rows and columns of the cell array for PUF 960 needs to be larger than the number of the total elements of the input code at least.

In this way, it may be required that the output code $\{c(i, j)\}$ is generated from the sequence $\{a(i)\}$, the sequence $\{b(i, j)\}$, and the random number code $\{d(i, j)\}$ with some kind of method. Thus, if the physical random number is adopted as an example to form the random number code {d(i, j)}, the condition (3), that is, the property of the output unpredictability, may possibly be satisfied. It must be impossible to predict the output in response to an unknown input, even though a set of inputs and outputs is stolen.

In this event, the input code {a(i), b(j)} and the output code {c(i, j)} may be exchanged during the communication between the physical nodes. For example, in an example of FIG. 26, the input code {a(i), b(j)} is input to the PUF device 600 included in the identification core from the second node 2002 (communication partner). The PUF device 600 outputs the output code {c(i, j)} in response to this input. Here, as mentioned below, it should be noted that the random number code {d(i, j)} is not returned.

As an example related to the present disclosure, the method to generate the output code {c(i, j)} mainly from the first input sequence {a(i)} and the second input sequence {b(j)} and the random number code {d(i, j)} may be explained with the drawings. As an example, the elements of the sequences {a(i)} and {b(j)} are assumed to be either "0" or "1". To generate the output code {c(i, j)}, the residue mod (x, y) may be adopted. This is the remainder of dividing x by y.

$$c(i,j) = \mod(a(i)+b(j)+d(i,j), 2),$$ Eq. 1.

FIG. 30 illustrates the chart of the relationship among the sequences {a(i)} and {b(j)}, the random number code {d(i, j)}, and the output code {c(i, j)} outputted according to the equation 1. It may be thus recognized that the ratio of "0" and "1" may be identical between the input and output. This is a necessary condition to stabilize the information quantity processed by equation 1. That is, the information quantity to be input to the right hand side of the equation 1 should be identical to that to be output from the left hand side of the equation 1.

In the case that the input information quantity and the output input information quantity are largely different from each other, the information quantity to be dealt with by the equation 1 should be reduced to fit with the smaller one. As a result, the amount of the information loss may at least be the difference between the two information quantities. The information leakage like this may probably be against the above-mentioned condition to be appended for PUF, that is, (5) the pattern of the outputs in reply to an input should actually be a limitlessly large number. Accordingly, such a situation should be avoided as possible as it can be. To satisfy this condition (5), the number of the cases of the random number needs to be as large as almost infinity.

FIG. 31 illustrates an example of a basic structure to realize the mechanism described by the equation (1). That is, the random number code {d(i, j)} may be generated by the random number generator 601 and then input to the code generator 602 together with the input code to be input from the communication partner 400. Thus, the output code {c(i, j)} may be generated by the code generator 602. Here, the communication partner 400 may be the second node 2002 in the example of FIG. 26.

In addition, the random number generator 601 and the code generator 602 may compose the PUF device 600 in an example of FIG. 31. On the other hand, although it is not specially described because it is inherent, there may be the code generator 602 out of the PUF device 600 in another example. Anyway, at least the random number generator 601 should be implemented into a chip as cheap as possible.

It may be found in the equation 1 that the code generator 602 adopts a kind of algorithm to generate a code. However, it involves the physical randomness with the random number code {d(i, j)} simultaneously. Thus, the above-mentioned condition (3), i.e., the property of the output unpredictability, may be satisfied. In addition, to input the total elements of the input code, the sum of the rows and columns of the random number generator 601 should be larger than or at least equal to the sum of the element numbers of {a(i)} and {b(j)}.

Furthermore, the communication partner 400 of the PUF device 600 (the second node 2002 in FIG. 26) may at least send the input code to be input to the PUF device 600. That is, in the example of FIG. 26, the second node 2002 may send the input code, that is to be input to the PUF device 600 included in the first node 2001, to the first node 2001.

FIG. 32 illustrates another example. Here, in the example of FIG. 26, the communication partner 400 corresponds to the second node 2002. On the other hand, the node equipped with the PUF device 600 corresponds to the first node in FIG. 26. First, the communication partner 400 sends the input code (P, S, T . . . ) to the scramble device 604. By this way, the input code (P, S, T . . . ) is converted into (P', S', T' . . . ). This converted code is input to the PUF device 600 as an input code. The PUF device 600 outputs the output code (P1, S1, T1 . . . ) in response to the input of the input code (P', S', T' . . . ). Next, (1) this output (P1, S1, T1 . . . ) is output to the communication partner 400. Or, (2) this output (P1, S1, T1 . . . ) is returned to the scramble device 604 and then the scramble device 604 returns the further scrambled output (P1', S1', T1' . . . ) to the communication partner 400. Or, although it is not specially illustrated because it is inherent, (3) a second scramble device converts the output (P1, S1, T1 . . . ) into the output (P1", S1", T" . . . ) and then returns it to the communication partner 400. In the method (3), at least two independent scramble devices are necessary.

Anyway, it may be preferable from the viewpoint of the cost that the scramble device 604 is embedded into the chip to be equipped with the PUF device 600. FIG. 33 illustrates a basic structure of the scramble device 604. In this example, the scramble device 604 includes the random number generator 605 and the code generator 606. The illustrations of the random number generator 605 and the code generator 606, which include the scramble device 604, are similar to those in FIG. 31, so that they are omitted here. In addition, although it is not specially illustrated because it is inherent, it may also be possible that the code generator 606 is located out of the scramble device 604. Furthermore, it may be possible to include the scramble device 604 in the PUF device 600 shown in FIG. 25 and FIG. 26. In this event, "PUF device" may be replaced with "PUF device and scramble device" in those figures.

FIG. 34 illustrates an example or a part of the example of the cell array for PUF 611 and the cell array for scramble device 614, which include the PUF cells 977 in FIG. 28. The rows are in the horizontal direction and the columns are in the vertical direction as contrary to FIG. 28. In this example, the number of the rows is N+K. The number of the columns is N. The upper area of the K rows and the N columns is the cell array for the scramble device 614 to form the random number generator 605 in the scramble device 604. The lower area of the N rows and the N columns is the cell array for PUF 611 to form the random number generator 601 in the PUF device 600. Of course, it may be possible to exchange the rows and the columns with no change in the function.

FIG. 35 illustrates another example realizing the random number generator 605 including the scramble device 604. First, an element of {a(j)+b(j)} is input to the scramble device 604 in a given column, where j is the given column number. Next, according to the equation 2, the elements of the physical random number d(i, j) are summed up in the row direction, where i is a row number. Then, the sum is divided by 2 to obtain the remainder. At each column number (j), a(j)+b(j) is added to this reminder and then divided by two to obtain the temporal output {f(j)}. By this way, the input code {a(j), b(j)} is converted into the temporal code {a(i), f(j)} by involving the physical randomness in the scramble device 604. The term of temporal code means a code of temporal output and the term of temporal output means an output temporal code; then temporal code and temporal output means an identical idea. This {a(i), f(j)} is input to the PUF device 600 as a temporal code so as to output the output code {c(i, j)} according to the equation 3. Furthermore, although it is not described since it is inherent, the temporal code may be replaced with {b(i), f(j)} or {a(i)+b(i), f(j)}. Anyway, it may be possible to compound a temporal code with an arbitrary method by using the input code {a(j), b(j)} and the temporal output {f(j)}. Furthermore, {b(j)} may be a dummy $$f(j) = \mod\left(a(j) + b(j) + \mod\left(\sum_{i=1}^{K} d(i, j), 2\right), 2\right),$$ Eq. 2.

$$c(i, j) = \mod(a(i) + f(j) + d(i + K, j), 2),$$ Eq. 3.

Here, the combination of the selected row number K of the scramble device 604, and the selected row number N of the PUF device 600, may be determined in an arbitrary manner by the owner or the regular administrator of the node having the PUF device. The determined (N, K) may be stored in the inner memory of the node having the PUF device. Or, on the contrary, (N, K) may be stored in the inner memory of the node to be a communication partner of the PUF device.

In general, it may be able to revise (N, K) as necessary. Once (N, K) is revised, the temporal code {a(i), f(j)} to be generated by the scramble device 604 must be changed even though the same input code {a(i), b(j)} is input. Accordingly, the output code {c(i, j)} to be generated by the PUF device 600 must be changed. The revised (N, K) is necessary to be re-registered to the node to be the communication partner as necessary.

In the case that the operational processor unit equipped in the identification core is used, since the code generation satisfies the above equations 1-3, it may be preferable that the whole or a part of the temporal output {f(j)} is stored in the register of the operational process unit. This is not to export the temporal output {f(j)}, that is to be generated between the scramble device 604 and the PUF device 600, to the exterior of the operational processor unit. That is, the temporal code including the temporal output {f(j)} is not to be exported to the exterior of the operational processor unit.

Furthermore, it is very difficult to extract the temporal output {f(j)}, that is confined in the operational processor unit or the chip, from the register under the generation of the codes by the reverse-engineering. It is because the register is a very small dynamical memory. For example, the resistor memory is 32 bits or 64 bits at most in the general personal computers. On the other hand, N bits are necessary to store the whole temporal output {f(j)}. Therefore, if N is large enough, the temporal code {f(j)} must be divided into a plurality of segments and then is stored in the register, in order to generate the codes. Here, the number of the bits of the register to be used for generating the codes is assumed to be R. For example, in FIG. 35, the segment 1 may be allocated to form the first to the R-th columns, the segment 2 may be allocated to from the (R+1)-th to the 2R-th columns, the segment 3 may be allocated to from the (2R+1)-th to the 3R-th column, etc. A part of the temporal output {f(j)} may be generated and stored in the register for each segment according to the equation 2. That is, as long as N is large enough, the register memory area storing a part of the temporal output {f(j)} must be overwritten whenever the segment is updated. Therefore, it is impossible to theft the whole temporal output {f(j)} even during the code generation.

Or, in the case that the operational processor unit equipped in the node including the identification core is used, since the code generation satisfies the above equations 1-3, it may be preferable that the whole or a part of the temporal output {f(j)} is stored in the inner memory of the node including the identification core. This is not to export the temporal output {f(j)}, that is generated between the scramble device 604 and the PUF device 600, to the exterior of the node including the identification core. That is, the temporal code including the temporal output {f(j)} is not to be exported to the exterior of the node including the identification core.

Or, in the case that the peripheral circuit inside the chip configuring the identification core is used, since the code generation satisfies the above equations 1-3, it may be preferable that the temporal output {f(j)}, that is generated between the scramble device 604 and the PUF device 600, is not to be exported to the exterior of the chip. That is, the temporal code including the temporal output {f(j)} is not to be exported to the exterior of the chip.

Anyway, it may be preferable that the temporal output {f(j)} is automatically overwritten after completing the generation of the output code {c(i, j)}. Furthermore, in the present invention, the random number code {d(i, j)} (i=1 . . . K) is used to generate the temporal code {f(j)} from the input code {a(i), b(j)}. Accordingly, if the element number of the random number code {d(i, j)} (i=1 . . . K) is large enough, it may actually be impossible to predict the temporal output {f(j)} from the input code {a(i), b(j)}. Furthermore, the random number code {d(i, j)} (i=K+1 . . . K+N), which is independent from the previous one, is used to generate the output code {c(i, j)} from the temporal input code {a(i), f(j)}. Therefore, as long as the element number of the random number code {d(i, j)} (i=K+1 . . . K+N) is large enough, it may be actually impossible to predict the output code {c(i, j)} from the temporal input code.

For example, the difficulty in predicting the output code {c(i, j)} may be roughly evaluated with the example of FIG. 34. Specifically, the bit capacities of the cell array for the scramble device 614 (K-rows) and the cell array for PUF 611 (N-rows) may be roughly evaluated as follows. First, the number of the cases of the input code is two to the power of 2N. The number of the cases of the random number code {d(i, j)} of the cell array for the scramble device 614 is two to the power of NK. On the other hand, the number of the cases of the random number code {d(i, j)} from the cell array for PUF 611 is 2 to the power of Y, where Y is the square of N. The number of the cases of the output code {c(i, j)} is 2 to the power of Z, where Z is the square of N.

Next, the necessary condition to determine (N, K) may be considered as follows. The input code to be used in the generic digital encryption lines may be currently from 128 bits to 256 bits. The number of the bits has been annually increased for the reason of the encryption security and may vary from 256 bits to 512 bits in the coining 10 years. Then, as an example, N=K=512 may be used for the rough evaluation. Thus, the number of the cases of the input code is 2 to the power of 1024. This is already much larger than the number of the integral digits that can be handled by the general calculators. Actually, a calculator outputs the infinity on the display. The number of the cases of the random number code {d(i, j)} of the scramble device, the random number code {d(i+N, j)} of the PUF device and the output code {c(i, j)} may be even larger, in which all results are in two to the power of 262,144. Of course, this is actual infinity Thus, at most the capacity of 262 k bits is sufficient to form the PUF device even with the inclusion of the scramble device. The bit capacity is four digits less than the bit capacity of the conventional DRAM products per die (4G bits), i.e., less than 1 to 10,000.

In the case of N=K=128, the number of the cases of the input code is 2 to the power of 256, i.e., 10 to the power of 77. As mentioned above, the number of the communication nodes may be more than one trillion (10 to the power of 12) all over the world in IoT. Although 10 to the power of 77 is not the infinity, it is much larger than the node number all over the world. The possibility that two input codes are accidentally the same is about 10 to the power of −65, which is actually zero.

The number of the cases of the random number code {d(i, j)} of the scramble device, the random number code {d(i+N, j)} of the PUF device, and the output code {c(i, j)} are all two to the power of 16,384. Of course, it is actually infinity. Thus, at most the capacity of 16 k bits is sufficient to form the PUF device even with the inclusion of the scramble device. This bit capacity is five digits less than the bit capacity of the conventional DRAM products per die (4G bits), i.e., less than 1 to 100,000.

By this way, even if the temporal code {f(j)} is theft, it may be impossible to predict the output code {c(i, j)} from the physical randomness of the random number code {d(i, j)} (j=K+1 . . . K+N). In addition, it may be possible to update (N, K) as a security buffer as required. Then, the temporal code generated in response to the same input code {a(j), b(j)} must be updated as required.

FIG. 36 illustrates an example of a memory chip including the cell array for the scramble device 614 and the cell array for PUF 611. Those cell array areas are layout in the word line direction and then share the word lines 503 together with the memory cell array area. FIG. 37 illustrates another example of a memory chip including the cell array for the scramble device 614 and the cell array for PUF 611. Those cell array areas are layout in the bit line direction and then share the bit lines 902 together with the memory cell array area. Anyway, the group of the word lines is controlled by the row decoder 972 and the group of the bit lines is controlled by the column decoder 973. Like this, the present invention is essentially unchangeable even though the word lines 503 and the bit line 902 are switched FIG. 38 illustrates an example of the PUF cell 977. There is a capacitor 982 at a cross-point of a word line 503 and a bit line 902. In general, the capacitor includes a dielectric film sandwiched between two conductors and then stores the charge by applying an electric field between these conductors. Here, if the applied electric field is direct current (DC), it may be expected that electric current cannot flow. However, if the applied electric field is still DC but with an excessively large magnitude, the dielectric film may be broken and then the broken capacitor may cause the flow of an electric current. The electric field may be applied to the capacitor 982 at the selected cross-point by applying a voltage between the word line 503 and the bit line 902. Additionally, the applied voltage to break the capacitor 982 may be either DC or AC.

The occurrence of the breakdown is regarded as being probabilistic due to the physical randomness. The electric current is likely to flow through the broken PUF cells even at a low electric field, which for example may correspond to "1" in a memory device and may correspond to black in FIG. 27. To the contrary, the electric current is hardly to flow through the unbroken cells at a low DC electric field, which for example may correspond to "0" in a memory device and may correspond to white in FIG. 27. This probability may be roughly controlled by tuning the applied electric field to break the dielectric film and the detailed condition of the capacitors (material properties, geometry, size and so forth). It may be preferable that this probability is about 50%.

FIG. 39 illustrates the current-voltage characteristic to be used for the breakdown judgment. The horizontal axis represents the absolute value of the read voltage (DC) to be applied to the PUF cell (capacitor 982 in the example of FIG. 38) for read. The vertical axis represents the absolute value of the electric current flowing through the PUF cell in response to the read voltage. Here, the electric field applied to the PUF cell is high if the voltage is high. The electric field applied to the PUF cell is low if the voltage is low. In the broken PUF cells, a very large electric current flows even though a low voltage is applied. On the other hand, in the unbroken PUF cells, the electric current hardly flows at a high voltage. To distinguish the difference, the breakdown judge current value 933 and the non-breakdown judge current value 934 are introduced at the breakdown judge voltage 932. That is, when the read voltage, whose absolute value is the same as the breakdown judge voltage 932, is applied to the PUF cell 977, if the absolute value of the electric current flowing through the PUF cell 977 is larger than the breakdown judge current value 933, the corresponding PUF cell is judged as being broken. If the absolute value of the electric current flowing through the PUF cell 977 is lower than the non-breakdown judge current value 934, the corresponding PUF cell is judged as being unbroken.

During the actual reading operation, first of all, the addresses of the cells to be read must be selected. To select the address, as illustrated in FIG. 28, the cell's row may be selected by the row decoder 972 and the cell's column may be selected by the column decoder 973. The combination of the cell's row and the cell's column is the address. In the example of FIG. 40, those addresses are represented in binary notation at the first line. Thus, the read voltage may be applied between the word line 503 and the bit line 902, both of which connect to the PUF cell 977 corresponding to the address selected in a method similar to that illustrated in FIG. 39. Then, the data of the corresponding address may be read ("1" or "0"). After the reading operation, the address of the PUF device to be selected may be changed to read the data of the next PUF cell. This procedure may be repeated until the data of the total PUF cells in the cell array for PUF 960 is read.

In the judge method in FIG. 39, there is a fixed gap between the breakdown judge current value 933 and the non-breakdown judge current value 934. Thus, if the absolute value of the read current is within the gap, the corresponding cell can be regarded as being neither broken nor unbroken. The PUF cells like this may be represented by "X", since it is neither "0" nor "1". FIG. 40, thus, is a drawing illustrating an example of the addresses of the PUF cells on the cell array by binary notation and the data of the corresponding PUF cells. As an example, in the third line, there are "1", "1", "0", "1", "X", "0", "0", "1" ... "0" from the left. By this way, the data of the fifth PUF cell from the left is "X".

Next, if the sequence of "0" and "1" is plotted on the checkerboard according to the corresponding addresses like FIG. 40, the white-black pattern similar to FIG. 27 may be obtained. Here, "0" is converted into white and "1" is converted into black. However, if there are several "X"s which are neither "0" nor "1", it may be difficult to obtain the white-black checkerboard pattern like FIG. 27. Then, it is required to exclude the PUF cells which correspond to the "X"s from the plot before plotting on the checkerboard pattern.

For example, the addresses of the PUF cells corresponding to "X" (e.g., 100 in binary notation in the example of FIG. 40) may be stored in the buffer memory. By comparing each of the addresses of the PUF cells with the record stored in the buffer memory, if an address is found in the buffer memory, the corresponding cell may not be read. By this way, the data corresponding to "X" may be excluded, as shown in the fourth line in FIG. 40, to form the combination including only "0" and "1". Thus, the white and black checkerboard pattern may be obtained.

As an example, the method of FIG. 41 is explained here. After the first break pulse voltage is applied, the breakdown inspection may be executed by the method described in FIG. 39. If the ratio of "X" is larger than a predetermined value, the second pulse voltage may be subsequently applied and then the breakdown inspection may be executed by the method described in FIG. 39. If the ratio of "X" is still larger, the third pulse voltage may be applied and then the breakdown inspection may be executed by the method described in FIG. 39. This procedure may be repeated until the ratio "X" becomes smaller than the predetermined value.

It may also be required to set an upper limit in advance, so as to define the maximal number of times the procedure can be repeated. In the case that the ratio of "X" is still larger than the predetermined value at the time the upper limit has been reached, the corresponding PUF device should be regarded as being disqualified as a result of the inspection. In the case that the corresponding PUF device fails to pass the inspection like this, the PUF device may be regarded as being defective and then is discarded. In the case that the PUF device passes the inspection, the addresses of the PUF cells labeled "X" as mentioned above may be stored in the buffer memory to exclude the data of the corresponding PUF cells. However, if the number of the PUF cells is large enough, it may be possible to ensure the physical randomness having a large enough information quantity even though the ratio of "X" is somewhat large. In this event, it may omit the inspection procedure for the ratio of "X".

In general, there may be two modes, i.e., the hard breakdown and soft breakdown modes, in the above-mentioned dielectric breakdown phenomena. The soft breakdown may sometime occur as a previous step before the hard breakdown. The electric current corresponding to a read voltage in the soft breakdown is smaller than that in the hard breakdown and larger than that in the non-breakdown. Furthermore, the cells in the soft breakdown state may sometime return to the non-breakdown state or transit to the hard breakdown state during which the voltage is repeatedly applied. That is, the soft breakdown state is unstable. However, once it transits to the hard breakdown state, it returns to neither non-breakdown state nor soft breakdown state. In the present invention, in the method described in FIG. 39 and FIG. 40, the hard breakdown state which is more stable may be regarded as "1" in terms of semiconductor memory, while the soft breakdown state may be regarded as "X". Therefore, the gap between the breakdown judge current value 933 and the non-breakdown judge current value 934 is used to label the soft breakdown state as "X".

By excluding the data of the cells "X" in the soft breakdown state like this, the white and black checkerboard pattern of FIG. 27 may hardly change even though the voltage is repeatedly applied. The reproducibility of the pattern is thereby ensured. In this way, the condition for PUF (4) can be satisfied, i.e., the relation between the input and output must be stable and reliable.

In general, between the transitions from the soft to hard breakdowns and from the non-breakdown to the soft breakdown, it is difficult to artificially manipulate which one of them as a majority by an electric stress. Accordingly, the ratio of the soft breakdown labeled "X" may become smaller or larger than the predetermined value during the repeated voltage application. However, if the number of the PUF cells in the soft breakdown state is larger than the predetermined value, the data quantity may be decreased by excluding "X" and then the information quantity of the patterns may become insufficient. Furthermore, in order to maximize the physical randomness, it may be preferable that the ratio of "0" to "1" is about 50% from the viewpoint of information entropy. Then, what is required may be the method to reduce the number of the cells in the soft breakdown state labeled "X" and to tune the ratio of "0" to "1" within a desired range by the repeated application of the voltage.

For example, since "X" corresponds to the soft breakdown state, some of the cells labeled "X" may transit to the hard breakdown state labeled "1" while a plurality of pulses is applied. Since the ratio of the transition from "0" to "X" is not ignorable, the ratio of "0" decreases at the same time. That is, even though the ratio of "0" is high after the first pulse, the ratio of "1" may increase while a plurality of pulses is applied. In this way, it may be possible to make the ratio of "0" to "1" close to 50% by optimizing the number of the pulses, the period of the pulse, and the amplitude of the pulse. In the case that the procedure fails, as mentioned above, the corresponding PUF devices should be regarded as being defective and then is discarded. In this way, it may be possible to forward only the verified products having a large enough information quantity of the physical randomness and including the stable data of "0" and "1".

As another example of the repeated breakdown pulses, the method of FIG. 42 may be described here. FIG. 42 differs from FIG. 41 in that the breakdown pulses increase every time the pulse is applied. It may be possible to control the ratio of "X" by tuning the pulse amplitudes. That is, it may be possible to tune the ratio of "0" to "1" within a desired range while decreasing the ratio of "X". The other details in the description may be similar to the example of FIG. 41 and can be omitted.

Another method to exclude the cells in the soft breakdown state labeled "X" is to select only the PUF cells labeled "X" and then to repeatedly apply the breakdown voltage to those selected cells until the soft breakdown state transits to the hard breakdown state in those cells. The method to apply the breakdown voltage in this event may be, for example, those illustrated in FIG. 41 or FIG. 42. It may be preferable that this method is executed while the ratio of "0" is still higher than that of "1" by a certain quantity.

In another example, it may be possible that some kind of the cell geometry of the PUF cells causes the hard breakdown to dominate the soft breakdown. For example, a cell geometry including the first conductor 1053, the second conductor 1052, the insulating film 910 and the conductive tip 1051 may be considered here, as illustrated in FIG. 43. The first conductor 1053 is connected to the first electrode 1055, and the second conductor 1052 is connected to the second electrode 1054. The molecular structure of the insulating film surrounding the conductive tip 1051, which is in particular labeled 1050, may be unstable due to the mechanical stress and then is easy to be broken. Furthermore, the electric field is easy to be collected around the conductive tip 1051 when the breakdown pulse is applied. That is, the cell may be easier to be in the hard breakdown state. However, the depth of the conductive tip 1051 may have a production variation or a manufacturing fluctuation. Then, the possibility of the breakdown occurrence of the insulating film 1050 between the conductive tip 1051 and the second conductor 1052 may vary among the cells. Here, it may be possible to tune the ratio of "0" to "1" within a desired range by further executing the breakdown pulse application method mentioned above.

As an example, the first electrode 1055 is connected to one of the word line 502 and the bit line 902. The second electrode 1054 is connected to the other one.

FIG. 44 illustrates another example of the PUF cell 977. The diodes are distributed at the cross-points of the word lines 503 and the bit lines 902. As an example, the diode may be a PN junction 986. FIG. 45 illustrates another example in which the diode element is the Schottky junction 987. Anyway, the diode may be broken by applying a strong voltage stress. Whether broken or unbroken is physically random and then may be judged by applying the reverse read voltage to the diode. In the broken cells, it is easy for the electric current to flow therethrough when the reverse read voltage is applied to the corresponding diode. This may correspond to "1" in terms of semiconductor memory. In the unbroken cells, it is difficult for the electric current to flow therethrough even if the reverse read voltage is applied to the corresponding diode. This may correspond to "0" in terms of semiconductor memory. The voltages, which are the stress voltage and the read voltage, may be applied between the selected word lines 503 and the selected bit lines 902.

As mentioned above, in the case that the components of the PUF cells 977 respectively connecting to word lines 503 and bit lines 902 are PN junctions 986 or Schottky junctions 987, the read voltage should be reverse bias. On the other hand, in the case that the components of the PUF cell 977 respectively connecting to word lines 503 and bit lines 902 are capacitors 982, the direction of the read voltage may either be reverse or forward. In this regard, the inspection method for the diode breakdown may be illustrated, as is similar to FIG. 39. Here, the read voltage to be applied to the two electrodes sandwiching the diode should be an absolute value and then the electric current flowing through the diode when the read voltage is applied should be also an absolute value. In other words, in the case of PN junction and Schottky junction, those absolute values may indicate the reverse bias and the reverse current. Other details may be similar to the case of capacitor and then the illustration may be omitted.

FIG. 46 illustrates the case where the PUF cell 977 is a transistor 983. In general, a transistor includes two adjoining diffusion layers on the surface of the semiconductor substrate and a gate capacitor. The gate capacitor may be a lamination of a gate electrode and a gate insulating film on the semiconductor substrate. In this example, one of the two diffusion layers is connected to bit line 902. The gate electrode is connected to word line 503. That is, it may be possible to use the gate dielectric breakdown as a factor of physical randomness. For example, the stress voltage may be applied to the word line 503 with regard to the bit line 902. This voltage stress, as an example, may be a pulse voltage like FIG. 41. As another example, it may be a pulse like FIG. 42. The read procedure, as illustrated in FIG. 39, may be executed by applying the breakdown judge voltage 932 between the bit line 902 and the word line 503, and then the electric current flowing between the bit line 902 and the word line 503 may be read.

FIG. 47 illustrates the case that the PUF cell 977 is a DRAM cell including the transistor 983 and a capacitor 982.

First of all, the method to break the capacitor 982 may be illustrated. Specifically, a transfer voltage may be applied between word line 503 and bit line 902 to turn the transistor 983 on. In this interval, a high voltage stress may be applied to the bit line 902. This high voltage stress, as an example, may be pulses as shown in FIG. 41 or FIG. 42. The read procedure may be executed by reading the electric current flowing through the bit line 902 while the transfer voltage is applied between the word line 503 and the bit line 902, as illustrated in FIG. 39. To apply the transfer voltage, a higher voltage may be applied to the word line 503 than to the bit line 902. However, the potential difference between the word line 503 and the bit line 902 in this event should be a necessary voltage to turn the transistor 983 on.

Subsequently, to break the gate insulating film of the transistor 983, a method similar to FIG. 46 may be available. In this event, the gate insulating film may be broken at the side connecting to the bit line 902. Anyway, the breakdown possibility may be probabilistic and then cause physical randomness.

What is important here is to use the conventional DRAM cell as the PUF cell 977. That is, in the case that the PUF device related to the present invention is appended to the DRAM chip, only the cell array for PUF may be ensured in a part of the memory cell region with no additional manufacturing cost. The bit capacity of the cell array for PUF is much smaller compared with not only the DRAM but also the general memory.

In the example of FIG. 34 as mentioned above, in the case of N=K=512, it is found that 262 k bits is a proper bit capacity for a PUF device. This amount is four-digits smaller than the conventional DRAM product per die (4G bits), i.e., less than about 1 to 10,000. In the case of N=K=128, it is found that 16 k bits is a proper bit capacity for a PUF device. This amount is five-digits smaller than the conventional DRAM product per die (4G bits), i.e., less than about 1 to 100,000.

It may be assumed that the price of a 4-Gb DRAM varies from 2.5 to 3 USD. Since the DRAM cell can be used for PUF cell 977 with no revision, the price of the PUF device with a scramble device may be at most 0.03 cents US dollars per chip, even the 4-th condition for PUF (the property of input-output reliability) is ensured by excluding the soft breakdown cells "X" and having a large enough information quantity of the physical random number.

FIG. 48 illustrates another example of the PUF cell 977. The select transistor 984 to be used for controlling the nonvolatile memory cell exists at the cross-point of the word line 503 and the bit line 902. The memory cell of the nonvolatile memory may be a lamination of silicon, a tunnel film, a charge storage layer, an inter-layer insulating film and a control gate between two diffusion layers on the semiconductor substrate or well. The select transistor 984 may be formed by replacing the whole or a part of the inter-layer insulating film with an inter-layer conductive layer or a metal via, or by implanting the conductive material into a hole extending through the inter-layer insulating film. The metal via is formed by a hole forming step and a conductive material filling step. Anyway, by applying a high voltage to the word line 503 connecting to the control gate, it may be possible to apply the high field stress to the tunnel film of the select transistor 984 at the selected cross-point. Here, the breakdown of the tunneling film and the read of the cell may be similar to that of the gate insulating film of the transistor 983. Moreover, the breakdown of the tunnel film may be probabilistic and then cause the physical randomness. That is, if the gate insulating film is replaced with the tunnel film, the explanation of all the operations may be the same as in the transistor 983. Therefore, the further detailed illustrations may be omitted here.

FIG. 49 illustrates another example of the PUF cell 977. The resistor 985 exists at a cross-point of the word line 503 and the bit line 902. By applying a high voltage between the word line 503 and the bit line 902, a high field stress may be applied to the resistor 985 at the selected cross-point.

In general, the resistor is a high-resistance conductor sandwiched by two electrodes. The resistor may become probabilistically short if a high electric field is applied to the resistor, so that the cross-point of the word line 503 and the bit line 902 may be non-conductive (short). In the case of non-short, the cross-point of the word line 503 and the bit line 902 may be conductive. Since the physical randomness determines which address the resistor becomes short or non-short, a random checkerboard pattern like FIG. 27 may be obtained.

By applying the read voltage to a resistor 985, it may be judged if the resistor 985 is broken or not. In a short PUF cell, the electric current hardly flows therethrough even though a read voltage is applied. For example, it may correspond to "0" in terms of semiconductor memory. In a non-short PUF cell, it is easy for the electric current to flow therethrough even though the read voltage is low. For example, it may correspond to "1" in terms of semiconductor memory. Such a short state of the resistor may be the same as the breakdown state of the conductor. For example, it may be caused by electromigration. That is, the electromigration may probabilistically occur, such that the cells with the electromigration may correspond to "0" in terms of semiconductor memory. The other cells may correspond to "1" in terms of semiconductor memory.

FIG. 50 illustrates the current-voltage characteristics used for judging the short. The horizontal axis is the absolute value of the read voltage to be applied to the resistor 985 for the read. The vertical axis is the absolute value of the electric current flowing through the resistor 985 in response to the read voltage. In the non-short PUF cells, a very high electric current may flow even though the read voltage is very low. On the other hand, in the short PUF cells, an electric current hardly flows even though the read voltage is high. To distinguish the difference, the non-short judge current value 743 and the short judge current value 744 may be introduced at the short judge voltage 742. That is, when the absolute value of the read voltage is the same as the short judge voltage 742, if the absolute value of the electric current flowing through the resistor 985 is higher than the non-short judge current value 743, the corresponding resistor may be regarded as being non-short. If the absolute value of the electric current flowing through the resistor 985 is lower than the short judge current value 744, the corresponding resistor may be regarded as being short.

In the judge method illustrated in FIG. 50, there is a designed gap between the non-short judge current value 743 and the short judge current value 744. Thus, the PUF cells whose read current is in the gap may be regarded as being neither short nor non-short. The PUF cells 977 like this may be regarded as being neither "0" nor "1" in terms of semiconductor memory. Those PUF cells 977 are represented by "X". In this event, an example of the addresses of the PUF cells 977 in the cell array and the data of the corresponding PUF cells 977 may be similar to FIG. 40, in which the PUF cell 977 is the capacitor 982. As an example, there are "1", "1", "0", "1", "X", "0", "0", "1" . . . "0" from the left. Like this, the data of the fifth cell is "X". Here, by excluding "X" with the method similar to the capacitor 982, the checkerboard pattern of only white and black may be obtained like FIG. 27. Thereby, the fourth condition for PUF (the property of the input-output reliability) can be satisfied. Thus, it may be able to forward only the qualified articles of the stable data of "0" and "1" while ensuring a suitable physical randomness.

To actually read the cell, first, the address of the cell to be read should be selected. To select the address, the cell's row may be selected by the row decoder 972 and the cell's column may be selected by the column decoder 973, as illustrated in FIG. 28. The combination of the cells' row and column is the selected address. In the example of FIG. 40, the address is represented by binary notation. Thus, the read voltage may be applied to the selected address with a method similar to FIG. 50, and then the data of the address may be read ("1" or "0"). After the read, the selected address of the PUF cell may be revised to read the data of the next PUF cell. This procedure may be repeated until the data of the total cells in the cell array for PUF 960 in FIG. 28 is read.

FIG. 51 illustrates an example of the resistor 985. The cell geometry may include the first conductor 1053, the second conductor 1052, the insulating film 910, and the conductive junction 970. The first conductor 1053 is connected to the first electrode 1055. The second conductor 1052 is connected to the second electrode 1054. The thickness of the conductive junction 970 may vary due to the manufacturing tolerance. Then, the resistivity of the cells may vary to cause the variation in the probability of short. Accordingly, it may be preferable that the ratio of the short to non-short cells is tuned to be about 50% by repeating the voltage stress. Here, the specific method of the pulse repetition may be, for example, the methods like FIG. 41 and FIG. 42.

As an example, the first electrode 1055 is connected to one of the word line 503 and the bit line 902. The second electrode 1054 is connected to the other one.

In general, the high resistive position of the conductive junction 970 may be heated due to the electrical stress and then be easy to cause the electromigration. Once the electromigration occurs there, the corresponding portion of the conductive junction 970 may be short. After becoming short, for example, the conductive junction 970 may be reformed to be like the conductive tip 1051 in FIG. 43. Furthermore, the oxidation may be progressed due to high temperature and then the insulating film 1050 may get into the portion of short to compensate a space between the conductive tip 1051 and the second conductor 1052. Thus, the state may transit from non-short to short.

If the electrical stress is further repeated, the oxide film at the portion of short (e.g., the insulating film 1050 in FIG. 43) may be broken and then the state may transit from short to non-short.

Between transitions from no-short to short and from short to non-short, it is difficult to artificially make one of them gain ascendance over the other. The intermediate state between them is labeled as "X". Accordingly, sometime the ratio of the intermediate state labeled as "X" may be lower than a predetermined value during the repetition of the electrical stress. Or it may be higher. However, if the number of the cells in the intermediate state is larger than a desired quantity, the randomness of the pattern may be insufficient due to the decrease of the data. Then, the method to repeat the voltage pulse for applying the electrical stress to the cells is required to improve the physical randomness.

As an example, after the first breakdown pulse voltage is applied, the breakdown inspection may be executed by the method illustrated in FIG. 50. Thus, if the ratio of "X" is higher than a predetermined value, the second breakdown pulse voltage is subsequently applied and then the breakdown inspection may be executed again by the method illustrated in FIG. 50. If the ratio of "X" is still high, the third pulse voltage is applied and then the breakdown inspection may be executed by the method in FIG. 50. This procedure may be repeated until the ratio of "X" becomes lower than a predetermined value.

The upper limit of the repetition number of the procedure is required to be defined in advance. In the case that the ratio of "X" is not less than a predetermined value even though the number of repetition arrives at the upper limit, the corresponding PUF device should be regarded as being disqualified. In the case that the PUF device success in the inspection, the addresses of the cells labeled "X" may be stored in a buffer memory, as mentioned above, and then the data of the corresponding cells may be excluded. In the case of disqualification, the PUF device should be discarded. However, if the number of the cells is large enough, it may be possible to ensure a large enough physical randomness even though the ratio of the intermediate state is large to some extent. In this event, the procedure to inspect the ratio of "X" can be omitted.

On the other hand, in order to utilize the physical randomness to a maximum degree, it may be preferable that the ratio of "0" to "1" is about 50%. The cells labeled "X" may probabilistically transit to "0" during the repetition of the pulse voltage. Then, the ratio of "0" may increase during the repetition of the plurality of pulses, even though the number of "1" is large to some extent at the first pulse. Here, the specific method to repeat the pulse voltage may be, for example, the methods like FIG. 41 and FIG. 42.

By this way, it may be possible to optimize by tuning the number of the pulses, the period of the pulse and the amplitude of the pulse. Thus, it may be possible to make the ratio of "0" to "1" close to about 50%. In the case of disqualification, the corresponding PUF devices should be discarded as being defective, as mentioned above. By this way, it may be possible to satisfy the fourth condition for PUF (the property of input-output reliability. Then, it may be possible to forward only the qualified articles of the stable data of "0" and "1" with large enough physical randomness.

FIG. 52 is another example of the resistor 985 adopted in FIG. 49. This may be formed simultaneously with the metal wiring pattern. Accordingly, it may be preferable that the conductor 930 is usually made of the same material as the conventional metal wiring. It may be preferable that at least a portion of the pattern configuration is bent like a rectangle, as shown in FIG. 52. It is easy for the electromigration to occur at the bent portion where the heat is accumulated.

As an example, the first electrode 1055 is connected to the word line 503 and the second electrode 1054 is connected to the bit line 902.

Moreover, it may be preferable that the portion bent like a rectangle is thinner than the other portion of the metal wiring. For example, the portion other than bent like the rectangle may be masked by resist to slim and then the geometry like this may be obtained.

It is also possible to bend the conductor 930 a plurality of times. FIG. 53 is an example in which 9 portions are bent like a rectangle. Thus, it is possible to tune the possibility of short by the wiring patterning.

As an example, the first electrode 1055 is connected to the word line 503 and the second electrode 1054 is connected to the bit line 902.

Another example of the conductive junction 970 shown in FIG. 51 is, as shown in FIG. 54 for example, the conductive via 530 formed by compensating the conductive material into a conductive via opened to go through the insulating film 910 from the first conductor 1053.

Here, it may be supposed that the target depth of the conductive via is made the same as the distance between the first conductor 1053 and the second conductor 1052 by optimizing the fabrication process of the via. If the distance is accidentally fabricated as desired, the conductive via is just fitted into a space between the first conductor 1053 and the second conductor 1052, as in the center of FIG. 54.

However, in general, the aspect ratio and the diameter of the conductive via must have unavoidable production tolerance, as illustrated in FIG. 55. This tolerance should cause the via depth to vary. Accordingly, some cells may have shorter depth and then the first conductor 1053 and the second conductor 1052 is made disconnect, as similar to FIG. 43. Other cells may connect those conductors (non-short) to be similar to FIG. 51. For example, there are short, connect (non-short), and connect (non-short) from the left in the example of FIG. 54.

If the conductive junction 970 (or the conductive via 530) of the PUF cell 977 selected by the word line 503 and the bit line 902 is short, then the electric current may not flow. This may correspond to "0" in terms of memory cell for example. On the contrary, if it is non-short, then the electric current may flow. This may correspond to "1" in terms of memory cell. Regarding "0" and "1" as white and black, respectively, the white and black random checkerboard pattern may be obtained like FIG. 27.

Here, it should be noted that the variation of the via depth is due to production tolerance in the mass production process. Then, it is free from any algorithm. Accordingly, it may be regarded as physical randomness. Moreover, the white and black random checkerboard pattern may be obtained like FIG. 27 with no application of the electrical stress.

However, if the ratio of short and non-short, which is measured after manufacturing the conduction via, is far from a desired quantity, it may be able to expect that the application of the electric stress compensates the difference from the desired quantity. In the case of short (e.g., the left of FIG. 54), a part of the insulating film between the bottom of the via and the second conductor 1052 (the insulating film 1050 in FIG. 43) may be broken while the electric stress is repeatedly applied. As a result, the transition from short to non-short may occur. On the contrary, in the case of non-short (e.g., the center of FIG. 54), the electromigration may occur while the electrical stress is repeatedly applied. As a result, the transition from non-short to short may occur.

However, between the insulating breakdown and the electromigration, it is difficult to artificially control one of them prevail. Then, in the case that data "1" prevails, only the cell of data "1" may be selected to be electrically stressed. On the contrary, in the case that data "0" prevails, only the cell of data "0" may be selected to be electrically stressed. Thus, it is preferable that the electrical stress is repeated to make the ratio of "1" to "0" close to a desired quantity while repeating the electrical stress. In this event, the stress pulse to be applied to a group of selected cells may be, for example, similar to FIG. 41 and FIG. 42.

To actually read, first of all, the addresses of the cells to be read should be selected. To select those addresses, the rows and columns of the cells to be read may be selected by the row decoder 972 and the column decoder 973, respectively. The combination of the selected row and column is the address to be read. In the example of FIG. 40, this address is represented by binary notation. The read voltage may be applied between the word line 503 and the bit line 902 which are connected to the cell corresponding to the selected address with the method illustrated in FIG. 50. Then, the data corresponding to the selected address may be read ("1" or "0"). After reading, the address of the PUF cell to be selected may be changed and then the data of the newly selected PUF cell may be read in a similar manner. The procedure like this may be repeated until the data of the total PUF cells in the cell array for PUF 960 as illustrated in FIG. 28 is read.

In the above example, in FIG. 43 or FIG. 51 for example, the first electrode 1055 is connected to one of the bit line 902 and the word line 503. The second electrode 1054 is connected to the other one. However, the field of the configurations related to the present invention may not be limited to this and then the following configuration may be also possible. For example, as illustrated in FIG. 56, one of the first electrode 1055 and the second electrode 1054 is connected to the gate electrode 995 through the two control gates (the first control gate 996 and the second control gate 997). The other of the electrodes may be grounded, connected to the source line, or connected to an arbitrary terminal linked to another circuit. The bit line 902 is connected to the second control gate 997 and the word line 503 is connected to the first gate 996. Or, in FIG. 57, one of the first electrode 1055 and the second electrode 1054 may be grounded, connected to the source line, or connected to an arbitrary terminal linked to another circuit. The other is connected to the gate electrode 995 through the two control gates (the first control gate 996 and the second control gate 997). The bit line 902 is connected to the first control gate 996 and the word line 503 is connected to the second control gate 997.

FIG. 58 and FIG. 59 illustrate the case that the PUF cell is a capacitor 982. For example, as illustrated in FIG. 58, one of the first electrode 1055 and the second electrode 1054 is connected to the gate electrode 995 through the two control gates (the first control gate 996 and the second control gate 997). The other of those electrodes may be grounded, connected to the source line, or connected to an arbitrary terminal linked to another circuit. The bit line 902 is connected to the second control gate 997 and the word line 503 is connected to the first control gate 996. Or, as illustrated in FIG. 59, one of the first electrode 1055 and the second electrode 1054 is grounded, connected to the source line, or connected to an arbitrary terminal linked to another circuit. The other of these electrodes is connected to the gate electrode 995 through the two control gates (the first control gate 996 and the second control gate 997). The bit line 902 is connected to the first control gate 996 and the word line 503 is connected to the second control gate 997.

FIG. 60 and FIG. 61 illustrate the case that the PUF cell is a PN junction 986. For example, as illustrated in FIG. 60, one of the first electrode 1055 and the second electrode 1054 is connected to the gate electrode 995 through the two control gates (the first control gate 996 and the second control gate 997). The other of these electrodes may be grounded, connected to the source line, or connected to an arbitrary terminal linked to another circuit. The bit line 902 is connected to the second control gate 997 and the word line 503 is connected to the first control gate 996. Or, as illustrated in FIG. 61, one of the first electrode 1055 and the second electrode 1054 is connected to the gate electrode 995 through the two control gates (the first control gate 996 and the second control gate 997). The other of those electrodes may be grounded, connected to the source line, or connected to an arbitrary terminal linked to another circuit. The bit line 902 is connected to the first control gate 996 and the word line 503 is connected to the second control gate 997.

Moreover, although it is not specially illustrated since it may be inherent, the direction of the PN junctions (diodes) in FIG. 60 and FIG. 61 may be able to get opposite.

FIG. 62 and FIG. 63 illustrate the case that the PUF cell is Schottky junction 987. For example, as illustrated in FIG. 62, one of the first electrode 1055 and the second electrode 1054 is connected to the gate electrode 995 through the two control gates (the first control gate 996 and the second control gate 997). The other of those electrodes may be grounded, connected to the source line, or connected to an arbitrary terminal linked to another circuit. The bit line 902 is connected to the second control gate 997 and the word line 503 is connected to the first control gate 996. Or, as illustrated in FIG. 63, one of the first electrode 1055 and the second electrode 1054 is connected to the gate electrode 995 through the two control gates (the first control gate 996 and the second control gate 997). The other of those electrodes may be grounded, connected to the source line, or connected to an arbitrary terminal linked to another circuit. The bit line 902 is connected to the first control gate 996 and the word line 503 is connected to the second control gate 997.

Moreover, although it is not specially illustrated since it may be inherent, the direction of the Schottky junctions (diodes) in FIG. 62 and FIG. 63 may get opposite.

FIG. 64 and FIG. 65 illustrate the case that the PUF cell is a resistor 985. For example, as illustrated in FIG. 64, one of the first electrode 1055 and the second electrode 1054 is connected to the gate electrode 995 through the two control gates (the first control gate 996 and the second control gate 997). The other of those electrodes may be grounded, connected to the source line, or connected to an arbitrary terminal linked to another circuit. The bit line 902 is connected to the second control gate 997 and the word line 503 is connected to the first control gate 996. Or, as shown in FIG. 65, the bit line 902 is connected to the first control gate 996 and the word line 503 is connected to the second control gate 997.

As an example of the resistor 985, the conductor 930 in FIG. 52 and FIG. 53 may be considered. The conductors may be used as a resistor or a fuse by forming thinner or bending like a rectangle. Or, in FIG. 51, the conductive junction 970 may be used as the conductor 930.

FIG. 66 and FIG. 67 illustrate the case that the PUF cell is a transistor 983. For example, as illustrated in FIG. 66, the gate of the transistor 983 is connected to the gate electrode 995 through the two control gates (the first control gate 996 and the second control gate 997). The source and drain of the transistor 983 may be grounded, connected to the source line, or connected to an arbitrary terminal linked to another circuit. Here, the bit line 902 is connected to the second control gate 997 and the word line 503 is connected to the first control gate 996. Or, as shown in FIG. 67, the bit line 902 is connected to the first control gate 996 and the word line 503 is connected to the second control gate 997.

FIG. 68 and FIG. 69 illustrate the case that the PUF cell is a DRAM cell including the transistor 983 and the capacitor 982. As illustrated in FIG. 68, the gate of the transistor 983 is connected to the gate electrode 995 through the two control gates (the first control gate 996 and the second control gate 997). One of the source and drain of the transistor 983 may be grounded, connected to the source line, or connected to an arbitrary terminal linked to another circuit. The other of the source and drain of the transistor 983 is connected to one of the two terminals of the capacitor 982. The other terminal of the capacitor 982 may be grounded, connected to the source line, or connected to an arbitrary terminal linked to another circuit. Here, the bit line 902 is connected to the second control gate 997 and the word line 503 is connected to the first control gate 996. Or, as shown in FIG. 69, the bit line 902 is connected to the first control gate 996 and the word line 503 is connected to the second control gate 997.

FIG. 70 and FIG. 71 illustrate the case that the PUF cell is a select transistor 984. For example, as illustrated in FIG. 70, the gate of the select transistor 984 is connected to the gate electrode 995 through the two control gates (the first control gate 996 and the second control gate 997). The source and drain of the select transistor 984 may be grounded, connected to the source line, or connected to an arbitrary terminal linked to another circuit. Here, the bit line 902 is connected to the second control gate 997 and the word line 503 is connected to the first control gate 996. Or, as shown in FIG. 71, the bit line 902 is connected to the first control gate 996 and the word line 503 is connected to the second control gate 997.

FIG. 72 illustrates an example that the diffusion layers are shared by the adjoining select transistors 984 along a bit line. This is called NAND-type cell array, where the bit line contacts are excluded from between the cells. However, since the cell is the PUF cell 977 and not the non-volatile memory cell, it is different from a so-called NAND Flash. That is, it is the NAND-type cell array for PUF. Here, the PUF cell 977 is the select transistor 984 and particularly the breakdown of the capacitor including the tunnel film may be used to generate physical randomness.

FIG. 73 is another example of the NAND-type cell array for PUF. In this example, the PUF cell is the transistor 983. Here, in particular, the PUF cell 977 uses the breakdown of the capacitor including the gate insulating film to generate physical randomness.

Like this, in the examples of either FIG. 72 or FIG. 73, the PUF cell 977 can serve as a transistor. In particular, this may be called cell transistor. The operation is similar to the general transistor. Accordingly, the control method for the capacitor breakdown, i.e., the dielectric breakdown, is also similar.

All of the details are described as follows.

FIG. 74 is an example of the cell array for PUF 960 related to the present invention. The page buffer 790 may take a role of the page buffer for the cell array for the NAND-type nonvolatile memory. The page buffer 790 includes the bit line connection gate 791 to control the switching (ON/OFF) of the connection to the bit line 902. Furthermore, the page buffer 790 includes the circuits for the sense-amplifier and the latch-up inside.

In this way, the present invention may be equipped with the memory cells for a NAND Flash. However, it may also be possible to be equipped with the volatile memories such as DRAM and SRAM, or other non-volatile memories such as a NOR Flash, a MRAM, a PRAM, a RRAM and so forth. Anyway, the essence of the present invention may be unnecessary to be changed. That is, any kind of the memory to be equipped with the cell array for PUF 960 related to the present invention may share at least one of the bit lines and the word lines as necessary.

To apply the voltage pulse to the PUF cell 977, as an example, the following method may be used. First, a positive voltage may be given to the select gate at the side of the bit line, and then the drain select transistor (SGD) 9811 at the side of the bit line contact may be turned on. In the case that there are word lines between the cell to be broken and the drain select transistor (SGD) 9811, these word lines may also be given a positive potential and then the corresponding PUF cells 977 (select transistors) may be similarly turned on. Here, the bit lines linking to the cells to be given a breakdown pulse may be grounded. Next, the word line to be given the breakdown pulse may be selected and then the breakdown pulse voltage may be applied. An example of the method to apply the breakdown pulse may be, for example, those illustrated in FIG. 41 or FIG. 42.

FIG. 75 illustrates the voltage pulse form in the breakdown inspection related to the present invention. First, a word line related to the PUF cell 977 (cell transistor) to be read may be selected and then a predetermined potential higher than 0V may be given. In the case that there are other word lines between the selected word line and the drain select transistor (SGD) 9811, a positive potential may be given to those word lines and then all of the associated PUF cells 977 (cell transistors) may be turned on. The bit line linking the PUF cell to be read may be given 0V or a predetermined potential lower than that given to the selected word line. The potential difference between the selected word line and the bit line are, for example, the same as about the breakdown judge voltage 932 shown in FIG. 39.

Simultaneously, a positive potential may be given to the gate of the drain select transistor (SGD) 9811 to turn the transistor on. Next, the potential of the bit line connection gate 791 may be reduced to 0V to turn off the bit line connection transistor 7910. Then, the bit line is disconnected from the sense circuit of the page buffer 790. If the insulating film of the selected PUF cell 977 (cell transistor) is broken as being conductive, the potential of the bit line may become higher. On the contrary, if the selected PUF cell is not conductive, the bit line potential may be unchanged.

Next, a positive potential is given to the bit line connection gate 791 to turn on the bit line connection transistor 7910. Subsequently, the potential change of the bit line is sensed in the page buffer 790. The bit line potential may be different due to whether or not the insulating film of the PUF cell 977 to be read is conductive. This difference may be amplified in the page buffer 790 and then stored as high/low data in the latch circuit. That is, the insulating film of the selected PUF cell 977 may be regarded as being broken if the associating bit line potential is higher than a predetermined potential (e.g., the breakdown judge voltage value 9330), and is regarded as being unbroken if the associated bit line potential is lower than a predetermined value (e.g., the non-breakdown judge voltage value 9340).

Here, the breakdown judge voltage value 9330 and the non-breakdown judge voltage value 9340 correspond to the breakdown judge current value 933 and the non-breakdown judge current value 934 in FIG. 39, respectively. In this example, the breakdown state is conductive and the unbroken state is non-conductive.

By using FIG. 76, another example of the voltage pulse form in the breakdown inspection related to the present invention may be illustrated. First, a word line associated with the PUF cell 977 (cell transistor) to be read is selected and then given 0V. In the case that there are other word lines between the selected word line and the drain select transistor (SGD) 9811, a positive voltage may be given to these word lines and then the corresponding PUF cells (cell transistors) may all be turned on. The bit line may be given a predetermined positive potential. The potential difference between the selected word line and the bit line may be, for example, about the breakdown judge voltage 932 in FIG. 39.

A positive potential may be simultaneously given to the gate of the drain select transistor (SGD) 9811 to turn on the drain select transistor (SGD) 9811. Next, the bit line connection gate 791 is reduced to 0V to turn off the bit line connection transistor 7910. Then, the bit line linking the PUF cell to be read is disconnected from the sense circuit in the page buffer 790. The bit line potential may decrease if the insulating film of the selected PUF cell 977 is broken as being conductive. On the contrary, the bit line potential is unchangeable otherwise.

Next, a positive potential is given to the bit line connection gate 791 again to turn on the bit line connection transistor 7910. Subsequently, the potential change of the bit line may be sensed in the page buffer 790. The bit line potential difference due to whether or not the insulating film of the selected PUF cell 977 is conductive may be amplified in the page buffer 790 and then stored as high/low data in the latch circuit. That is, the insulating film of the selected PUF cell 977 may be regarded as being broken if the associate bit line potential becomes lower than a predetermined potential (e.g., the breakdown judge voltage value 9331), and is regarded as being unbroken if the associated bit line potential is higher than a predetermined value (e.g., the non-breakdown judge voltage value 9341).

Here, the breakdown judge voltage value 9331 and the non-breakdown judge voltage value 9341 correspond to the breakdown judge current value 933 and the non-breakdown judge current value 934 in FIG. 39, respectively. In this example, the broken state is conductive and the unbroken state is nonconductive.

A block adjoining a plurality of blocks for the non-volatile memories can be allocated for the cell array for PUF. For example, the layout like FIG. 36 and FIG. 37 may be possible. The PUF device and the non-volatile memory device are different but may share the bit lines 902 or the word lines 503, like this. Consequently, the chip area may be saved.

Furthermore, in the case that there is a plurality of PUF devices on the same chip, those PUF devices need blocks. In this event, the pulse application method of FIG. 41 or FIG. 42 may be executed in one of the PUF devices to determine the number of the pulses. The determined number of the pulses may be recorded in a memory area on the same chip (or buffer). The same number of the pulses may be applied to the cells in the blocks for other PUF devices. In this event, the inspection of the breakdown ratio may be omitted between the adjoining pulses.

The geometry, manufacturing method, operating method and so forth of the scramble device may be similar to the PUF device. Accordingly, those illustrations may be omitted here. The only difference between the scramble device and the PUF device is whether or not the output is used as a temporal output.

The barcode type is described here.

In a special example of the physical random combination configured on the cell array of the semiconductor device, as illustrated in FIG. 27, for example, "1" and "0" are counted at each row and then black is allocated to the rows where the number of "1" is larger than the other. The white is allocated to the row where the number of "0" is larger than the other. Or, "1" and "0" are summed up by binary notation at each row and then black is allocated to the rows where the first digit is "1". On the contrary, white is allocated to the rows where the first digit is "0". Or, the rows may be allocated with either "1" or "0" according to some kind of property related to these rows, respectively.

Like this, the values of the rows ("1" or "0") may be determined from the collective characteristics of the PUF cells related to given row numbers, respectively. Then, the resulting values of the rows may be recorded to hypallage cells 979, respectively, as illustrated in FIG. 77. For example, any bit operation may be able to work for this aim. Or, it may be preferable that "0" and "1" are summed up in each row and then the last digit is stored in the corresponding hypallage cell 979. Or, it may also be preferable that the numbers of "0" and "1" are counted in each row and then the majority of "1" and "0" is stored in the corresponding hypallage cell 979.

It may be preferable that the hypallage cell 979 is a memory cell, a fuse and so forth. However, the memory cell may be either non-volatile or volatile. For example, in the case of the non-volatile memory cell, it may be preferable that the cell has a floating gate. Or, the cell may use the magnetic resistivity change, the phase change, the resistivity change of the resistive layer, and so forth. In the case of the volatile memory cell, the cell may use the charge quantity accumulated in the capacitors or specially designed circuits.

Anyway, the white and black random checkerboard pattern in FIG. 27 may be converted into the random horizontal pattern as illustrated in FIG. 78. This is similar to the conversion from QR code to barcode. The information quantity may be decreased by this conversion, but adequate randomness may be maintained as long as the row number is large enough and the ratios of white and black in the stripe pattern are comparative.

Here, in FIG. 28, in order to reproduce FIG. 27, a plurality of some kind of PUF cells 977 is located at the cross-points on the checkerboard pattern, respectively. As mentioned above, the PUF cell 977 may be a memory cell, a resistor, a capacitor, a diode, a switch, or some kind of transistor, as long as they can stably output at least two states including the first and second states. Here, the row number is N and the column number is M. It is required that both N and M are large enough to obtain adequate randomness in FIG. 27.

Subsequently, as an example of the conversion from the input code (P, S, T . . . ) to "0" and "1" in the binary notation, (a(1), a(2) . . . a(N)) may be considered as follows. As illustrated in FIG. 79, the elements of (a(1), a(2) . . . a(N)) may be respectively allocated to the hypallage cells 979 in an order starting from the first row. In this event, the data of the hypallage cell in the i-th row (1/0) may be denoted by the element d(i). Here, the set of d(i), which is depicted as {d(i)}, is a random number code including a random set of "0" and "1". Similarly, the above input code may be denoted as {a(i)}, where i is an integer ranging from 1 to N. Subsequently, by using some kind of method, the output code {c(i)} is generated from the input code {a(i)} and the random number code {d(i)}. Thus, the input code {a(i)} and the output code {c(i)} may be exchanged between physical nodes.

However, as mentioned above, as long as FIG. 27 is the white and black random pattern, it may be satisfied that {d(i)} is a random number code which is a random set composed of "0" and "1". Of course, in the above-mentioned example, the essence of the present invention may be unchanged even though the rows and columns are exchanged.

Here, as an example, to generate the output code {c(i)}, the residue operation mod (x, y) may be executed. This is the reminder of dividing x by y. FIG. 80 is a chart illustrating the relation among the input code {a(i)}, the random number code {d(i)}, and the output code {c(i)} to be output according to the equation (1).

$$c(i)=\mod(a(i)+d(i),2), \qquad \text{Eq. 4.}$$

This is similar to the equation 1 but simplified by excluding the column element j. Furthermore, it may be understood that the ratio of "0" to "1" is unchangeable before and after the conversion in this method. This condition is necessary to stabilize the data quantity to be treated. That is, it is required that the information quantity to be input to the right hand side of the equation 4 is almost the same as the data quantity to be output from the left hand side of the equation 4. It is because, in the case that the information quantities of the input and output are quite different, the information quantity of the system, which is defined by the equation 4, fits to the smaller one of the information quantities of the input and output. As a result, the amount of loss of the information entropy (physical randomness) may at least be the difference therebetween.

FIG. 81 is a conceptual drawing illustrating an example of the basic configuration to realize the mechanism described by the equation 4. That is, the random number code {d(i)} may be generated by the random generator 601 and then forwarded to the code generator 602. The input code {a(i)} may be input from the communication partner 400 to the code generator 602. Then, the code generator 602 may generate the output code {c(i)}.

In this example, both the random number generator 601 and the code generator 602 compose the PUF device 600. On the other hand, although it is not specially illustrated since it may be inherent, in another example, the code generator 602 may be out of the PUF device 600. Anyway, at least the random number generator 601 must be equipped in the chip as cheap as possible.

In the present invention, as an example of the random number generator 601, the method conceptually illustrated in FIG. 78 and FIG. 79 may be used. Thus, the PUF device 600 may serve as the identification core of FIG. 25 and FIG. 26.

As conceptually illustrated by the equation 4, the code generator 602 may be configured by a program. Here, a kind of algorithm is used to generate the code, but it is a characteristic of the present invention that the physical randomness is involved by the random number code {d(i)}. However, in order to input the total elements of the input code, the row number of the random number generator 601 may at least be equal to or larger than the element number of {a(i)}.

Furthermore, the communication partner 400 in FIG. 81 may correspond to the second node 2002 in the example of FIG. 26. On the other hand, the node having the PUF device 600 may correspond to the first node 2001 in FIG. 26.

FIG. 32 illustrates another example, where the communication partner 400 corresponds to the second node 2002 in the example of FIG. 26. On the other hand, the node having the PUF device 600 corresponds to the first node 2001 in FIG. 26. First, the communication partner 400 of the PUF device related to the present invention sends the input code (P, S, T . . . ) to the scramble device 604. Thus, the input code (P, S, T . . . ) is converted into (P', S', T' . . . ). This code is input to the PUF device 600 as an input code. The PUF device 600 returns the output (P1, S1, T1 . . . ). Next, (1) this output (P1, S1, T1 . . . ) is output to the communication partner 400. Or, (2) this output (P1, S1, T1) is returned to the scramble device 604 and then the further scrambled output (P1', S1', T1' . . . ) is returned to the communication partner 400. Or, although it is not specially illustrated since it may be inherent, (3) a second scramble device converts the output (P1, S1, T1 . . . ) into (P1'', S1'', T1'' . . . ) and then returns it to the communication partner 400. The method in (3) needs at least two independent scramble devices.

FIG. 82 illustrates a part or a whole of the cell array including the PUF cells 977 in FIG. 77 and the hypallage cells 979. The number of the rows is N+K. The N+K is equal to or smaller than the number of the total bit lines or the total word lines. Here, the upper K rows are assigned to the cell array for the scramble device 614 and the lower N rows are assigned to the cell array for PUF 611. This combination (N, K) is used as a security buffer, as is similar to the example related to FIG. 34.

First, {a(i)} and {d(i)} are summed up in each row and then divided by 2 to form the temporal output {f(i)}, as shown in the equation 5.

$$f(i)=\mod(a(i)+d(i),2), \qquad \text{Eq. 5.}$$

Here, {f(i)} is the output related to the cell array for the scramble device 614, where i is an integer ranging from 1 to K.

Subsequently, the equation 6 is obtained by replacing the sequence {a(i)} with the temporal code {f(i)} in the equation 5. Here, the left hand side is the output of the code generator 602, where i is an integer ranging from 1 to N.

$$c(i)=\mod(f(i)+d(i),2), \qquad \text{Eq. 6.}$$

In the case that the hypallage cell 979 is a fuse, for example, FIG. 78 may be realized by respectively arraying the fuses to rows of FIG. 77. For example, the short fuses are regarded as black rows. The non-short fuses are regarded as white rows. In this way, the white/black random horizontal pattern corresponds to the pattern of the non-short/short of the fuses distributed in the column direction. Furthermore, the short/non-short of the fuses is determined by some kind of property related to each row.

The determination method of non-short/short of the fuses is not only an arithmetic method to count the numbers of white and black at each row. In the case that there are irreversible errors due to some kind of reason in a certain row, the fuses of the corresponding rows may be made short and the others are made non-short. This method is valid as long as such irreversible errors occur physically random. Furthermore, in this example, it is acceptable that the ratio of short to non-short may be far from 50%.

Meanwhile, the rows having the irreversible errors is replaced by other rows which are called redundancy rows and then are, generally, not used for any part of the semiconductor device. On the contrary, the other rows are used for a part of the product of the semiconductor device. This is to avoid the forward of the defective products.

Meanwhile, it is rare that the fuses are respectively allocated to the rows of the memory cell array. It is because the addition of the area, which occupies the fuse memories, will incur extra cost of the semiconductor device as the row number increases.

Then, it should be remarked that the combination of the rows to be replaced and not to be replaced by the redundancy rows is physically random. That is, it may become possible to obtain physical randomness without adding a new area to the PUF device 600 by using a part of area for avoiding the forward of the defective products (the area for redundancy row) among the memory cell array.

For example, in the case that there are irreversible errors in a certain row due to some kind of reason, the numbers of the corresponding rows (row numbers) are recorded in a separately prepared memory area (redundancy memory). Then, when a memory cell is accessed, it may be checked if the row number of the memory cell is stored in the redundancy memory. If it not stored in the redundancy memory, it may be accessed. Otherwise, it may not be accessed and then the corresponding row may be replaced by one of the redundancy rows. However, a designed method may determine which rows are secured for the redundancy rows in the memory cell array, or which redundancy row replaces a row whose row number is recorded in the redundancy memory. This method is to replace the rows whose row numbers are recorded in the redundancy memory with other rows without the irreversible errors. It may be uniquely determined which rows actually replace the rows whose row number is recorded in the redundancy memory by inputting a predetermined test code. Thus, the vertical distribution of the replaced rows and the non-replaced rows is obtained. As an example, assigning the replaced rows with black and the other rows with white, the physical random pattern may be obtained as is similar to FIG. 78. Or, assigning white to "0" and black to "1" and regarding the row numbers as the element numbers, the random number code {d(i)} used in the equations 4-6 may be obtained.

By this way, in the case that the occurrence of the irreversible errors of the memory cells due to some kind of reason are used as physical randomness, the memory area for redundancy may form the physical randomness without using hypallage cells 979 shown in FIG. 77. However, in order to output the qualified physical randomness with this method, the number of the rows N should be large enough. Here, if the number of the rows to be stored in the redundancy memory is L, L should be larger than 1 and smaller than N.

A semiconductor memory product satisfying the above-mentioned condition is, for example, Dynamic Random Access Memory (DRAM). In this event, the above-mentioned PUF cell 977 is the memory cell of DRAM. For example, it may be configured by the transistor 983 and the capacitor 982, as illustrated in FIG. 47 and FIG. 69.

In the case of a typical 4G bit DRAM, for example, the number of the rows reserved to replace those having the irreversible errors due to some kind of reason (the number of the bit lines related to the redundancy) may be, for example, about 15,000 among the total bit lines having a quantity of about 6,550,000. The number of the cases related to the redundancy may be therefore estimated as being the same as the permutation of selecting 15,000 among 6,550,000. The rough calculation results in 10 to the power of 315,289. This is an extremely large number and then may be actually regarded as infinity.

Here, the bit line direction to be secured for redundancy has been fitted to the row direction in FIG. 77. On the contrary, it may also be possible that the word lines are in the rows in FIG. 77. In the case of a typical 4G bit product of the DRAM, the number of the redundancy rows is, for example, 3,044 while the number of the total word lines is about 4,400,000. The permutation of selecting 3,044 among 4,400,000 is turned out to be about 1.6 times 10 to the power of 20,222 as a result of the calculation. It is much smaller than the number of the cases of the bit line redundancy, but is still an extremely large number. Anyway, it may be possible to adopt the redundancy memory secured for the product management of the DRAM in advance without additionally preparing an area for the PUF device 600. Thus, an actually limitless physical randomness may be obtained.

Like this, the fuse memory is prepared as a redundancy memory in the DRAM for the product management. In addition, the physical randomness obtained by less number of rows than the total number of bit lines is large enough. For example, in the case of the above-mentioned 4 Gbit DRAM, the number of the redundancy rows is 153,000 while the number of the bit lines is 6,550,000. This method may save a space of 6M bits as compared with the case of separately preparing the fuse memory cells for all rows.

It is possible to use the whole or a part of the redundancy area in the chip for the PUF device 600. In this event, the number of the rows of the PUF device 600, which is N, should be smaller than the number of all bit lines or all word lines in chip.

In the identification core 10000 related to the present invention, for example, at least the PUF module 6000 and the input-output control module 800 may be included in the chip 10. This input-output control module 800 may further include the input-output control circuit, the word line control circuit, the bit line control circuit, the buffer for data input-output, and so forth.

As illustrated in FIG. 84, the identification core 10000 related to the present invention may be, for example, configured by at least the PUF module 6000, the PUF control module 880, the input-output control module 810, the scramble device module 890, and the buffer module for temporal code 900 and then equipped in the chip 10.

The input-output control module 810 can include the input-output control circuit and the buffer for data input-output but not the word line control circuit and the bit line control circuit. The scramble device module 890 includes the scramble device 604 in FIG. 32. The temporal code generated by the scramble device 604 is stored in the buffer module for temporal code 900, which is independent from the external input-output control module 810. Thus, the temporal code is not output to the exterior of the chip 10 even though it is required from the exterior. This is to confine the temporal code in the chip. The PUF control module 880 may include the word line control module, the bit line control module, and the data buffer. Moreover, as illustrated in FIG. 40, the PUF control module 880 may also include the inner memory area for recording the addresses corresponding to the mode "X". A similar memory area to store the addresses associated with the mode "X" may be included in the scramble device module 890 as necessary.

If the set of the input codes {a(i)} and {b(j)} are input from the external input-output 50, the input-output control module 810 transfers the set of the input codes {a(i)} and {b(j)} to the scramble device module 890. Here, the temporal code {f(i,j)} generated according to the equation 2 is temporarily stored in the buffer module for temporal code 900 and then forwarded to the PUF control module 880. The PUF control module 880 has a command of the word line control circuit, the bit line control circuit, the data buffer and so forth, and then generates the output code {c(i, j)} according to the equation 3 with regard to the random number code {d(i, j)} obtained from the PUF module 6000 and the temporal code {f(i, j)}. The generated output code {c(i, j)} is temporarily stored in the inner data buffer. The input-output control module 810 exports the output code {c(i, j)} to the exterior of the chip 10 via the external input-output 50. Thus, the temporal output {f(i, j)} can be confined in the chip.

Or if the input code {a(i)} is input to the chip via the external input-output 50, the input-output control module 810 transfers the input code {a(i)} to the scramble device module 890. Here, the temporal code {f(i)} generated according to the equation 5 is temporarily stored in the buffer module for temporal code 900 and then forwarded to the PUF control module 880. The PUF control module 880 has a command of the word line control circuit, the bit line control circuit, the data buffer and so forth and then generates the output code {c(i)} according to the equation 6 with respect to the random number code {d(i)} obtained from the PUF module 6000 and the temporal code {f(i)}. The generated output code {c(i)} is temporarily stored in the data buffer in the PUF control module 880. The input-output control module 810 outputs the output code {c(i)} to the exterior of the chip 10 via the external input-output 50. Thus, the temporal output {f(i)} can be confined in chip.

The PUF cell 977 may be anything that can be simultaneously manufactured in the general semiconductor manufacturing process, such as a MOS-type transistor, a DRAM cell, a non-volatile memory cell transistor, a select transistor used in a non-volatile memory device, a phase charge memory cell, a resistive change memory cell, a magnetic phase change memory cell, a PN junction, a Schottky junction, a capacitor, an insulating film, a resistor and so forth. Or, the specially designed microstructures may also be used for the PUF cell 977.

In order to probabilistically break the PUF cells 977, an electrical stress may be applied to the selected cells. In this event, the total addresses in the chip may be selected or a part of these addresses may be selected to apply a breakdown pulse thereon as necessary.

If the ratio of "1" to "0" becomes about 50% in FIG. 27, the randomness of the vertical pattern in FIG. 78 may likely increase. Thereby, in the case that the cell area to be used for the PUF device is limited due to some kind of reason or in the case that the PUF device is manufactured for a small capacity product, it may be necessary to make the ratio of "1" to "0" as close to 50% as possible in FIG. 27. For example, as illustrated in FIG. 41 or FIG. 42, the breakdown pulse may be applied in stages to tune the ratio of "1" and "0". First, the first pulse voltage is applied and then the inspection is executed. Thus, if the number of the unbroken cells is larger, the second pulse voltage is applied. If the number of the unbroken cells is still larger even after the inspection, the third pulse voltage is further applied and then the inspection is executed again. In this way, by applying the breakdown pulses in stages, as is similar to FIG. 41 or FIG. 42, the number of the unbroken cells gradually decreases, whereas the number of the broken cells gradually increases. The application of the breakdown pulse may stop when the difference in those numbers becomes smaller than a predetermined range.

In another example, the pulse voltage is applied to total cells for the PUF device and then the inspection is executed. Thus, if the number of the unbroken cells is larger, only the unbroken cells are selected to be applied with the pulse voltage again. If the number of the unbroken cells is still large, only the unbroken cells are selected again and then the pulse voltage is applied thereon. In this way, it may be preferable that the breakdown pulse is repeatedly applied to only the unbroken cells in stages. Even if the breakdown pulse is not gradually increased in stages, the unbroken cells are broken in stages so that the ratio of "0" and "1" gradually becomes close to each other. The application of the breakdown pulses may stop when the difference in those ratios becomes smaller than a predetermined range.

After the application of the breakdown pulse finishes, the "X" which is neither "0" nor "1" may be sometime left. In this event, "X" may be excluded by using the method illustrated in FIG. 40.

In general, it may not be always that the number of the chips configuring the electronic apparatuses is only one. It may be regarded that the nodes composing the network includes at least or more than one chip. As an example in FIG. 25, the information apparatus 140 to be a node includes the first chip 110, the second chip 120 . . . the N-th chip 130. Among them, it may not be always necessary that the total chips include the PUF device related to the present invention. In the example of FIG. 25, only the first chip 110 includes the PUF device 600 and then serves as an identification core.

The PUF device like this may be equipped in a chip together with the modules having other functions, or may be manufactured as an independent chip having only the PUF function. Moreover, it may be preferable that the PUF device generates an output code according to the physical randomness whenever it receives an input code. In the case that the plurality of chips configures an electronic apparatus, at least one of those chips may be necessary to include the PUF device related to the present invention.

SUMMARY OF THE INVENTION

The present invention is invented in view of the circumstances mentioned above and then aims at providing the electronic signature technology for a block chain with a private key to be uniquely allocated to a real physical substance, not to be editable, and not to be abused even by the owner.

The present invention may adopt the following method to solve the above-mentioned problem.

In an embodiment, a network includes a logical network and a physical network. The logical network includes a plurality of logical nodes. Each logical node is connected to a respective identification core. Each identification core includes at least one semiconductor chip having a physical randomness. Each semiconductor chip generates one of a plurality of pairs of private keys and public keys based on the physical randomness thereof according to an input received by the one of the at least one semiconductor chip under a public key cryptography. One of the public keys is regarded as a logical address of one of the logical nodes, which is connected to one of the identification cores. The physical network includes a plurality of physical nodes. Each identification core is one of components in each physical node. The logical network is uniquely linked to the physical network by the pairs of private keys and public keys.

Due to the above, it is able to provide a private key which is uniquely allocated to a network node (which does have a physical substance) and cannot be edited even by the regular users. Thus, the abuse of the private keys can be prevented. Furthermore, it is also able to realize the block chain technology to avoid the abuse of the private keys.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 30 illustrates an example of a relation between an input code and an output code.

FIG. 80 illustrates an example of the relation between input code and the output code.

Figure 1:
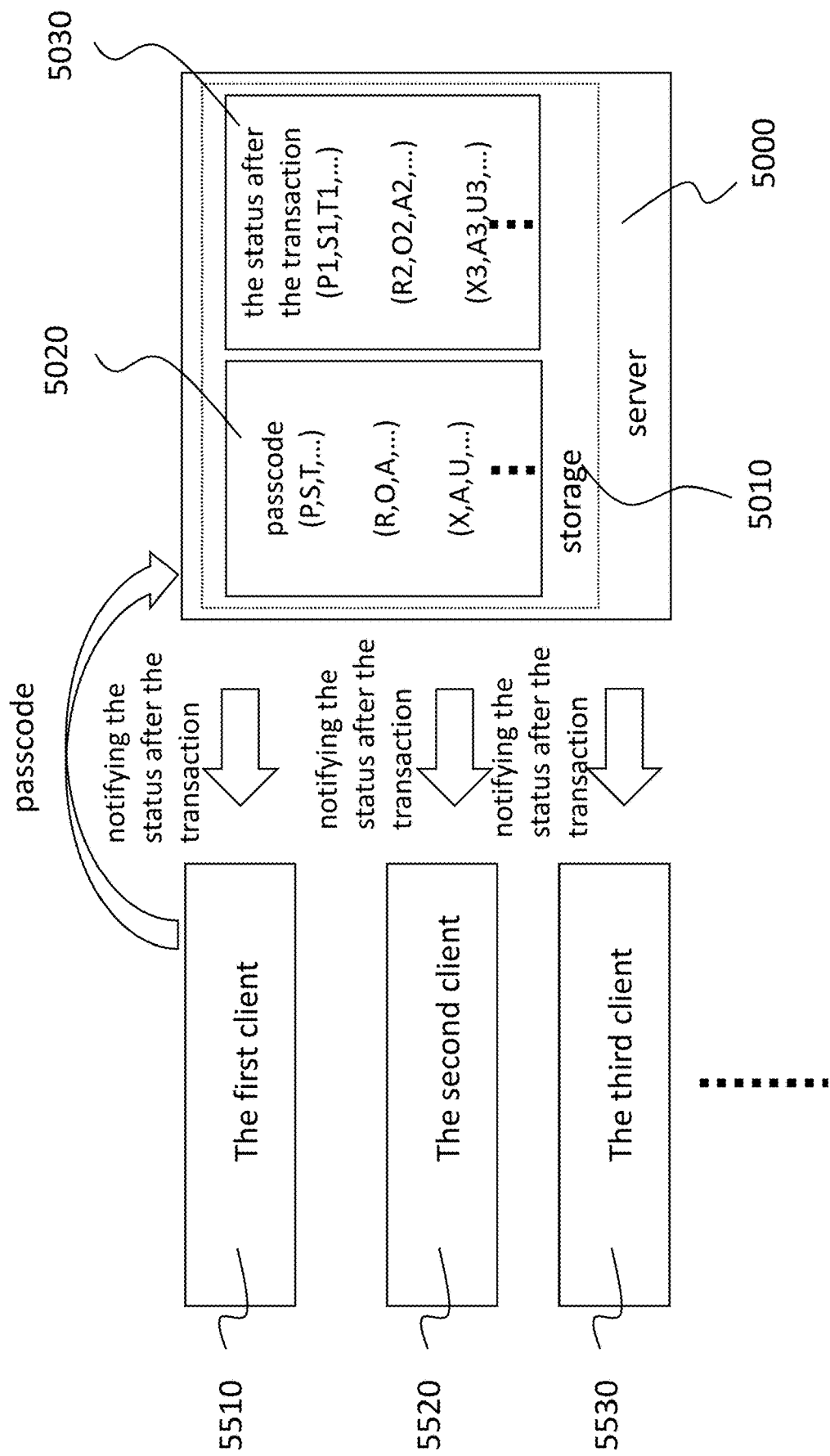
FIG. 1 illustrates an example for a concept of a client-server type network.

In the various figures of the drawings, the same numerals designate the same or similar parts. Furthermore, when the terms "first", "second", "third", "inner", "bottom" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

As mentioned above, it may be possible to realize the physical chip identification (PCID) as a characteristic to the chip by utilizing various ideas inside semiconductor chip being physical substance. From analogy to physically-unclonable function (PUF), the term of PCID can be conveniently replaced with that of PUF as necessary hereinafter. On the other hand, to satisfy the property of the output unpredictability, the output from the PUF device may be a kind of physical random number. It may be possible that this random number is used to generate a private key to be used in an electronic signature. However, to obtain the output that is specific to the chip from the PUF device, some kind of the input is necessary to be input to the PUF device. The output from the PUF device is not only specific to the chip but also changeable in response to the input, which is chameleon property. Furthermore, this physical random number can be confined in the chip without being exposed to the exterior of the chip, as mentioned above.

It may be able to refrain from the abuse of the private keys, which is one of few weak points of the block chain. The specific description may be carried out using the drawings as follows. On the other hand, the function of the block chain may be applied to the security of IoT, which is still vulnerable.

The first embodiment is described below.

Figure 25:
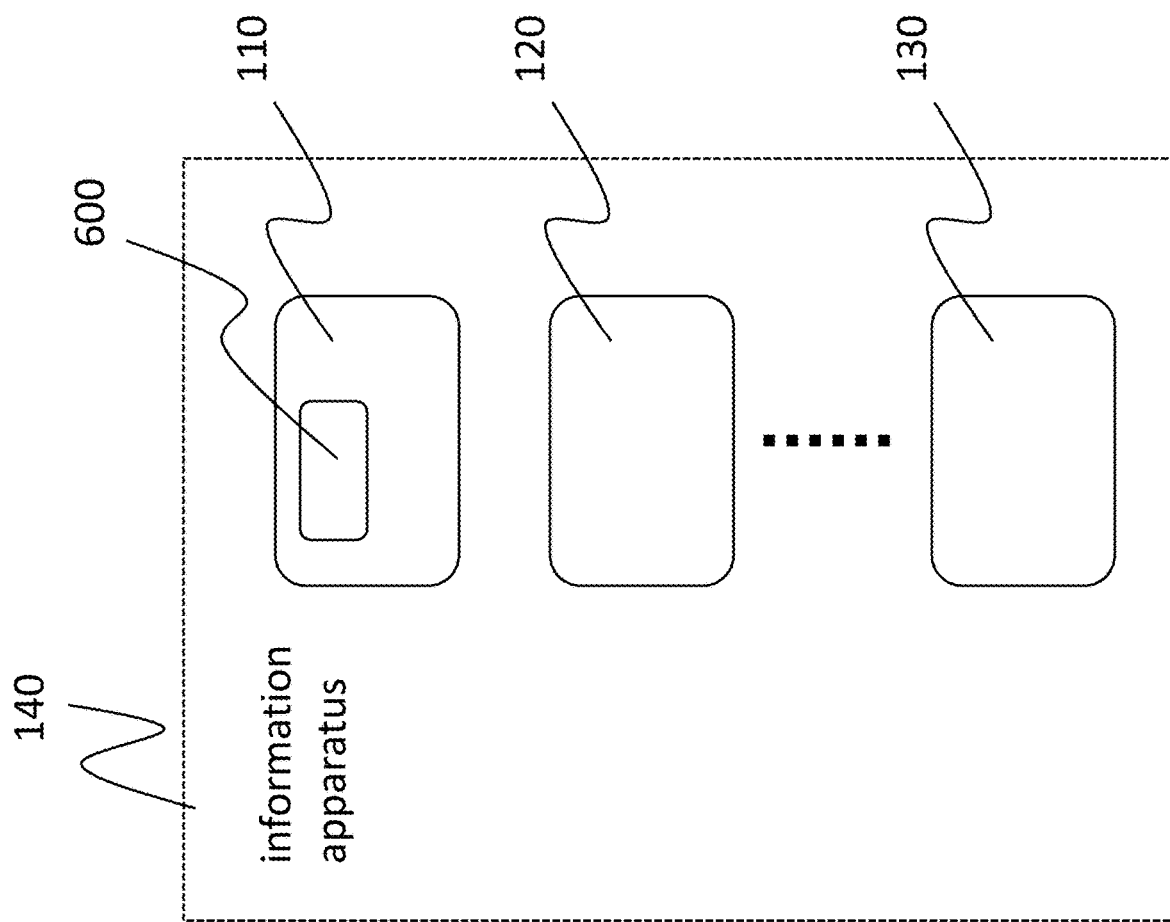
FIG. 25 illustrates an example of a basic configuration of an information apparatus including the PUF device.
Figure 26:
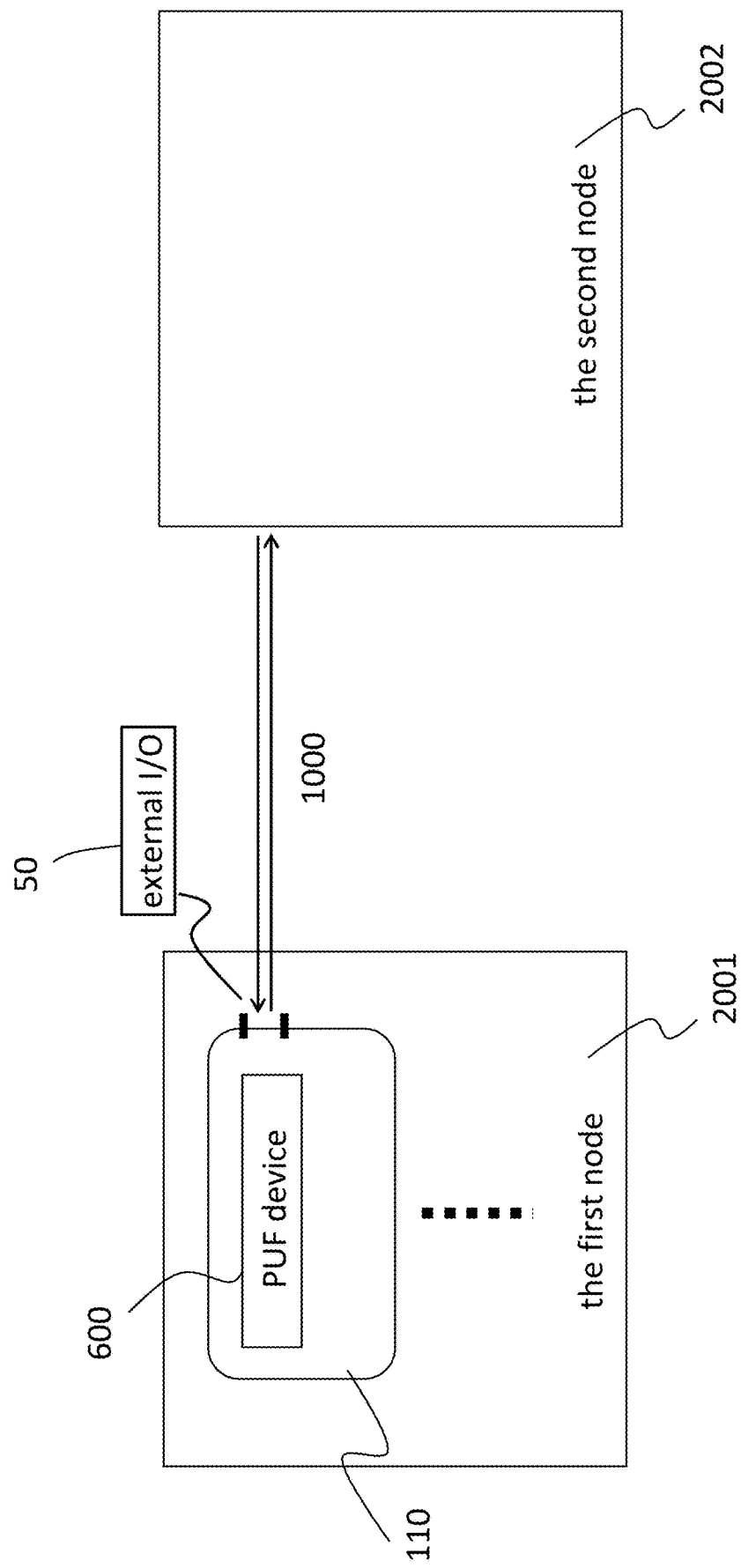
FIG. 26 illustrates an example of a communication method of the nodes including the PUF device.
Figure 32:
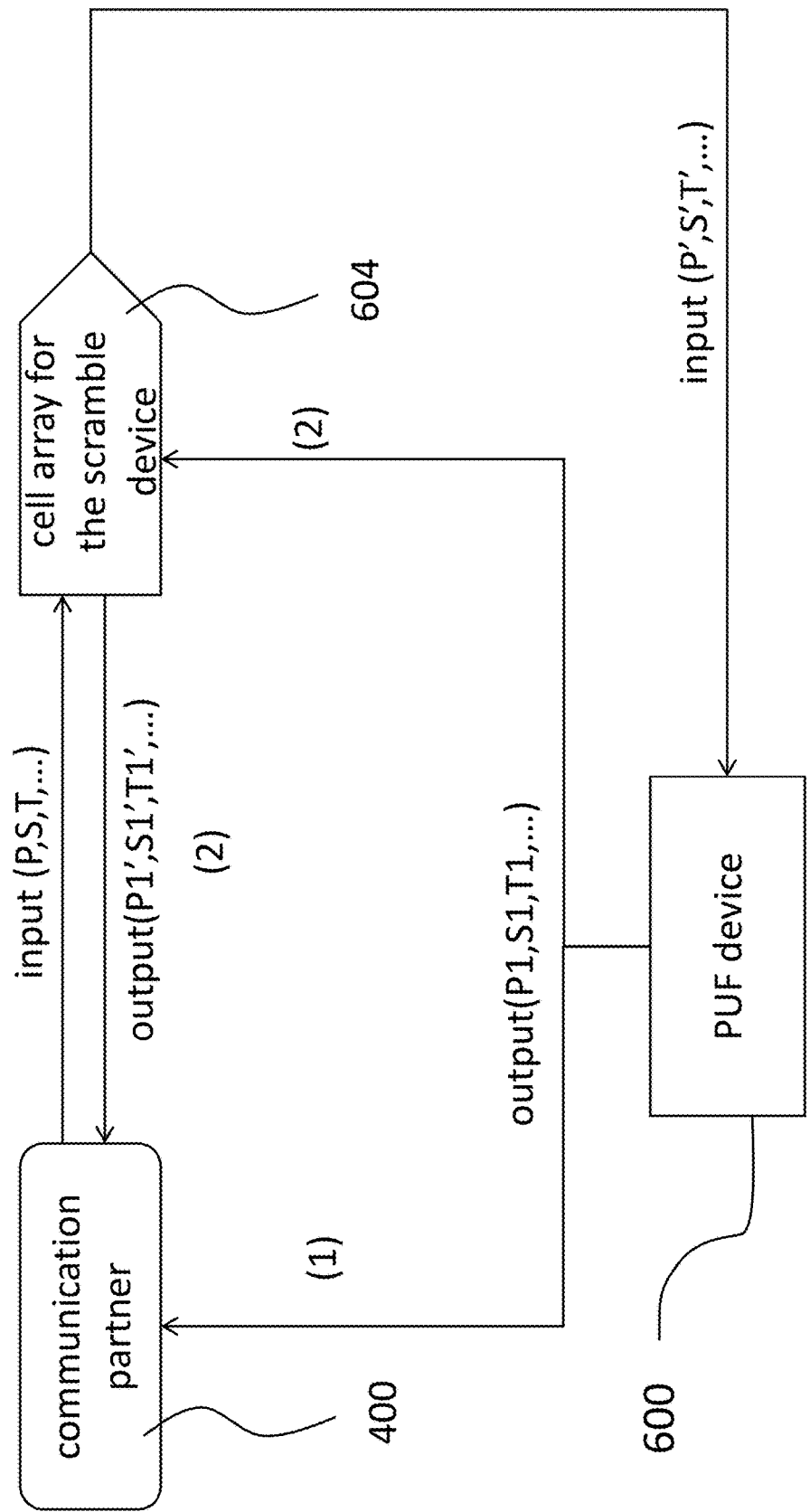
FIG. 32 illustrates an example of a basic configuration to realize the generation method of the output code.
Figure 33:
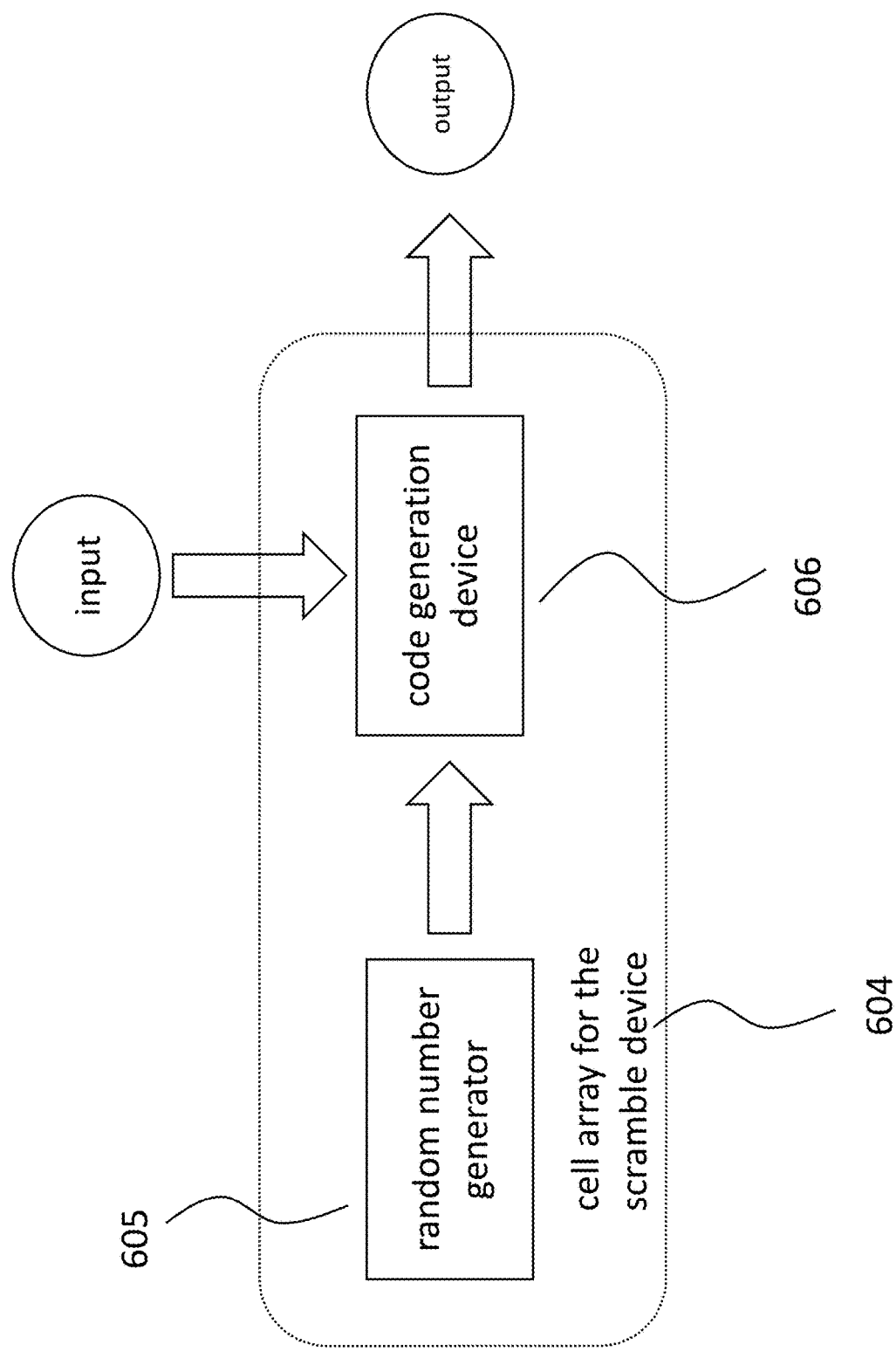
FIG. 33 illustrates an example of a basic configuration of a scramble device.
Figure 34:
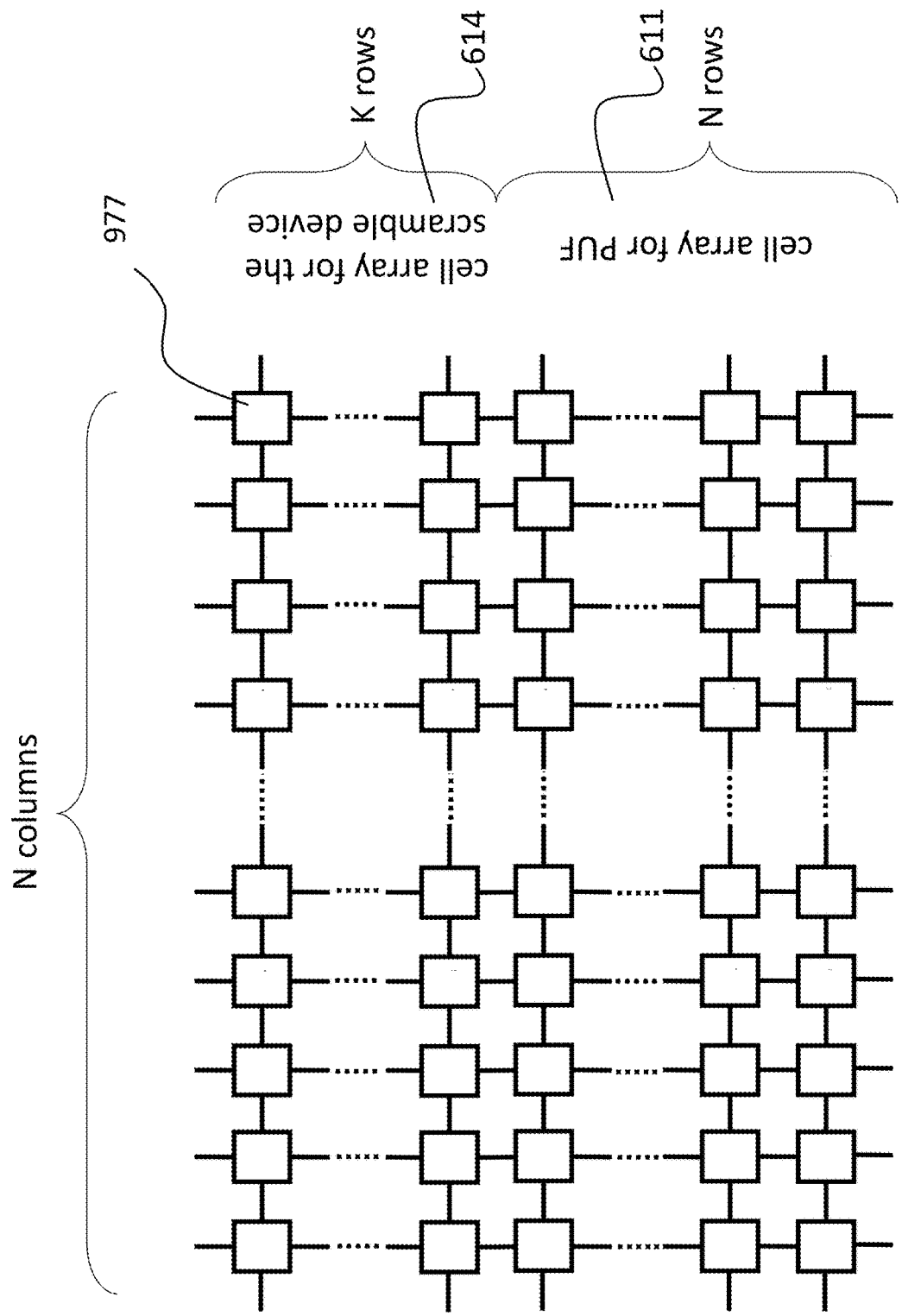
FIG. 34 illustrates an example of a layout of the cell array for PUF and the cell array for the scramble device.
Figure 35:
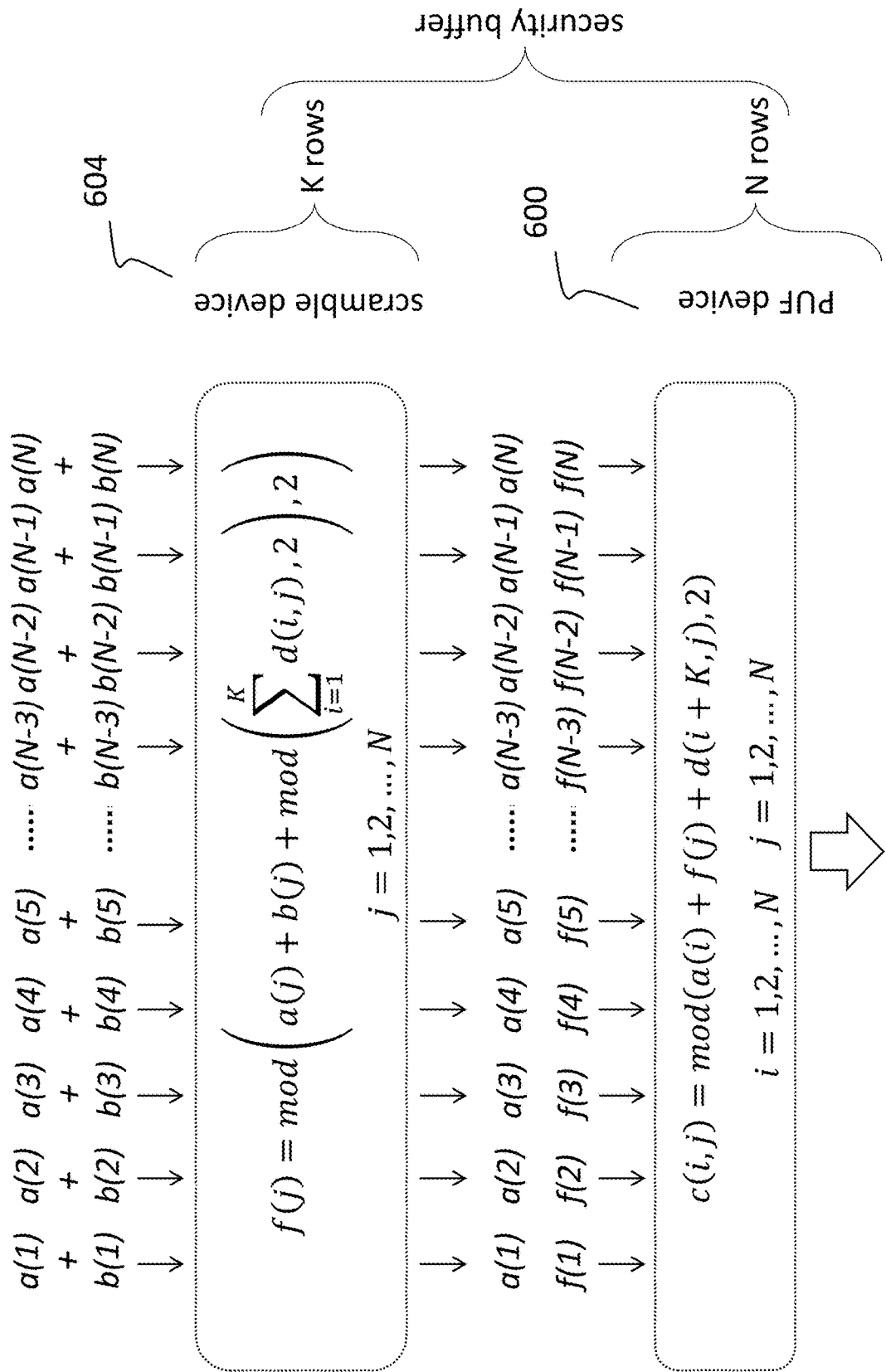
FIG. 35 illustrates an example that the scramble device and the PUF device cooperate with each other.
Figure 36:
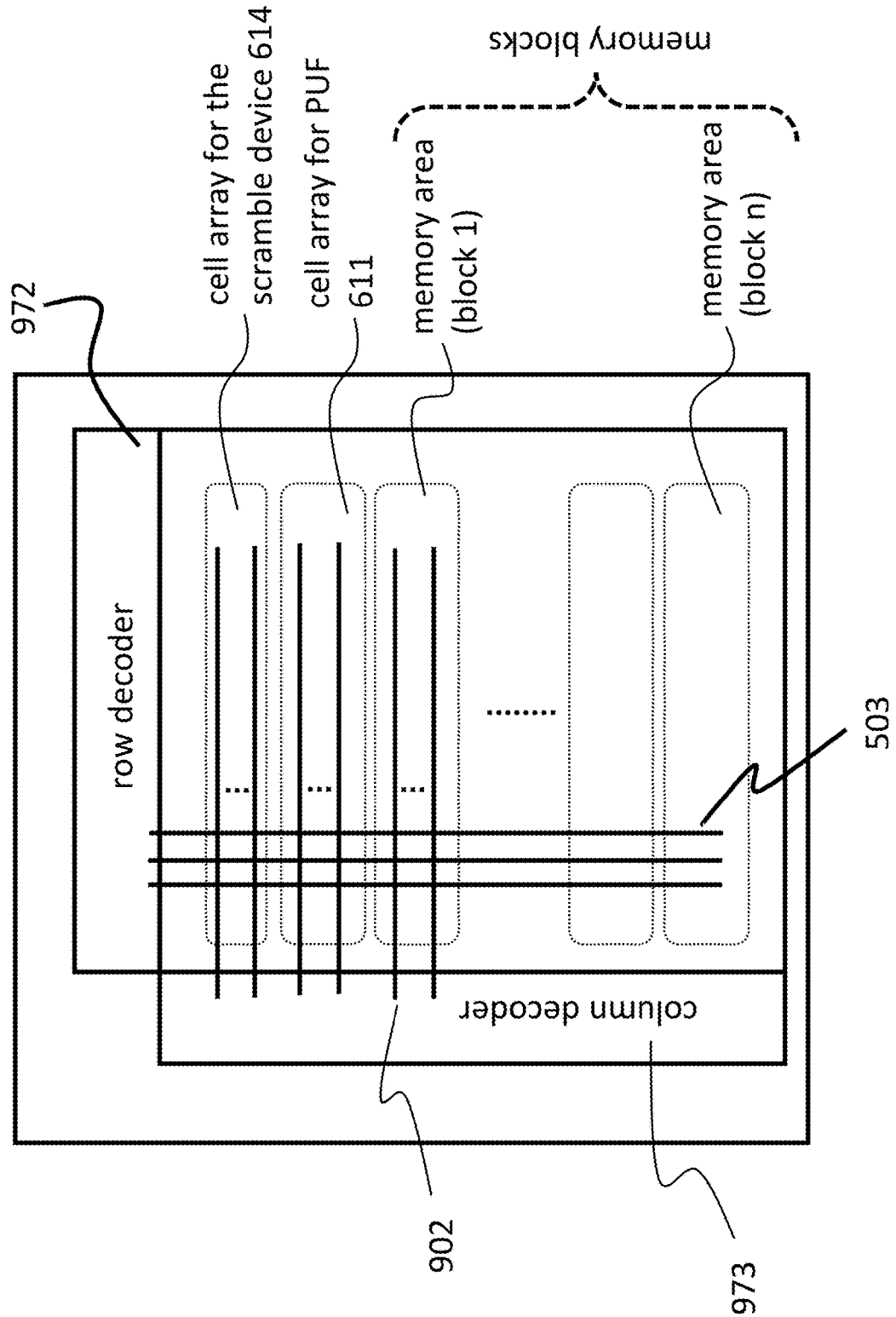
FIG. 36 illustrates an example of the layout of the cell array for the scramble device and the cell array for PUF on the chip.
Figure 37:
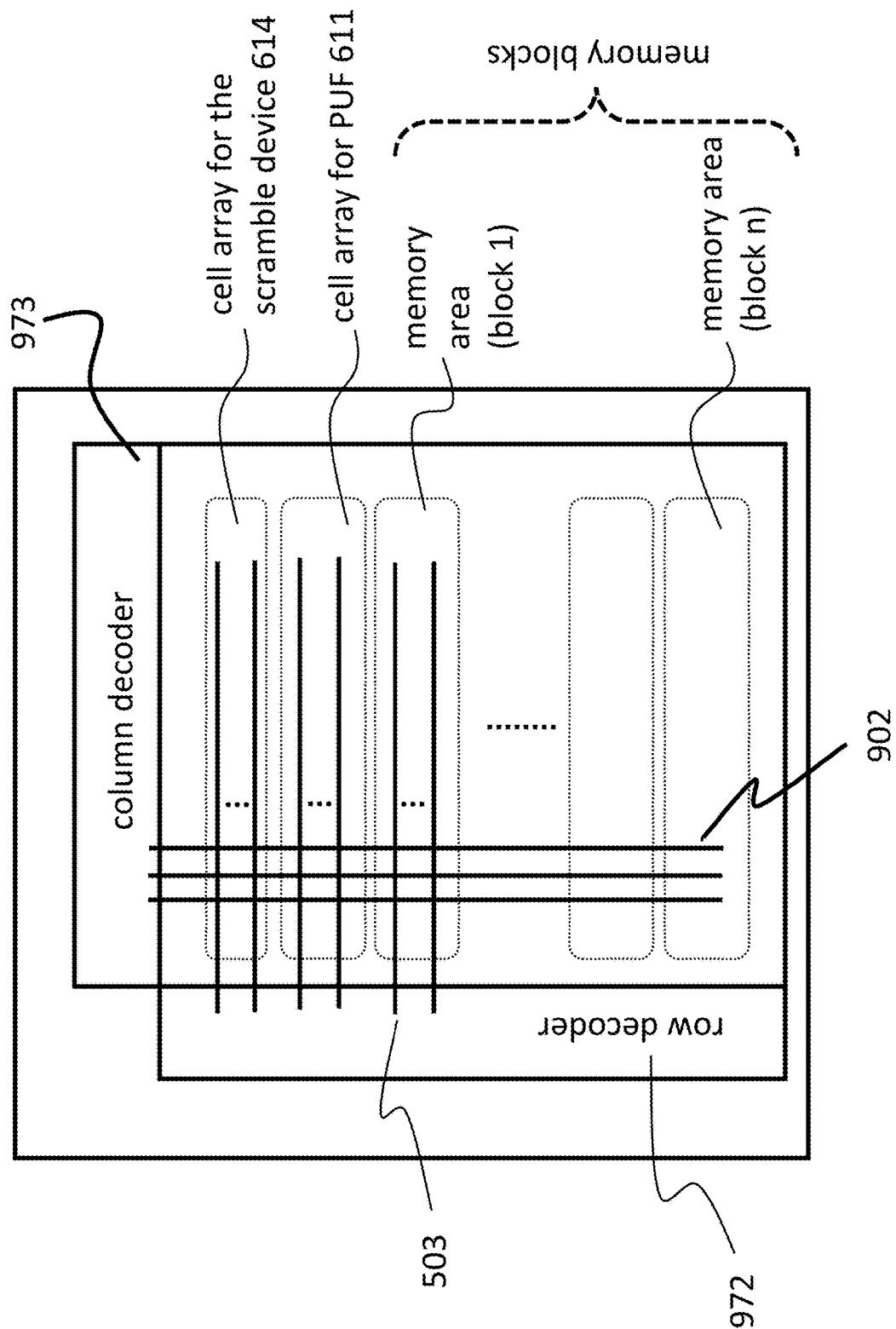
FIG. 37 illustrates an example of the layout of the cell array for the scramble device and the cell array for PUF on the chip.
Figure 38:
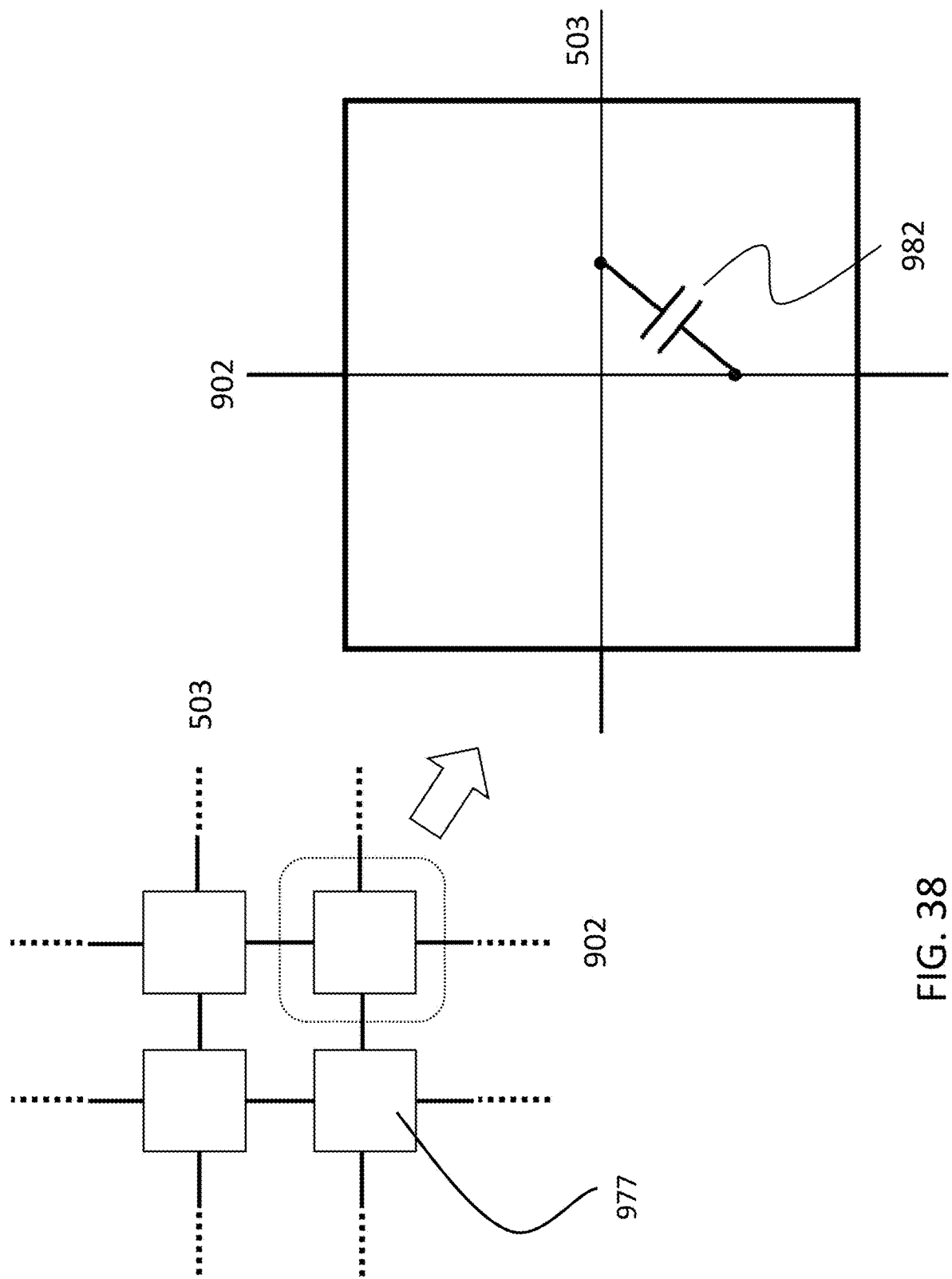
FIG. 38 illustrates an example of a PUF cell utilizing the capacitor.
Figure 39:
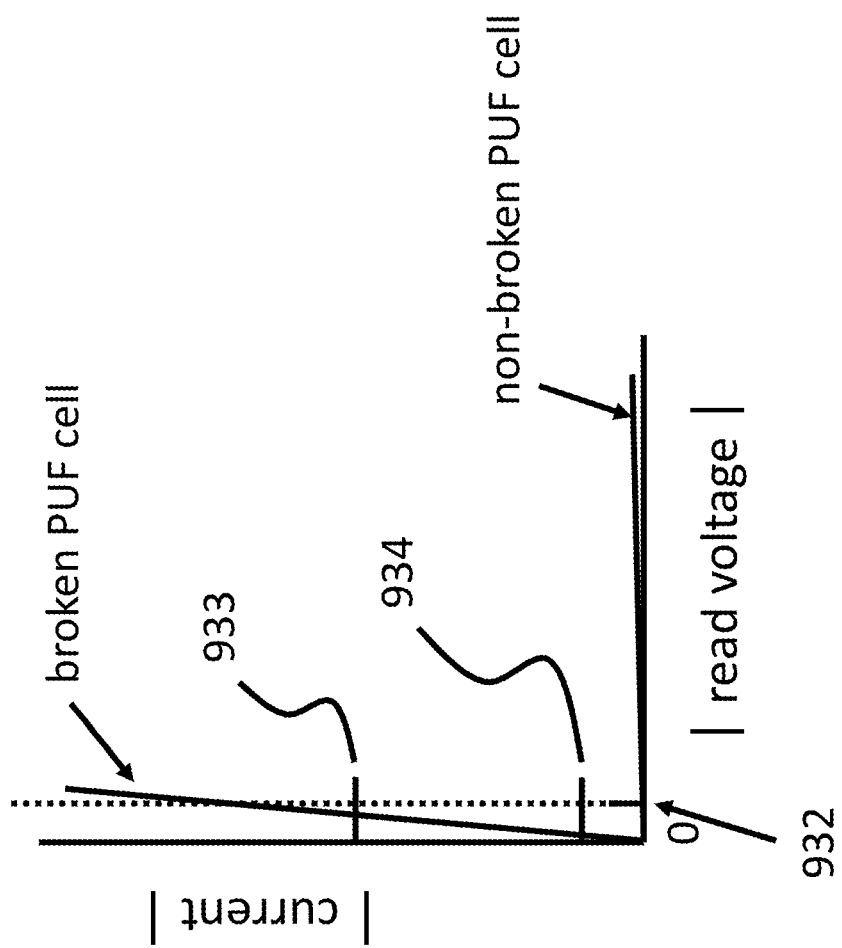
FIG. 39 illustrates an example of the method to read the PUF cell utilizing dielectric breakdown.
Figure 85:
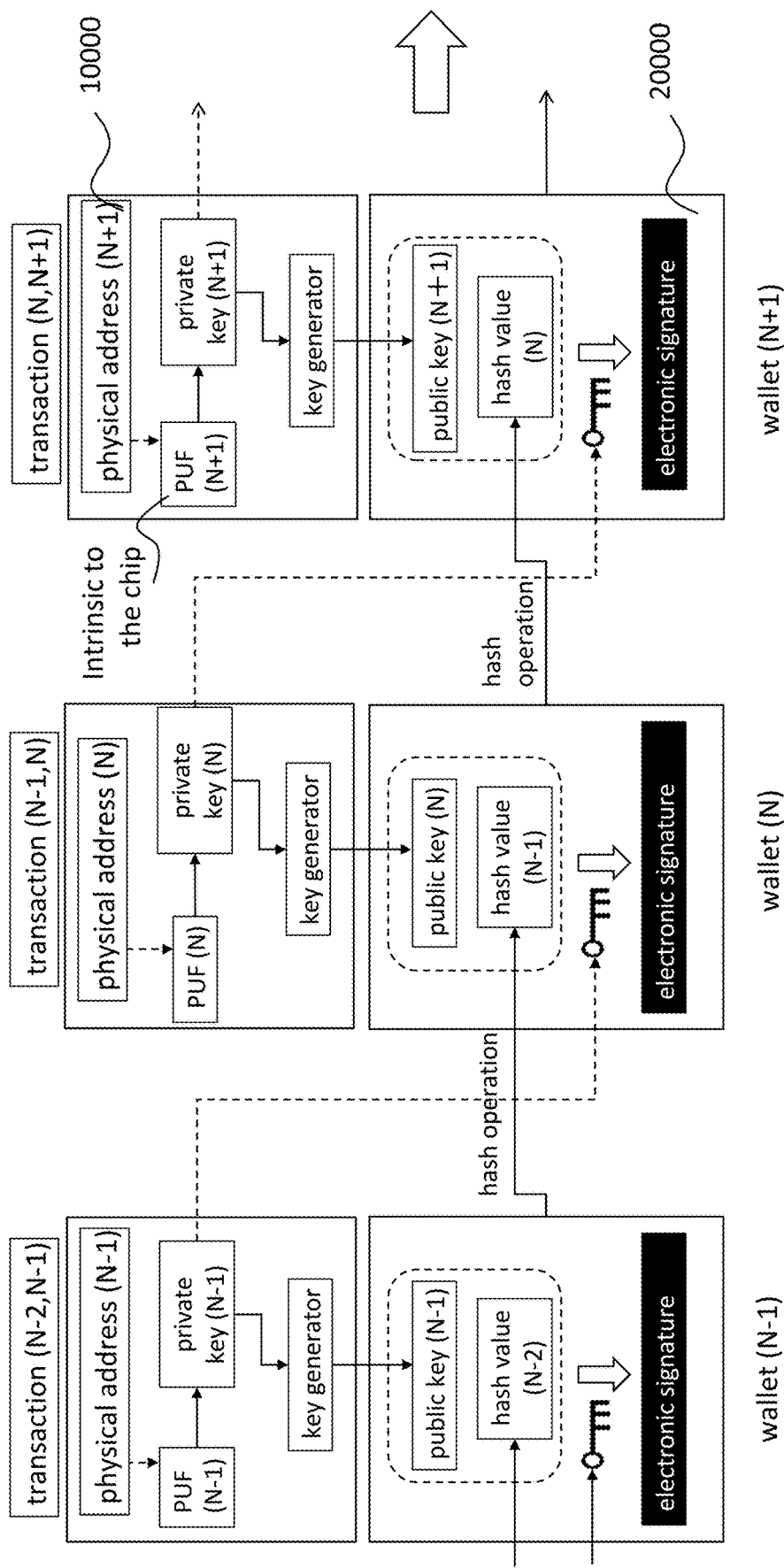
FIG. 85 illustrates an example of a transaction method utilizing the identification core related to the present invention.

FIG. 85 illustrates an example that the transaction (N−2, N−1) is executed from the wallet (N−2) to the wallet (N−1), the transaction (N−1, N) is executed from the wallet (N−1) to the wallet (N), and the transaction (N, N+1) is executed from the wallet (N) to the wallet (N+1). However, N is an arbitrary integer allocated to the physical node connecting to the network by some kind of method. The wallet (N) is the N-th node. In the bottom columns, there are three squares 20000 enclosing the public keys, the hash values, and the electronic signatures. On the contrary, in the upper columns, there are three squares including the physical addresses, the PUF devices, and the private keys. In particular, the upper square corresponds to the first chip 110 including the PUF device 600, that is, the identification core related to the present invention, as illustrated in FIG. 25. In particular, the identification core may be called Physical Chip Identification Core (PCIC). That is, those three squares arrayed in the upper columns are the identification cores 10000. Furthermore, although it is not specially illustrated since it may be inherent, in the present embodiment, the PUF device 600 may include the scramble device 604 in FIG. 32. The description for this may be omitted because it may be done only by replacing "PUF device" with "PUF device and scramble device".

Figure 6:
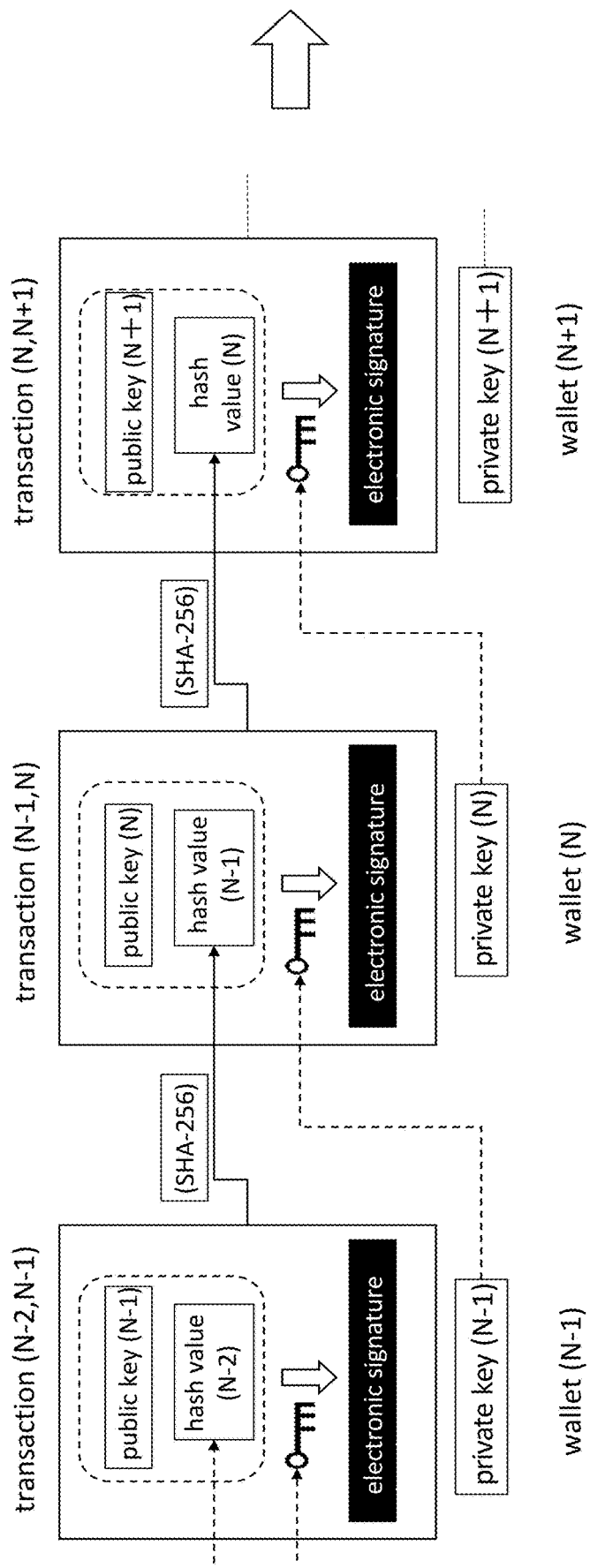
FIG. 6 illustrates another configuration of bitcoin.

That is, the squares in the bottom columns correspond to the wallets of the bitcoin in FIG. 6. In the present invention, the identification cores are appended in the upper columns. Furthermore, in the present invention, the private keys are included in the identification cores and then confined in physical substance (semiconductor chip).

To clarify how the identification cores work, the wallet (N) in the bottom center may be focused on. The hash value (N−1) is the content of the wallet (N) and is generated in the previous wallet (N−1) by the following method. First, the public key (N−1) to be the logical address of the wallet (N−1) in the network (bitcoin address in bitcoin), the hash value (N−2) to be the content of the wallet (N−1), and the electronic signature (N−2) are hashed together. The hash function may be used for hashing. There are plenty of hash functions such as MD2, MD4, MD5, RIPE-MD160, SHA-256, SHA-384, SHA-512 and so forth. As an example among them, the SHA-256 is adopted in bitcoin.

The wallet (N−1) acquires the public key (N) as the logical address of the wallet (N) in the network. The public key (N) and the hash value (N−1) are encrypted with the private key (N−1) to form the electronic signature (N−1). The electronic signature (N−1) and the hash value (N−1) are forwarded to the wallet (N). In the wallet (N), the public key (N), the hash value (N−1) and the electronic signature (N−1) are hashed together to form the hash value (N). The hash value (N) and the electronic signature (N) are forwarded to the wallet (N+1). Since the method to generate the electronic signature (N−2) and the electronic signature (N) are similar to that to generate the electronic signature (N−1), the description for them may be omitted.

In this way, the description may be as same as in FIG. 6 with the exception that the private key is included in the identification core 10000. Accordingly, the present invention has a complete consistency with the conventional block chain.

Thus, the decisive difference from FIG. 6 is the identification core 10000. That is, the public key included in the square in the bottom column 20000 differs from what is logically given like the address of the wallet like bitcoin, and is generated through a predetermined physical generation process by the identification core 10000.

The upper squares, i.e., the identification cores 10000, may include the semiconductor chips (or, chips) configuring the physical nodes in the network. They may have physical substances.

The PUF device, or the PUF device and the scramble device, included in this identification core 10000, are the PUF (N−1) of the wallet (N−1), the PUF (N) of the wallet (N), and the PUF (N+1) of the wallet (N+1), for example.

In general, the semiconductor chips are physical substances and not logically generated by any software. Accordingly, it is possible that the physical addresses are respectively allocated to the chips by some kind of format. As an example, in the case that a certain chip is linked to an Ethernet card, the MAC address linked to the Ethernet card in advance may be the physical address. Or, the physical address may be the code recorded in a non-volatile memory equipped in the chip in advance. Or, the physical address may be the code recorded in storage linked to the chip in advance.

However, the physical addresses included in the identification cores, i.e., the squares 10000, may not be always the physical addresses managed in the network. Some of them may be permitted to be duplicated. The PIN code recorded in the SIM card linked to this chip in advance and anything to be input to the PUF devices as an input code may take a place of the physical address.

As long as a chip having the physical substance configures a part of the physical node connecting the network (identification core), this chip may be expected to link to a physical address by some kind of method. Accordingly, one of the simplest ways is to input the physical address to the PUF device. However, what is actually linked to the physical substance of the chip may be the PUF device equipped in the chip.

Figure 27:
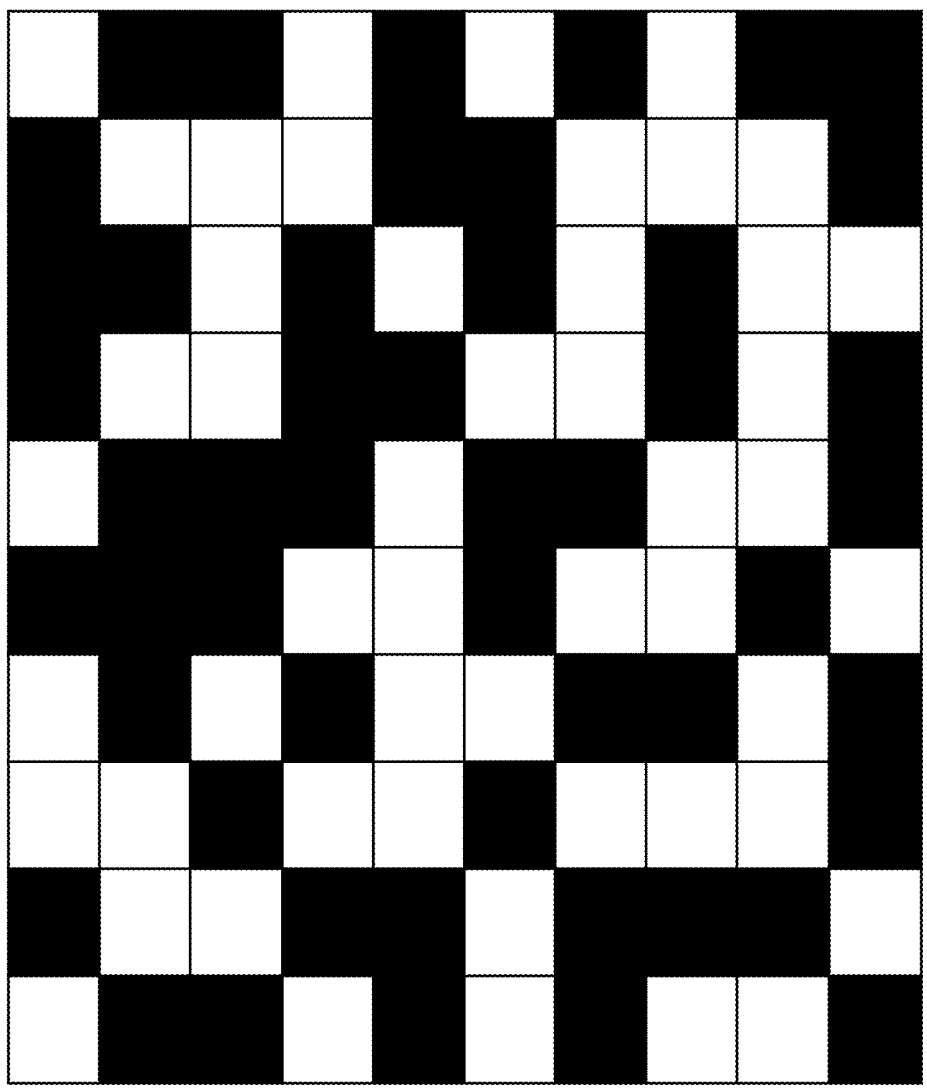
FIG. 27 illustrates an example of a QR code type physical randomness.
Figure 28:
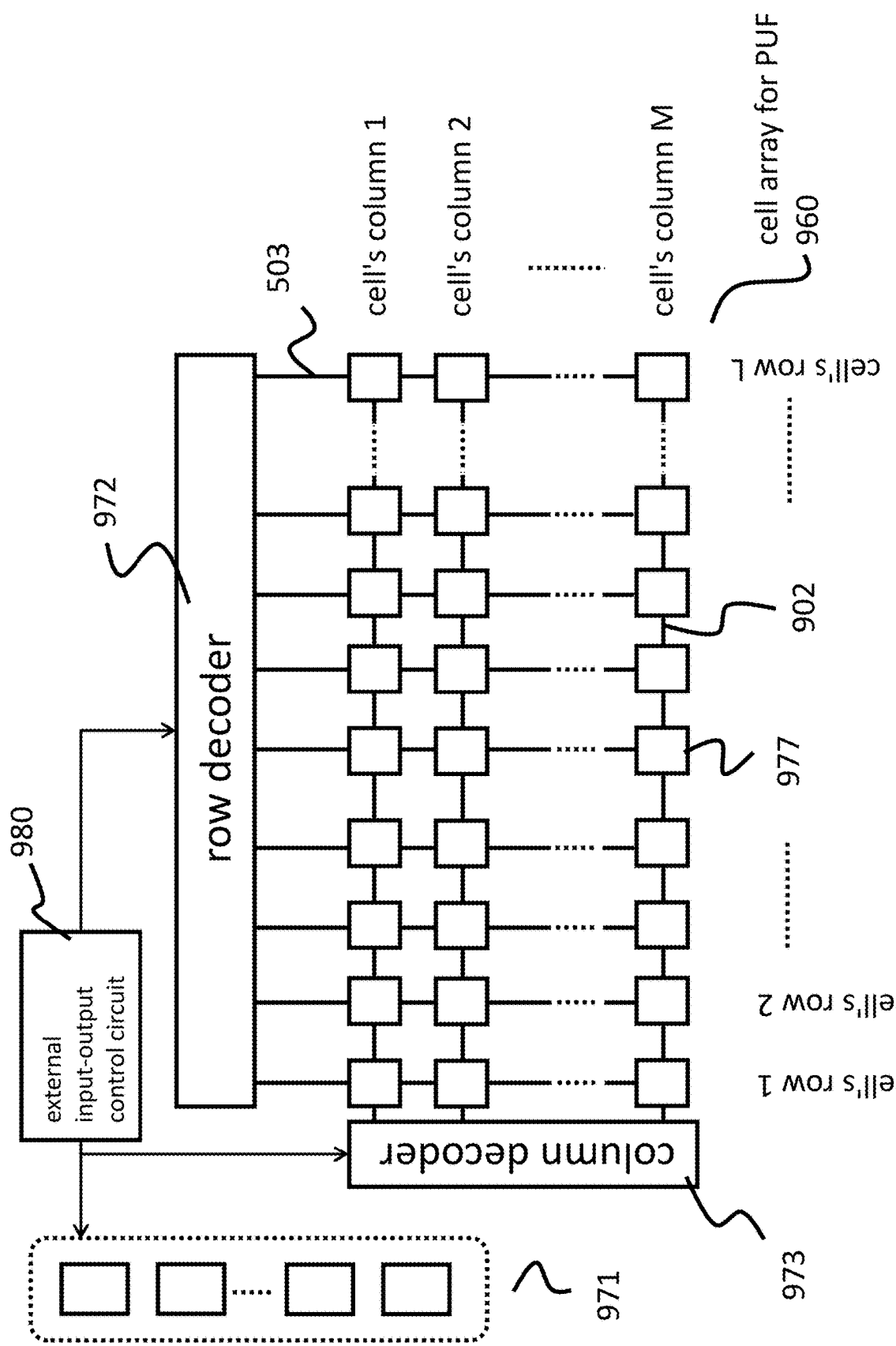
FIG. 28 illustrates an example of a cell array for PUF.
Figure 29:
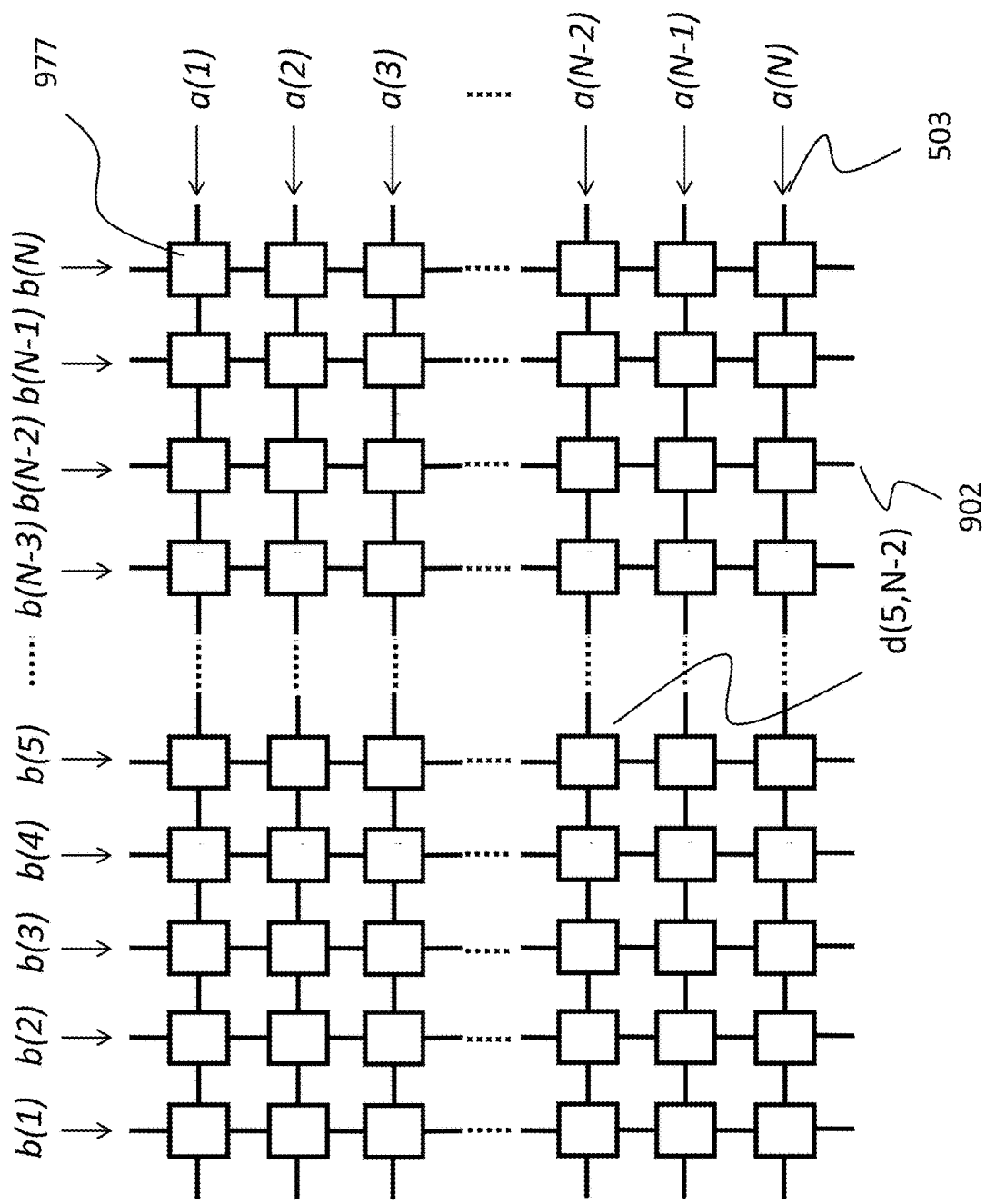
FIG. 29 illustrates an example of an input method to the cell array for PUF.
Figure 31:
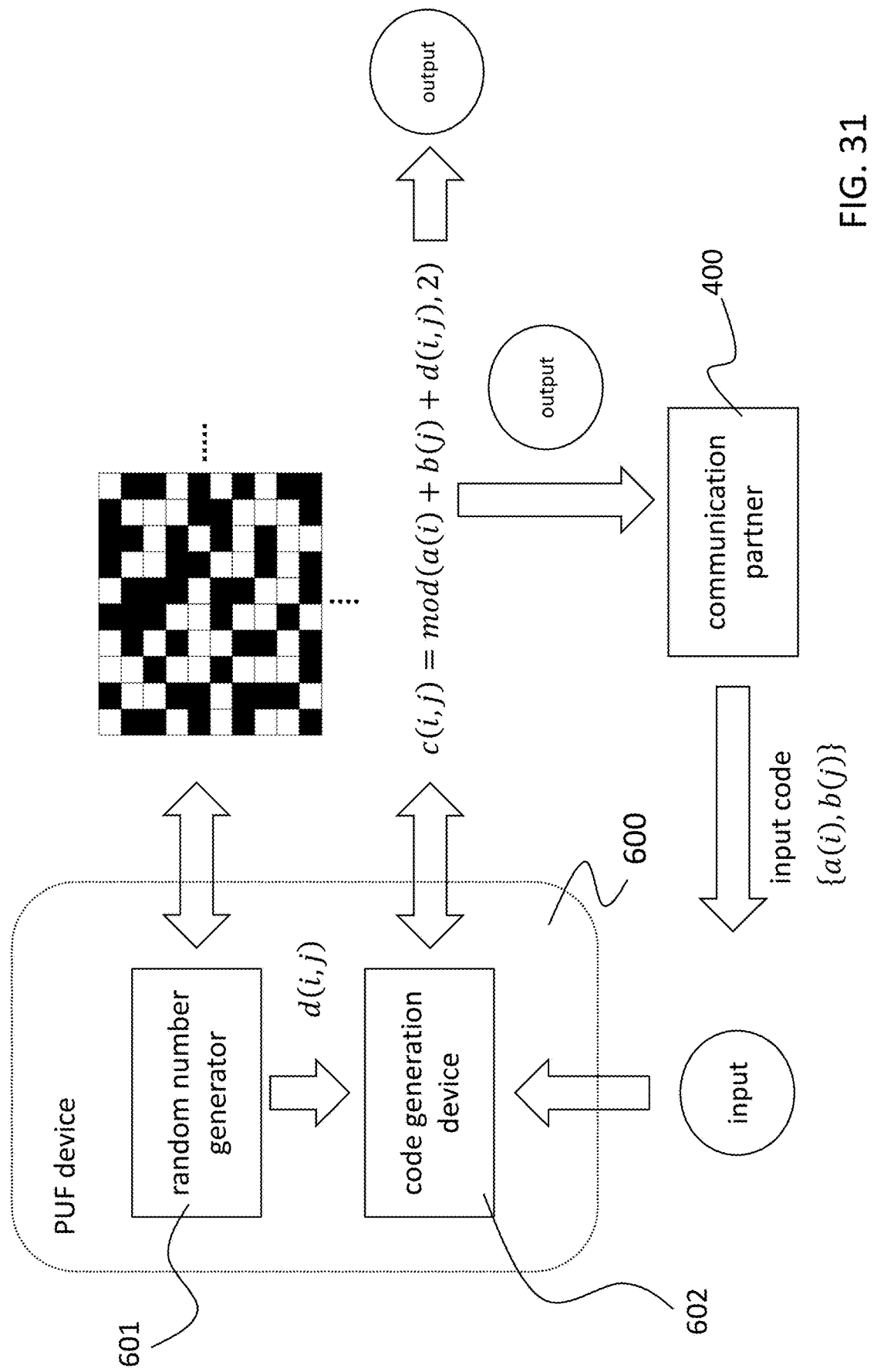
FIG. 31 illustrates an example of a basic configuration to realize a generation method of the output code.
Figure 78:
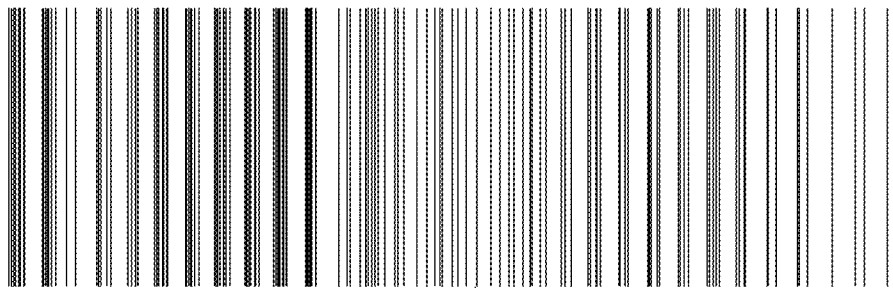
FIG. 78 illustrates an example of a barcode type physical randomness.
Figure 79:
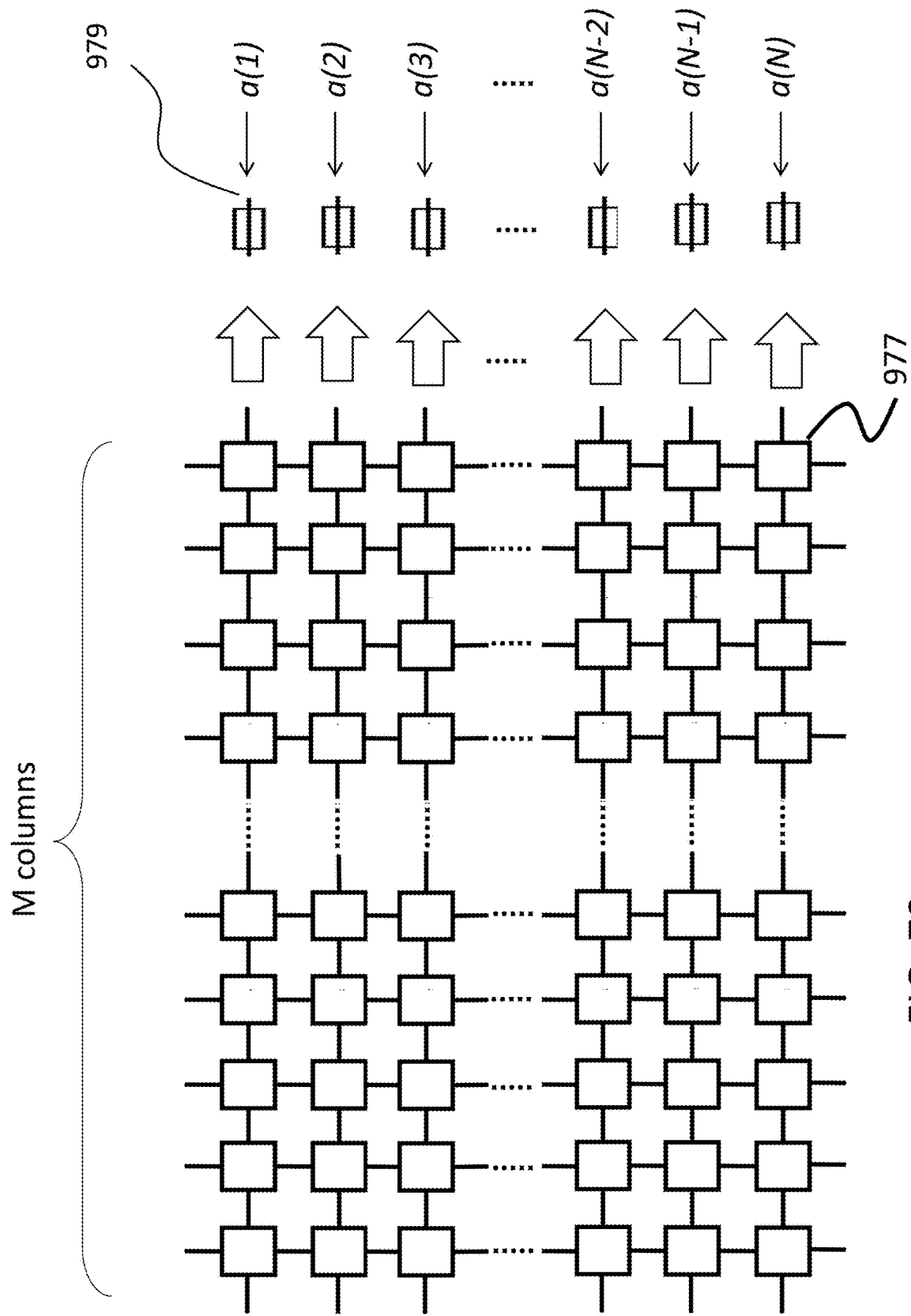
FIG. 79 illustrates an example of an input method for the PUF device utilizing the hypallage cell.
Figure 81:
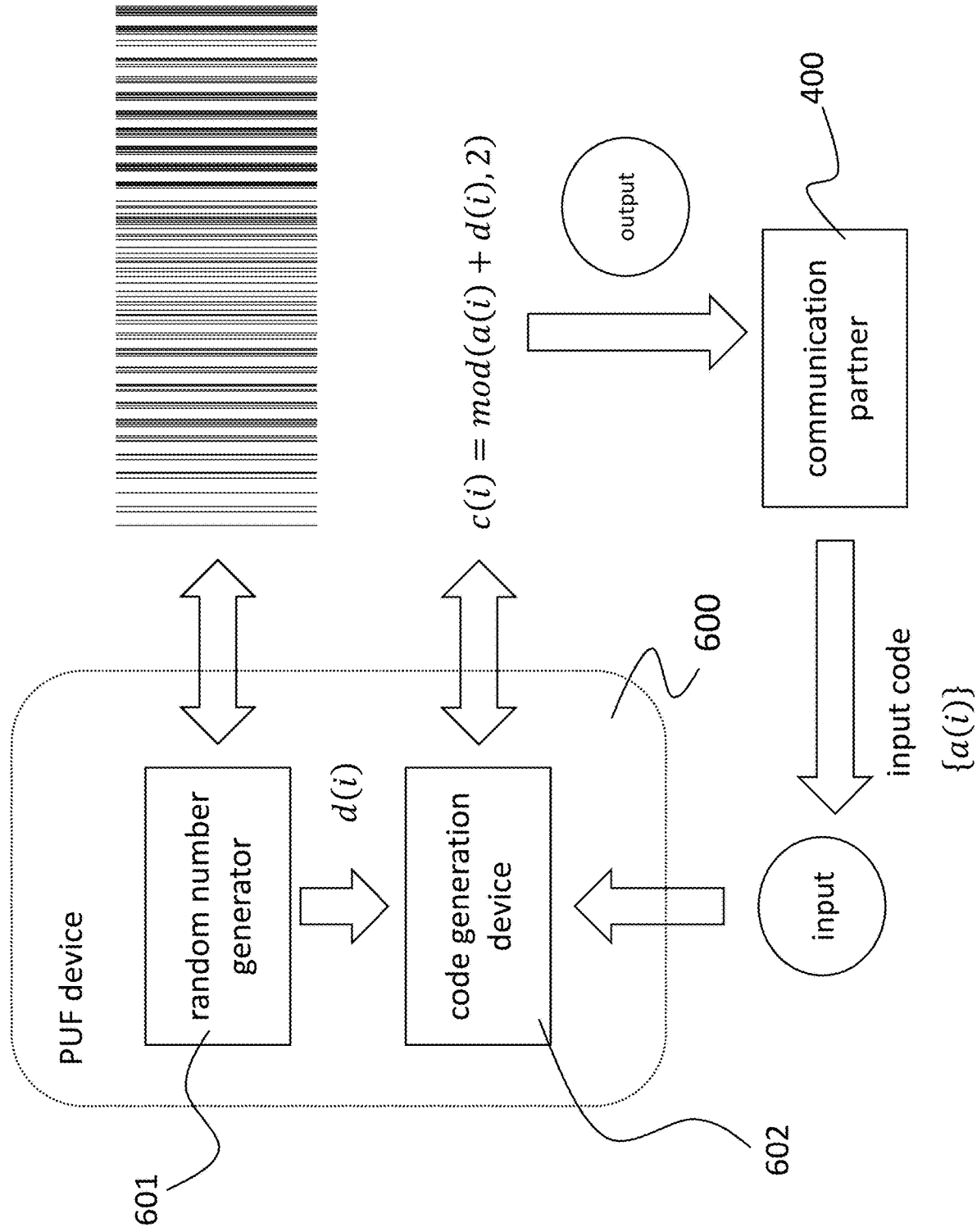
FIG. 81 illustrates an example of a basic configuration to realize the generation method of the output code.
Figure 82:
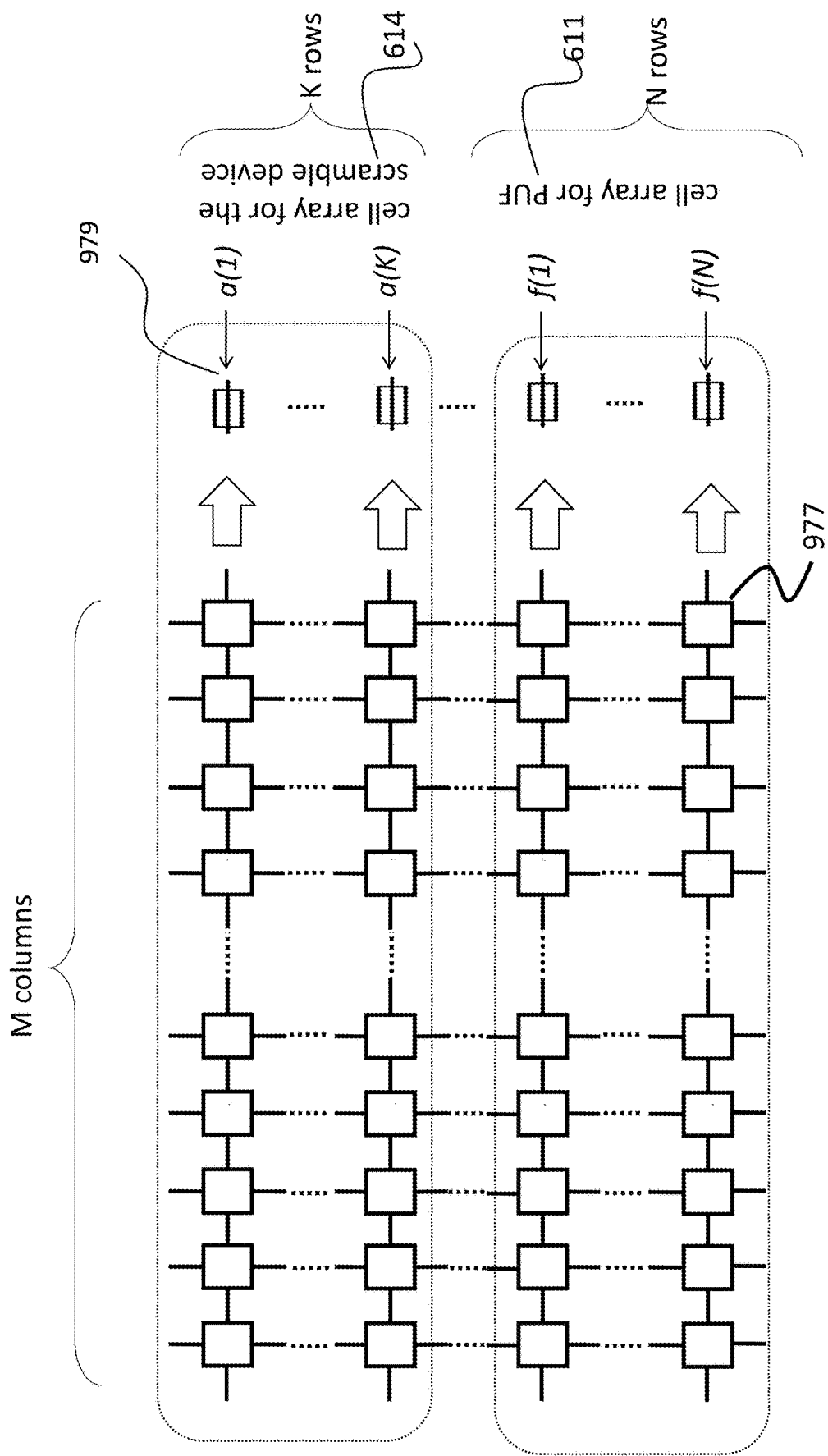
FIG. 82 illustrates an example that the scramble device and the PUF device cooperate with each other.
Figure 83:
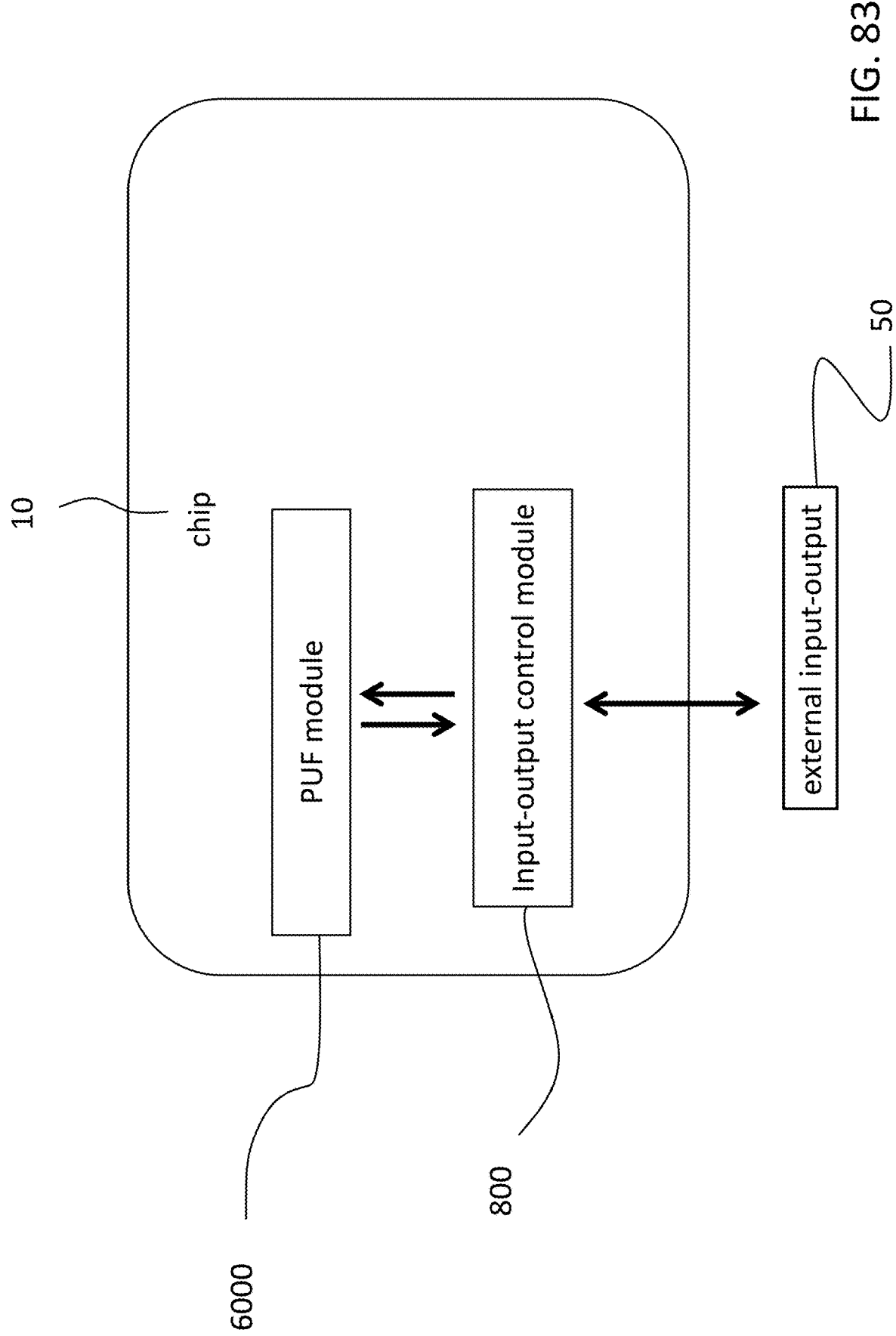
FIG. 83 illustrates an example of an input-output control method of the PUF module equipped in the semiconductor chip having the input-output control module.

Thus, the PUF (N) to which an appropriate input is input may output a random number code which is physically random, as illustrated in FIG. 27 and FIG. 78. This random number code may be regarded as the private key (N), or the temporal code generated from the random number code by using the equation 2 or the equation 5 may be regarded as the private key (N), or the output code generated from this random number code by using the equation 3, the equation 4 or the equation 6 may be regarded as the private key (N), or the code generated by the code generation method modulated not beyond the scope of the present invention may be regarded as the private key (N).

Figure 84:
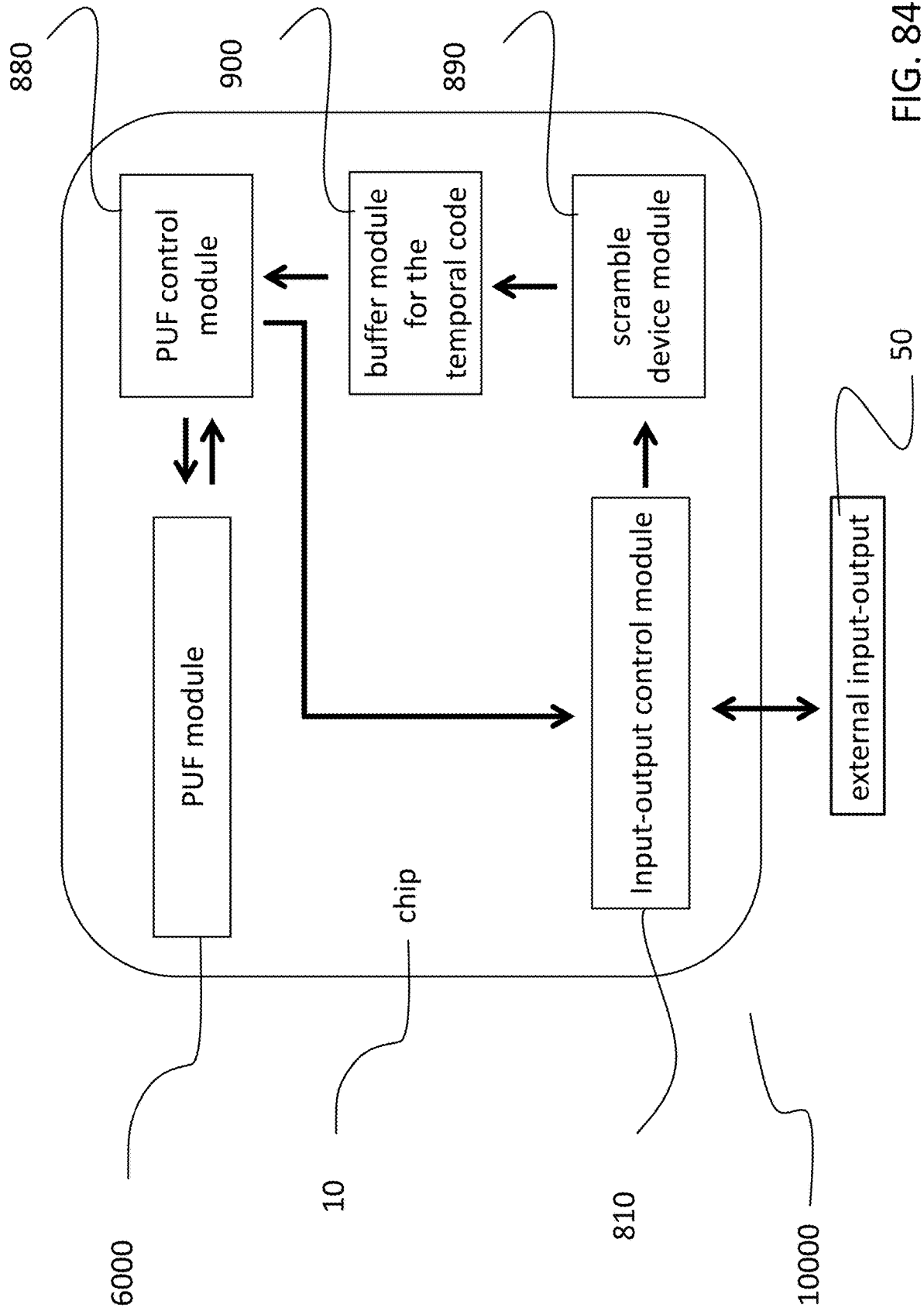
FIG. 84 illustrates an example of an utilization method of the scramble module and the PUF module utilizing a temporal code inside the identification core.

The private key (N−1) and the private key (N+1) may be similarly generated. Those private keys may be respectively confined within the identification cores, as illustrated in FIG. 84.

The private key (N) generated like this is input to the key generator so as to generate the public key to form a pair with the private key (N). The public key (N−1) and the public key (N+1) are similarly generated. As an example, the key generator may be modulated in this identification core 10000, as illustrated in FIG. 85.

Figure 86:
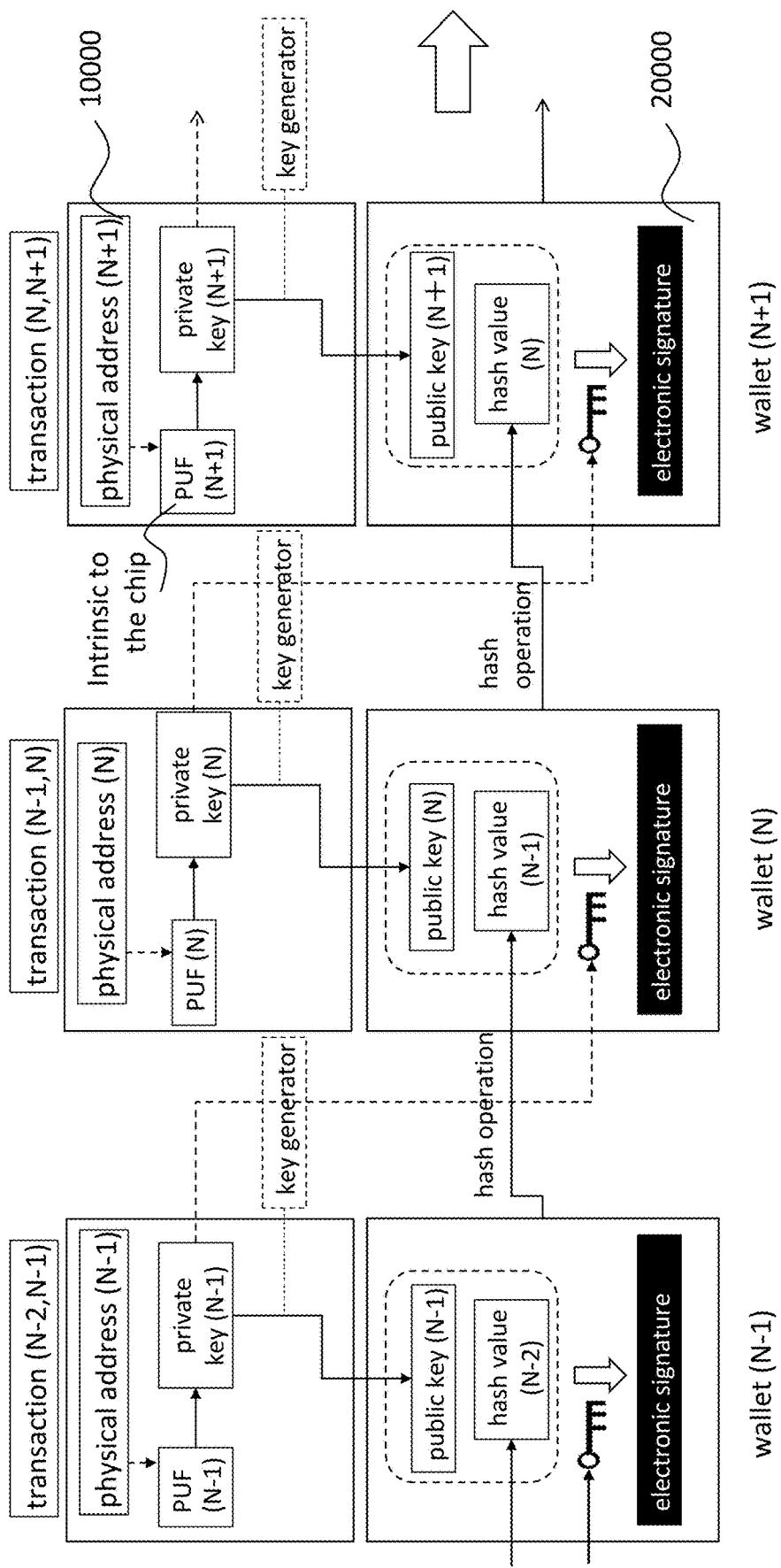
FIG. 86 illustrates an example of the transaction method utilizing the identification core related to the present invention.

As another example, as illustrated in FIG. 86, the key generator may be located out of the identification core 10000. As another example, the key generator may be equipped as another module of the same information apparatus (physical node). As another example, the key generator may be modulated in another electronic apparatus linked to the identification core 10000. As a further example, the key generator may be installed in the system including the identification core 10000 as software.

Figure 87:
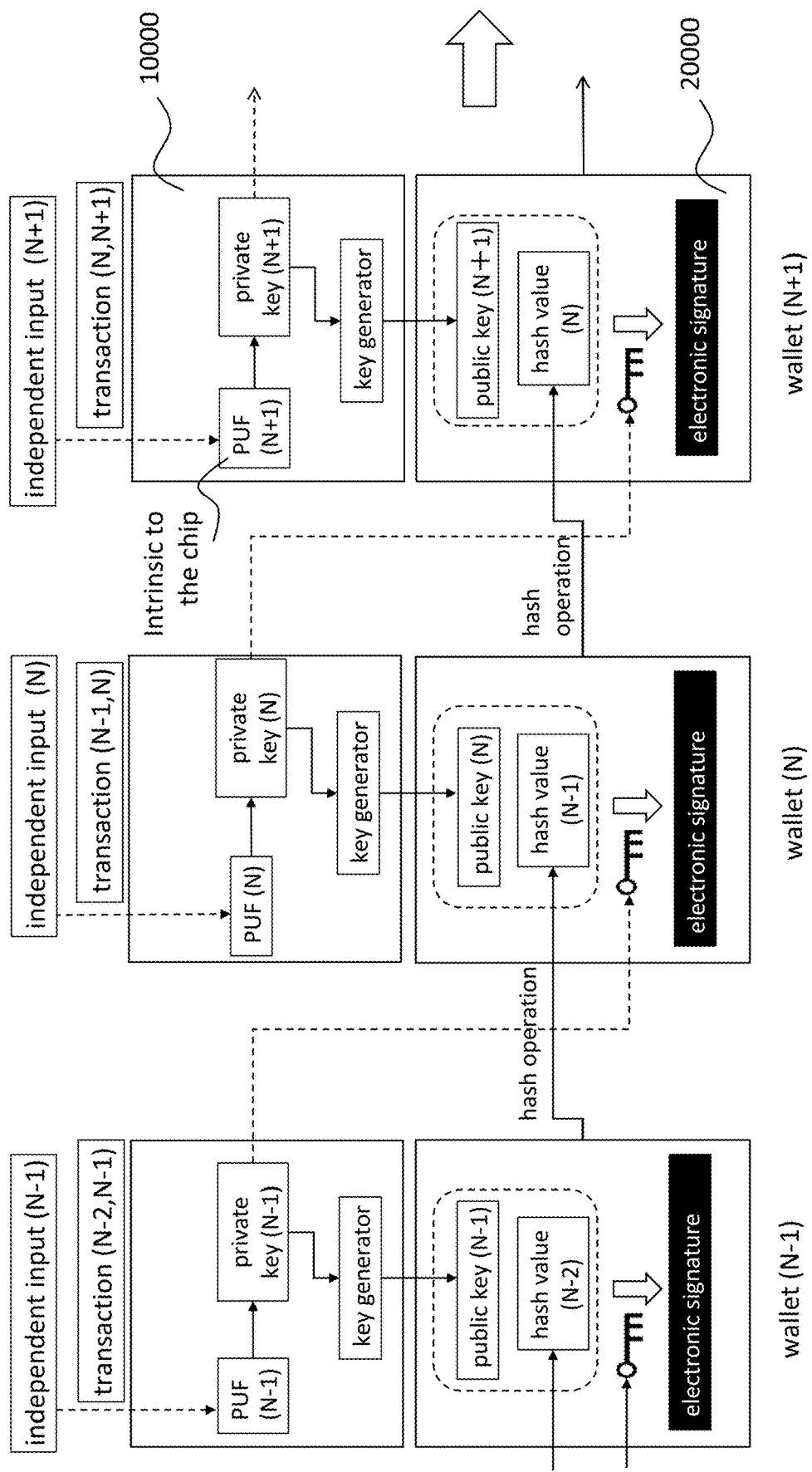
FIG. 87 illustrates an example of the transaction method utilizing the identification core related to the present invention.
Figure 88:
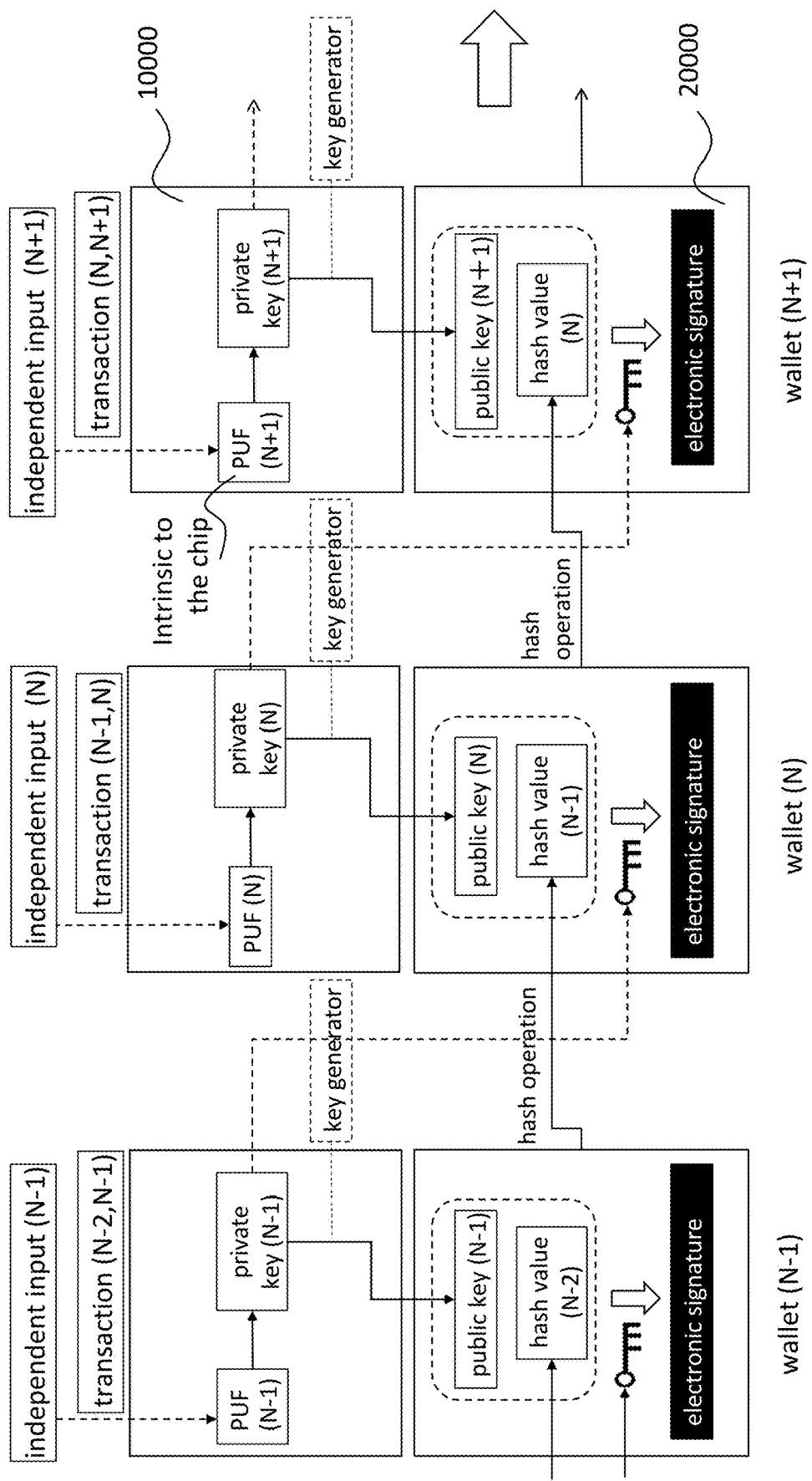
FIG. 88 illustrates an example of the transaction method utilizing the identification core related to the present invention.

Anyway, the upper squares, i.e., the identification cores 10000, include at least three of the PUF device, the physical address to be input to the PUF device or some kind of the code information taking a place of the physical address (independent input), and private key generated by the PUF device. FIG. 87 illustrates an example in which the physical addresses in FIG. 85 are replaced with the independent inputs. The detailed description is similar to that of FIG. 85 and then is omitted. FIG. 88 illustrates an example in which the physical addresses in FIG. 86 are replaced with the independent inputs. The detailed description is similar to that of FIG. 86 and then is omitted.

As an example, the independent input to boot some kind of application executing in the network may be the passcode, the digital code information (such as a PIN code, a barcode, and a QR code), some kind of biometric information to identify the regular user of the application (such as the finger print information, the finger vein information, the retina information, the DNA information and so forth), the voice and image information extracted from the voice and pictures of the regular user to identify the individual persons, the physical information extracted from the physical characteristics of the regular user to identify individual persons, and the other personal information to identify the regular user.

As another example, the independent input that some kind of the application executing in the network requires the users to input as necessary may be the passcode, the digital code information (such as a PIN code, a barcode, and a QR code), some kind of biometric information to identify the regular user of the application (such as the finger print information, the finger vein information, the retina information, the DNA information and so forth), the voice and image information extracted from the voice and pictures of the regular user to identify the individual persons, the physical information extracted from the physical characteristics of the regular user to identify the individual persons, and the other personal information to identify the regular user.

As another example, the independent input to boot the information terminal in which some kind of application executing in the network is installed may be the passcode, the digital code information (such as a PIN code, a barcode, and a QR code), some kind of biometric information to identify the regular user of the application (such as the finger print information, the finger vein information, the retina information, the DNA information and so forth), the voice and image information extracted from the voice and pictures of the regular user to identify the individual persons, the physical information extracted from the physical characteristics of the regular user to identify the individual persons, and the other personal information to identify the regular user.

By this way, the private key generated by the PUF device having the physical substance and the public key being the logical address in the network may be linked. That is, the identification core related to the present invention may organically link the semiconductor chip having the physical substance (hardware) and the logical network (software).

Here, the logical network is the network in which the nodes are logical nodes.

Figure 9:
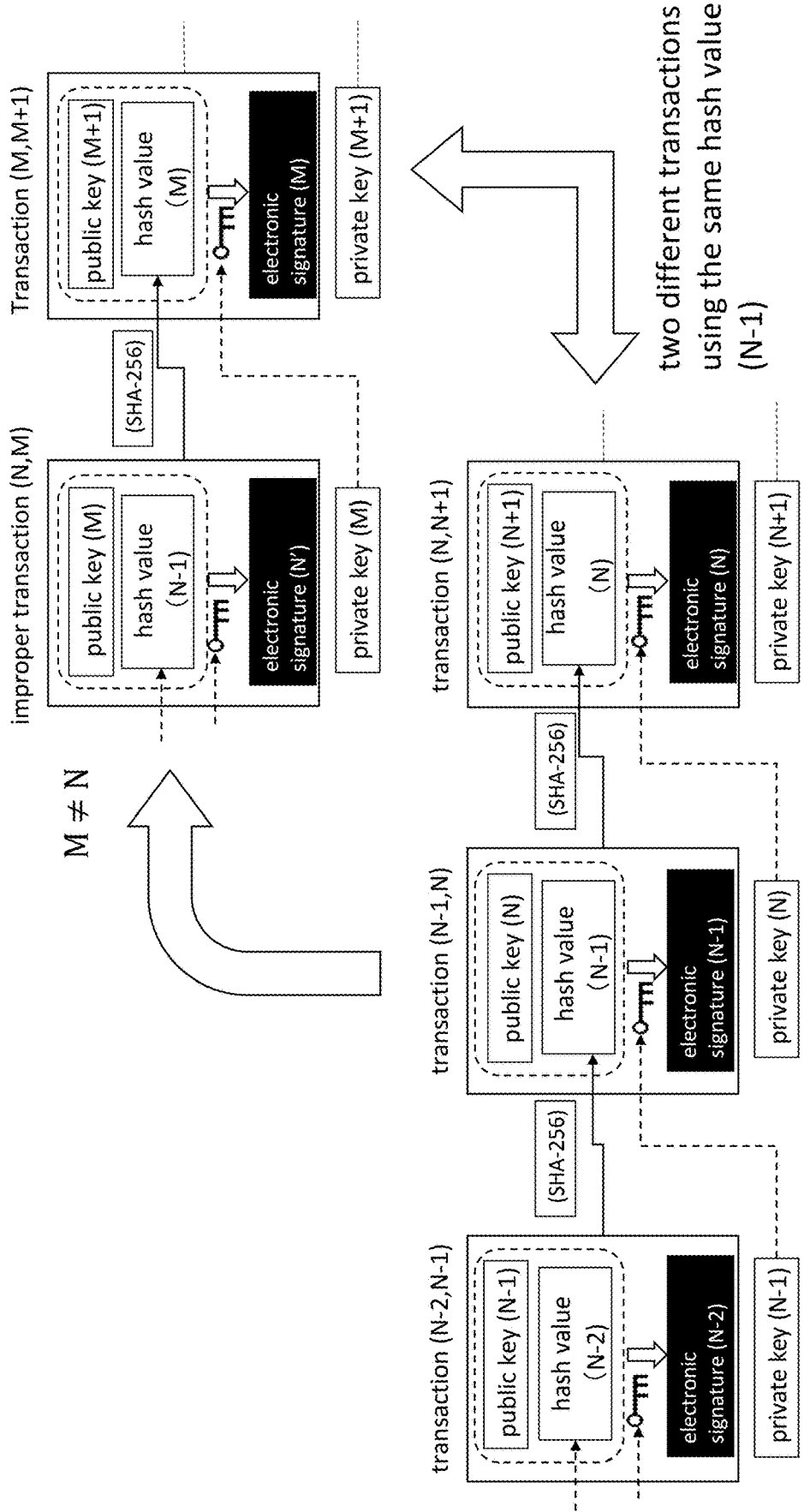
FIG. 9 illustrates an example that the regular owner of the wallet (N) abuses the private key (N) to proceed an improper transaction.
Figure 10:
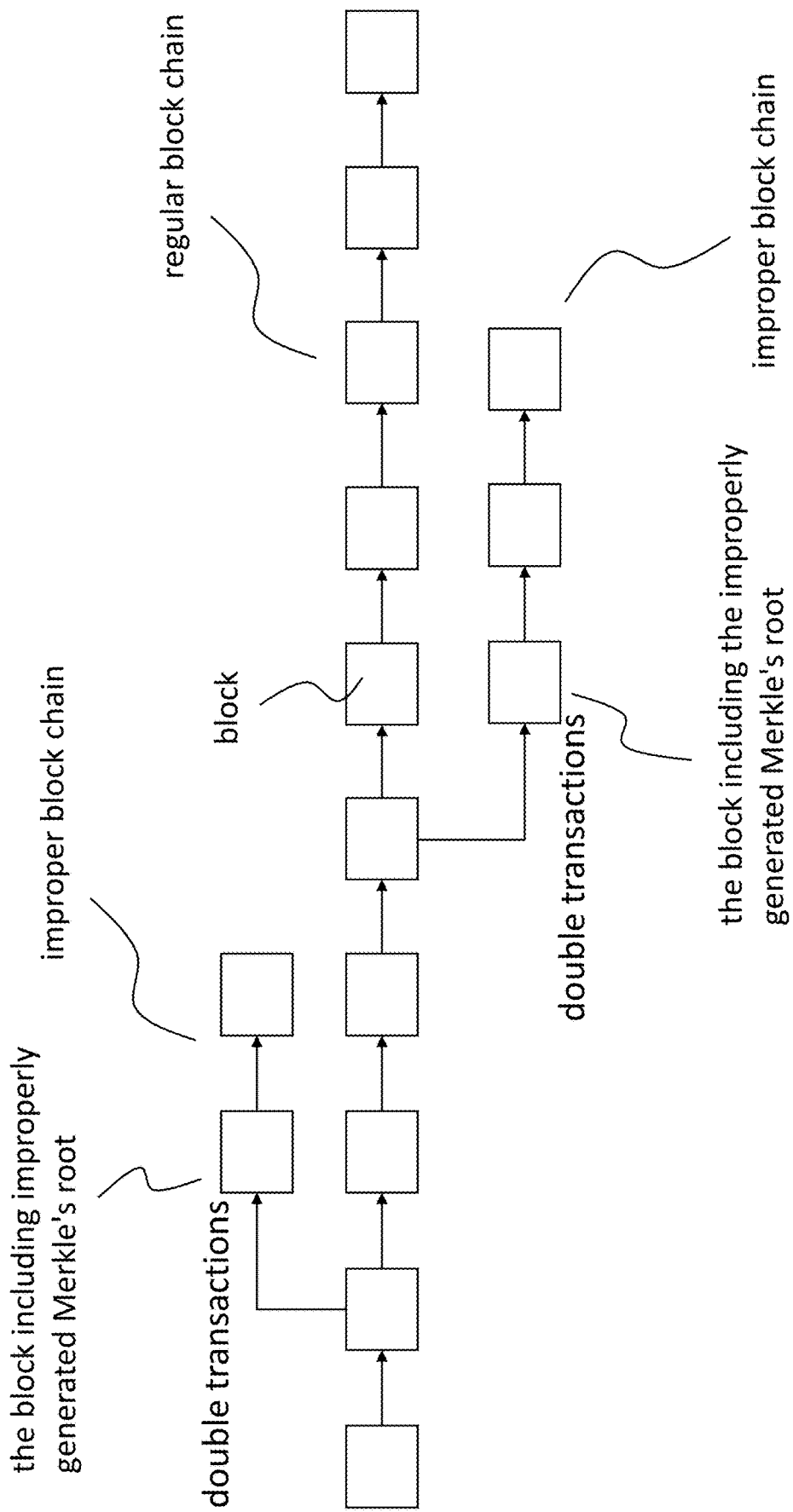
FIG. 10 illustrates an example for an impact of an improper transaction on the block chain.
Figure 11:
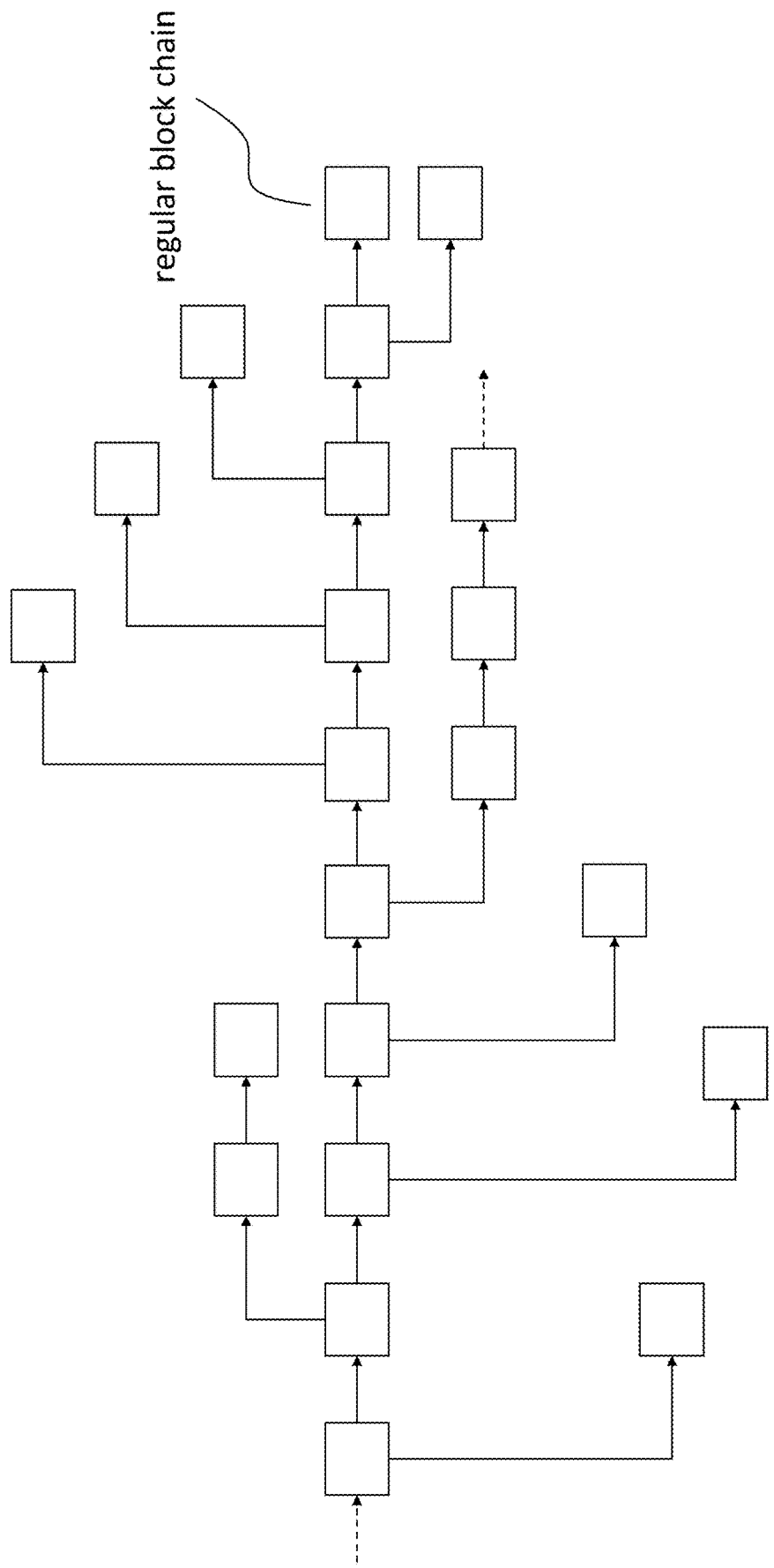
FIG. 11 illustrates an example for an impact of an improper transaction on the block chain.
Figure 12:
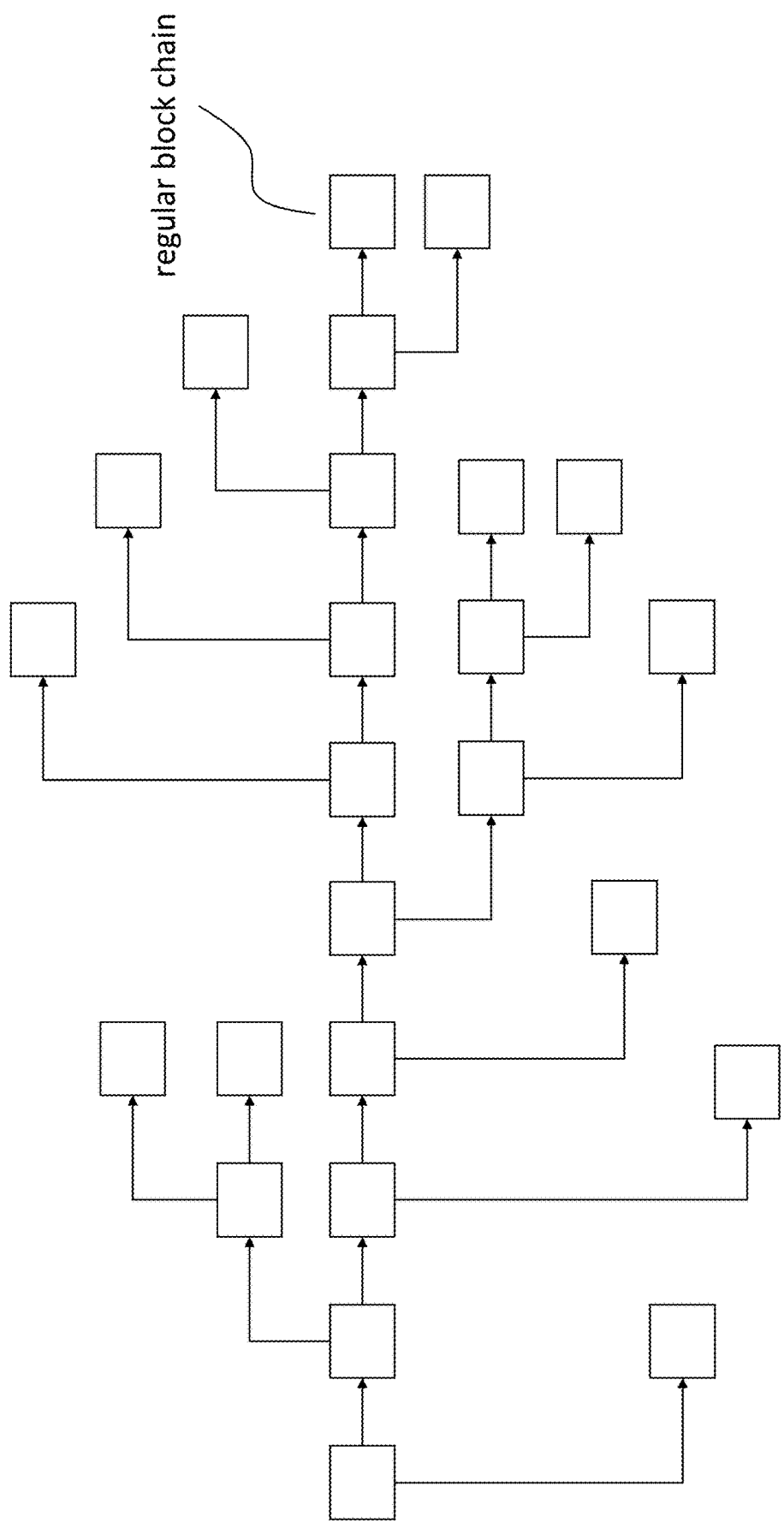
FIG. 12 illustrates an example for an impact of an improper transaction on the block chain.
Figure 13:
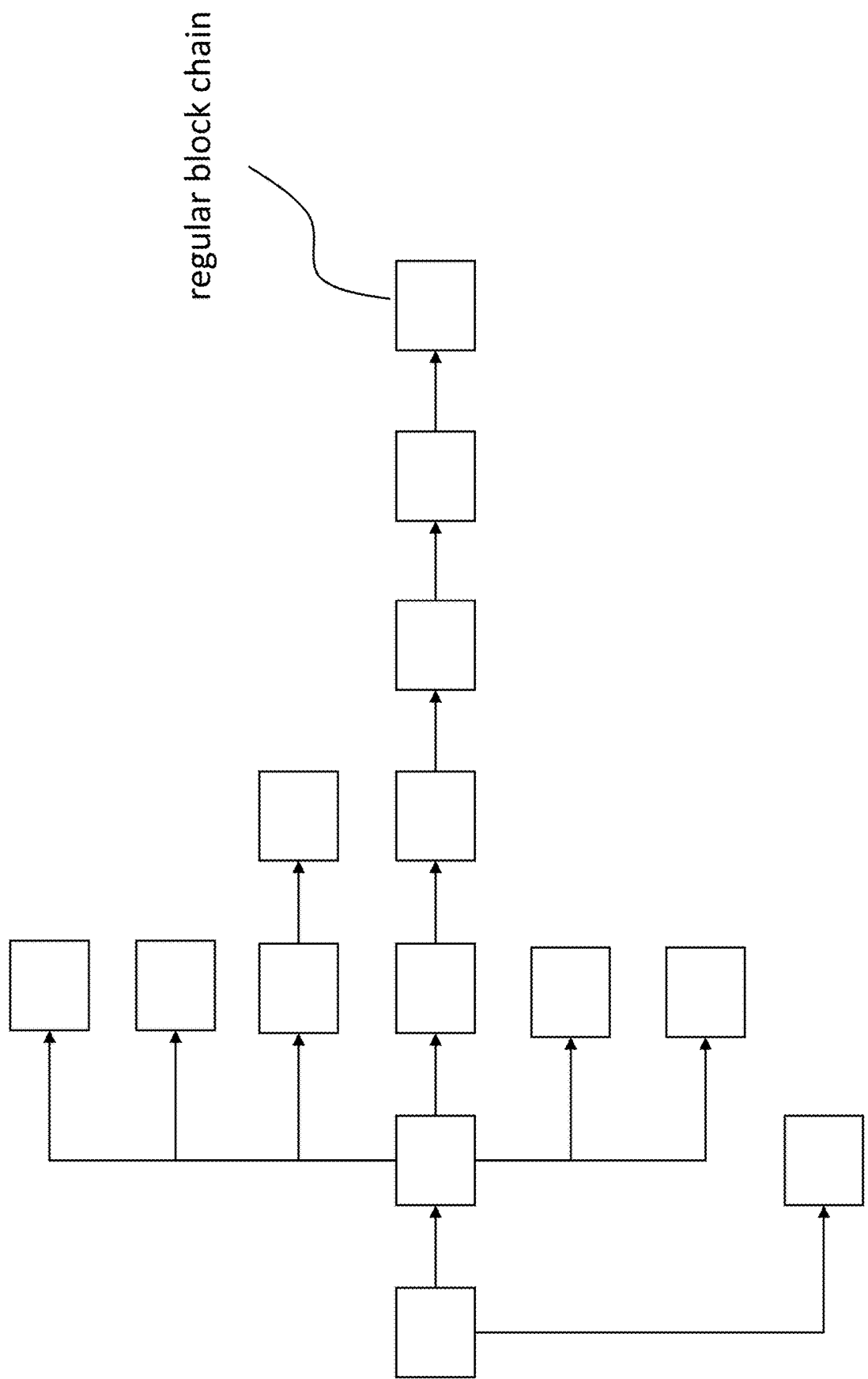
FIG. 13 illustrates an example for an impact of an improper transaction on the block chain.
Figure 14:
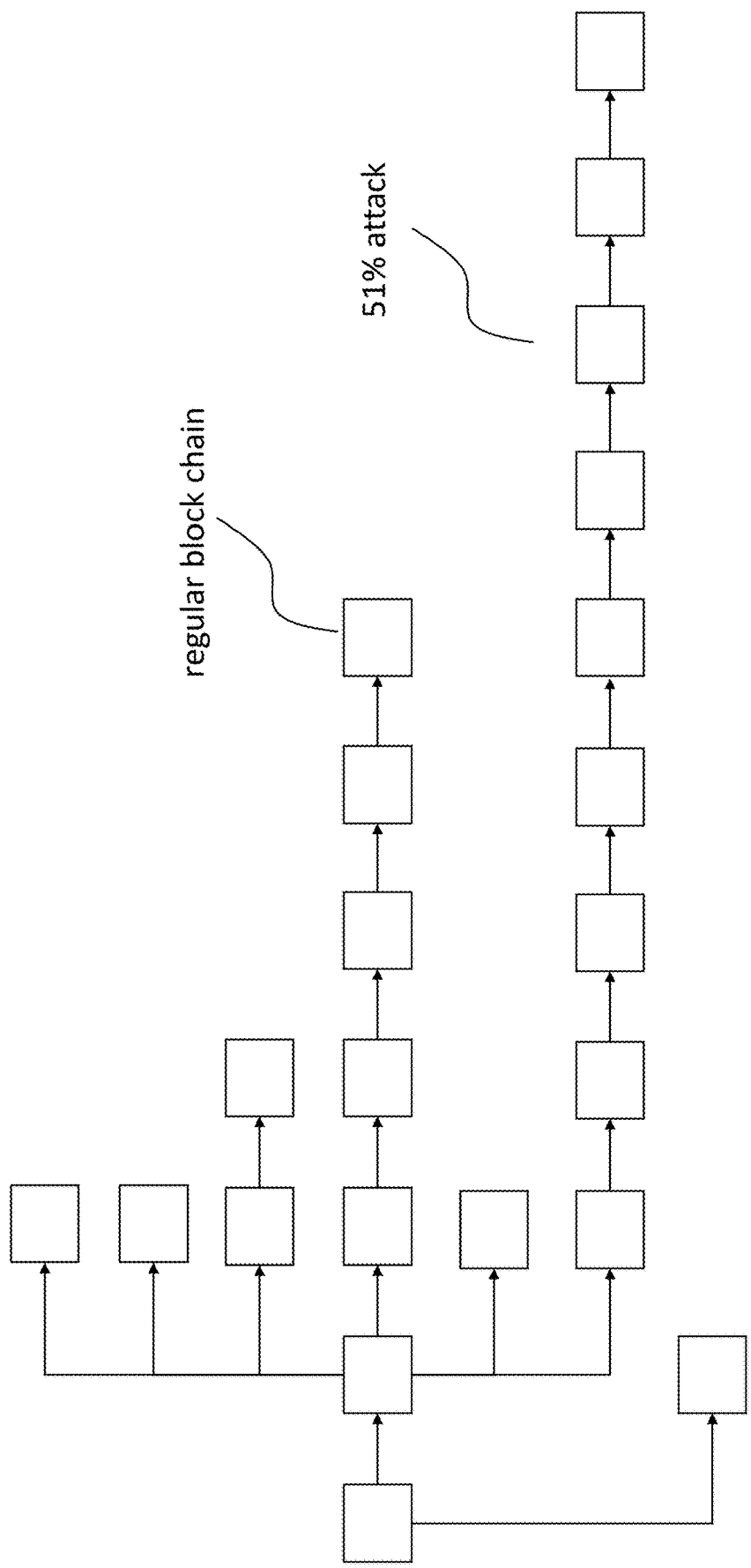
FIG. 14 illustrates an example for an impact of an improper transaction on the block chain.
Figure 15:
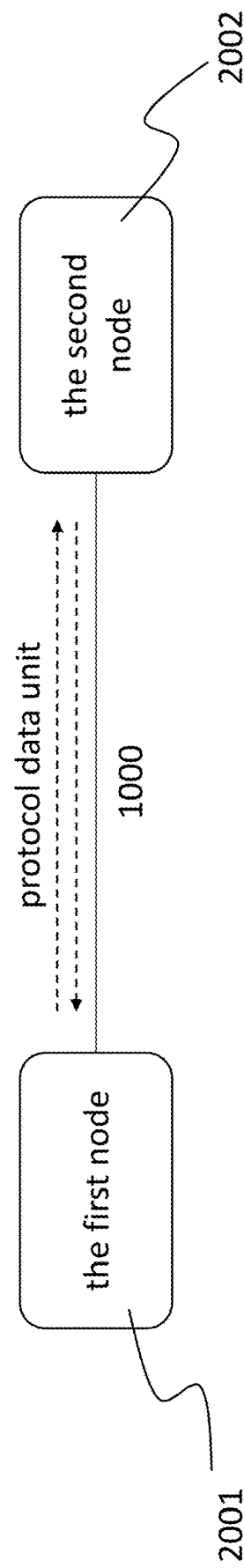
FIG. 15 illustrates a smallest configuration to manage the communication of a protocol data unit.

On the other hand, a few weak points of the block chain are the abuse of the private key by the owner of the private key, as illustrated in FIG. 9. If the private key is abused as illustrated in FIG. 9, the problem of multi-transaction may occur, as illustrated in FIGS. 10-14. To avoid this problem, "Proof of "Work" (PoW) is adopted by the conventional block chain. However, PoW is based on an optimistic assumption that the 51% attack is unrealistic.

Figure 89:
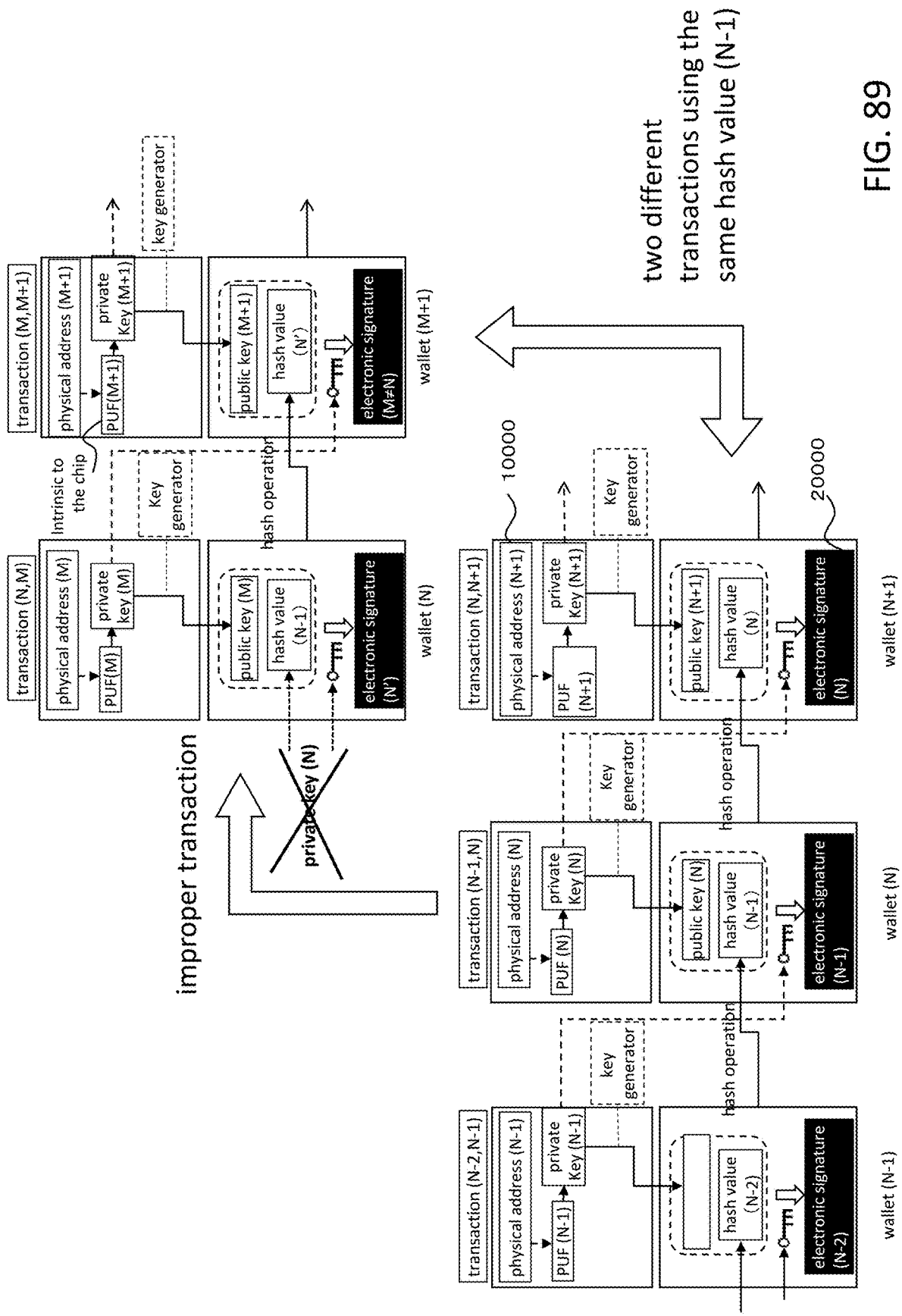
FIG. 89 illustrates the reason that the improper transaction is prevented by utilizing the identification core related to the present invention.

FIG. 89 illustrates how the multi-transaction is prevented by the present invention. As an example, FIG. 86 is adopted but it may be inherent that FIG. 85, FIG. 87 and the FIG. 88 are similarly used to prevent the multi-transaction.

First of all, the case of the improper transaction similar to FIG. 9 may be considered as follows. In FIG. 89, the transition (N−1, N) and the previous ones have been appropriately processed. In the next process, the improper transaction (N, M) is processed by someone as well as the regular transaction (N, N+1). This "someone" may illegally acquire the private key (N) or may be the regular owners and users of the private key (N). In this event, M is an integer different from N. Subsequently, it may be assumed that the transaction (M, M+1) is regularly executed. As a result, there are two different transactions taking over the same hash value (N−1) in FIG. 89. This means that the contents of the wallet (e.g., coin) illegally increases twofold.

To process the illegal transaction, it must be necessary that the private key is simultaneously used for both the transaction (N, M) and the transaction (N, N+1). Here, "simultaneously" doesn't mean "rigorously at the same time". In the case of bitcoin, the time difference less than 10 minutes may be regarded as "simultaneous" in average.

In order to simultaneously use the private key (N) in such a regard of "simultaneously", first of all, the private key (N) and the hash value (N−1) may be copied to another wallet, e.g., the wallet (M−1). This wallet (M−1) is unnecessary to really exist and just only a logical destination to which the private key (N) and the hash value (N−1) are copied. It may be a virtual wallet formed by the hacker's tool or a temporarily existing logical address.

Here, in the case that the regular owner or user processes the improper transaction, the problem to be prevented is the copy of the private key (N) to the wallet (M−1), since the hash value (N−1) is the contents of the wallet (N). If the private key (N) is used twice within 10 minutes to process the transaction of the same coin without copying the private key (N) to the wallet (M−1), the record that the same coin was processed twice simultaneously in the wallet (N) may be left in the block chain and then the improper process may be found. Therefore, it may be required to prevent the copy of the private key (N).

With the PUF device included in the upper square, which is related to the present invention, e.g., identification core 10000, it may disable even the regular owners or users to extract the private key (N) from the chip. Therefore, the copy of the private key (N) to the virtual wallet (M−1) is prevented and then can defend the abuse of the private key. The copies of the private key (N−1) and the private key (N+1) are similarly prevented.

The description may be continued with FIG. 86 as follows. For example, it may begin with the method to generate the electronic signature (N) with the private key (N). First of all, the wallet (N) forms the hash value (N) by hashing the hash value (N−1) (which is the content of the wallet (N)), the public key (N) and the electronic signature (N−1) together. This may be temporarily stored in the wallet (N). Next, the wallet (N) is to acquire the public key (N+1) which is the logical address of the destination of the transaction, i.e., the wallet (N+1), in the network. Subsequently, by using the private key (N) confined in the chip of the identification core 10000 linked to the wallet (N), the hash value (N) and the public key (N+1) are encrypted together to generate the electronic signature (N). Finally, the generated electronic signature (N) and the hash value (N) are forwarded to the wallet (N+1) whose logical address is the public key (N+1). In this way, the transaction (N, N+1) can be completed in the side of the wallet (N). Of course, it may be similarly described with FIG. 85. If the physical addresses are replaced with the independent inputs in the identification cores, FIG. 87 and the FIG. 88 may be also similarly illustrated.

That is, in the method using the identification core 10000, which is related to the present invention, it may be able to confine the private key within the identification core 10000. Specifically, it may be possible with the system illustrated in FIG. 84 or in the system revised to an extent not far beyond the essence of the present invention.

In this way, the identification core provides "invisible private key" from the exterior in the present invention. Then, the weak point of the block chain is reinforced. Since the copy of the private key (N) to the wallet (M−1) is prevented, the improper transaction (N, M) using the wallet (M) is also prevented. That is, more than two different transactions taking over the same hash value (N−1) becomes impossible.

Figure 90:
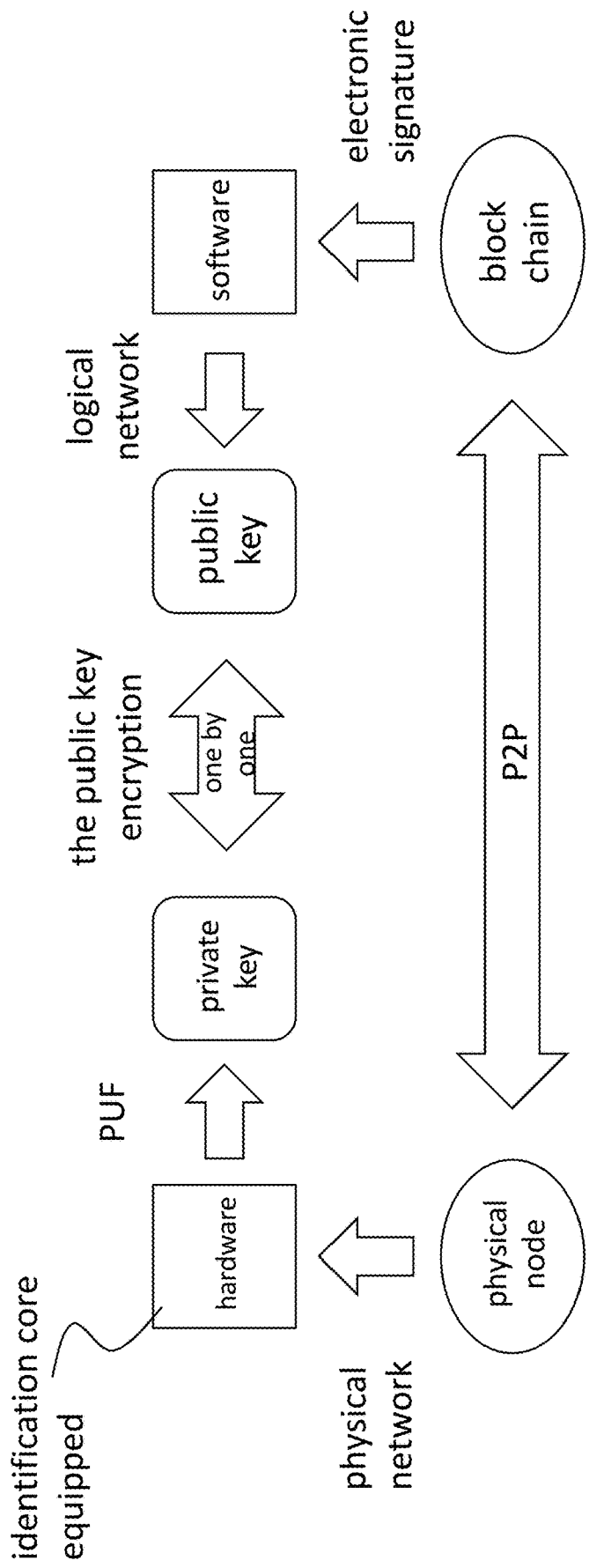
FIG. 90 illustrates an example of a concept of the method to cooperate the logical network with the physical network utilizing a public key forming a unique set with a private key generated by the identification core related to the present invention.

FIG. 90 illustrates the concept of the present invention. That is, the present invention provides the method for skillfully cooperating PUF, public key cryptography and the electronic signature (network method utilizing the identification core) in order to organically link the block chain in the logical network to the physical network.

Figure 2:
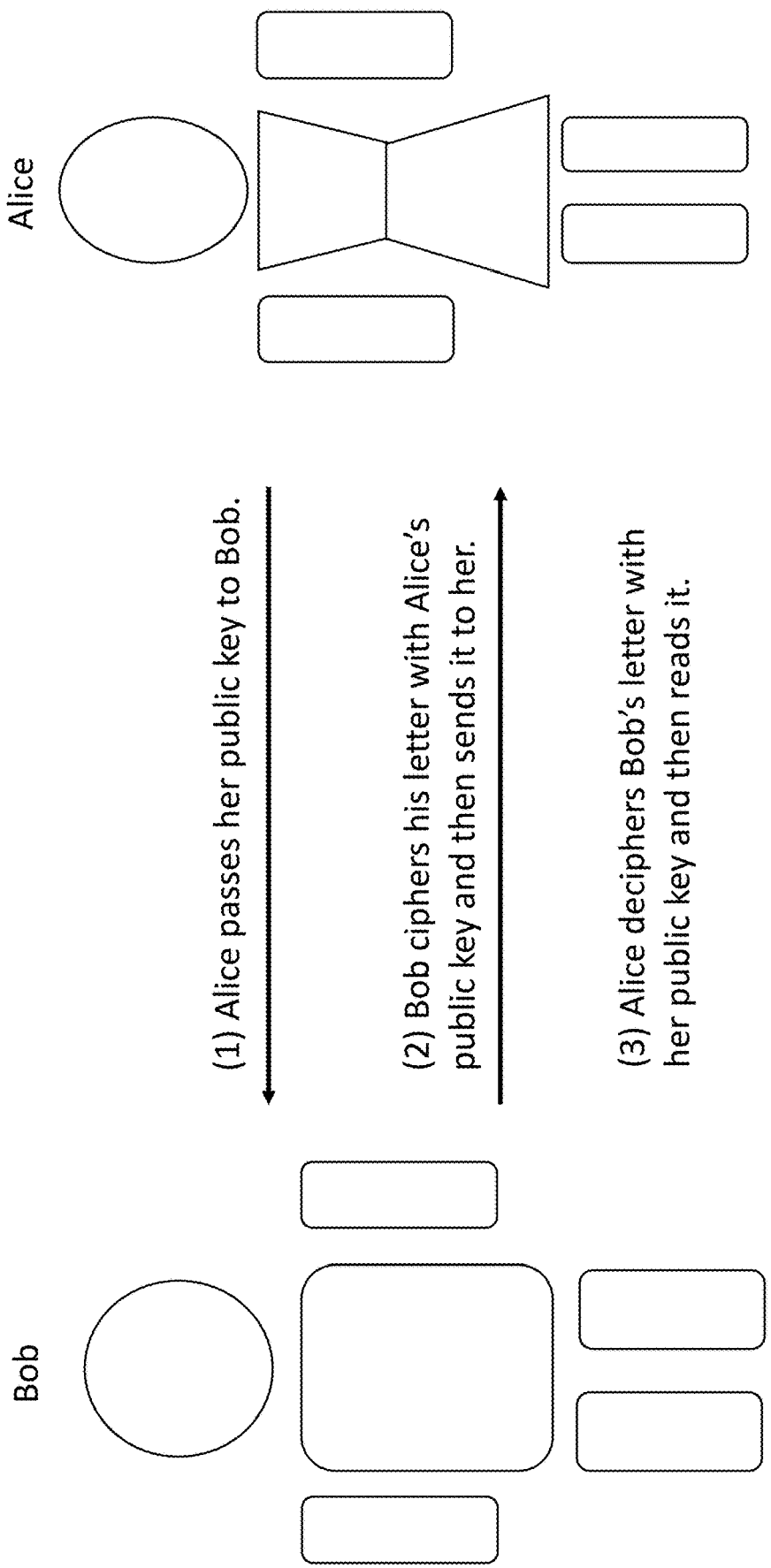
FIG. 2 illustrates an example for a configuration of the public key cryptography.
Figure 3:
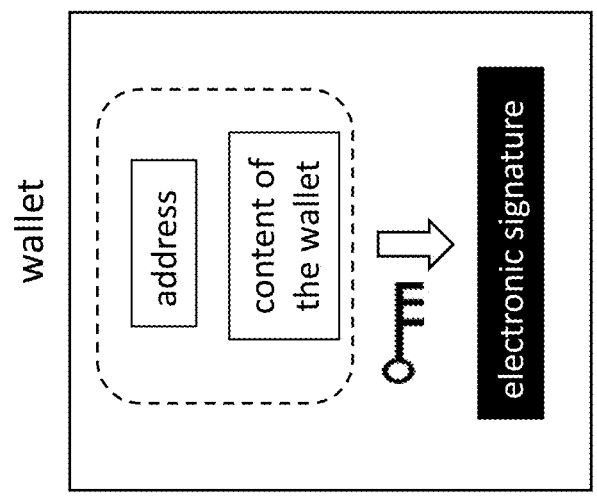
FIG. 3 illustrates an example of a basic concept of a wallet in which the electric money (etc.) is stored.
Figure 4:
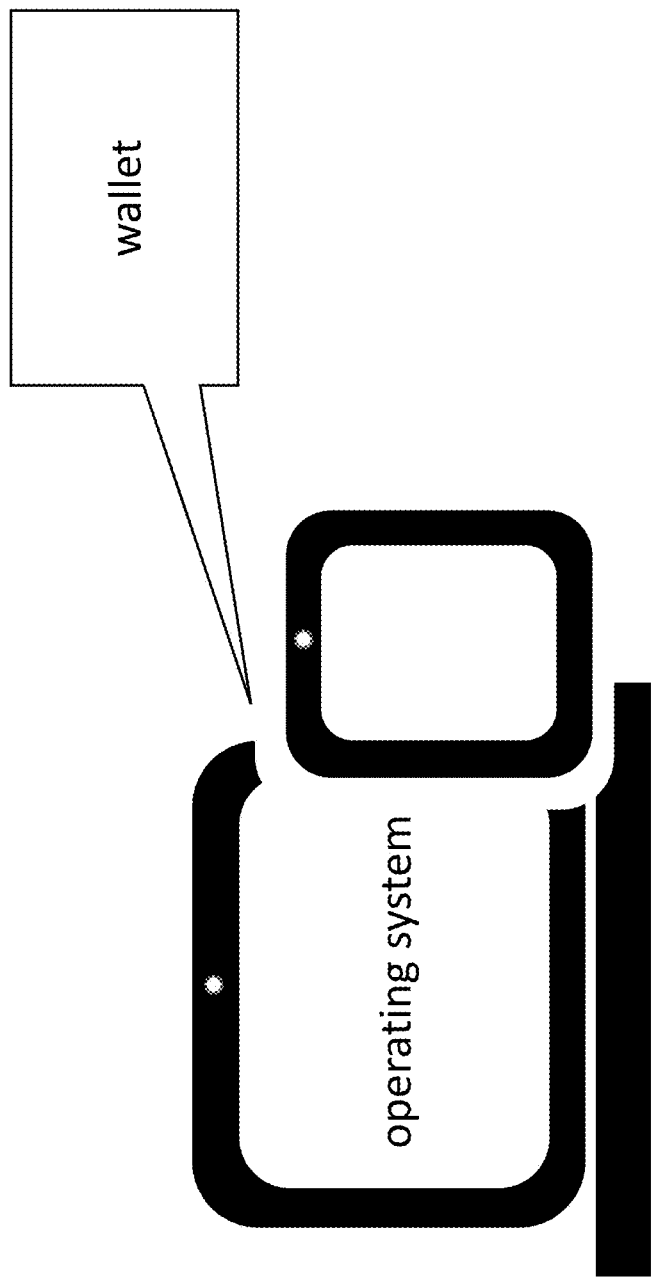
FIG. 4 illustrates an example that the wallet storing the electric money (etc.) is installed in hardware to be used.
Figure 5:
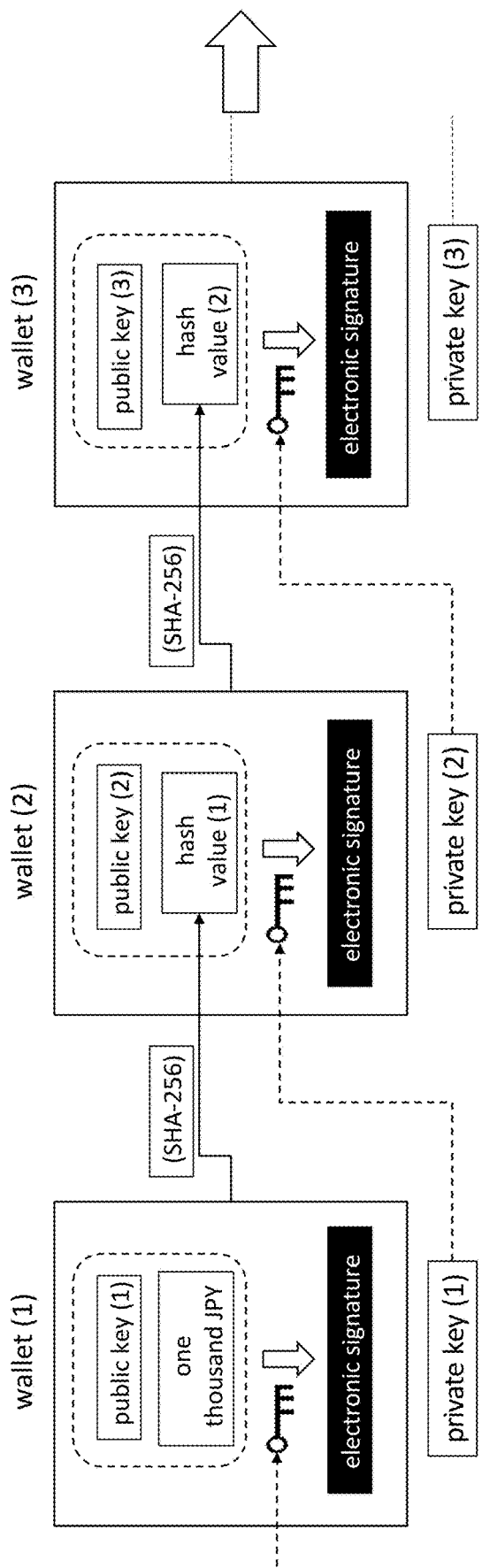
FIG. 5 illustrates a configuration of bitcoin.

The private key and the public key are uniquely linked, as illustrated by the metaphor of Alice and Bob in FIG. 2. The security presumes that it is impossible to decrypt the public key cryptography. In this invention, a public key forming a unique pair with a private key generated by the PUF device which is a component of hardware having the physical substance serves as a logical address (bitcoin address in bitcoin) used in the block chain being a kind of software. The private key generated here is confined within the identification core having the physical substance and then serves as "invisible private key" from the exterior.

In addition, a PUF device generates different private keys respectively in response to different inputs, and different PUF devices respectively generate different private keys in response to the same input. Thus, the private key confined by the identification core may have the chameleon property.

The input to the PUF device may be a physical address, an independent input and so forth, as mentioned above.

For example, the input to the PUF device may be the MAC address linked to the identification core or some kind of codes stored in the SIM card and external storage which are linked to the identification core.

Or, the input to the PUF device may be some kind of code to be input to boot some kind of application executing in the network may be the passcode, the digital code information (such as a PIN code, a barcode and a QR code), some kind of biometric information to identify the regular user of the application (such as finger print information, finger vein information, retina information, DNA information and so forth), the voice and image information extracted from the voice and pictures of the regular user to identify the individual persons, the physical information extracted from the physical characteristics of the regular user to identify the individual persons, and the other personal information to identify the regular user.

Or, the input to PUF device may be some kind of code that some kind of application executing in the network requires the users to input as necessary may be the passcode, the digital code information (such as a PIN code, a barcode and a QR code), some kind of biometric information to identify the regular user of the application such as (finger print information, finger vein information, retina information, DNA information and so forth), the voice and image information extracted from voice and pictures of the regular user to identify the individual persons, the physical information extracted from the physical characteristics of the regular user to identify the individual persons, and the other personal information to identify the regular user.

Or, the input to the PUF device may be some kind of code to boot the information terminal in which some kind of application executing in the network is installed may be the passcode, the digital code information (such as a PIN code, a barcode and a QR code), some kind of biometric information to identify the regular user of the application (such as the finger print information, the finger vein information, the retina information, the DNA information and so forth), the voice and image information extracted from the voice and pictures of the regular user to identify the individual persons, the physical information extracted from the physical characteristics of the regular user to identify the individual persons, and the other personal information to identify the regular user.

Anyway, some of the inputs to the PUF devices respectively composing the identification cores may be permitted to be duplicated in the network.

Thus, the safety of the block chain may be improved by sharing the operation of the security technologies between hardware and software. Or, the security of the block chain which is a software technology may be used for the network of hardware (e.g., IoT).

Subsequently, it may be illustrated that the transaction history can be dated back by using the present embodiment. The method to date back the transaction history in FIG. 88 may be illustrated as an example, while the method to date back the transaction history in FIGS. 85-87 may be similarly illustrated. First of all, the transaction (N−1, N) may be remarked. The electronic signature (N−1) is generated from the hash value (N−1) which is the content of the wallet (N) and the public key (N) being the logical address of the wallet (N) by using the private key (N−1). Next, the electronic signature (N−1) may be decrypted with another public key which is arbitrarily selected. In the case that the decrypted result is the same as the public key (N) and the hash value (N−1), the selected public key is found to be the logical address of the wallet (N−1). Otherwise, the electronic signature (N−1) may be decrypted with another public key. This process may be repeated until the decrypted result is the same as the public key (N) and the hash value (N−1).

Figure 91:
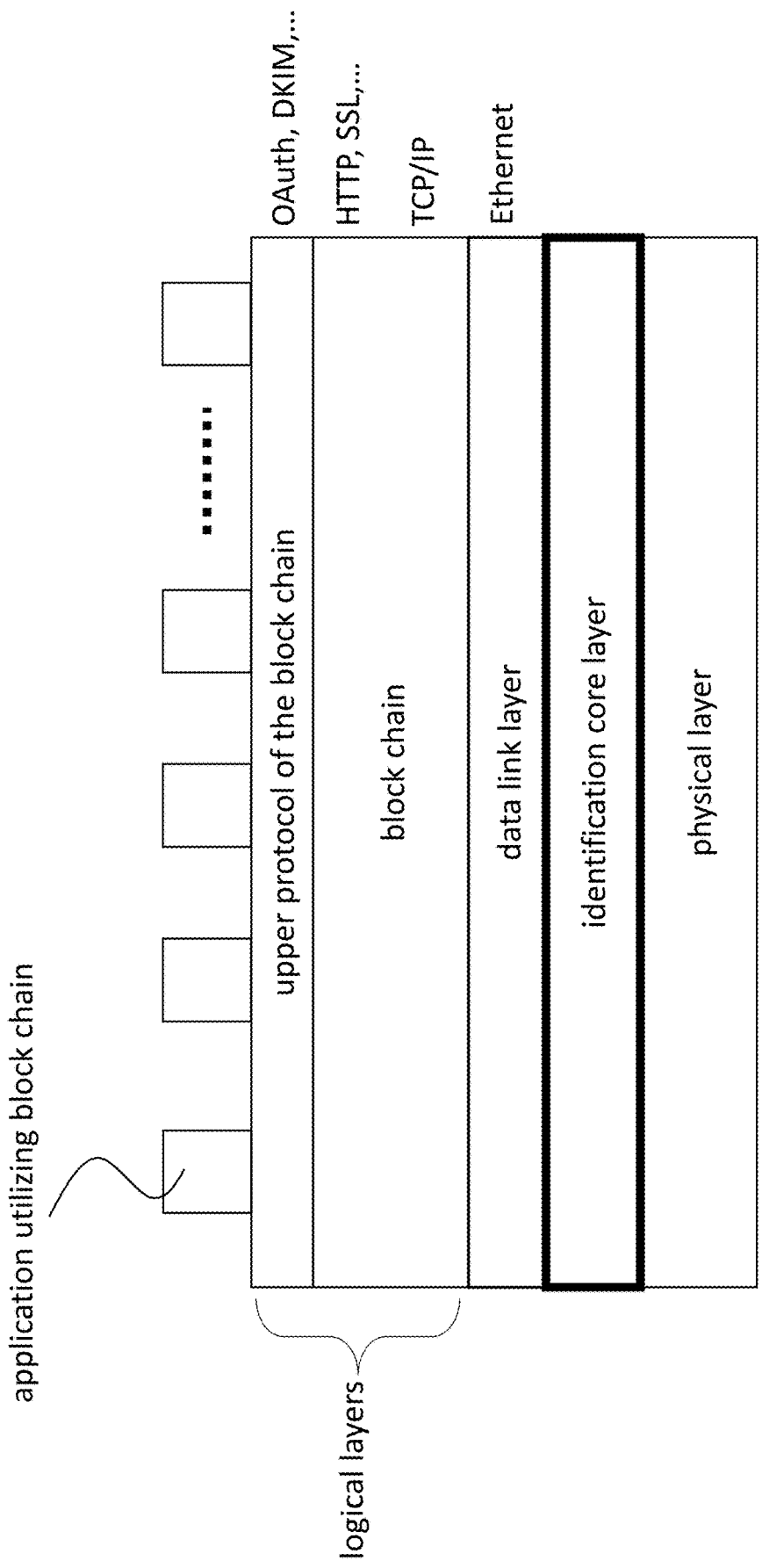
FIG. 91 illustrates that the logical layers or any applications above them need not be changed by adopting the identification core related to the present invention.

FIG. 91 is a conceptual illustration of the communication layer including the identification core and the block chain, which are related to the present invention.

The block chain exists in the logical layer using the public key as a logical address in the network. The lowest layer of the logical layer is the layer standardized with the TCP/IP protocol (including the network layer and the transport layer in FIG. 16). There may be HTTP, SSL and so forth in the upper layers. Or as an example, there may be OAuth, DKIM and so forth in further upper layers, which are upper protocols to the block chain. Accordingly, any application assuming the block chain should be built above the highest level.

Figure 16:
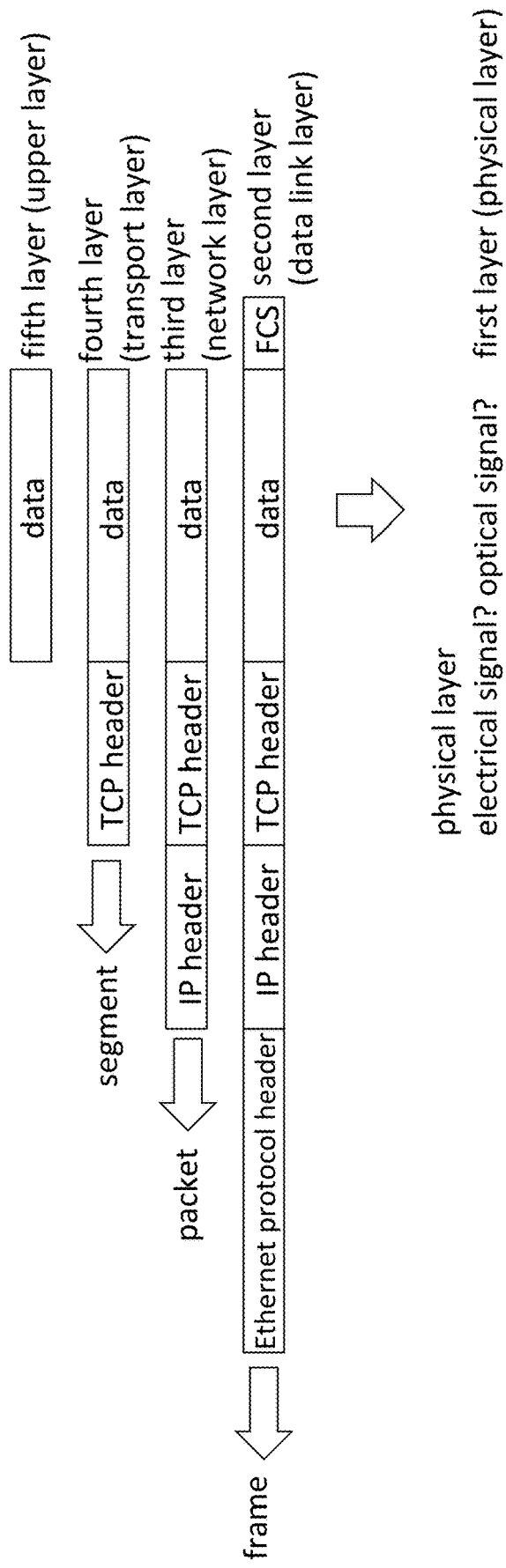
FIG. 16 illustrates a typical example of the communication layers.
Figure 17:
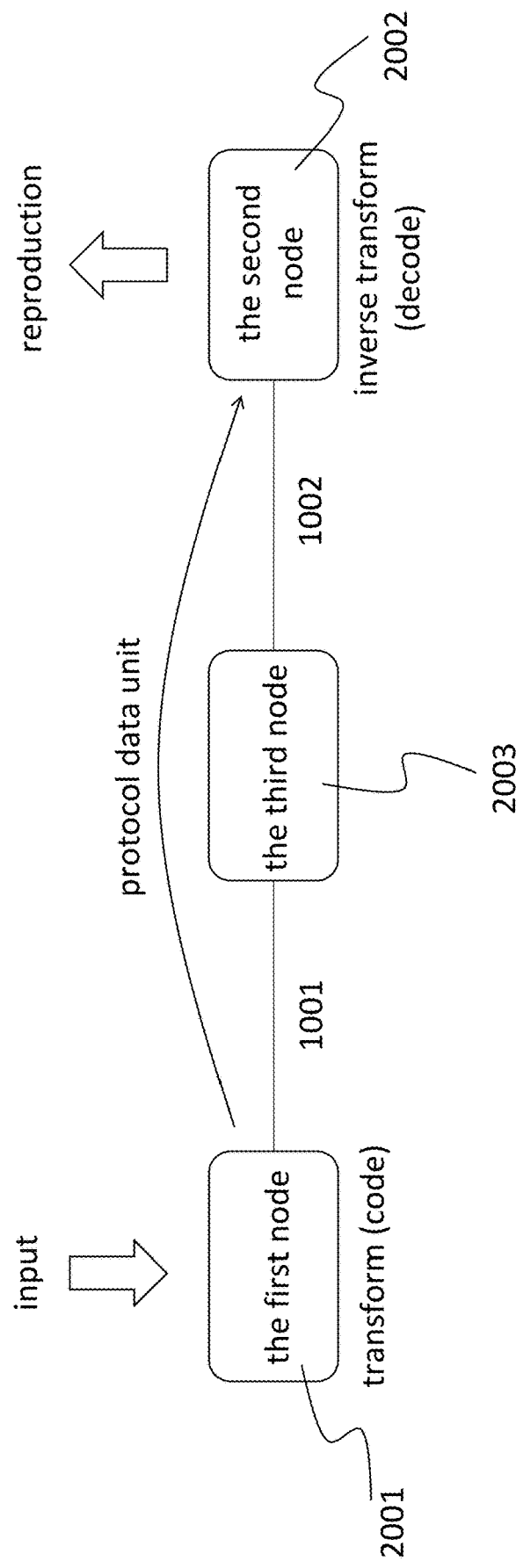
FIG. 17 illustrates a smallest configuration of a network to manage the communication of the protocol data unit with a relay device.
Figure 18:
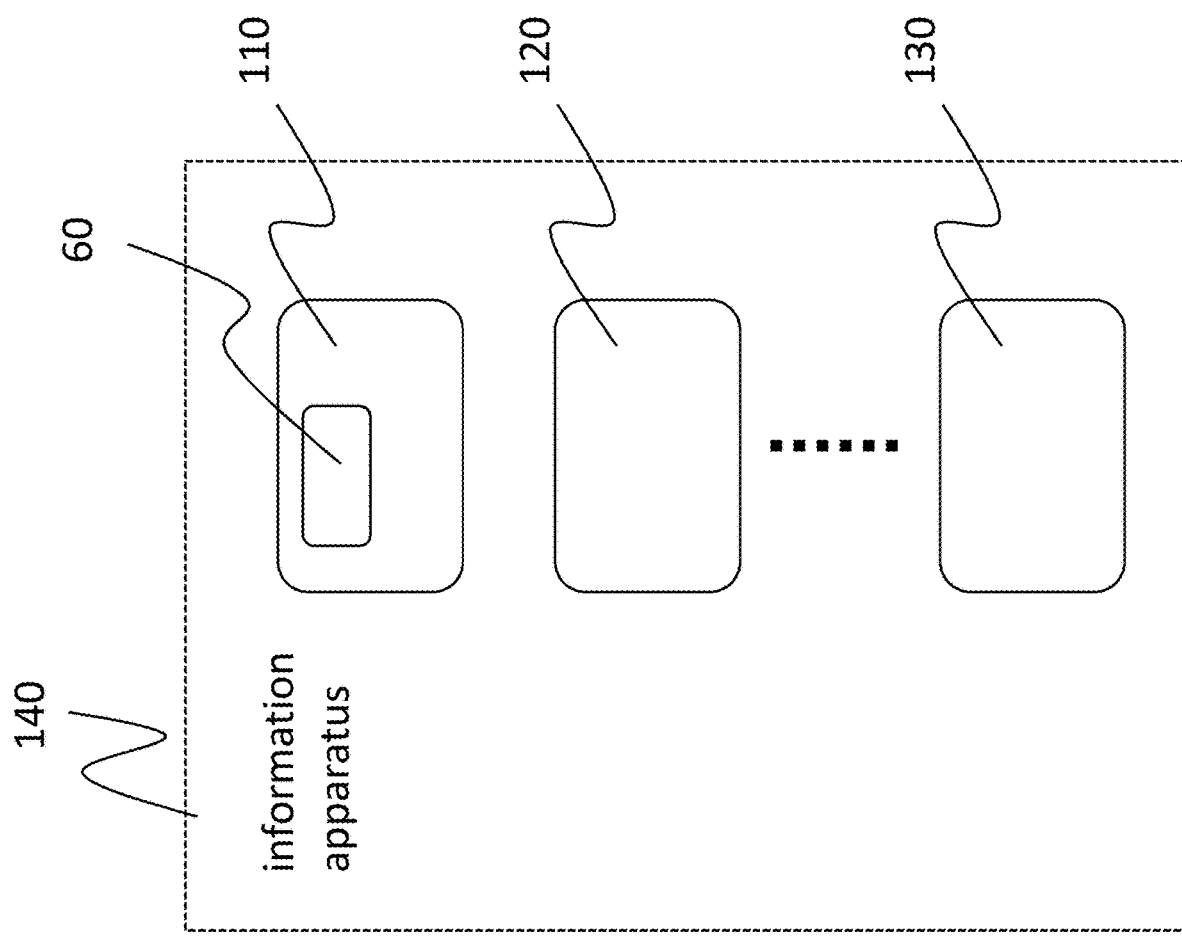
FIG. 18 illustrates an example of a basic configuration of an information apparatus including the chip identification device.
Figure 19:
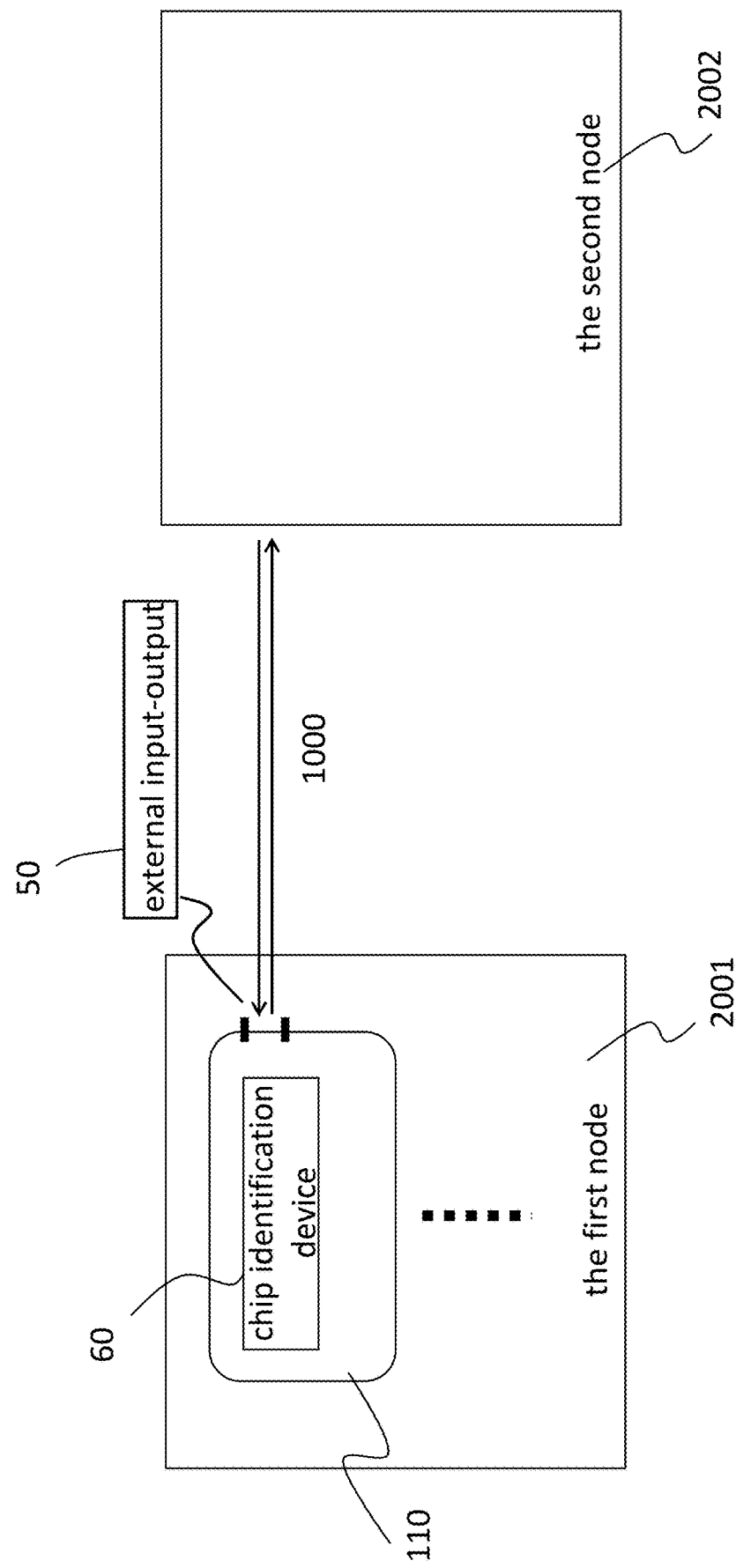
FIG. 19 illustrates an example of a communication method of the nodes including the chip identification device.
Figure 20:
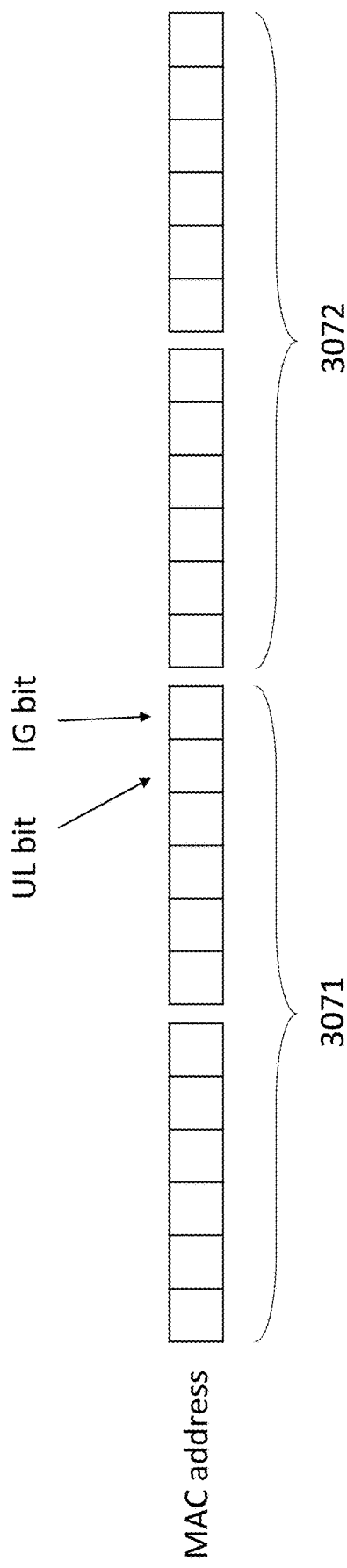
FIG. 20 illustrates a typical basic configuration of a MAC address.
Figure 21:
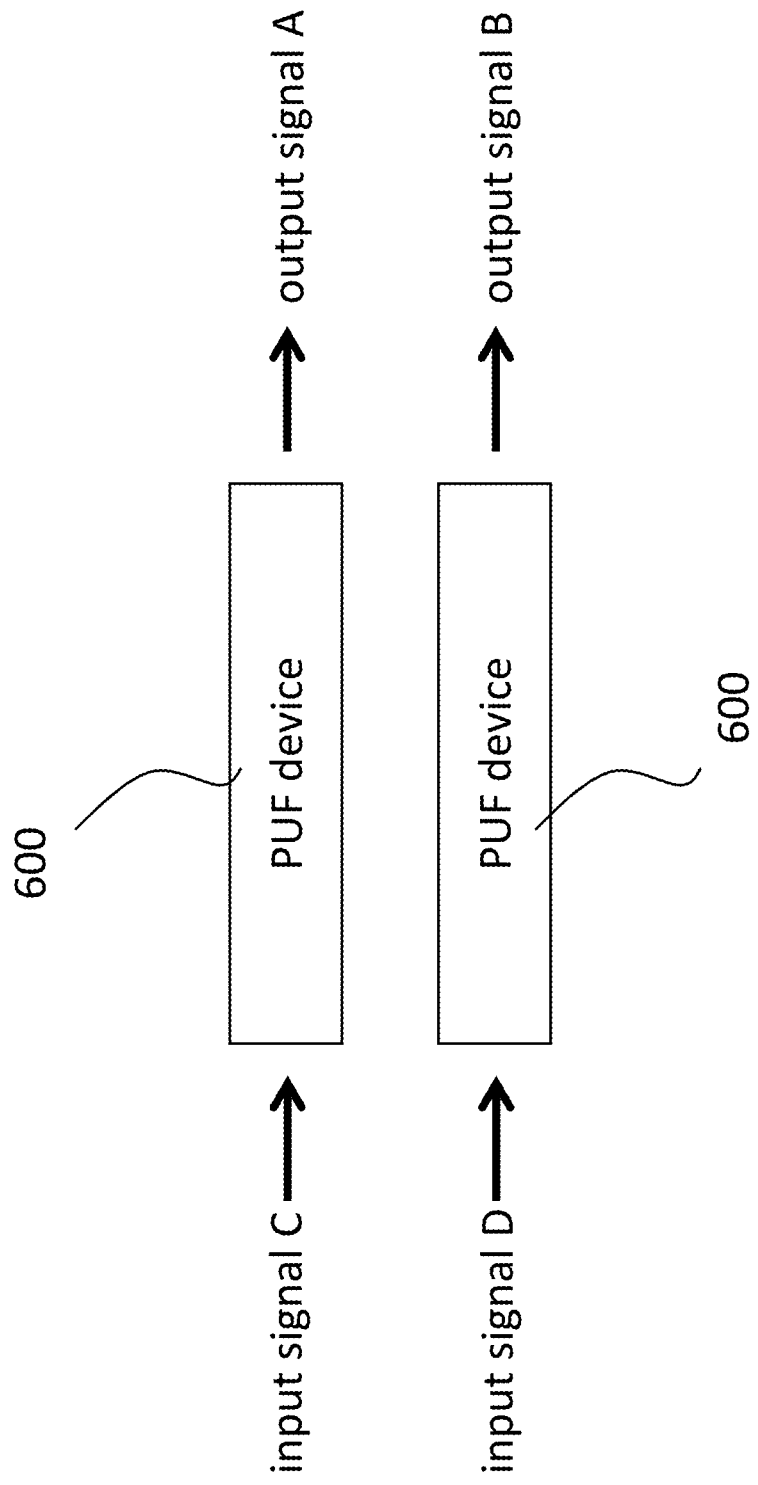
FIG. 21 illustrates a first condition for PUF, which is the property of independent input.
Figure 22:
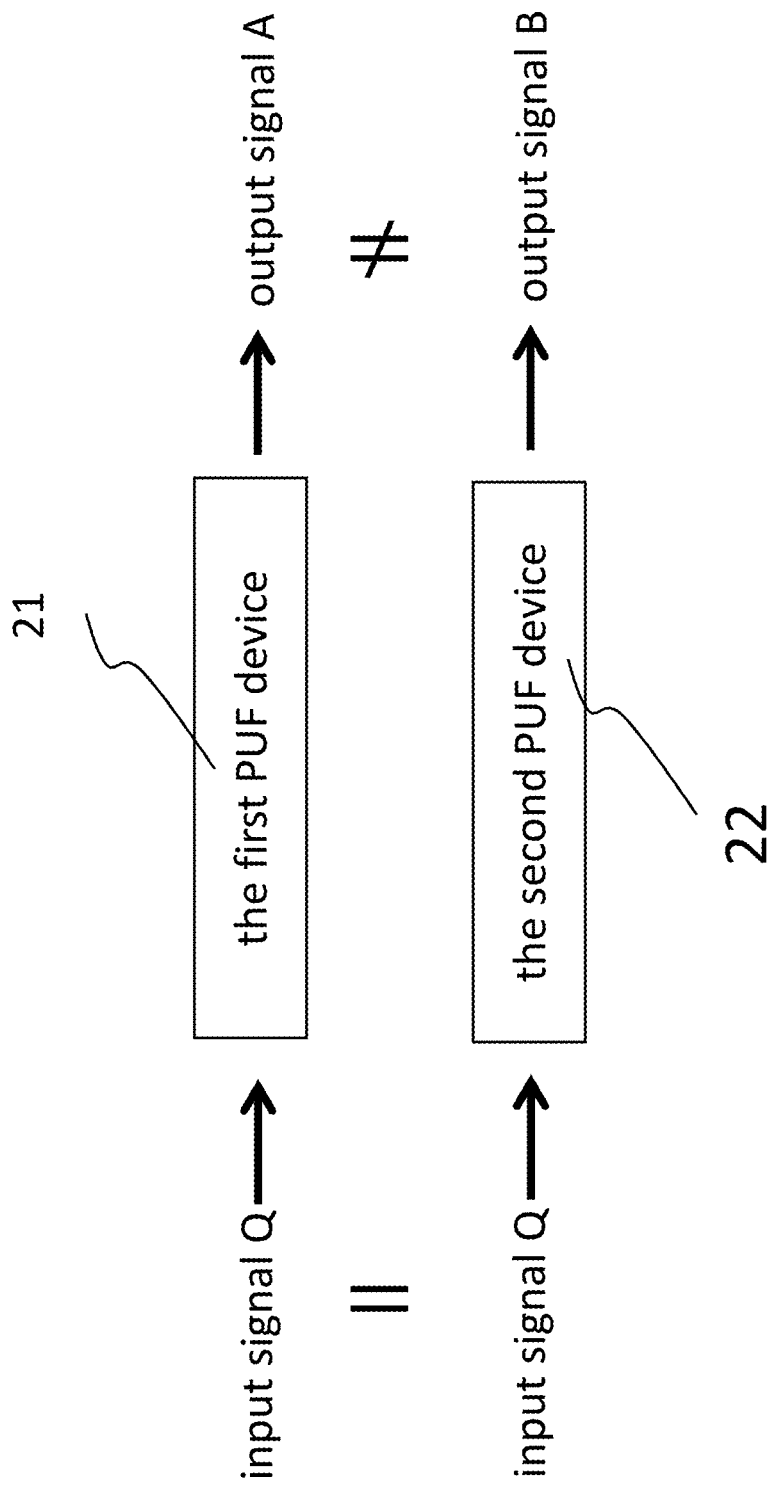
FIG. 22 illustrates a second condition for PUF, which is the property of independent output.
Figure 23:
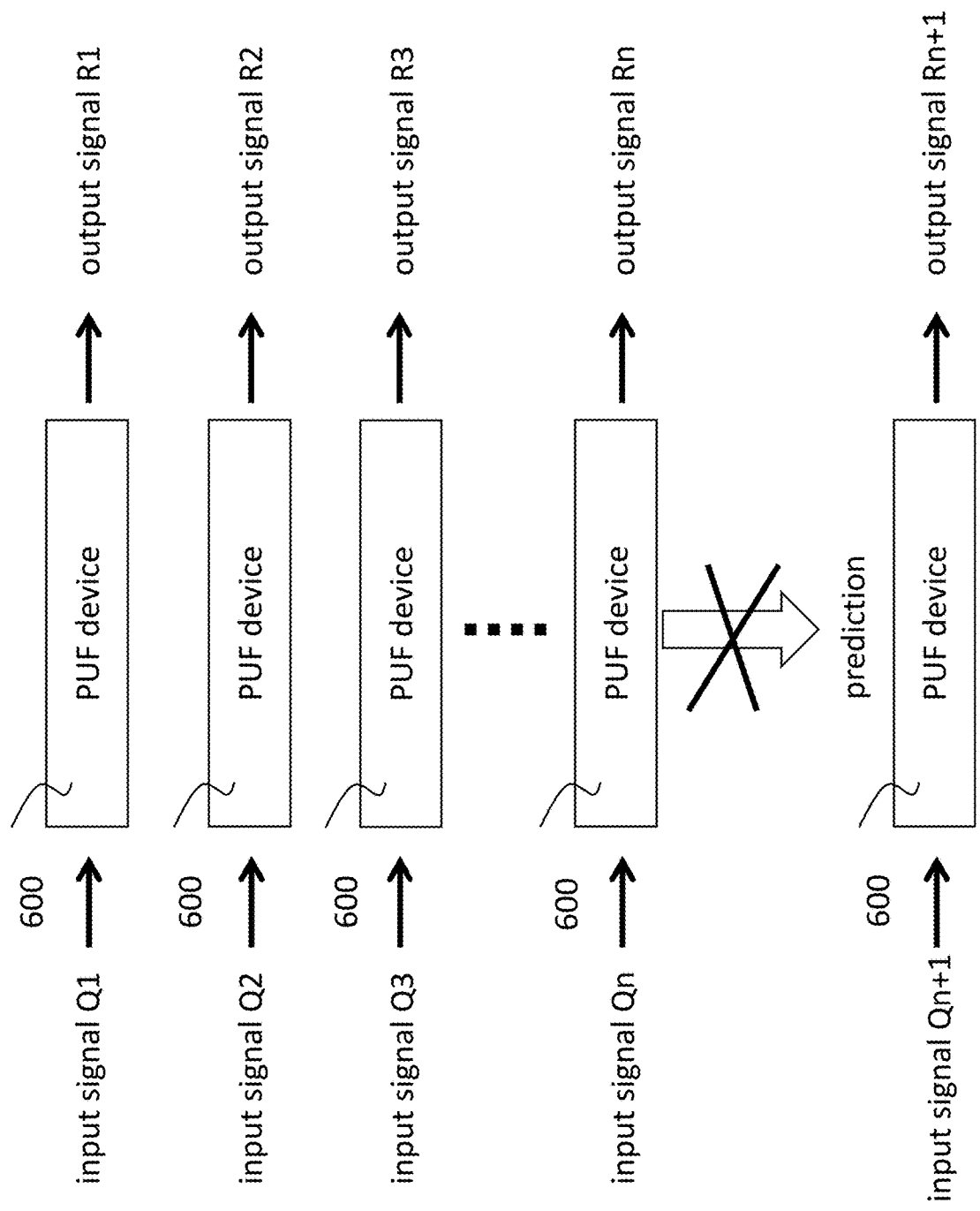
FIG. 23 illustrates a third condition for PUF, which is the property of output unpredictability.
Figure 24:
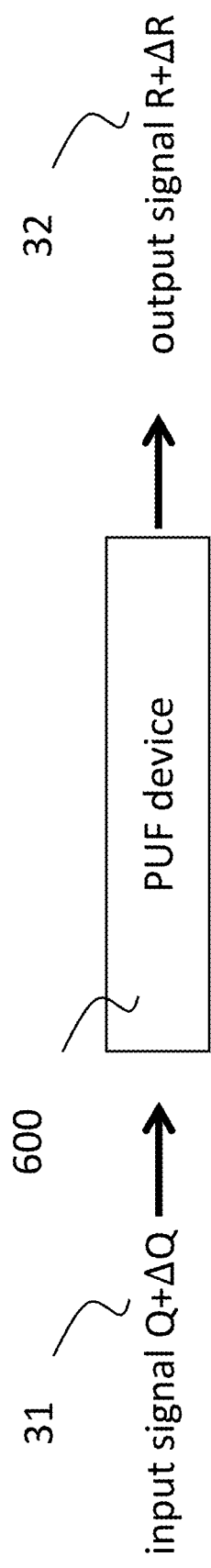
FIG. 24 illustrates a fourth condition for PUF, which is the property of input-output reliability.

On the other hand, the data link layer and the physical layer are the bottom two layers, as illustrated in FIG. 16, which are directly related to the hardware having the physical substance. The hardware considered here is everything connected to the network, i.e., all connected matters in IoT.

As illustrated in FIG. 16, any change in a lower layer may not affect any upper layer at all. Accordingly, even if the layer of the identification core (identification core layer) is inserted below the data link layer, it is not necessary to change the block chain existing above the data link layer. This feature should remain unchanged, which is free from any structure above the block chain. In other words, the insertion of the identification core may not affect any structure and any information service to be built above the infrastructure including the block chain at all.

This decisively means that the identification core related to the present invention is completely compatible with block chain.

The problem may be whether or not the identification core related to the present invention really exists in the layer lower than the data link layer. It may be answered by considering the problem, what is to be input to the PUF device included in the identification core. For example, the physical address allocated to the information apparatus equipped with the identification core including the PUF device may be adopted as an input to the PUF device. In this event, the communication system is unchangeable. More specifically, even if the MAC address, which is the physical address in the Ethernet format, is input to the PUF device, it should not be necessary to change the Ethernet format. Moreover, as mentioned above, also in the case that the code information (independent input) taking a place of the physical address allocated to the identification core is input to the PUF device, it should not be necessary to change the Ethernet format.

In this way, it is confirmed that the identification core layer is in the layer below the data link layer.

On the other hand, the lowest layer should be unchanged, that is, the physical layer. It is because the identification core is equipped in the hardware belonging to the physical layer. This accordingly serves as a linking hardware, which is the physical substance, to the data link layer, which is a kind of communication layer. Actually, the installation of the identification core is to change the hardware.

It is thereby found that the identification core is above the physical layer, as illustrated in FIG. 91.

The conventional block chain and any information technologies revised from the block chain are to change the logical layer, more specifically, to add some upper layer thereon. On the contrary, the identification core related to the present invention is to change the layer below the logical layer, more specifically, to insert a new authentication method by PUF between the data link layer and the physical layer, as a linker layer to improve the security.

Figure 92:
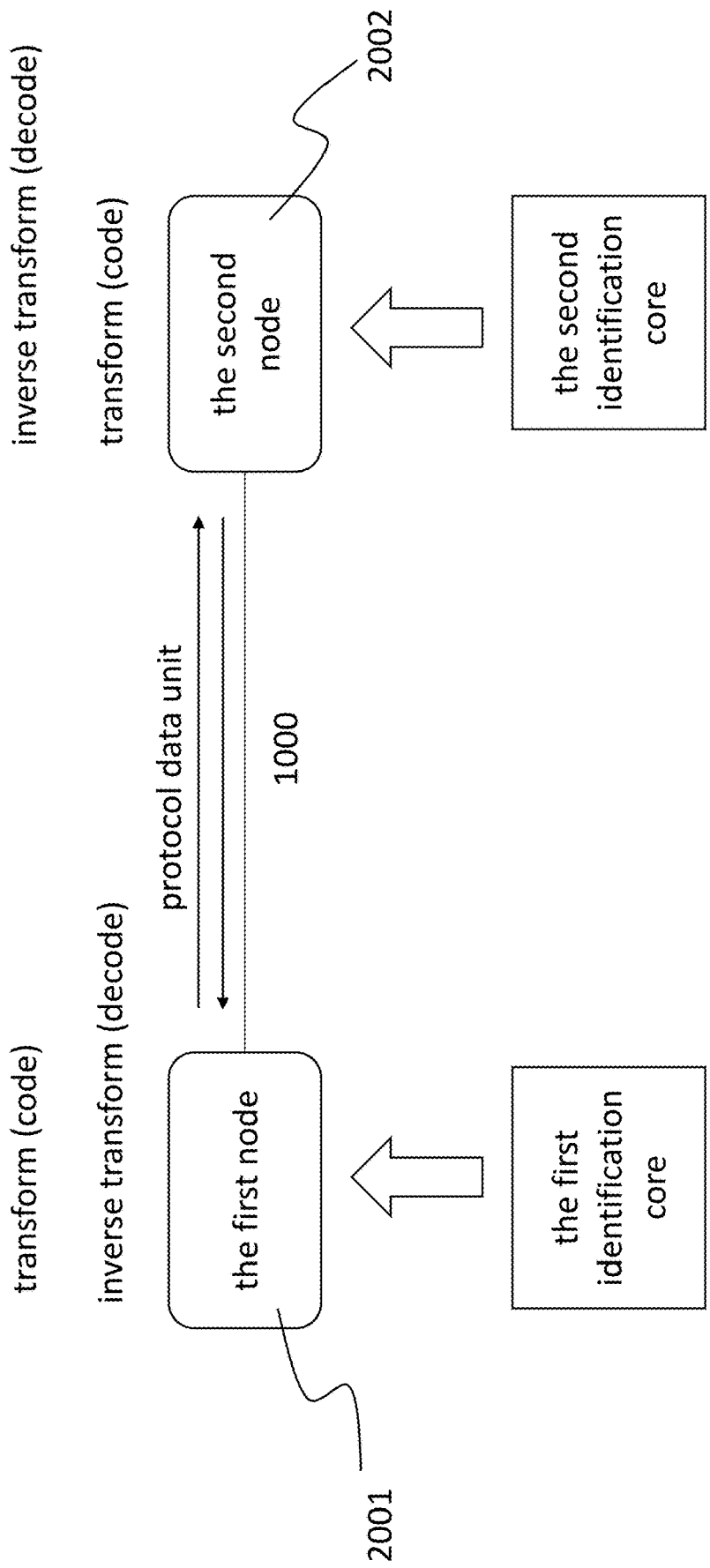
FIG. 92 illustrates the relation between the identification cores related to the present invention and the smallest unit of the network.

FIG. 92 illustrates a smallest unit of the network. The first node 2001 is linked to the first identification core and the second node 2002 is linked to the second identification core. The first and the second nodes (2001 and 2002) are connected by the signal transmission pathway 1000 and then exchange the protocol data unit. This protocol data unit can be coded (converted) and then generated from the data input to one of them. It is inverse-converted (decoded) to be the original data in the other of them.

There must be the identification core layer between the physical layer and the data link layer beneath the bottom of the logical layer, which is free from which communication layer the protocol data unit and the signal transmission pathway 1000 are belonged to. The first identification core links the hardware corresponding to the first node to the data link layer. The second identification core links the hardware corresponding to the second node to the data link layer.

Figure 93:
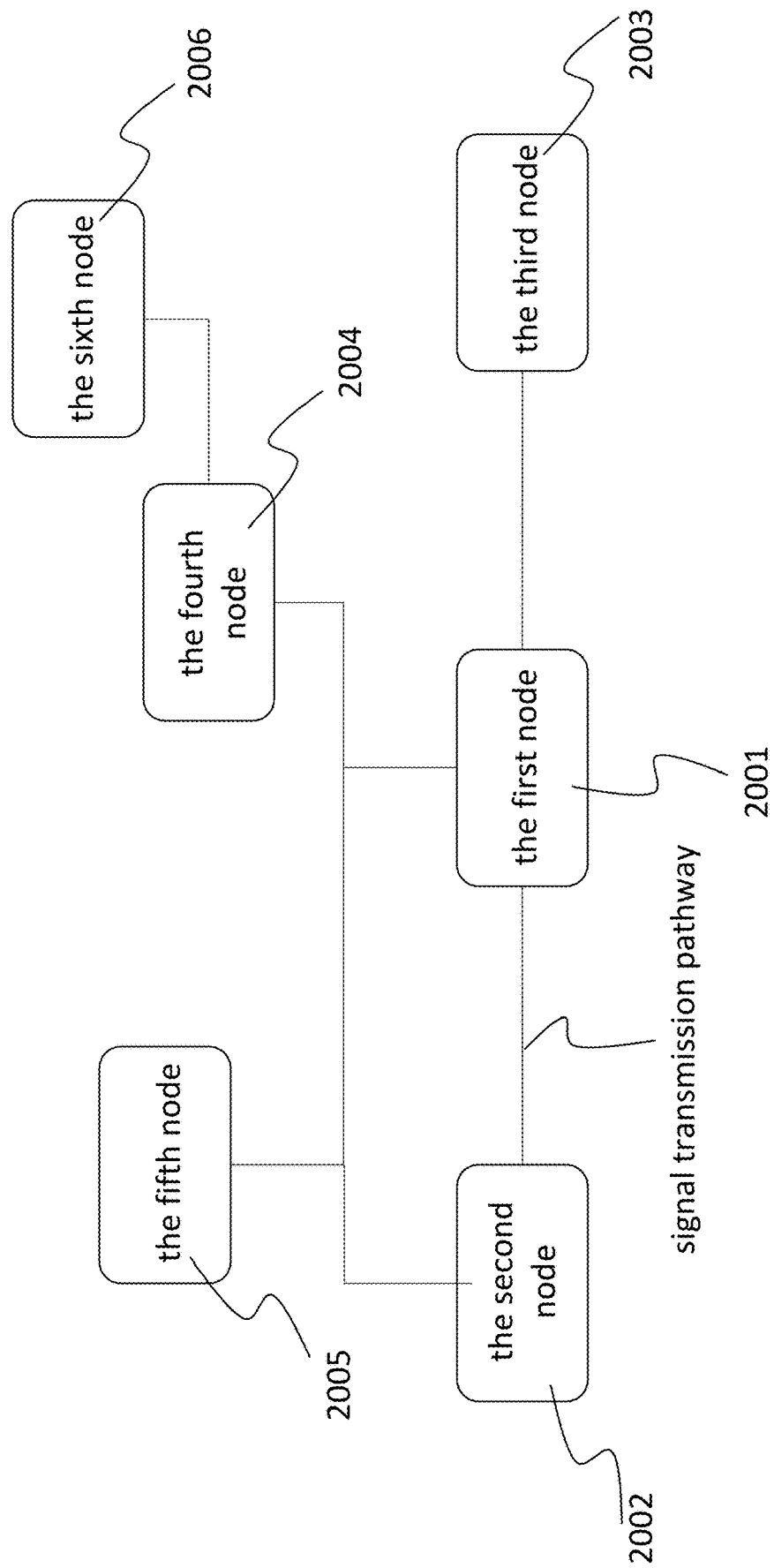
FIG. 93 illustrates an example of the network composed by combining the smallest units illustrated in FIG. 92.

FIG. 93 is an example of the network configured by combining the smallest unit illustrated in FIG. 92. Two of the first to sixth nodes (2001-2006) are respectively connected by the signal transmission pathways. Some of the nodes configuring the network are the information terminals where the users are in direct access. Others are directly connected to the network for other purposes, such as the sensors to collect the data for big data, the clearing house to exchange the real currencies and the encryption currencies like bitcoin, the interface to connect the conventional banking system, the servers to deal with the medical data, the independent medical equipment, the biosensors to collect the biomedical information, the data base of the industries or institutes, the interface of the auto-driving system, the interface of the control system of the industrial facilities used in the manufacturing floor, the interface to access the artificial intelligence, the interface of the control system of the robots, and the others to configure any part of IoT. The real substances of those nodes are various and are everything or anything connecting to or to be connected to the network.

The identification core related to the present invention is free from with or without the block chain and can be adopted in the network structure illustrated in FIG. 92 and FIG. 93. Since the identification core layer is below the data link layer, any structure built in the layer above the data link layer is free from the insertion of the identification core layer. Thus, FIG. 91 can be expanded to FIG. 94. That is, arbitrary information service can be freely built with or without the block chain.

In the case that the block chain is used in the network with the identification core related to the present invention, the identification core related to the present invention works in a specially designed form. As illustrated in FIG. 90 as an example, the input to the PUF device included in the identification core which is directly linked to the hardware and the logical address in the upper layer are uniquely bound by the chameleon property of the PUF device and the public key cryptography. The merit of this is, as mentioned above, to realize "invisible private key" from the exterior of the identification core. In addition, since the position of the identification core layer is under the data link layer, the identification core has no impact on the block chain in the upper layer. This means that the specification of any applications developed under the assumption of block chain is unnecessary to be changed by the insertion of the identification core. Therefore, the present invention is completely compatible with any block chain applications.

The second embodiment is described below.

Figure 95:
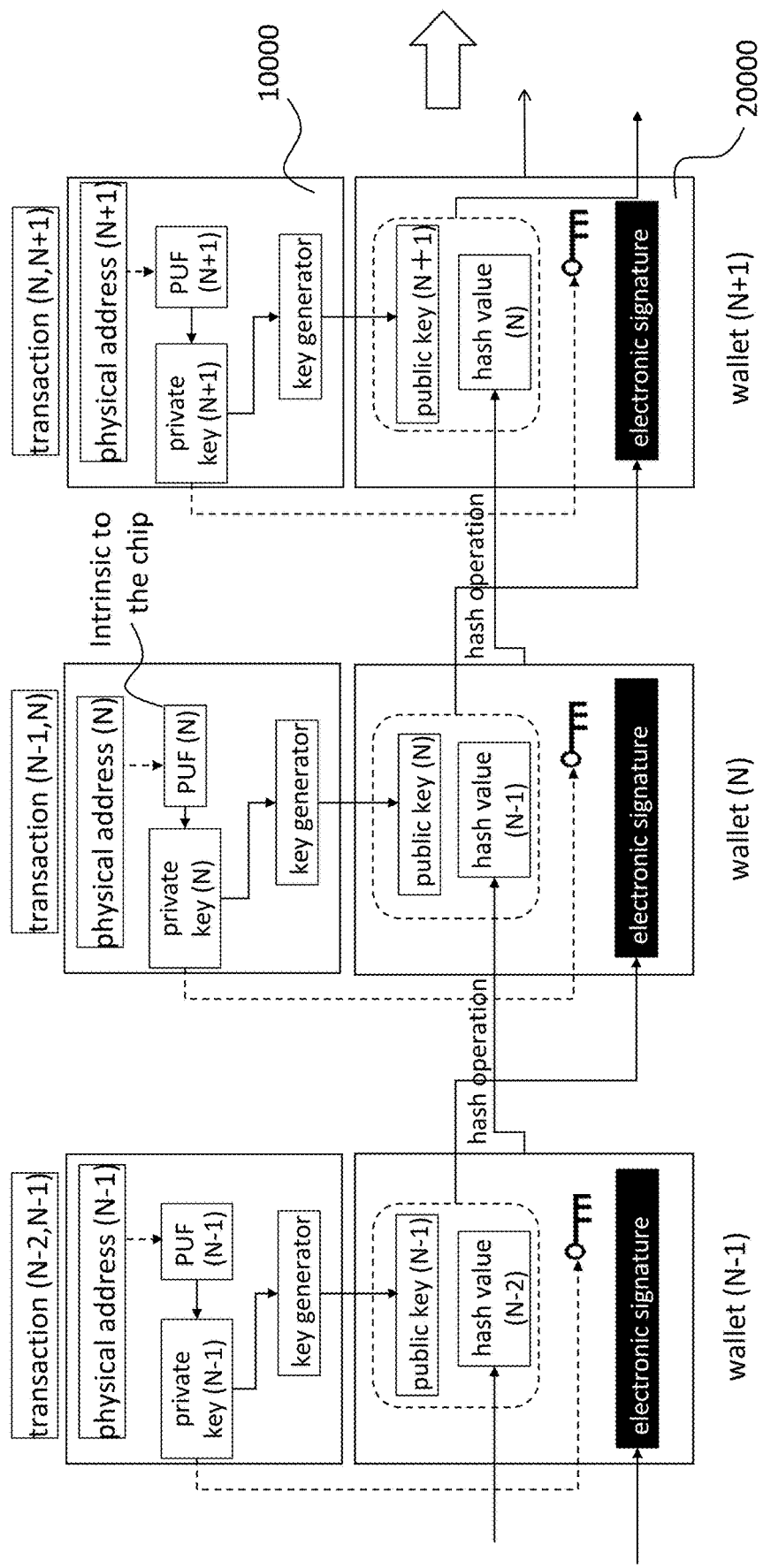
FIG. 95 illustrates an example of a method of transaction utilizing the identification core related to the present invention.

FIG. 95 illustrates an example that the transaction (N−2, N−1) is executed from the wallet (N−2) to the wallet (N−1), the transaction (N−1, N) is executed from the wallet (N−1) to the wallet (N), and the transaction (N, N+1) is executed from the wallet (N) to the wallet (N+1), where N is an arbitrary integer allocated to the physical node connected to the network by some kind of method. In the bottom column, there are three squares 20000 enveloping the public keys, the hash values, and the electronic signatures. On the contrary, in the upper column, there are three identification cores 10000 including the physical addresses, the PUF devices and the private keys. In particular, the identification core is the first chip 110 including the PUF device 600 and then is related to the present invention, as illustrated in FIG. 25. Moreover, although it is not specially illustrated while it may be inherent, the present embodiment may include the scramble device 604 of FIG. 32 in the PUF device 600. The description of this example is omitted because it is the same as that in the present embodiment if "PUF device" is replaced with "PUF device and scramble device".

The square in the bottom column 20000 may configure the same with that of bitcoin in FIG. 6. To actually follow the operation, the wallet (N) at the center in the bottom column may be considered. The hash value (N−1) is the content of the wallet (N) and generated in the previous wallet (N−1) by the following method. First, the public key (N−1) which is the logical address (bitcoin address in bitcoin) in the network, the hash value (N−2) which is the content of the wallet (N−1), and the electronic signature (N−2) are hashed together. The hash function may be used to hash them. There are plenty of hash functions such as MD2, MD4, MD5, RIPE-MD160, SHA-256, SHA-384, SHA-512, and so forth. As an example, the bitcoin adopts one of them, SHA-256.

In the wallet (N−1), the public key (N−1) which is the logical address in the network and the hash value (N−2) which is the content of the wallet (N−1) are encrypted together with the private key (N−1) to form the electronic signature (N−1). The electronic signature (N−1) and the hash value (N−1) are forwarded to the wallet (N). In the wallet (N), the public key (N), the hash value (N−1) and the electronic signature (N−1) are hashed together to form the hash value (N). The hash value (N) and the electronic signature (N) are forwarded to the wallet (N+1). The electronic signature (N−2) or the electronic signature (N) is formed in a similar manner as mentioned above.

In the present embodiment, the method to form the electronic signature is different from that to form the electronic signature of the bitcoin in FIG. 6, except for the private key that is included in the identification core 10000.

On the other hand, as is similar to the first embodiment, the public key included in the square in the bottom column 20000 is not logically given a bitcoin address. The public key is generated through a predetermined physical generation process by the upper column, that is, the identification core 10000. Moreover, the squares in the bottom column 20000 are logical nodes and then correspond to the wallets in the bitcoin.

The square in the upper column, that is, the identification cores 10000, includes the semiconductor chip (or chip) configuring a part of the physical nodes in the network. They have physical substances.

For example, the PUF device included in the identification core, or the PUF device and the scramble device which are included in the identification core, may be such as the PUF (N−1) of the wallet (N−1), the PUF (N) of the wallet (N), and the PUF (N+1) of the wallet (N+1) and so forth.

In general, the semiconductor chip is a physical substance and may not be logically generated by software. Accordingly, it may be necessary to respectively allocate the physical addresses to the chips according to some kind of format. As an example, in the case that a certain chip is linked to an Ethernet card, the MAC address allocated to the Ethernet card in advance may be the physical address of the chip. Or, the code recoded in storage linked to this chip in advance may also possibly be the physical address.

However, the physical address included in the square 10000 related to the identification core may not always be the physical address administrated in the network and then is permitted to be duplicated. It may also be replaced by a PIN code recoded in the SIM card linked to this chip in advance and any others to be input to the PUF device as an input code.

As long as the chip having the physical substance configures a part of the physical node (identification core) connected to the network, this chip may be expected to link to the physical address with some kind of method. Accordingly, it may be one of the simplest methods that the MAC address of this chip is input to the PUF device as an input code. What is actually linked to the physical substance of the chip is the PUF device equipped in the chip.

In this way, the PUF device (N) input with a proper input code outputs a random number code which is physically random, as represented in FIG. 27 and FIG. 78. This random number code is regarded as the private key (N), or a temporal code generated from the random number code by using the equation 2 or 5 is regarded as the private key (N), or an output code generated from the random number code by using the equations 3, 4 or 6 is regarded as the private key (N), or the codes generated with another method revised from those methods of the code generation within the scope of the present invention are regarded as the private key (N). The private key (N−1) and the private key (N+1) are also generated in a similar way.

The private key (N) generated like this is input to the key generator to form the public key (N) forming the pair with the private key (N). The public key (N−1) and the public key (N+1) are also generated in a similar way. As an example, the key generator may be modulated in this identification core 10000, as illustrated in FIG. 95.

Figure 96:
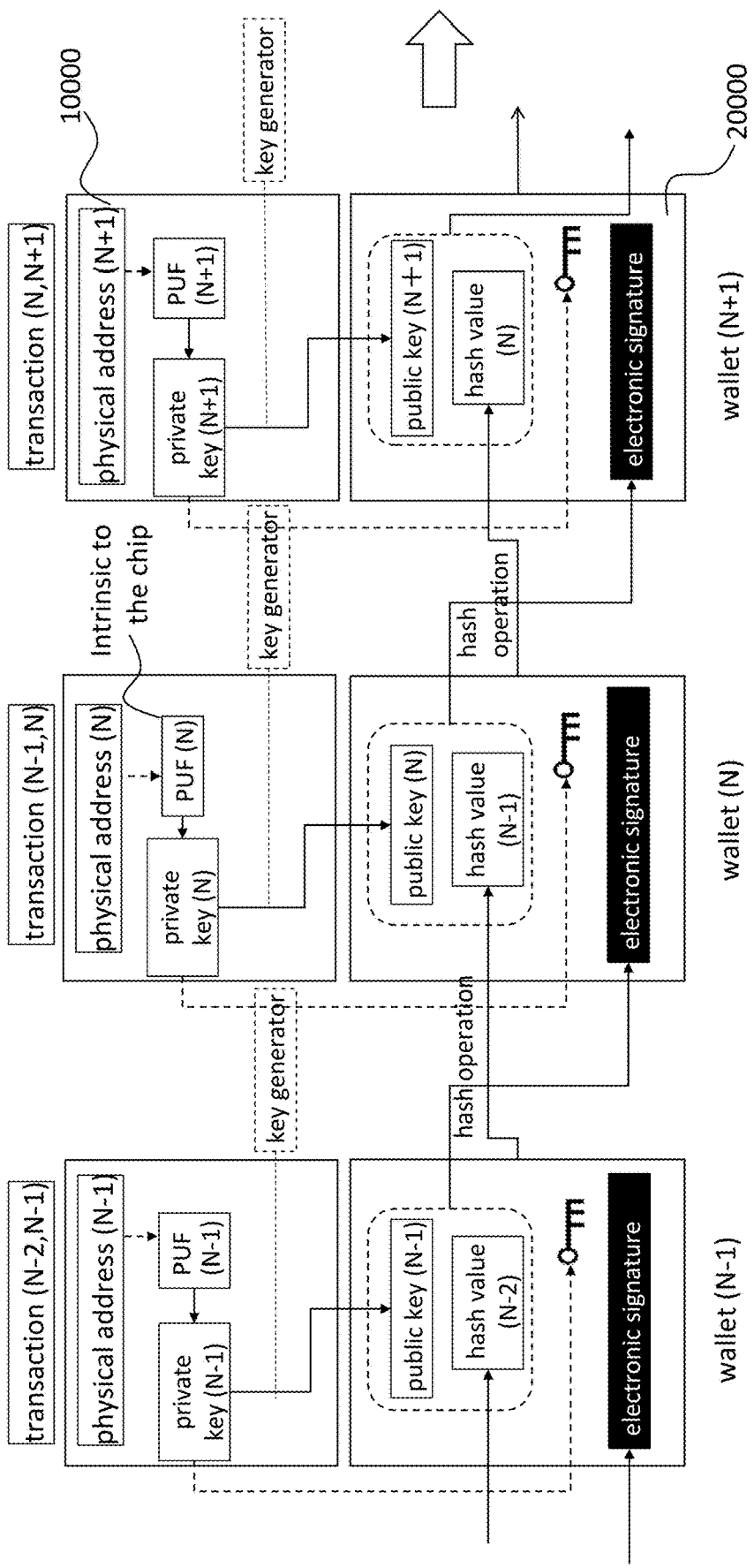
FIG. 96 illustrates an example of the method of transaction utilizing the identification core related to the present invention.

As another example, the key generator can be located in the exterior of the identification core 10000, as illustrated in FIG. 96. As another example, the key generator can be equipped in the same information apparatus (physical node) as another module. As another example, the key generator can be equipped in another electronic apparatus linked to the identification core 10000. As a further example, the key generator can be installed in the system including the identification core 10000 as software.

Figure 97:
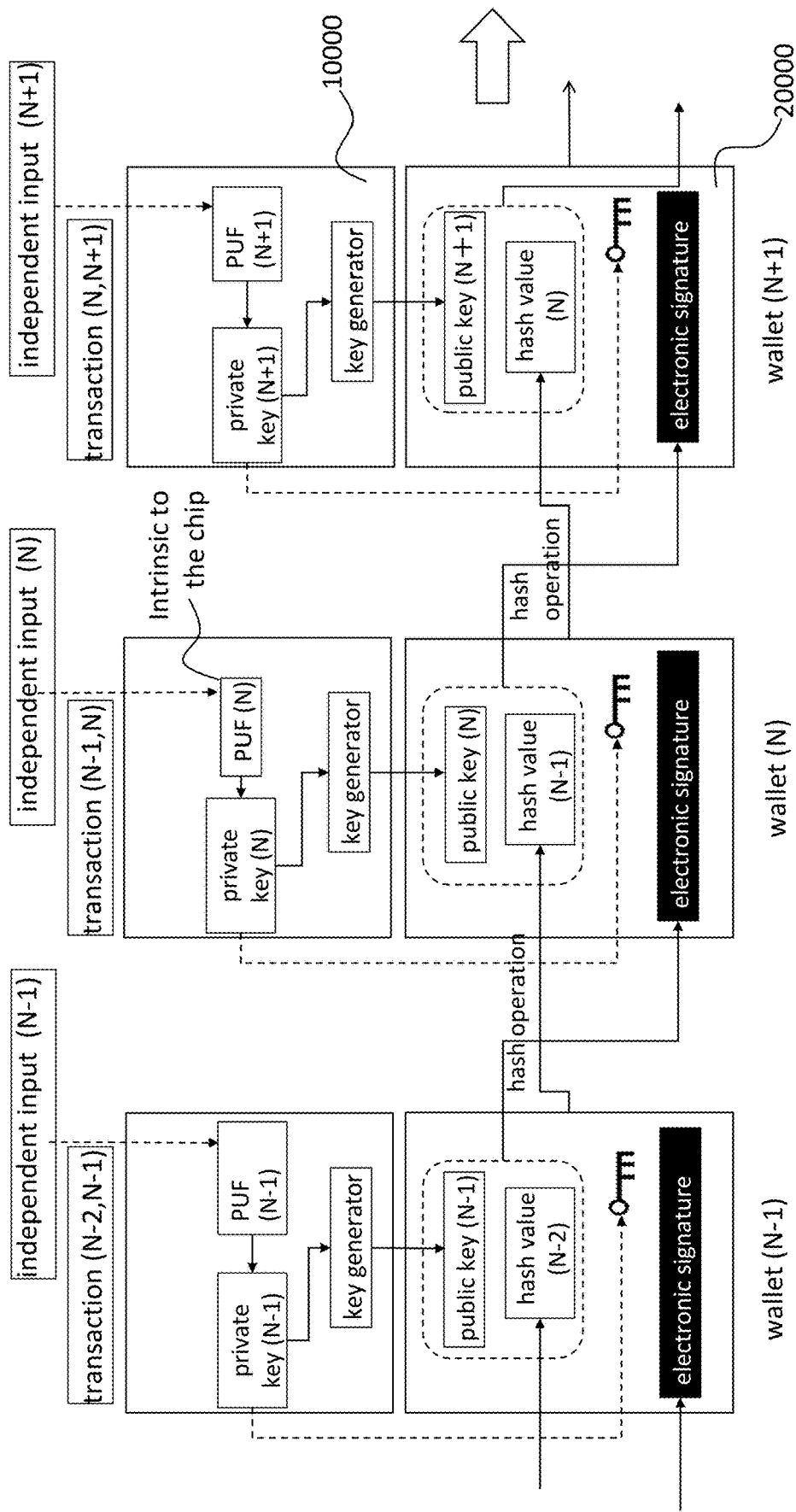
FIG. 97 illustrates an example of the method of transaction utilizing the identification core related to the present invention.
Figure 98:
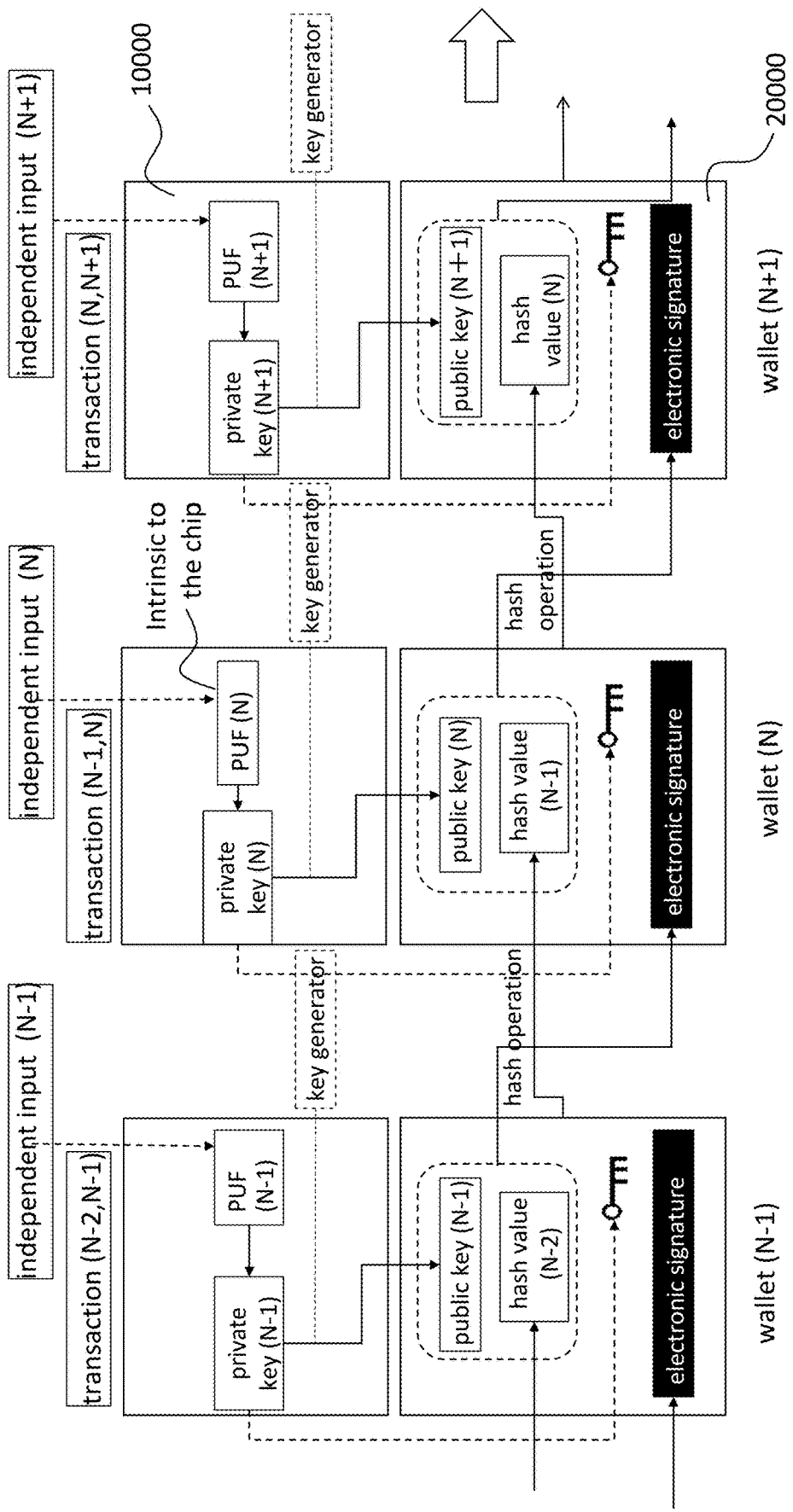
FIG. 98 illustrates an example of the method of transaction utilizing the identification core related to the present invention.

Anyway, the square in the upper column, i.e., the identification core 10000, includes at least three of the PUF device, the physical address to be input to the PUF device or some kind of code to take a place of the physical address (independent input), and the private key generated by the PUF device. FIG. 97 is an example that the physical address in FIG. 95 is replaced by an independent input. The detailed description is similar to that of FIG. 95 and then is omitted. FIG. 98 is an example that the physical address of FIG. 96 is replaced by an independent input. The detailed description is similar to that of FIG. 95 and then is omitted.

The detailed description of the independent input is similar to that in the first embodiment and then is omitted.

In this way, also in the present embodiment, it may be possible to specifically link the private key generated from the PUF device having the physical substance to the public key being the logical address. That is, it may be possible to organically link the semiconductor chip (hardware) having the physical substance to the logical network (software).

Consequently, the present embodiment can also prevent the abuse of the private key as mentioned in FIG. 9. The detailed description to this is similar to that in the case of FIG. 89. Here, the abuse of the private key is that someone simultaneously uses the private key (N) to execute the transaction (N, M) as well as the transaction (N, N+1). In addition, "simultaneously" does not precisely mean "at the same time". If the difference in time is less than 10 minutes in average, it may be regarded as "at the same time".

In order to use the private key (N) for two different transactions under such a presumption, first, the private key (N) and the hash value (N−1) may be copied to another wallet, e.g., the wallet (M−1), where M is an integer number different from N. The wallet (M−1) is not necessary to really exist and is just a logical destination for the copy. It may be a virtual wallet formed by the hacker tool or a logical address which temporarily exists.

Subsequently, it is assumed that the transaction (M, M+1) is executed with no falsification. As a result, there are two different transactions taking over the same hash value (N−1). This means that the contents of the wallet (e.g., coin) is illegally increased twofold.

Here, in the case that the regular owner or user of the wallet (N) processes an improper transaction, the problem to be prevented is to copy the private key (N) to the wallet (M−1), since the hash value (N−1) is the content of the wallet (N). If the private key (N) is used twice within 10 minutes without copying it to the wallet (M−1), an improper transaction may be found since it is recorded in the block chain that two transactions are simultaneously executed with the same hash value in the wallet (N). Accordingly, if the copy of the private key (N) is prevented, such an improper transaction is also prevented.

If PUF device equipped in the upper squares related to the present invention, i.e., the identification cores, is used, it can forbid that even the regular owner or user of the wallet (N) extracts the private key (N) from the said chip. Thereby, the copy of the private key (N) to the virtual wallet (M−1) is prevented and then the abuse of the private key can be prevented. The copy of the private key (N−1) and the private key (N+1) to virtual wallets are also prevented in a similar manner.

The procedure of the transaction in the present embodiment is specifically illustrated in FIG. 96. For example, the electronic signature (N) is generated with the private key (N). First, the hash value (N−1) being the content of the wallet (N) and the public key (N) are encrypted together using the private key (N) confined in the chip of the identification core 10000 linked to the wallet (N) so as to form the electronic signature (N). Subsequently, the hash value (N−1) being the content of the wallet (N), the public key (N) and the electronic signature (N−1) are hashed together to form the hash value (N). The generated hash value (N) and the electronic signature (N) are forwarded to the wallet (N+1) whose logical address is the public key (N+1). In this way, the transaction (N, N+1) can be executed in the wallet (N). Of course, the similar procedure can also be explained with FIG. 95 in a similar manner. If the physical addresses in the identification cores are replaced with independent inputs, the procedure can also be explained with FIG. 97 and FIG. 98 in a similar manner.

In other words, if the identification core 10000 related to the present invention is used, the private key may be confined within the identification core 10000. Specifically, the systems illustrated in FIG. 84 or revised within the scope of the present invention can be realized.

Like this, the present invention provides "invisible private key" from the exterior of the identification core so as to reinforce the weak point of the block chain. Thus, the copy of the private key (N) to the wallet (M−1) is prevented and then the improper transaction (N, M) using the wallet (M) is also prevented. That is, more than two different transactions taking over the same hash value (N−1) become impossible.

Figure 94:
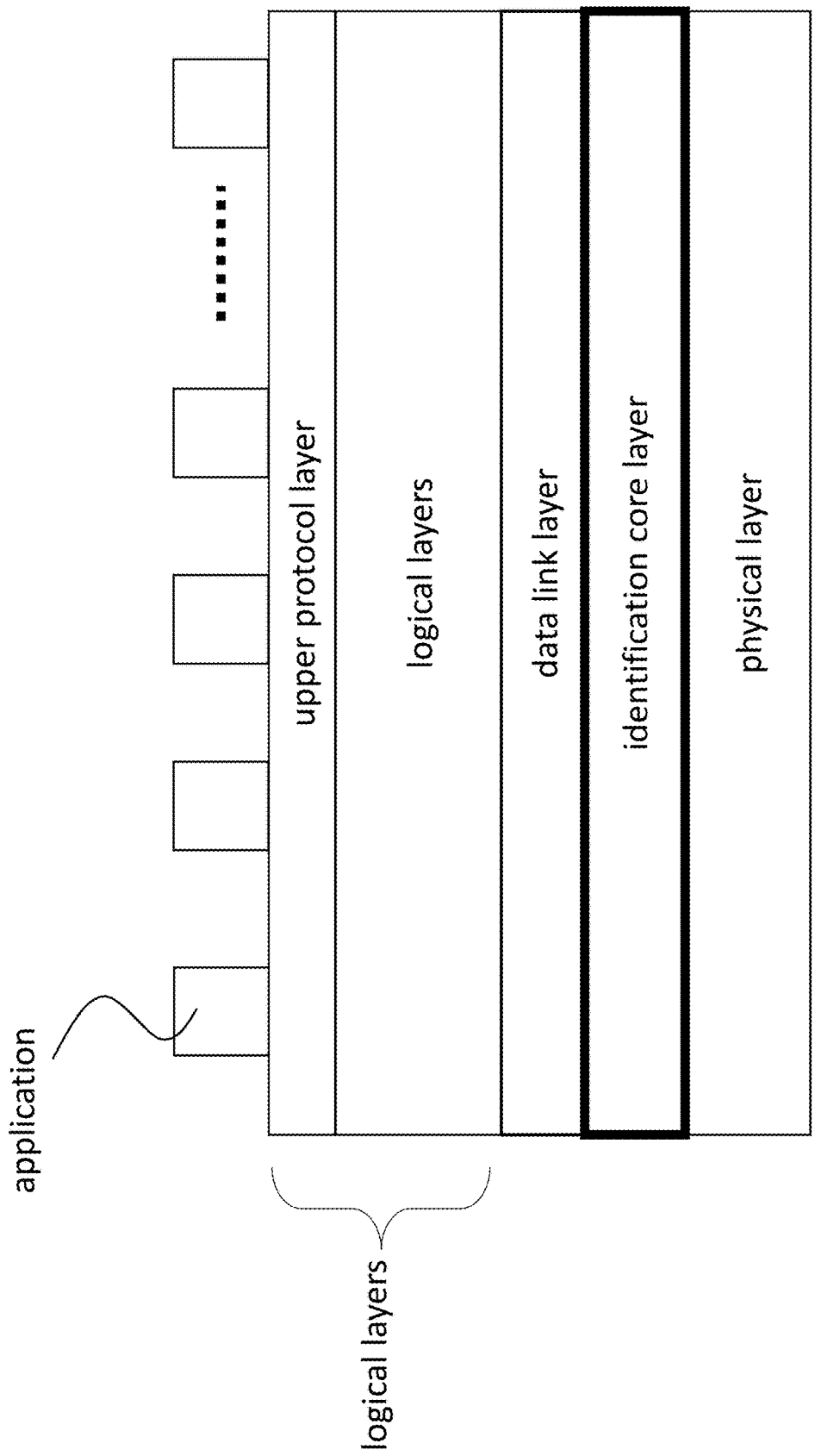
FIG. 94 illustrates that the logical layers and any applications above them need not be changed by utilizing the identification core related to the present invention.

In this way, the concept of FIG. 90 can also be realized in the present embodiment. Moreover, the security of the block chain may be further improved by sharing the execution of the security technologies between hardware and software. Or, the security technology of the block chain can be applied to the security of IoT, which is still vulnerable. Furthermore, the concept of the communication layer including the identification core and the block chain is also similar to FIG. 91. Accordingly, the identification core is completely compatible with block chain. On the other hand, it is inherent, as illustrated in FIG. 94, that the identification core layer can be expanded to the case without the block chain. In any cases, the smallest component in the network is similar to FIG. 92. FIG. 93 is an example of a network including a plurality of smallest components illustrated in FIG. 92.

Subsequently, it is impossible to date back the transaction history with the present embodiment. As an example, the method to date back the process of FIG. 98 may be described. The processes of FIG. 95-97 can also be explained in a similar manner.

First, the transaction (N−1, N) may be considered. The electronic signature (N−1) is generated from the hash value (N−2) being the content of the wallet (N−1) and the public key (N−1) being the logical address of the wallet (N−1) using the private key (N−1). Next, the public keys of the nodes in the network are searched. In the case that an obtained public key is accidentally the same as the public key of the wallet (N−1), even if the electronic signature (N−1) is decrypted by the public key (N−1), the result is the public key (N−1) and the hash value (N−2) and then is not the same as the public key (N) of the wallet (N) and the hash value (N−1). Thus, it is unable to date back the transaction history in a similar manner to the first embodiment.

Accordingly, in order to date back the transaction history in the present embodiment, the result obtained by decoding the electronic signature (N−1) should be compared with the content of the wallet (N−1). The process to require the sender to confirm the transaction is analogous to the process executed in the conventional banking transaction.

However, since various costs are appended other than that of recording the transaction history in the banking operation, it is difficult to reduce the transaction cost if a bank is used for such an execution. Then, a node having only the function to confirm if the sender really exists without the bank may be adopted.

Figure 7:
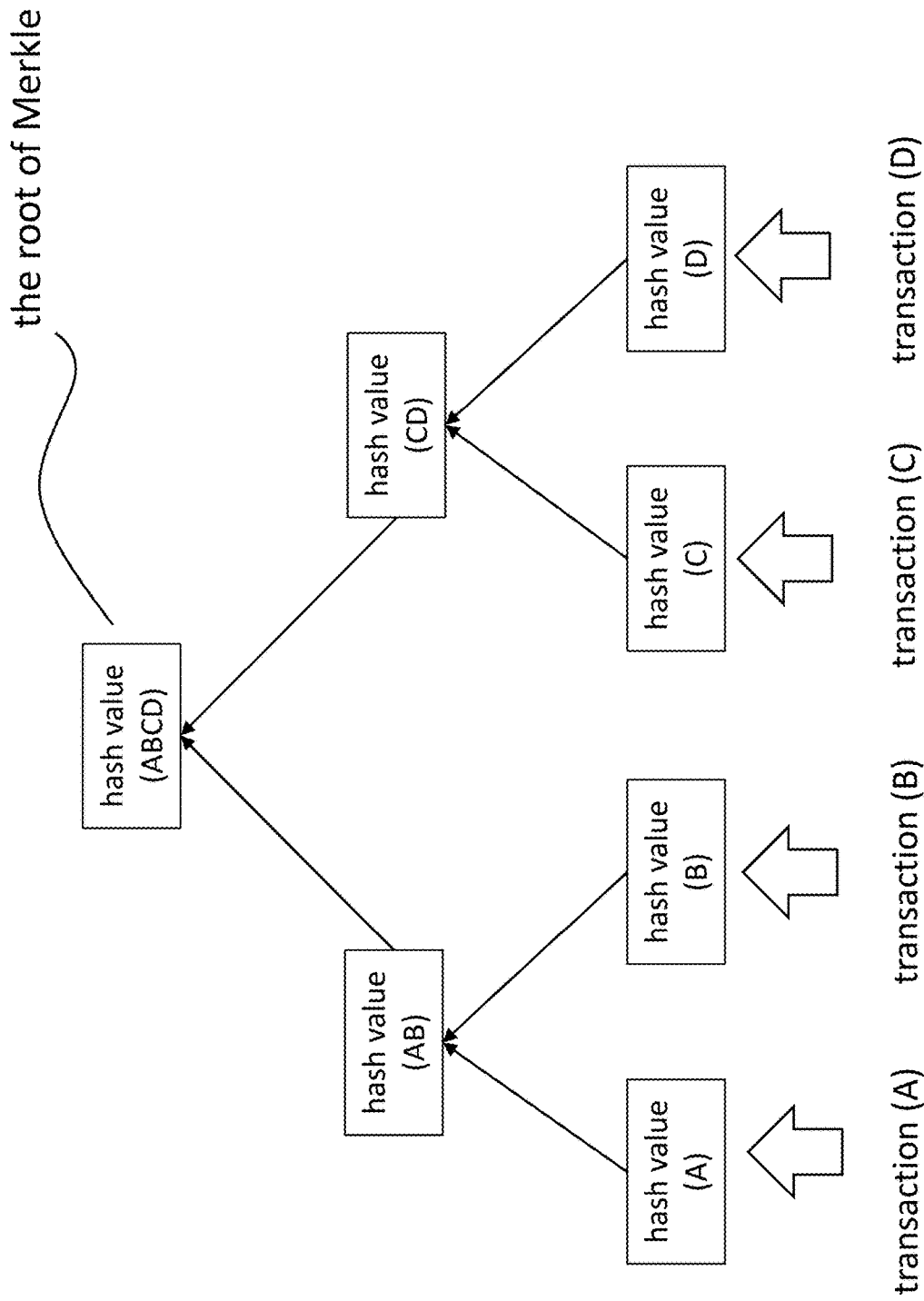
FIG. 7 illustrates a tree diagram of Merkle.
Figure 8:
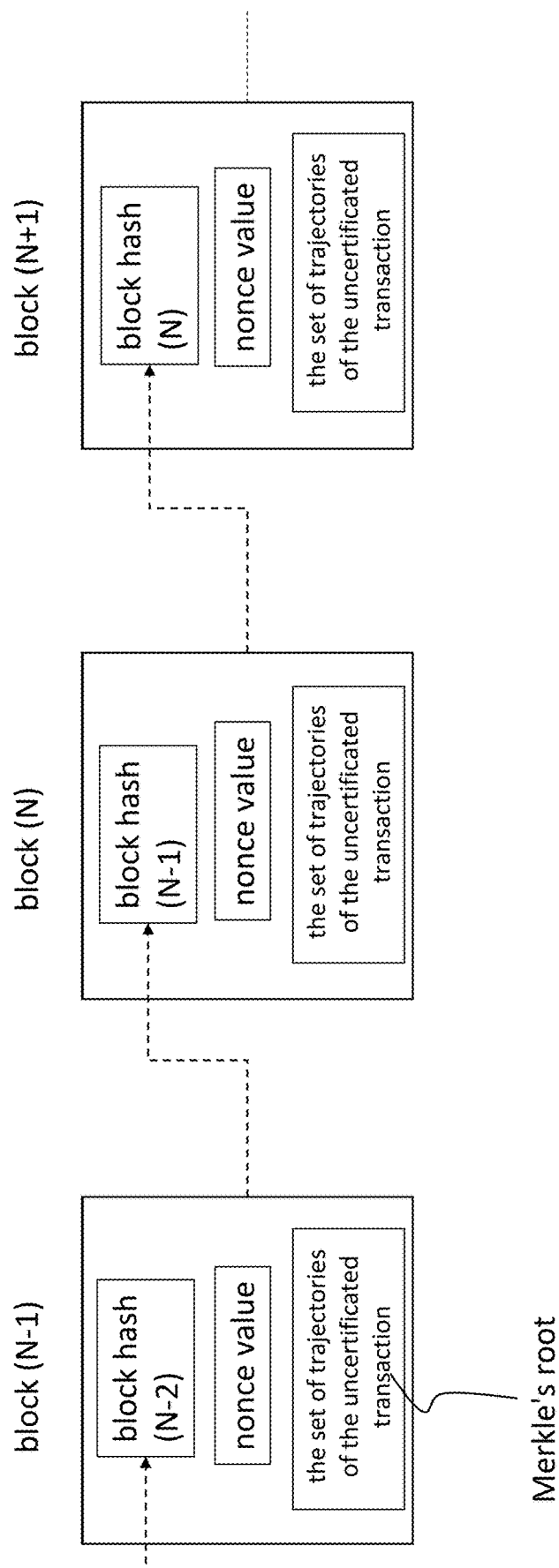
FIG. 8 illustrates a configuration of a block chain.

This node is called trajectory node. Nodes other than trajectory nodes store the Merkle root, that is, only the latest hash value, in order to save the storage space. For example, only the hash value (ABCD) is stored and the others hash values may be deleted in the example of FIG. 7. The trajectory node stores the past hash values linked to at least one Merkle root in as a perfect form as possible. In the example of FIG. 7, what is stored is the hash value (ABCD), the hash value (AB), the hash value (CD), the hash value (A), the hash value (B), the hash value (C), and the hash value (D). Or, the hash value (ABCD), the hash value (AB), and the hash value (D) are stored. Or, the hash value (ABCD), the hash value (AB), and the hash value (CD) are stored. In this event, the hash value (A), the hash value (B), the hash value (C) and the hash value (D) are deleted.

In this way, the trajectory node may store the whole or a part of the Merkle trees.

Here, for example, the past trajectory of the electronic signature (R−1) that the wallet (R) received may be date back. First, the electronic signature (R−1) is decrypted using the public key (Q) distributed in the network. The result (denoted as the hash value (Q−1) hereinafter) is compared with the data stored in the trajectory nodes storing proper Merkle trees. If the hash value (Q−1) is found in a tree, it is found that the hash value (R−1) has been transferred via the node (Q). If the similar procedure is repeated with a plurality of public keys obtained with the repetition of the net search, it may be possible to finally reproduce the Merkle tree whose Merkle root is the hash value (R−1). Moreover, in order to know how the node (Q) has processed, the transaction record before and after the node (Q) may be read out.

Figure 99:
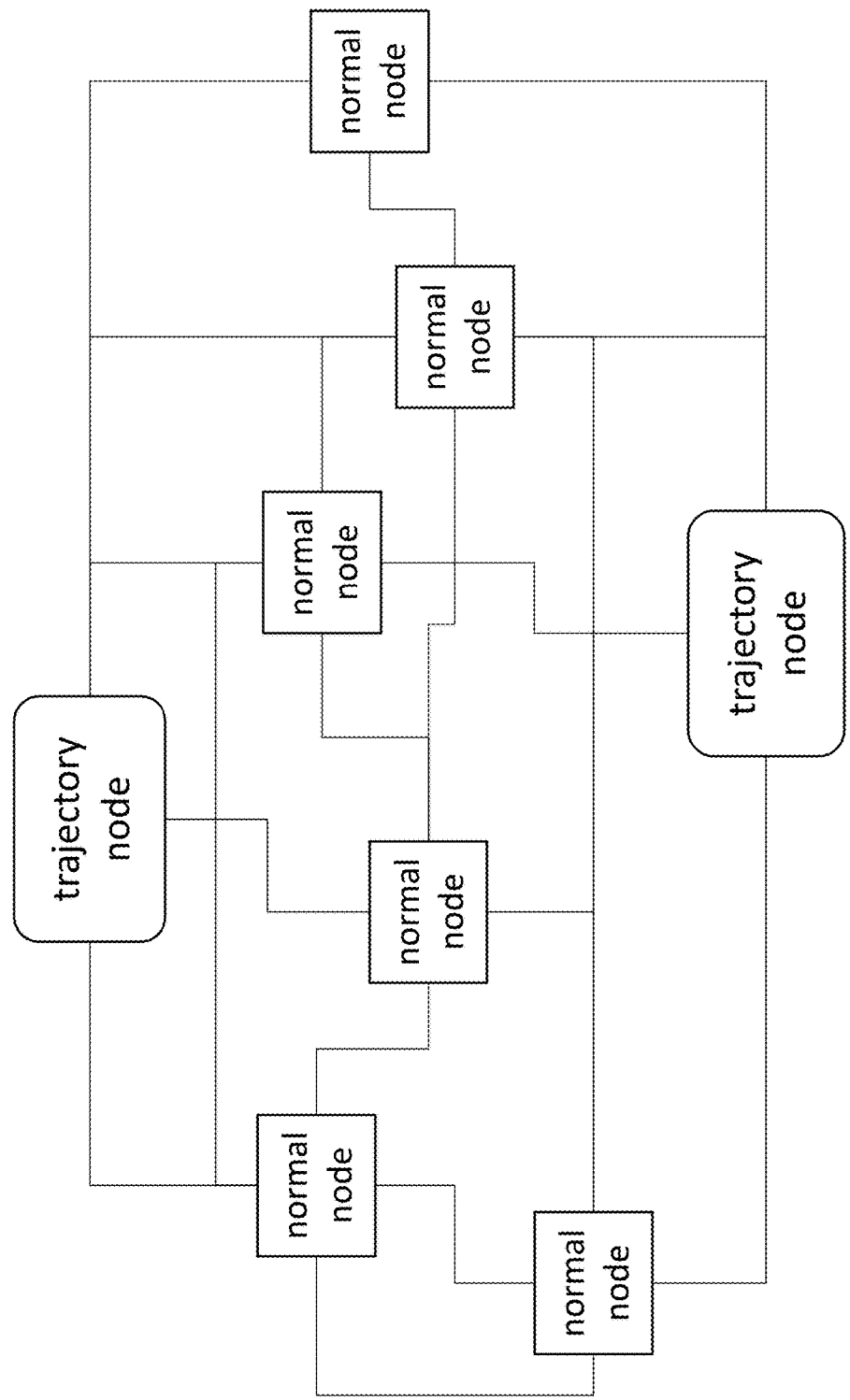
FIG. 99 illustrates an example of the network configuration including a plurality of trajectory nodes and a plurality of normal nodes different from the trajectory nodes.

The number of the trajectory nodes to collate the record of the transaction is not limited to only one. Since some trajectory nodes delete a part of the hash values, as mentioned above, it is necessary to collate the record with a plurality of trajectory nodes. As an example, as illustrated in FIG. 99, the network structure including a plurality of trajectory nodes and a plurality of normal nodes (not trajectory nodes) may be considerable.

In this way, the trajectory nodes have a special function compared with the normal nodes. However, the special function is limited. As mentioned above, the storage capacity of the trajectory nodes is larger than the normal nodes with no specialty. Then, the trajectory nodes may not always be the same as the servers in the client-server type network, which play central roles as the core nodes of the network. Accordingly, the network of the present embodiment is a kind of P2P which is combined with a part of properties of the client-server type network.

It can create a new business using the trajectory node. Most of the conventional banking service may be unnecessary if FinTech using the block chain stands up in earnest. However, it may be unrealistic to completely abandon the conventional banking service. Considering such a situation, it may be necessary to combine the P2P type network service with the client-server type one. For example, some banking institute may be able to provide the service of trajectory search by connecting the nodes with a huge capacity of the storage to the block chain type network. This banking institute may make a profit with the service of trajectory search, whereas it is expected that the users of this service become customers of the banking institute to use a part of the conventional banking service of the client-server.

The node like the trajectory node having a limited special function may be as if the core nodes having weak authority. It may sometime take a core place and simultaneously one of the nodes in the P2P type network. Thus, it is able to provide the network service combining the client-service type and the P2P type ones with the present embodiment. In other words, with the block chain including the identification core related to the present embodiment, it may become easy to incorporate the client-server type network service into the P2P type network service.

The third embodiment is described below.

Another merit of the identification core related to the present invention certainly realizes the One-CPU-One-Vote (OCOV). This OCOV is a necessary condition for certifying the "Proof-of-Work" (PoW). It is because the PoW is invalidated by infinitely preparing the logical addresses if those logical addresses can respectively certify the date of the authentication. However, in the network related to the present invention, the identification cores play an important role to highly-credibly administrate the total nodes having CPU as physical substances.

Figure 100:
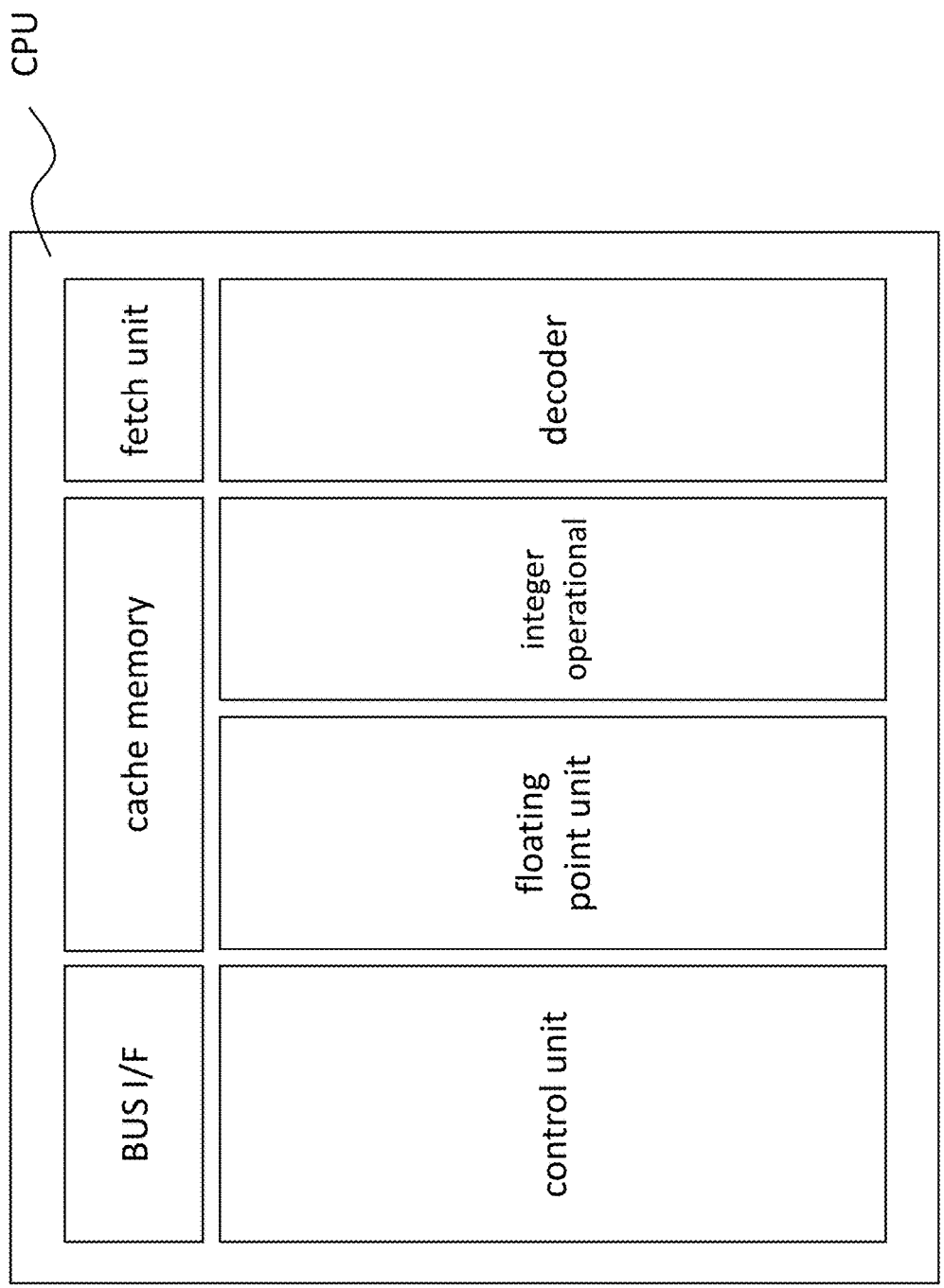
FIG. 100 illustrates the configuration of a typical CPU.

First of all, it may be applied to a typical CPU and then described. As an example, the typical CPU is as illustrated in FIG. 100. The BUS I/F, the cash memory, the fetch unit, the decoder, the integer operational unit, floating-point unit and the control unit are modularized. The BUS I/F manages the data exchange with the external BUS. The cash memory temporarily stores the data for further data exchanging with the main memory. The fetch unit collects the fetch-related circuits. The decoder decodes the operational results. The integer operational unit executes the operation of integers. The floating-point unit executes the operation of floating point. The control unit controls the operation of the individual units.

Figure 101:
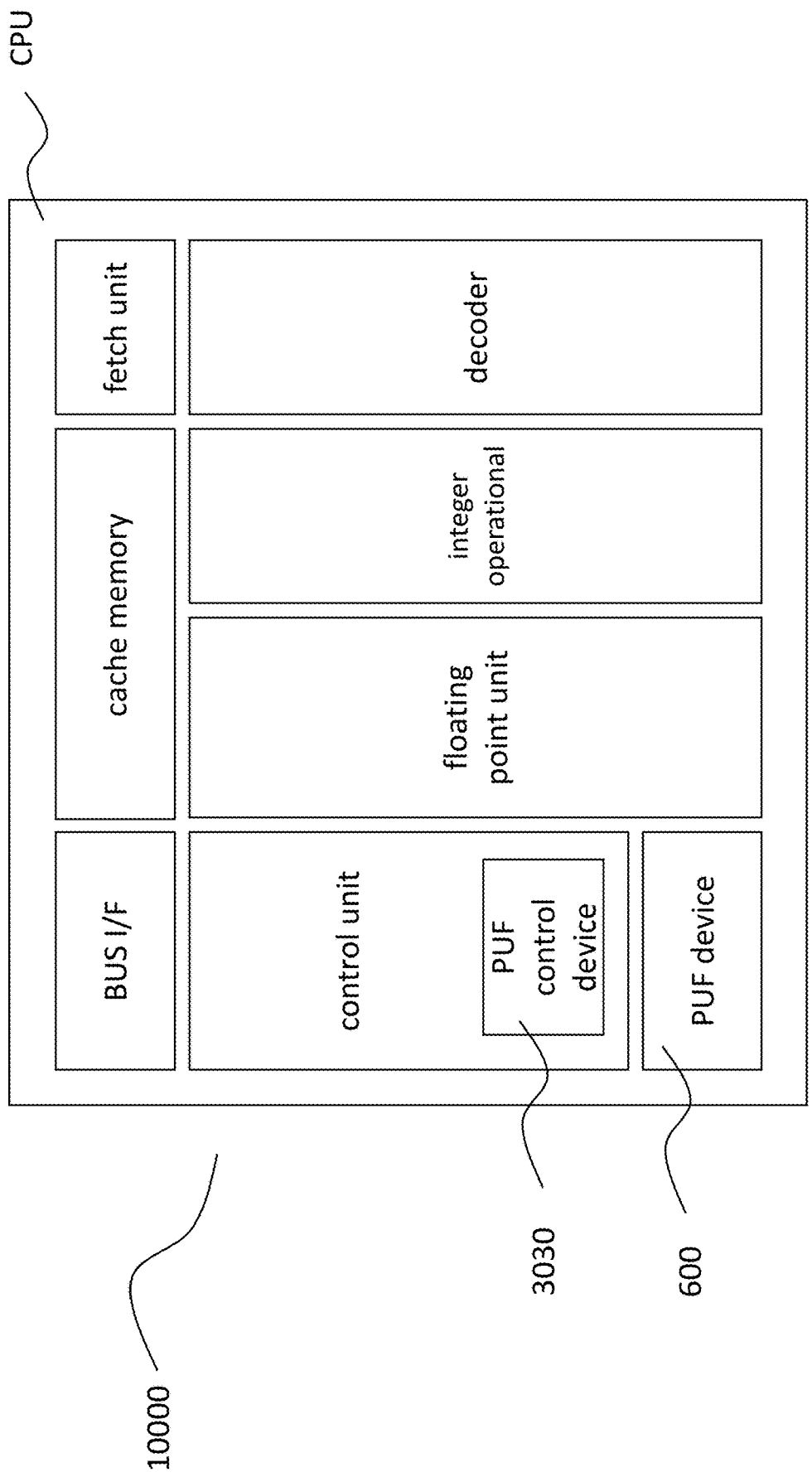
FIG. 101 illustrates an example of a basic configuration of the identification core related to the present invention utilizing the PUF device and CPU.

FIG. 101 illustrates an example of the CPU chip to be equipped with the PUF device 600 related to the present invention. The PUF device 600 is appended to the typical configuration of the CPU of FIG. 100. Furthermore, the control device for PUF 3030 is also included in the control unit. Thus, the CPU chip itself may serve as the identification core. Moreover, although it is not specially illustrated since it may be inherent, it is possible for the present embodiment to include the scramble device 604 of FIG. 32 in the PUF device 600. The explanation in the event is omitted because it may be completed by replacing "PUF device" with "PUF device and the scramble device".

Figure 102:
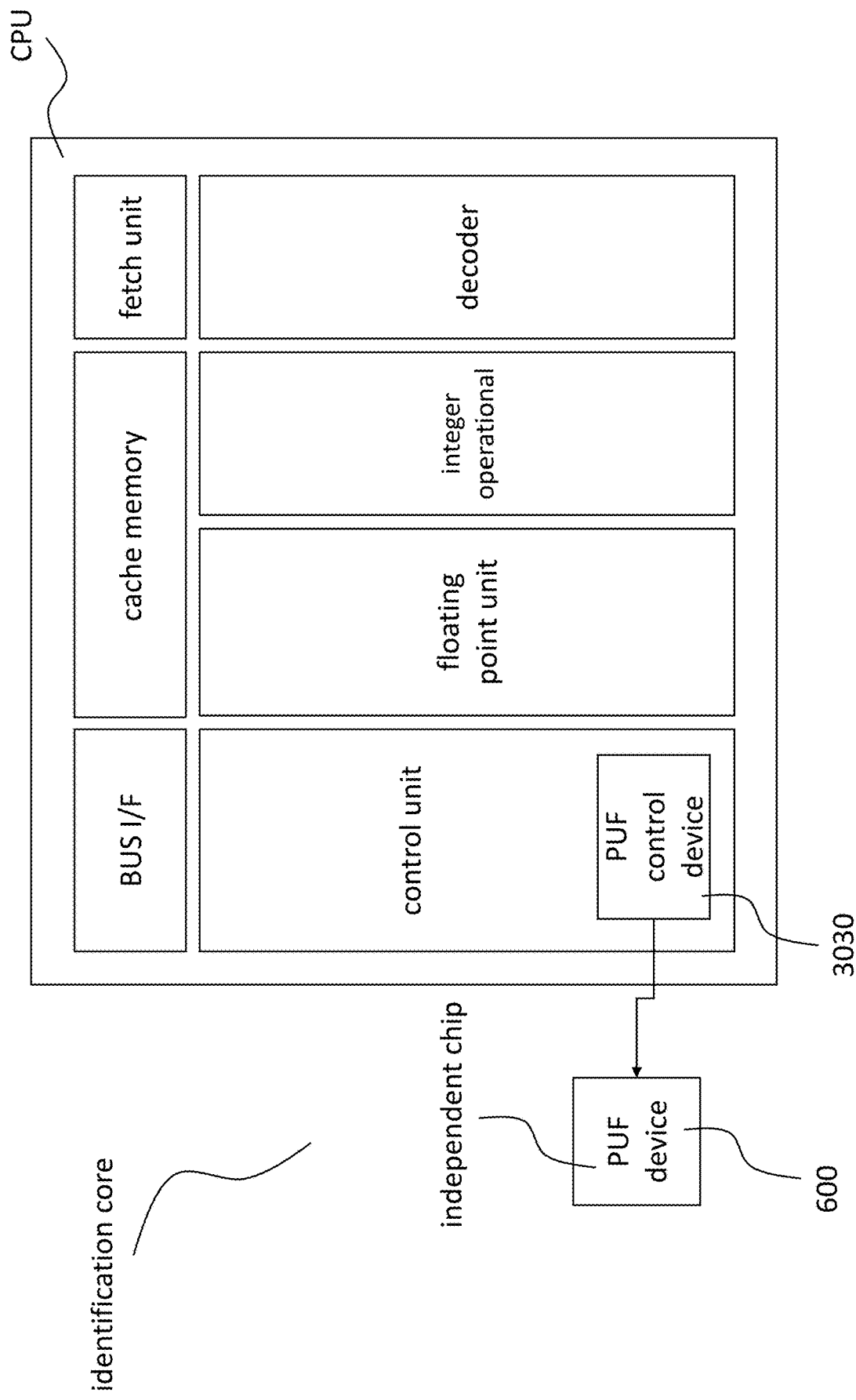
FIG. 102 illustrates an example of a basic configuration of the identification core related to the present invention utilizing the CPU and one-chip PUF device.

FIG. 102 illustrates another example that the PUF device 600 related to the present invention is an independent chip in the exterior of the CPU. Even in this event, the control device for PUF 3030 is included in the control unit and then control the external PUF device 600. Thus, the PUF device may serve as the identification core by corporation with the CPU. The actual data exchange can be executed by the BUS I/F, by the cash memory to temporarily store the data to be exchanged, or by an interface to be specially prepared for the specification of the PUF device 600. Or, although it is not specially illustrated since it may be inherent, it may modularize the control device for PUF 3030 as an independent unit from the conventional control unit.

Figure 103:
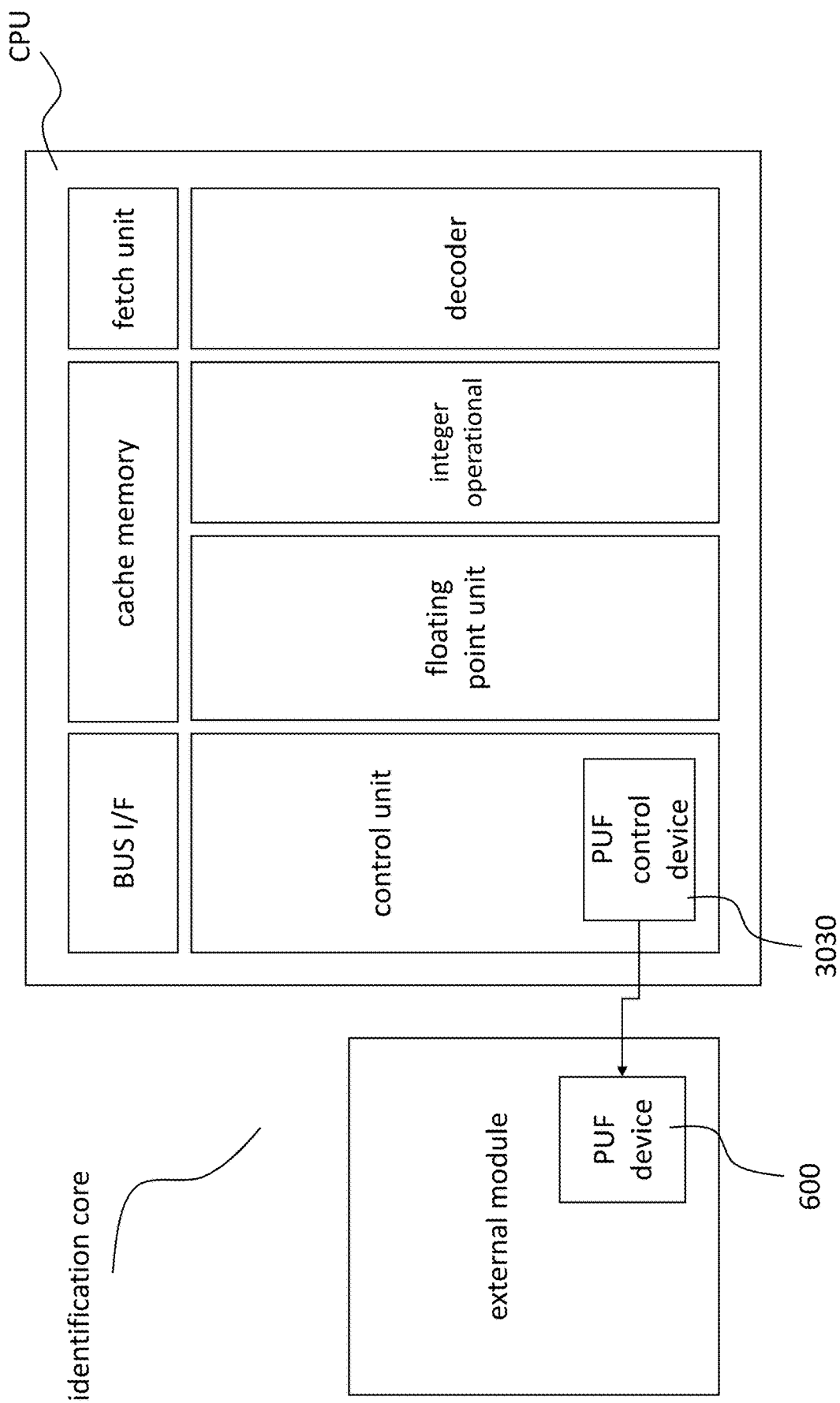
FIG. 103 illustrates an example of a basic configuration of the identification core related to the present invention utilizing the CPU and the PUF device equipped in the external module.

FIG. 103 illustrates another example that the PUF device 600 related to the present invention is included in a module in the exterior of the CPU. Even in this event, the control device for PUF 3030 is, for example, included in the control unit and then controls the external PUF device 600. Thus, the PUF device may serve as an identification core by corporation with the CPU. The actual data exchange can be executed by the BUS I/F, by the cash memory to temporarily store the data to be exchanged, or by an interface to be specially prepared for the specification of the PUF device 600. Or, although it is not specially illustrated since it may be inherent, it may modularize the control device for PUF 3030 as an independent unit from the conventional control unit.

Figure 104:
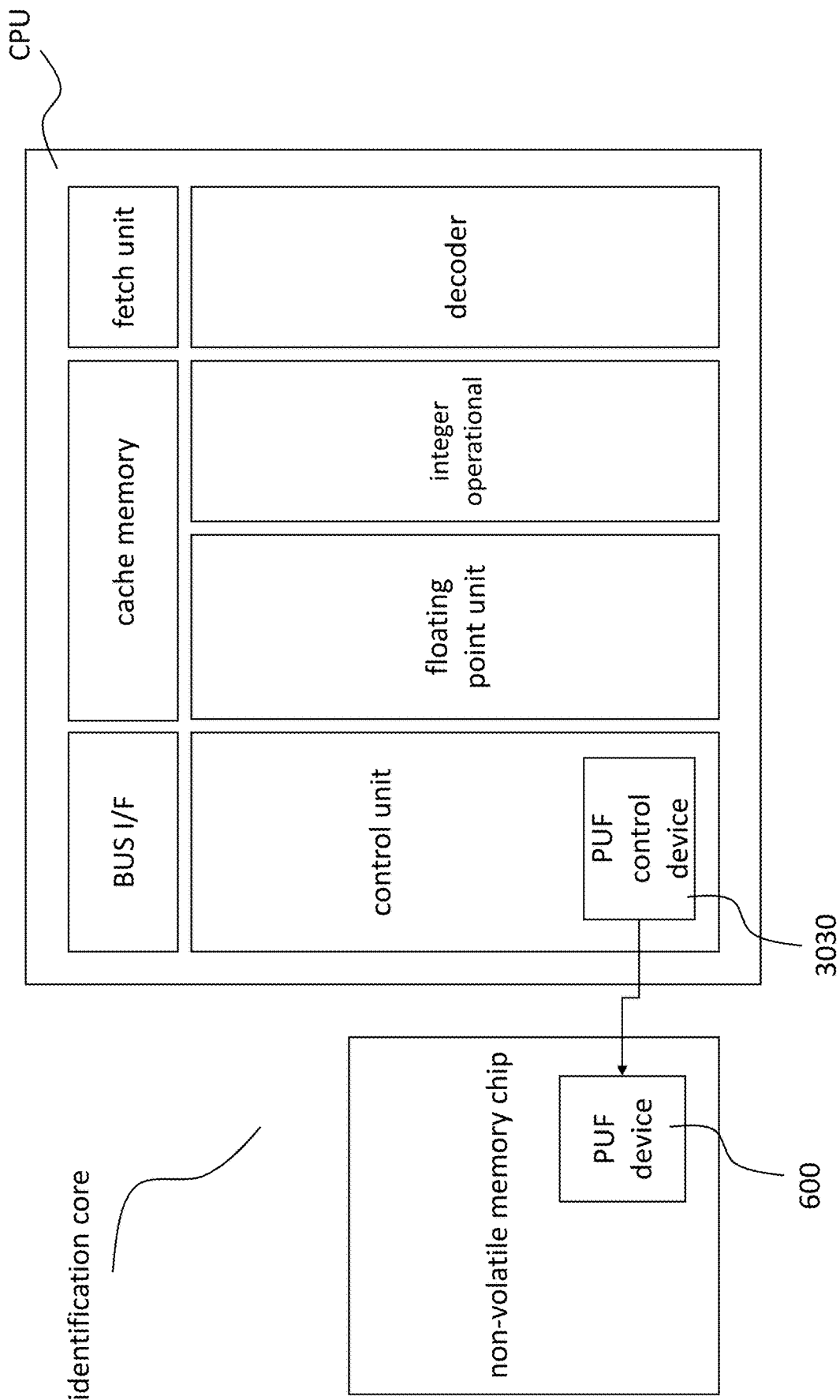
FIG. 104 illustrates an example of a basic configuration of the identification core related to the present invention utilizing the CPU and the PUF device equipped in the non-volatile memory chip.

FIG. 104 illustrates another example that the PUF device 600 related to the present invention is included in a non-volatile memory chip in the exterior of the CPU. Even in this event, the control device for PUF 3030 is included in the control unit and then controls the external PUF device 600. Thus, the PUF device may serve as an identification core by corporation with the CPU. The actual data exchange can be executed by the BUS I/F, by the cash memory to temporarily store the data to be exchanged, or by an interface to be specially prepared for the specification of the PUF device 600. Or, although it is not specially illustrated since it may be inherent, it may modularize the control device for PUF 3030 as an independent unit from the conventional control unit.

Figure 105:
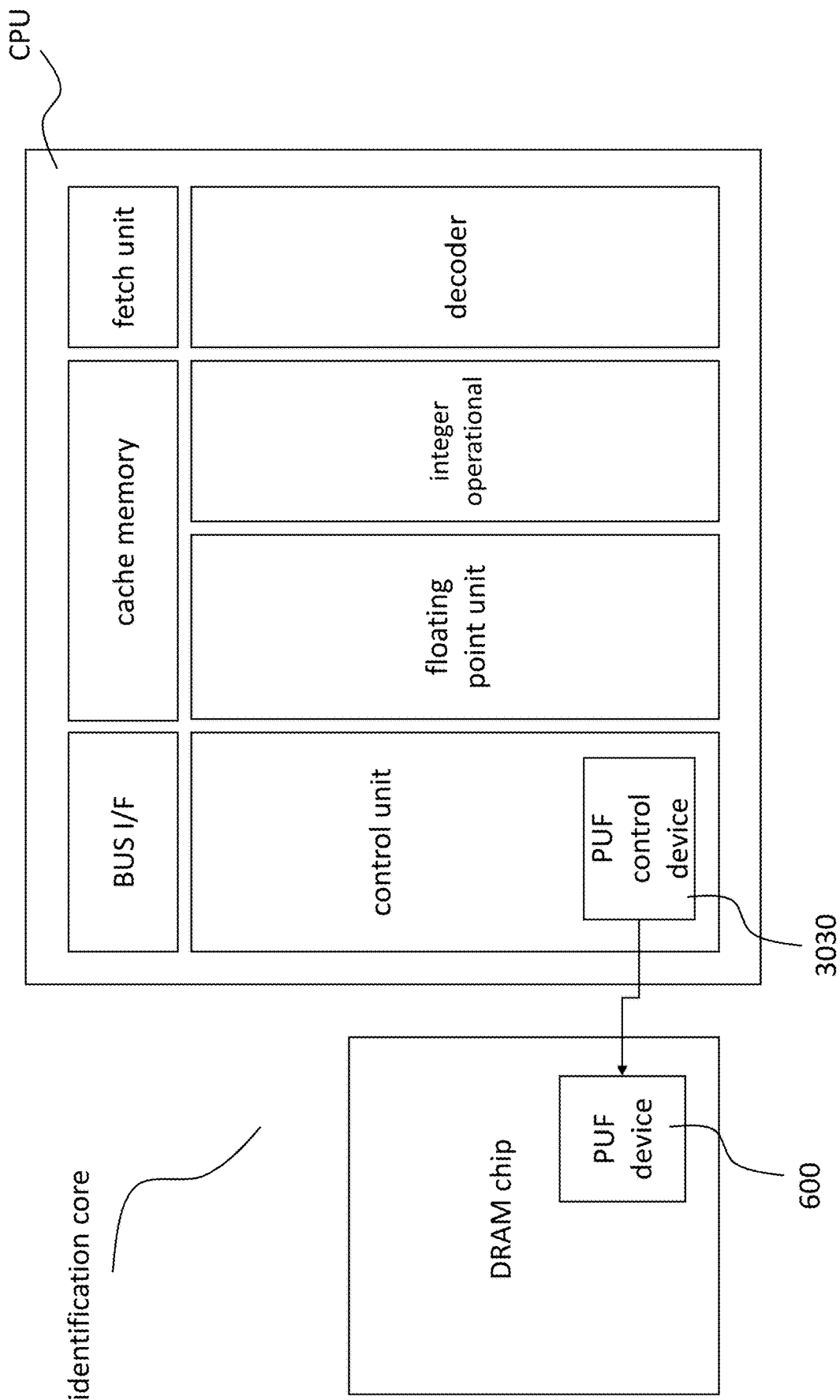
FIG. 105 illustrates an example of a basic configuration of the identification core related to the present invention utilizing the CPU and the PUF device equipped in the DRAM chip.

FIG. 105 illustrates another example that the PUF device 600 related to the present invention is included in a DRAM chip in the exterior of the CPU. Even in this event, the control device for PUF 3030 is included in the control unit and then controls the external PUF device 600. Thus, the PUF device may serve as an identification core by corporation with the CPU. The actual data exchange can be executed by the BUS I/F, by the cash memory to temporarily store the data to be exchanged, or by an interface to be specially prepared for the specification of the PUF device 600. Or, although it is not specially illustrated since it may be inherent, it may be able to modularize the control device for PUF 3030 as an independent unit from the conventional control unit.

The examples illustrated in FIGS. 101-105 are a part of the total examples related to the present embodiment. More various configurations may be possible, as long as they are within the scope of the explanation with FIGS. 101-105. For example, although it is not specially illustrated since it may be inherent, it may also be possible for the CPU to locate the control device for PUF 3030 in the exterior and to include the PUF device 600. Or, it may also be possible for the CPU to locate both the control device for PUF 3030 and the PUF device 600 in the exterior. Anyway, the present embodiment may serve as an identification core by cooperating with the CPU.

Figure 106:
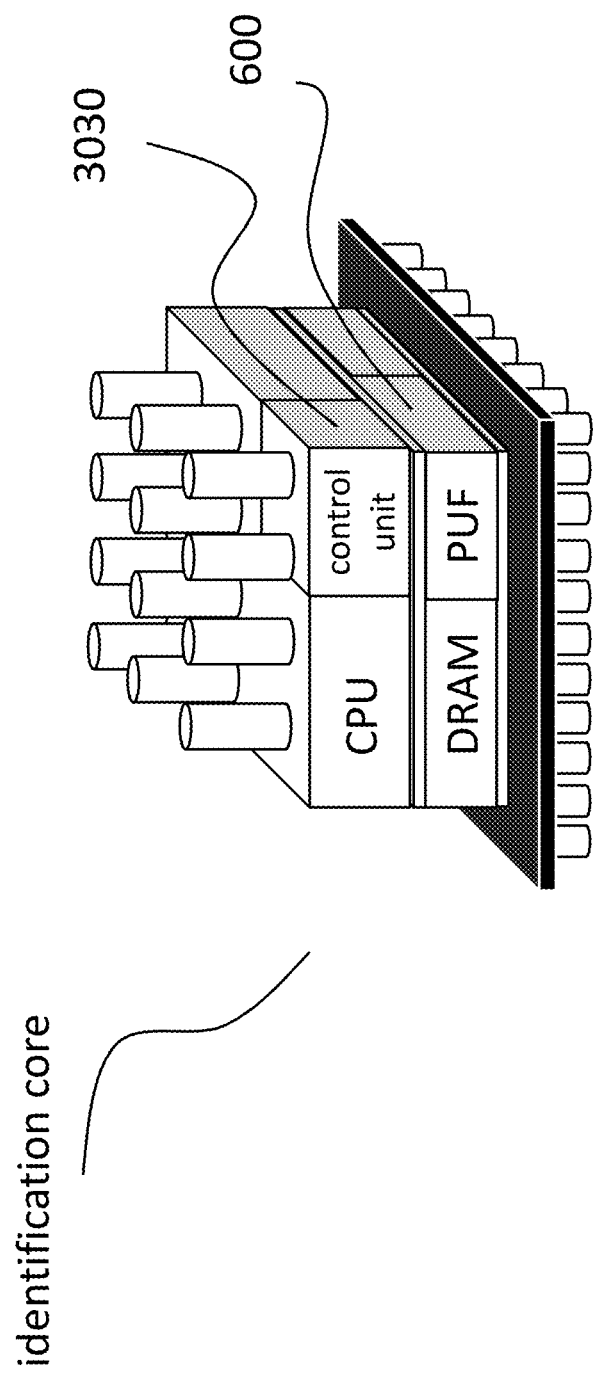
FIG. 106 illustrates an example of a basic configuration of the identification core related to the present invention utilizing the PUF device, the CPU and the DRAM.

In general, DRAM is a necessary semiconductor device to operate the CPU. Accordingly, as an example like FIG. 106, the CPU chip having the control device for the PUF 3030 and the DRAM chip having the PUF device 600 may be bonded and mounted together to form an identification core.

Figure 107:
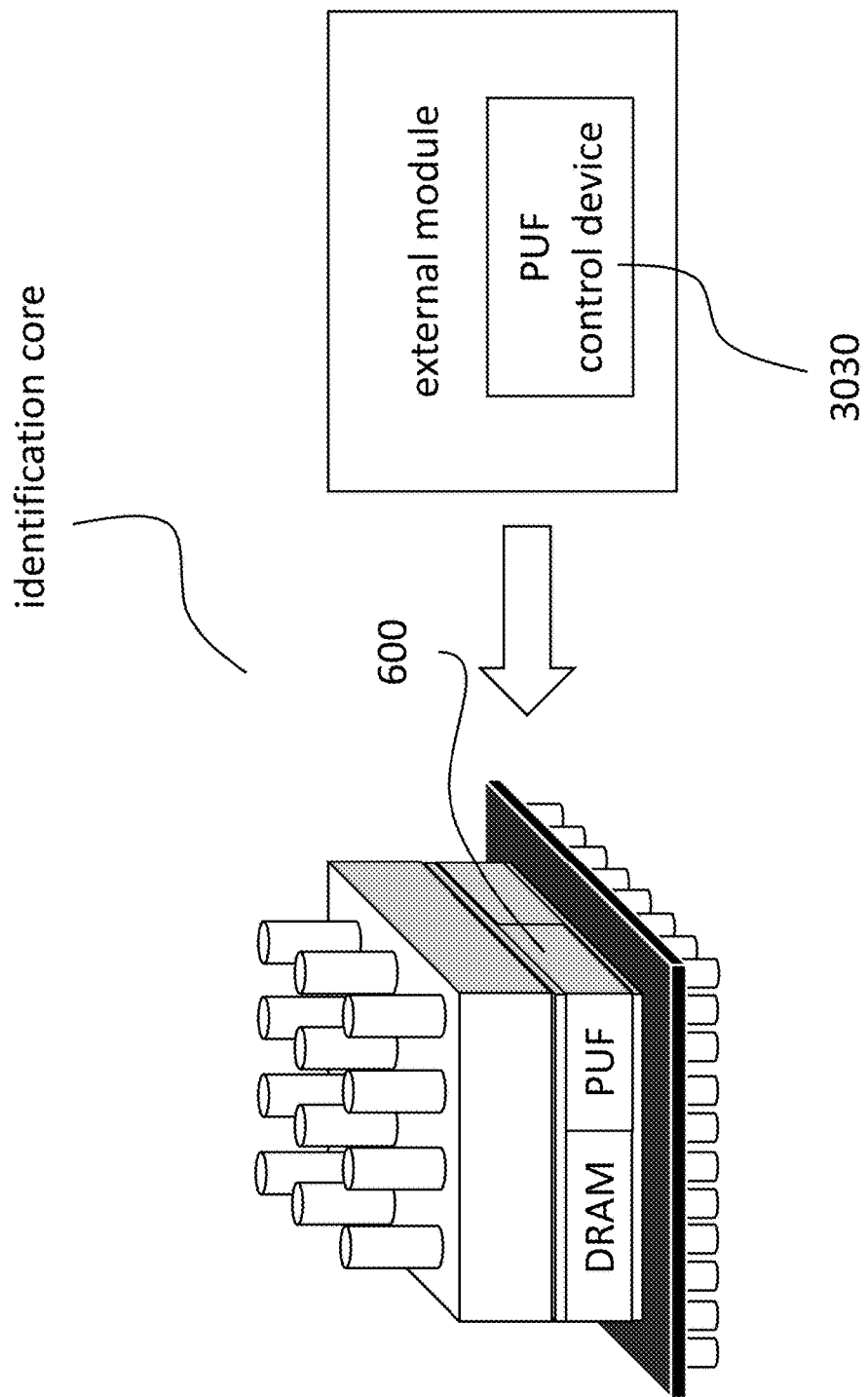
FIG. 107 illustrates an example of a basic configuration of the identification core related to the present invention utilizing the PUF device, the CPU and the DRAM.

As another example like FIG. 107, the CPU chip and the DRAM chip having the PUF device 600 may be bonded and mounted together. It may be further linked to an external module including the control device for the PUF 3030 so as to form an identification core.

Figure 108:
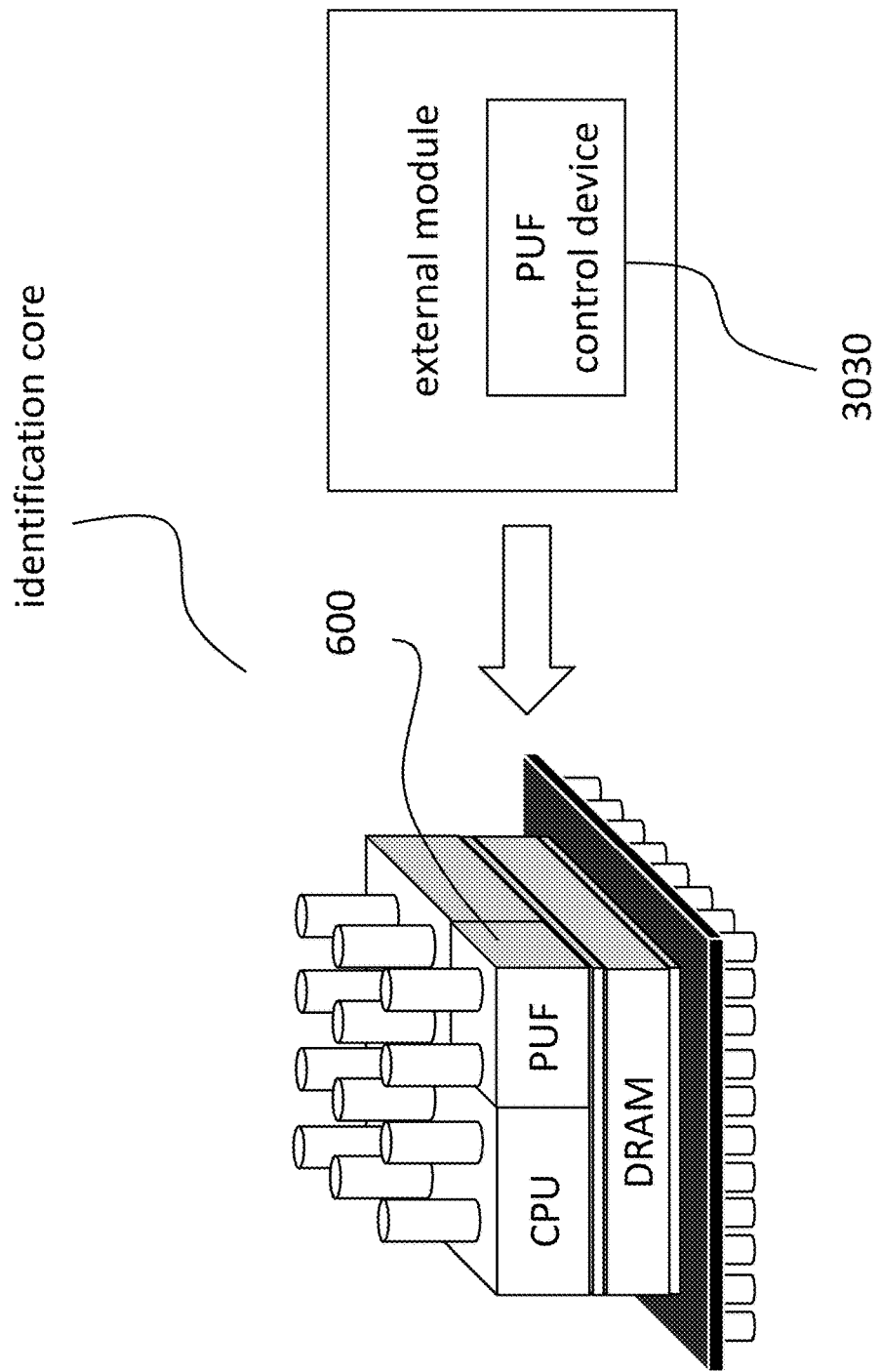
FIG. 108 illustrates an example of a basic configuration of the identification core related to the present invention utilizing the PUF device, the CPU and the DRAM.

As another example like FIG. 108, the CPU chip having the PUF device 600 and the DRAM chip may be bonded and mounted together. It may be further linked to an external module including the control device for the PUF 3030 so as to form an identification core.

Figure 109:
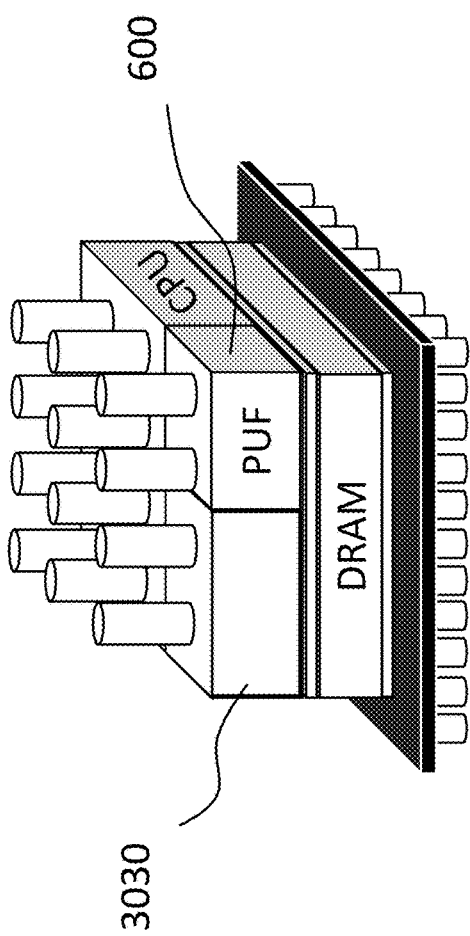
FIG. 109 illustrates an example of a basic configuration of the identification core related to the present invention utilizing the PUF device, the CPU and the DRAM.

As another example like FIG. 109, the CPU chip having both the control device for the PUF 3030 and the PUF device 600 and the DRAM chip may be bonded and mounted together to form an identification core.

Figure 110:
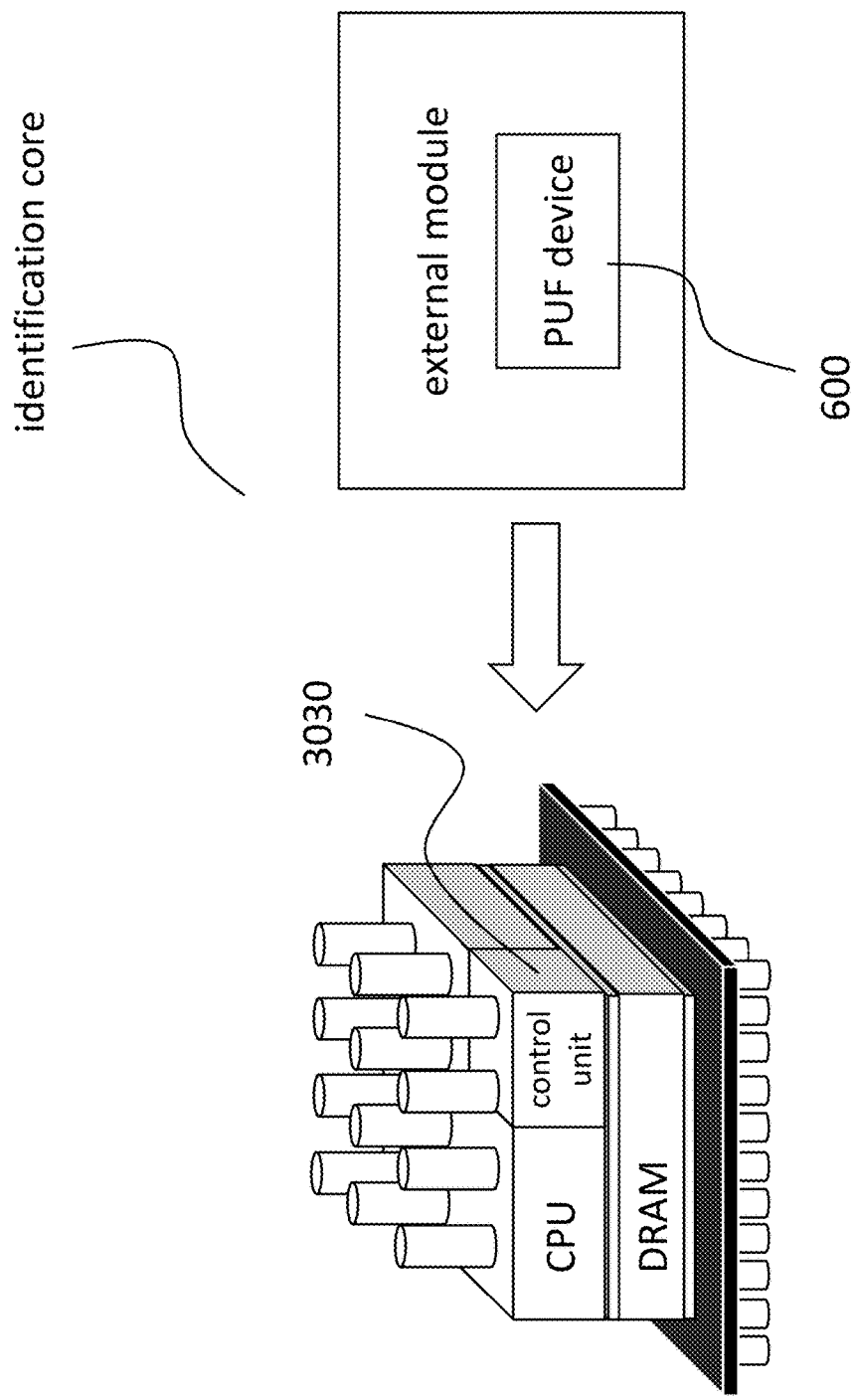
FIG. 110 illustrates an example of a basic configuration of the identification core related to the present invention utilizing the PUF device, the CPU and the DRAM.

As another example like FIG. 110, the CPU chip having the control device for the PUF 3030 and the DRAM chip may be bonded and mounted together. It may be further linked to an external module including the PUF device 600 so as to form an identification core.

The examples illustrated in FIGS. 106-110 are a part of the total examples related to the present embodiment. Various configurations may be possible, as long as they are within the scope of the explanation with FIGS. 106-110.

The Fourth embodiment is described below.

In the case that the independent input is selected as an input to the PUF device like FIG. 87, FIG. 88, FIG. 97, and FIG. 98, the following merits are appended. In other words, first, even though a sole node (an information terminal such as a PC, a tablet and so forth) is shared with friends and family, they may actually own independent wallets as long as they use different independent inputs, respectively. Second, even though a node (an information terminal such as a PC, a tablet and so forth) is fallen into other's hand by theft or lost, different inputs respectively form different wallets with the same node. Therefore, it may prevent the theft of the wallets as long as the independent input is not simultaneously fallen into the same person.

This is a merit of chameleon property.

The fifth embodiment is described below.

Figure 111:
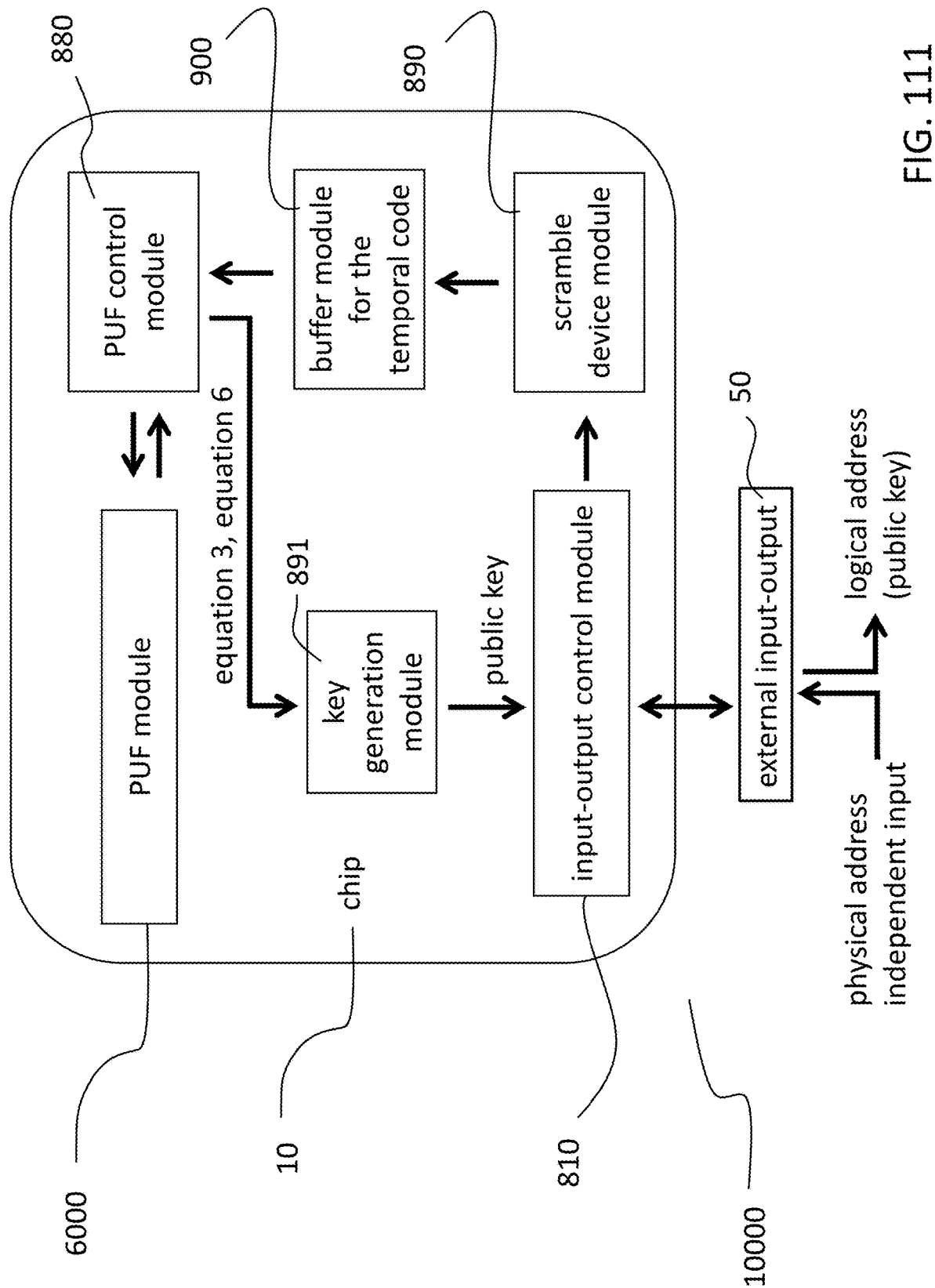
FIG. 111 illustrates an example of a configuration that the identification core related to the present invention confines the private key and generates the public key forming a unique pair with the private key, and outputs the public key to the exterior of the identification core.

The identification core 10000 related to the present invention, as illustrated in FIG. 111 as an example, includes at least the PUF module 6000, the PUF control module 880, the input-output control module 810, the scramble device module 890, the buffer module for temporal code 900, and the key generation module 891. Then, they are equipped in the chip 10.

Figure 40:
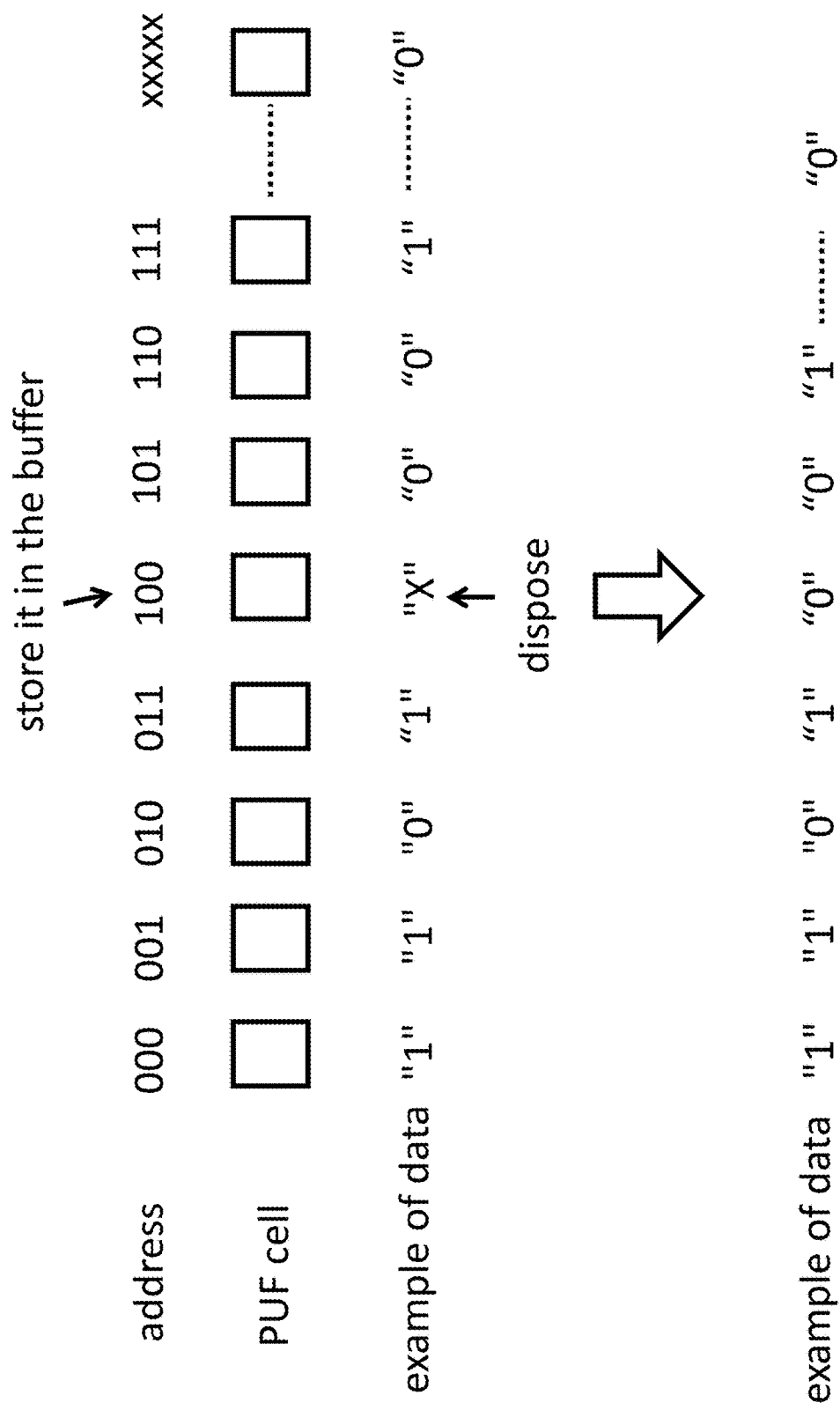
FIG. 40 illustrates an example of a method to make sure the input-output reliability of the PUF device.
Figure 41:
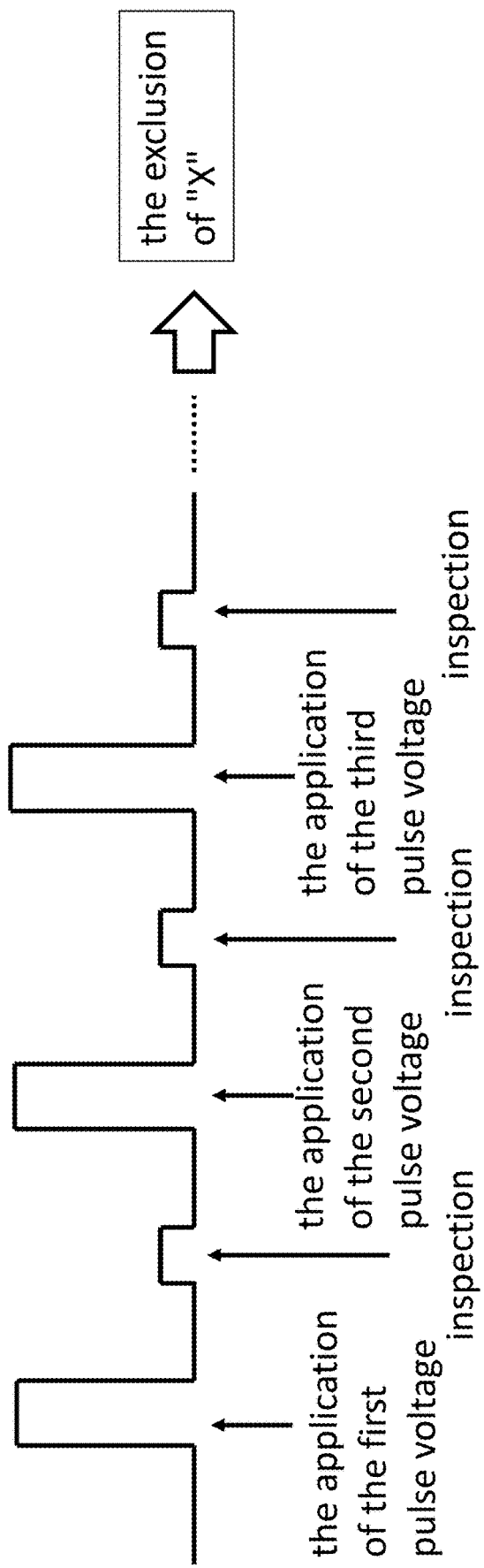
FIG. 41 illustrates an example of an electric stress pulse to be applied to the PUF cell.
Figure 42:
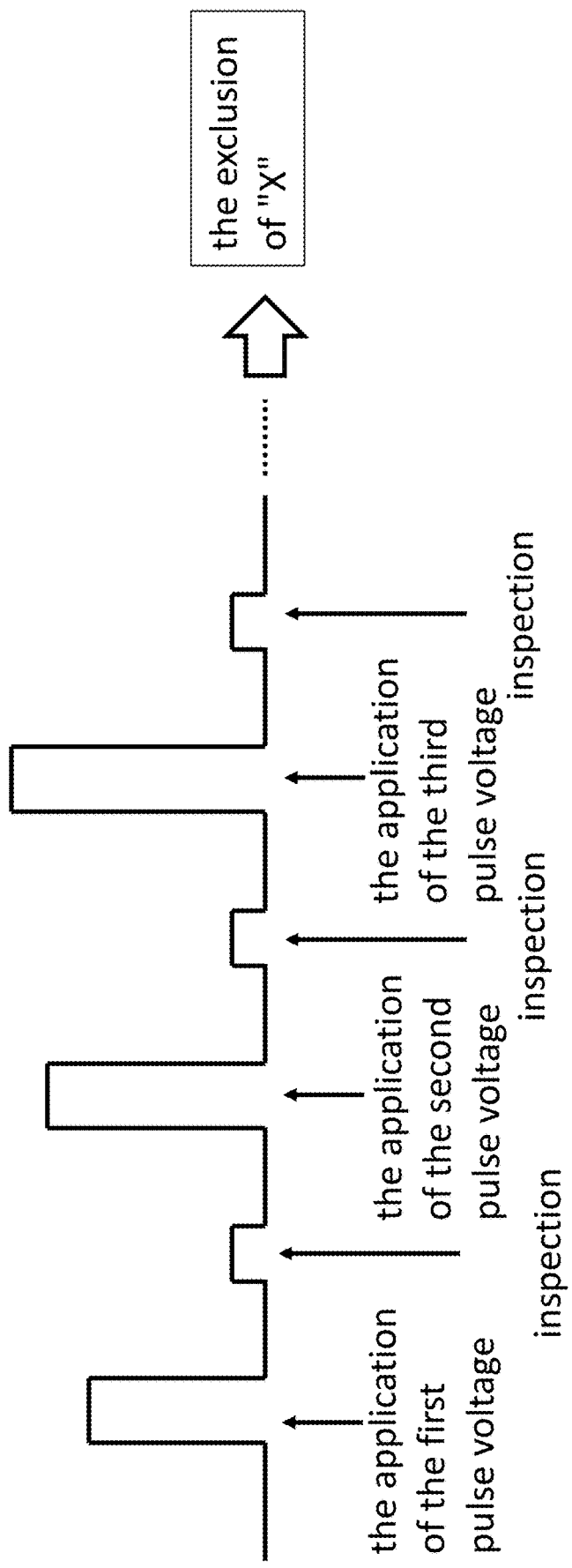
FIG. 42 illustrates an example of the electric stress pulse to be applied to the PUF cell.
Figure 43:
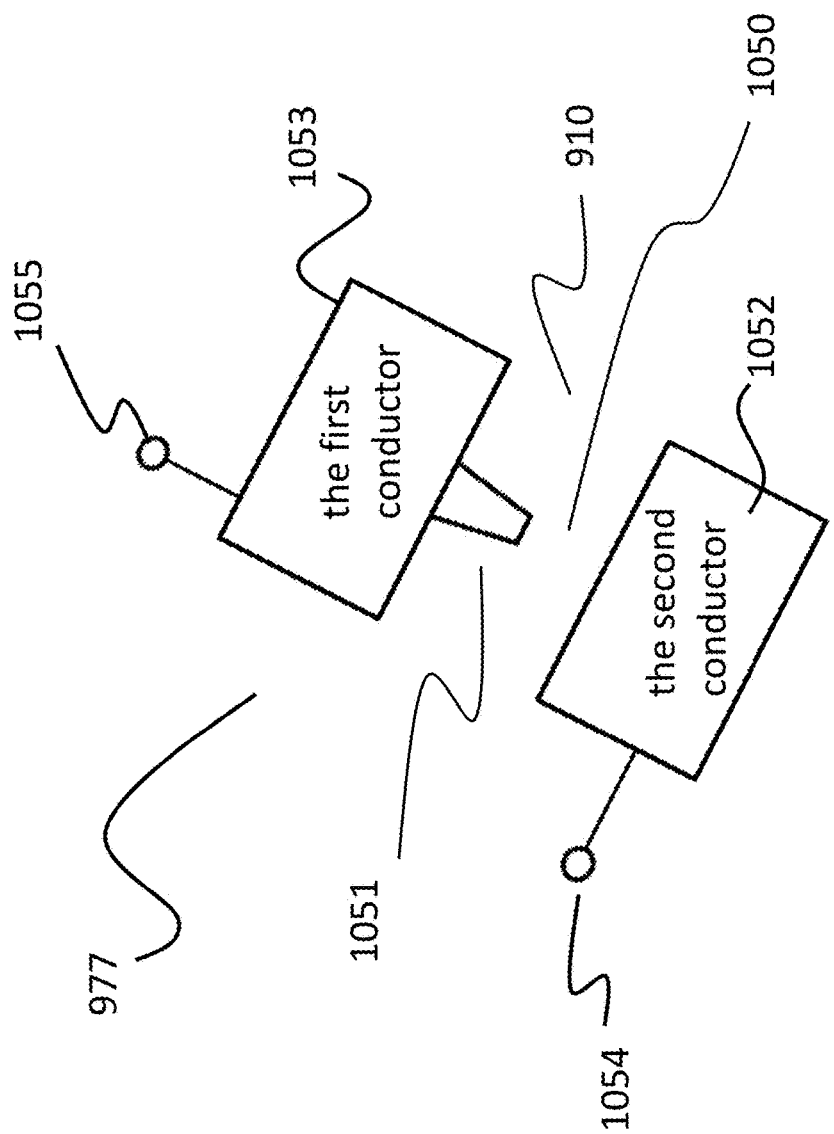
FIG. 43 illustrates an example of the PUF cell utilizing a conductive tip.
Figure 44:
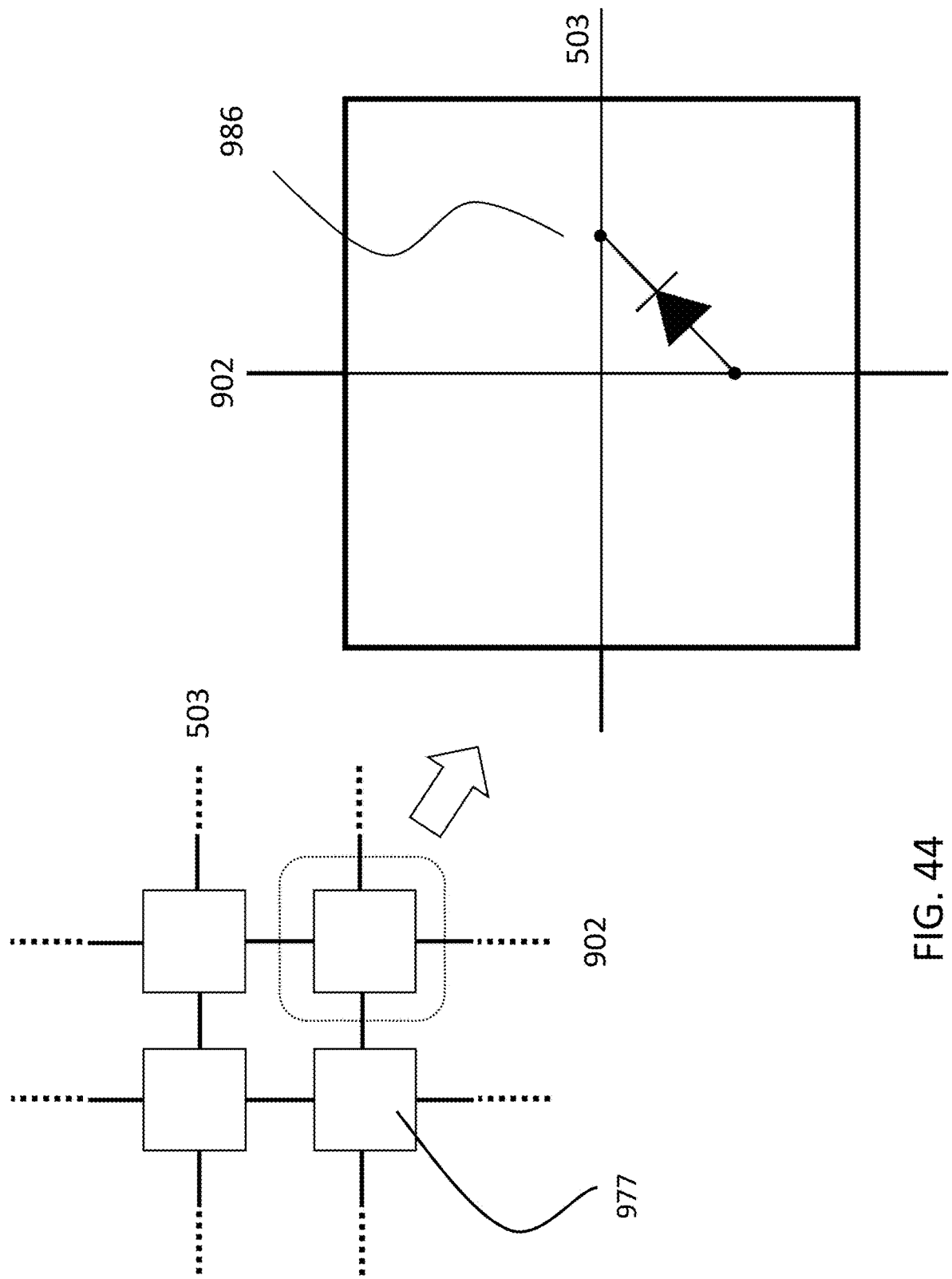
FIG. 44 illustrates an example of the PUF cell utilizing the PN junction.
Figure 45:
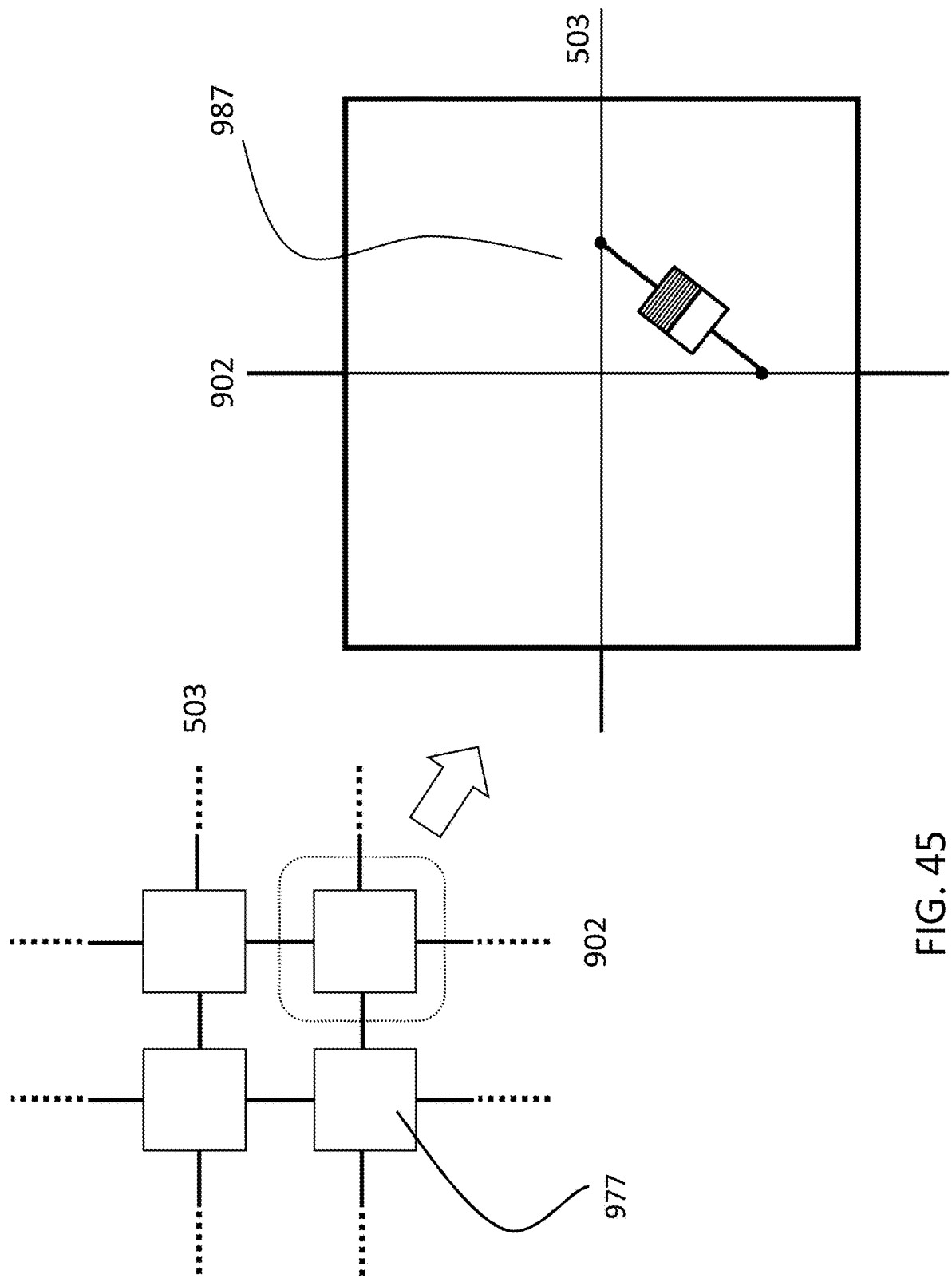
FIG. 45 illustrates an example of the PUF cell utilizing a Schottky junction.
Figure 46:
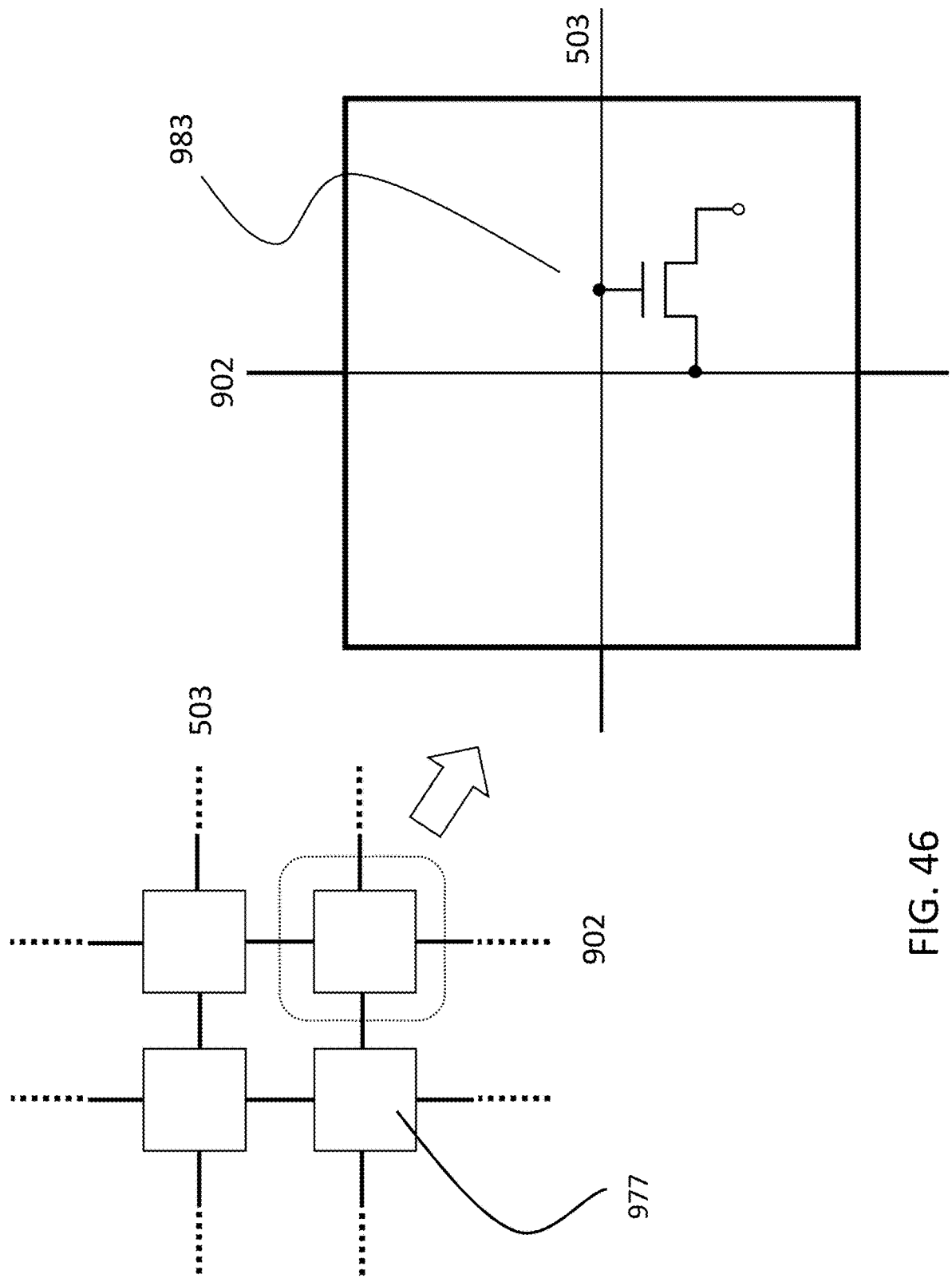
FIG. 46 illustrates an example of the PUF device utilizing the MOSFET.
Figure 47:
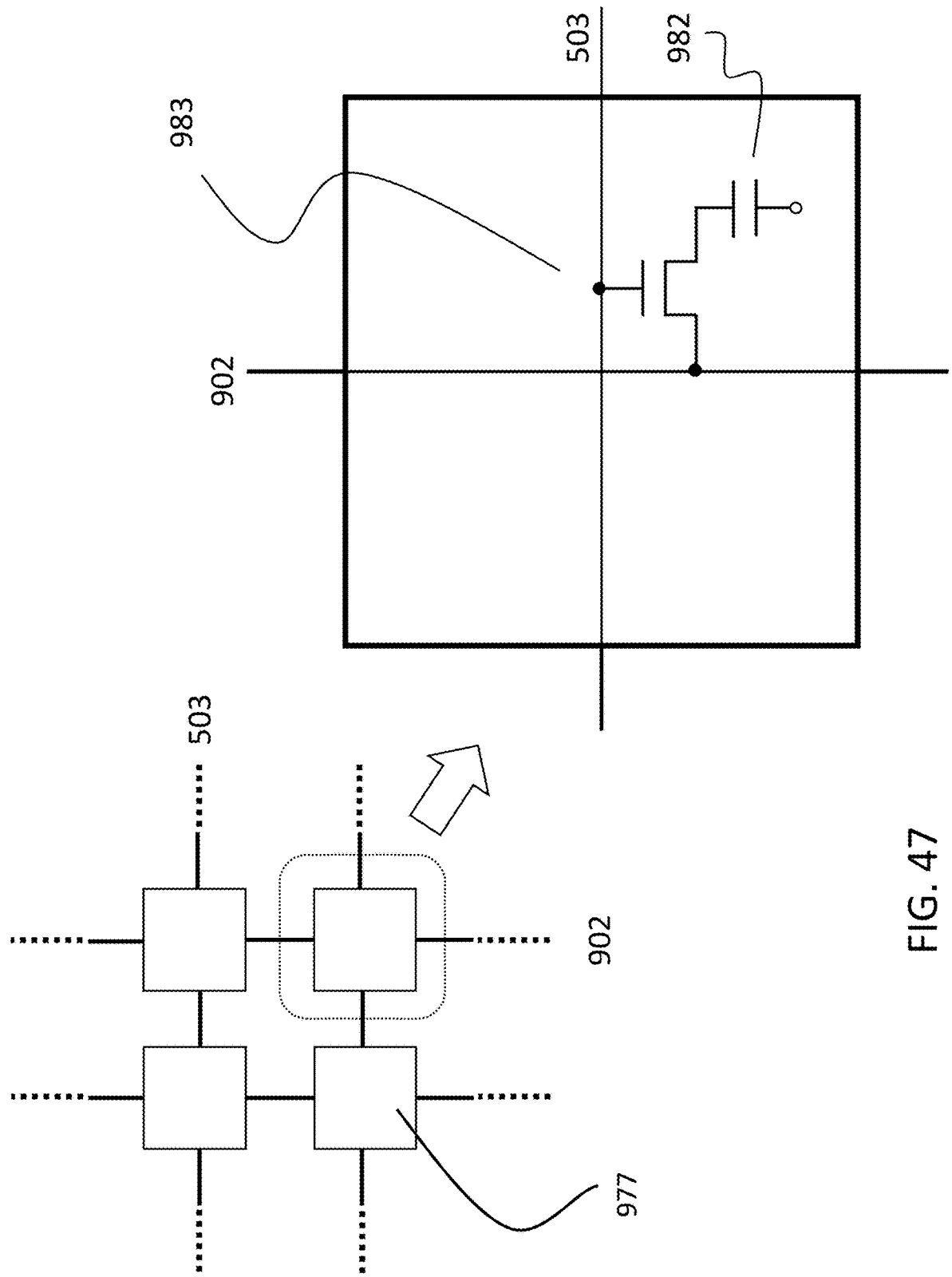
FIG. 47 illustrates an example of the PUF device utilizing the DRAM cell.
Figure 48:
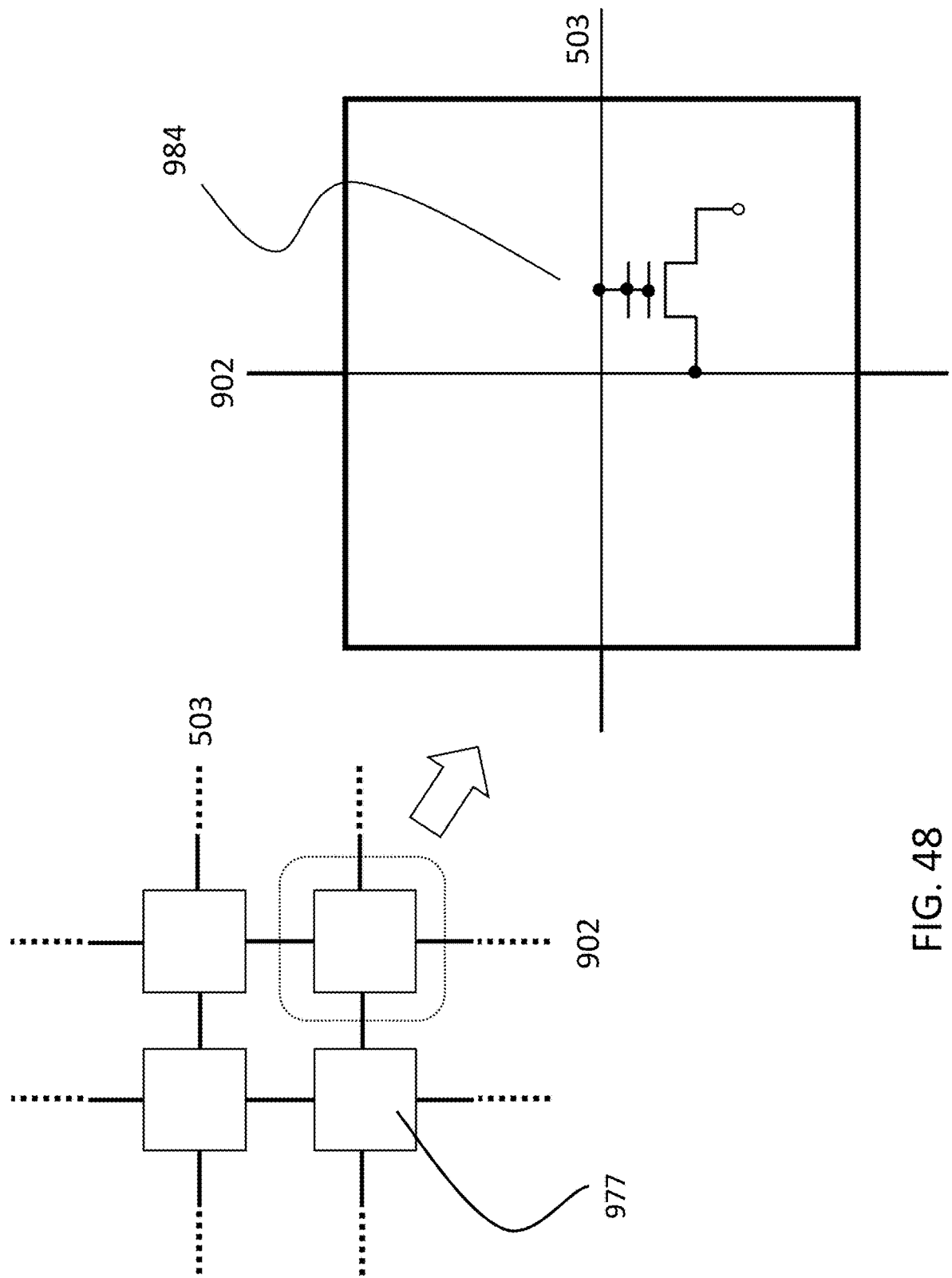
FIG. 48 illustrates an example of the PUF cell utilizing a select transistor of a non-volatile memory.
Figure 49:
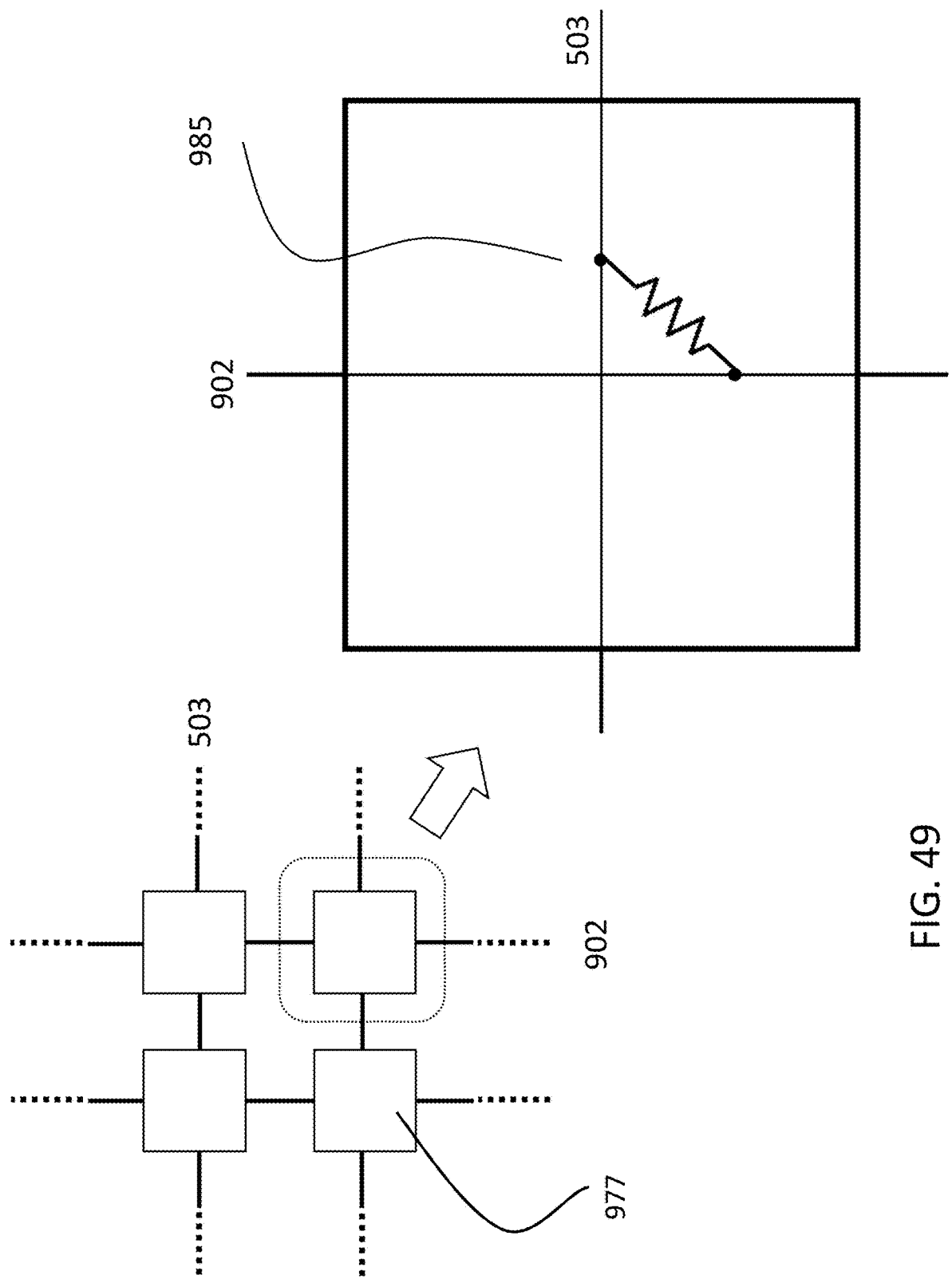
FIG. 49 illustrates an example of the PUF device utilizing a resistor.
Figure 50:
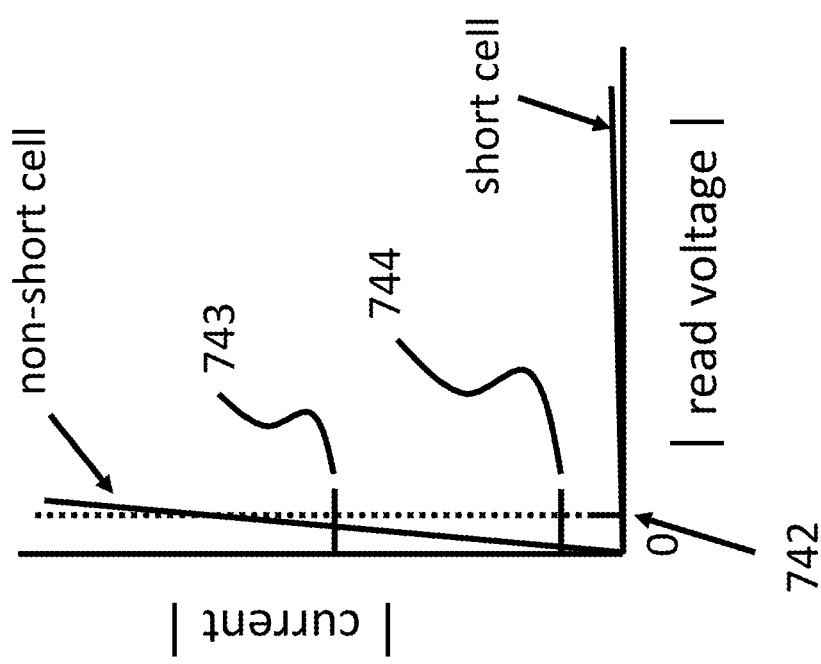
FIG. 50 illustrates an example of the PUF cell utilizing the wiring short.
Figure 51:
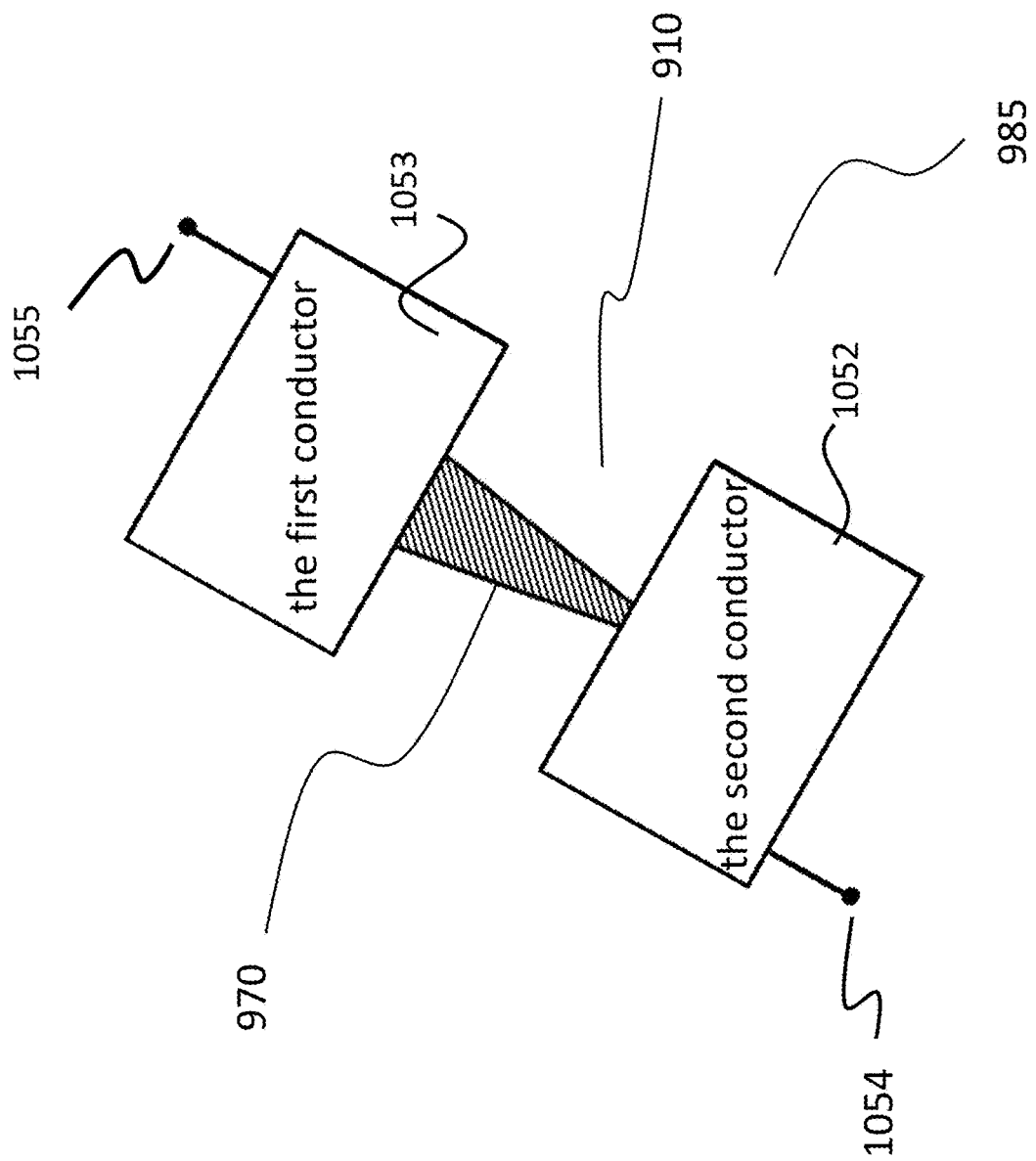
FIG. 51 illustrates an example of the PUF cell with the resistor.
Figure 52:
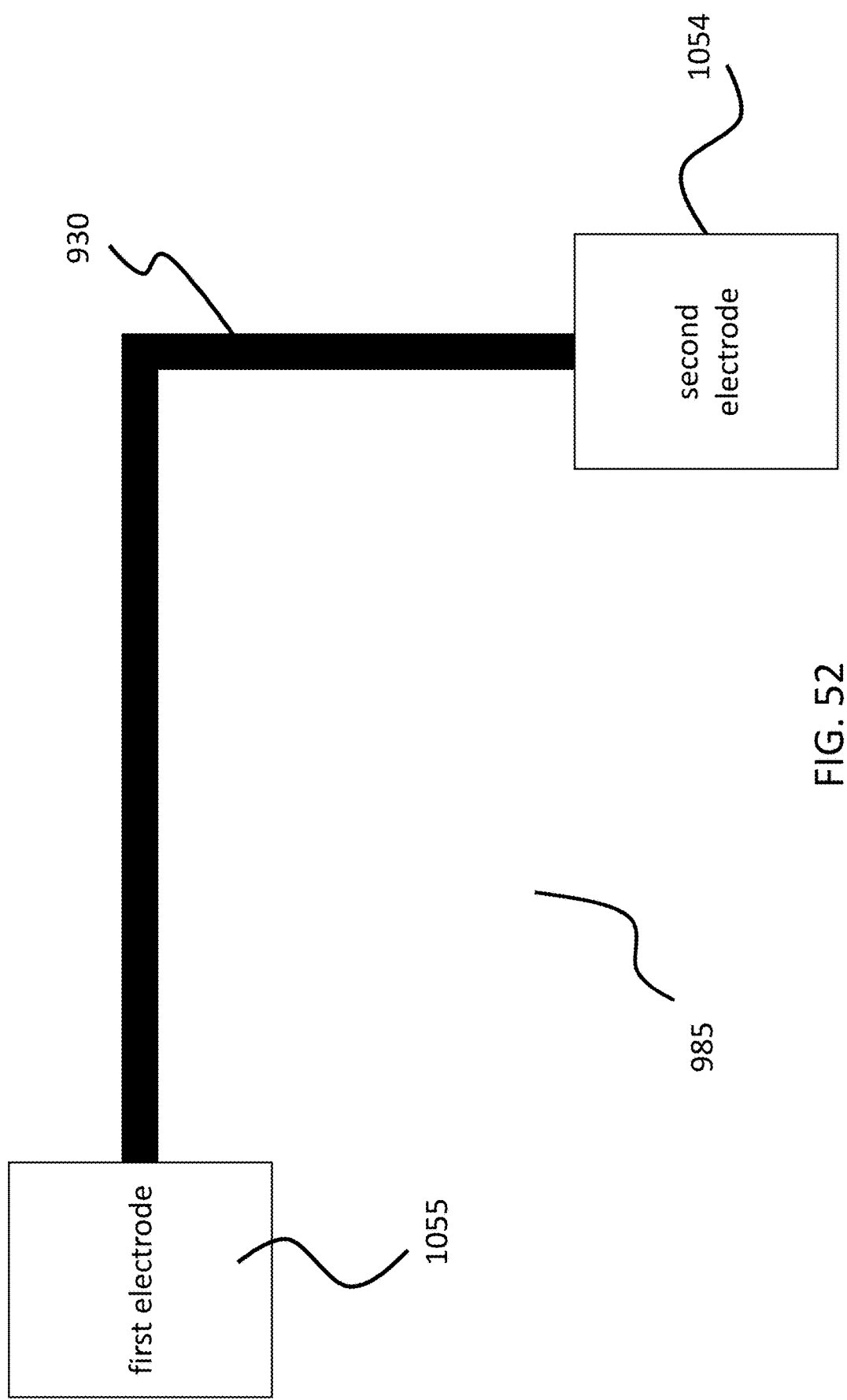
FIG. 52 illustrates an example of the PUF cell utilizing the bended conductive wiring.
Figure 53:
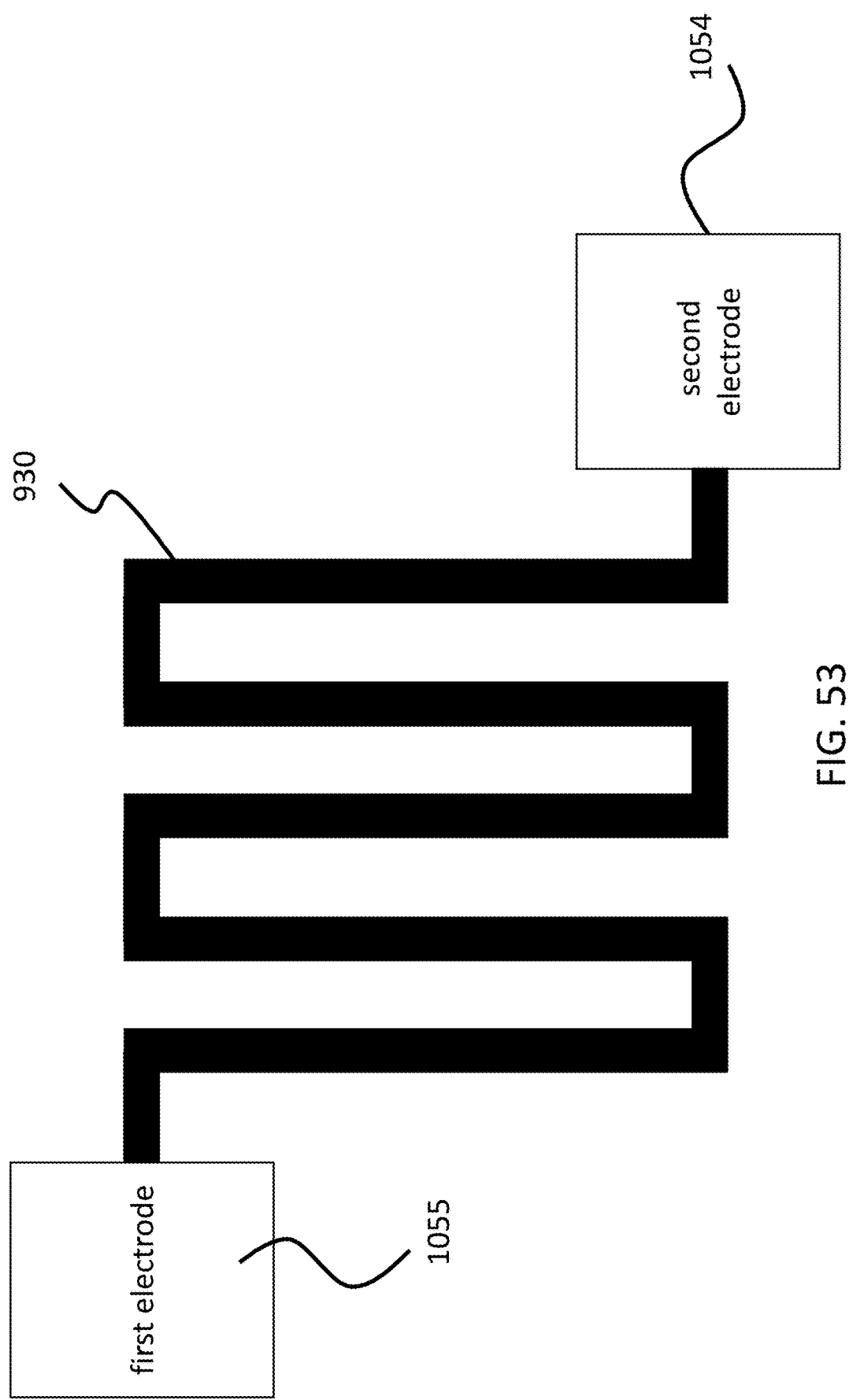
FIG. 53 illustrates an example of the PUF cell utilizing the conductive wiring having a plurality of bended portions.
Figure 54:
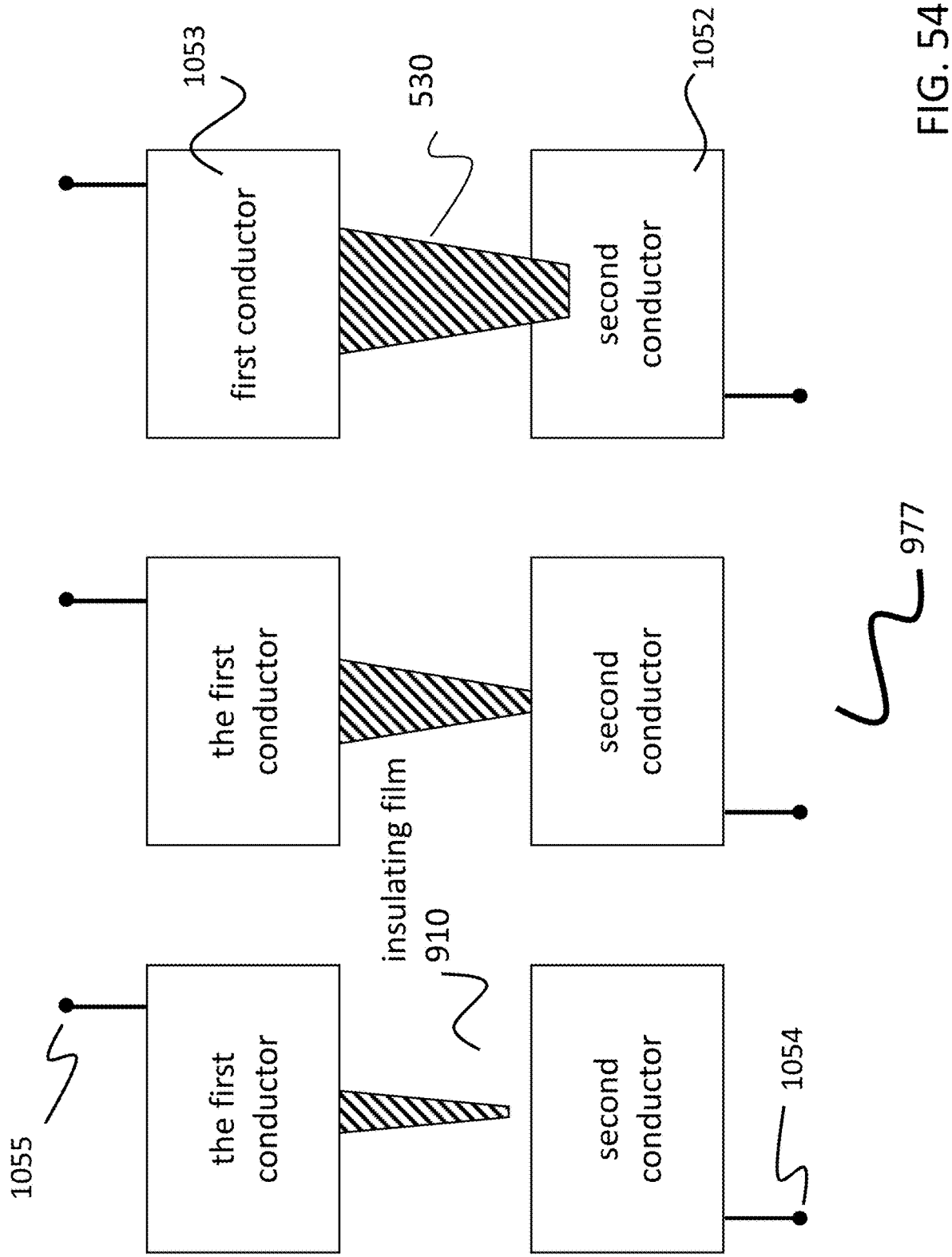
FIG. 54 illustrates an example of the PUF cell utilizing a conductive via.
Figure 55:
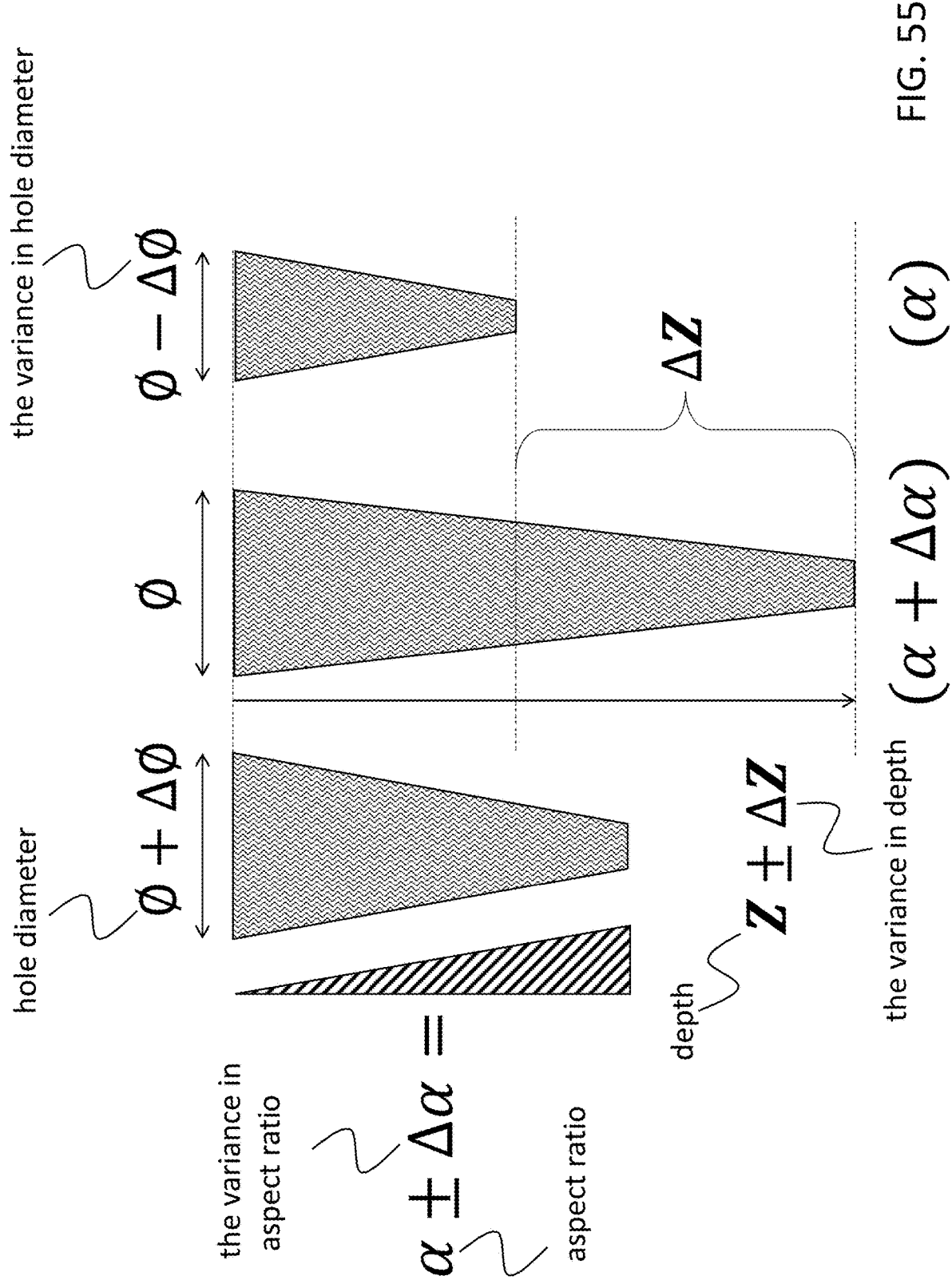
FIG. 55 illustrates a cause where the conductive via varies in depth.
Figure 56:
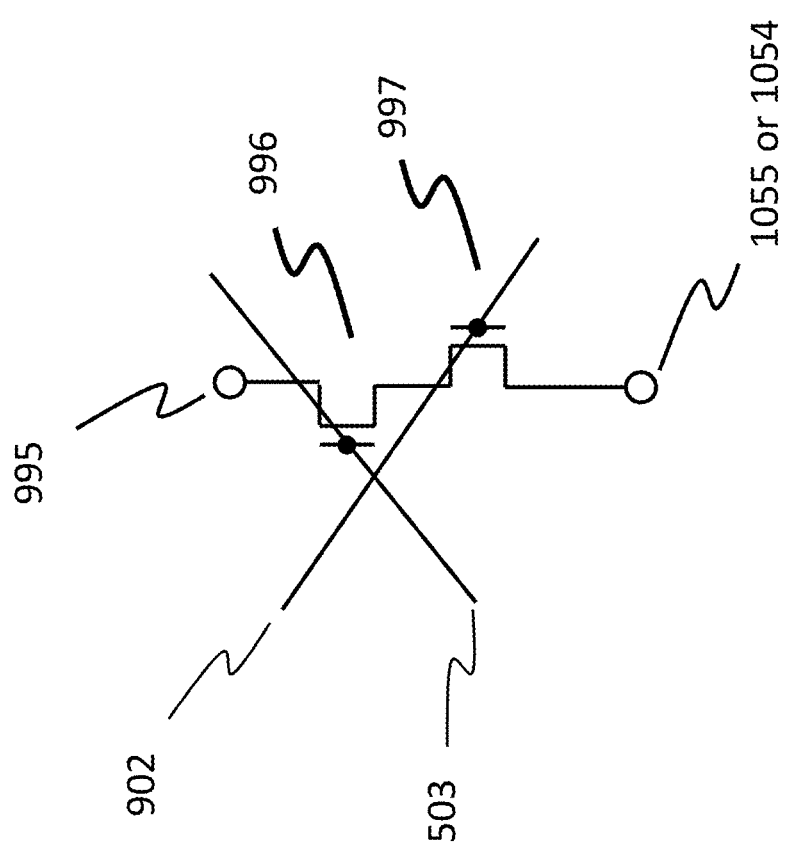
FIG. 56 illustrates an example of addressing a PUF cell.
Figure 57:
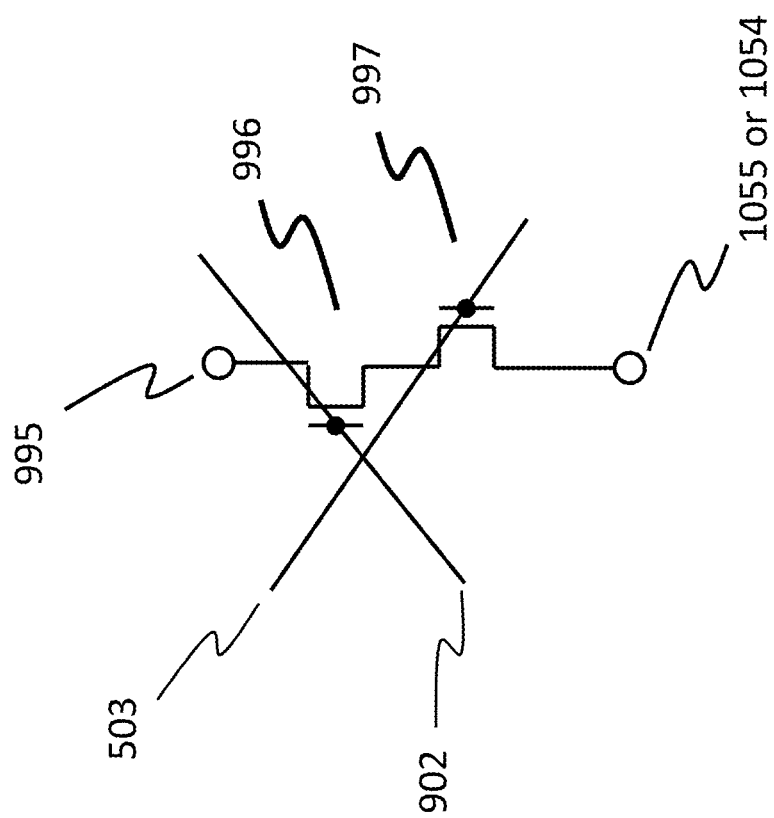
FIG. 57 illustrates an example of addressing the PUF cell.
Figure 58:
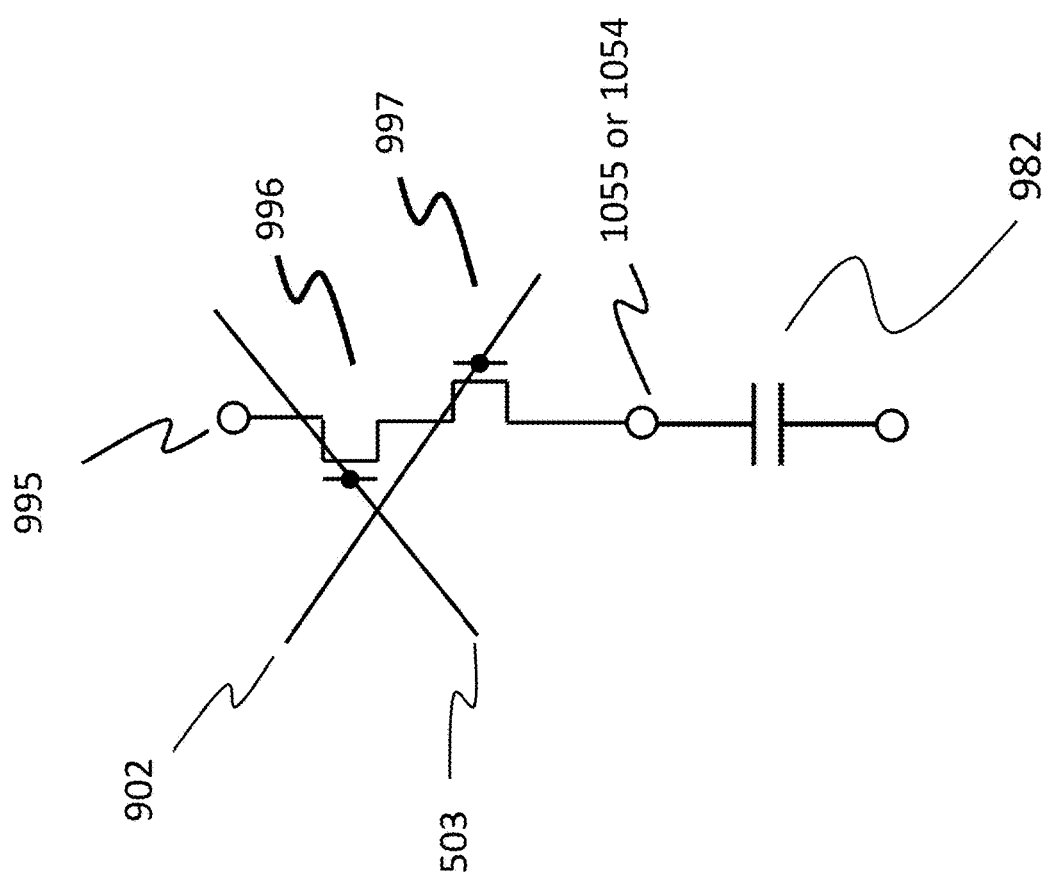
FIG. 58 illustrates an example of addressing the PUF cell utilizing a capacitor.
Figure 59:
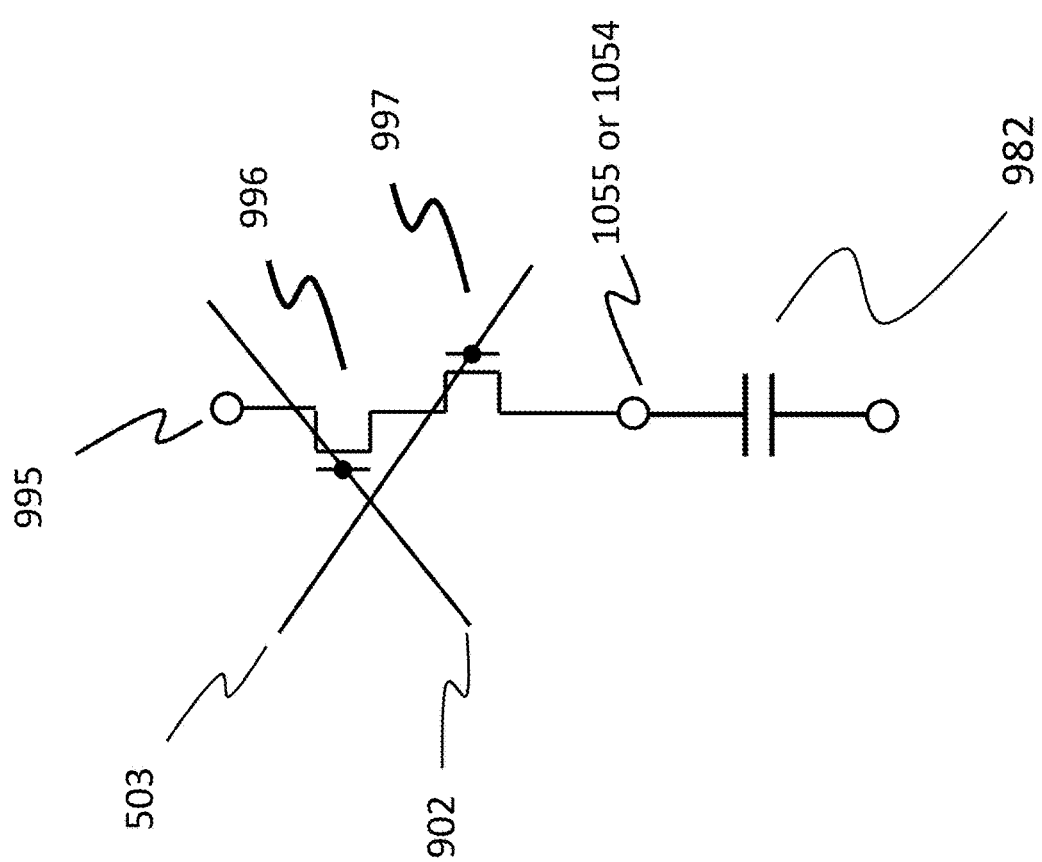
FIG. 59 illustrates an example of addressing the PUF cell utilizing the capacitor.
Figure 60:
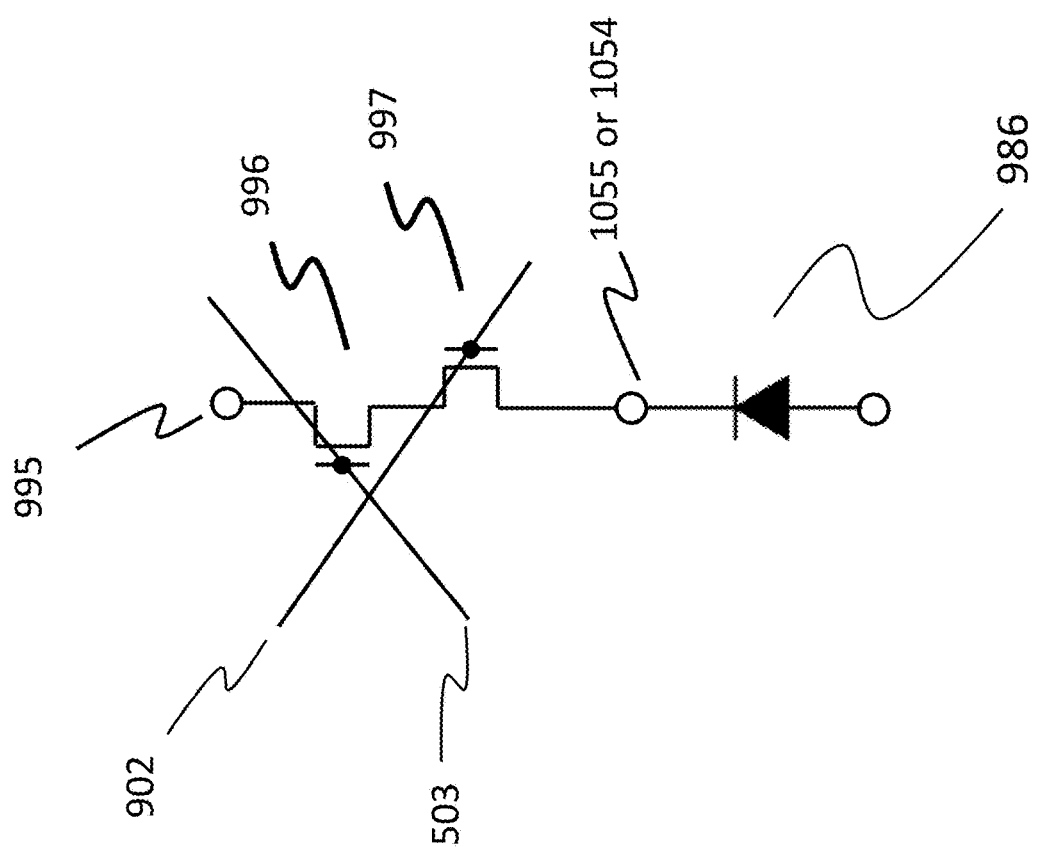
FIG. 60 illustrates an example of addressing the PUF cell utilizing a PN junction.
Figure 61:
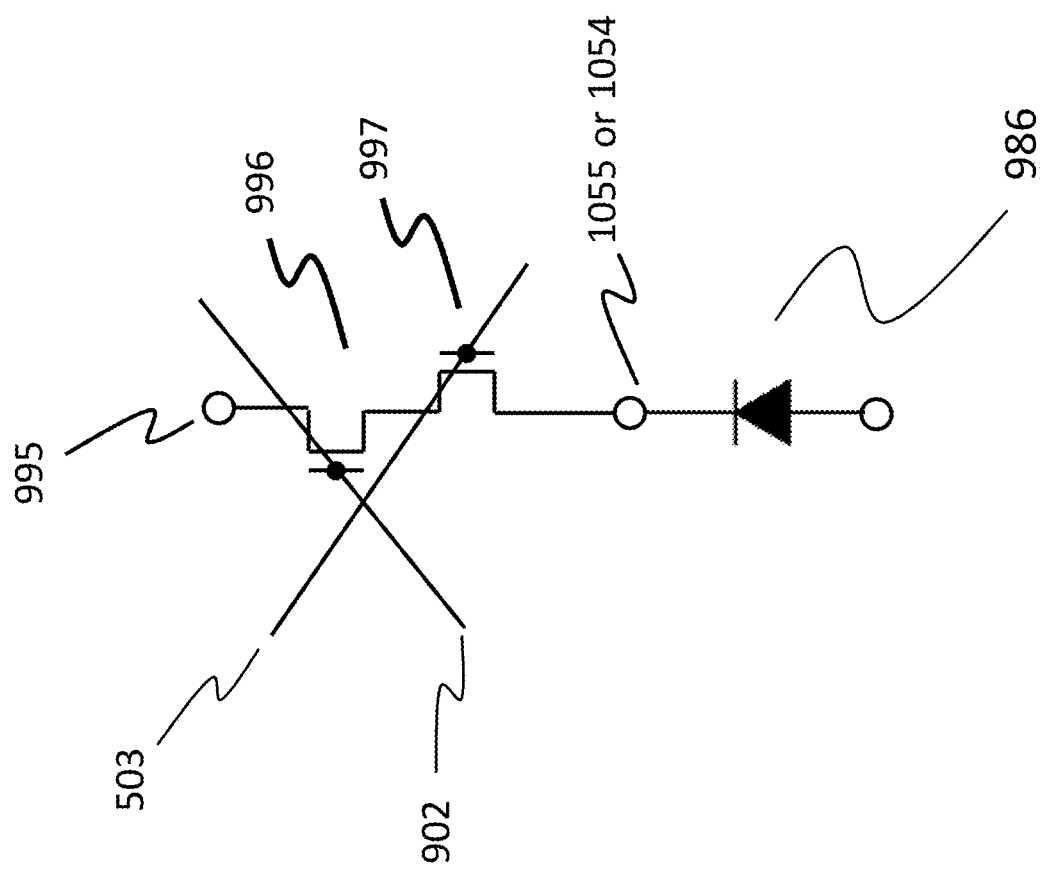
FIG. 61 illustrates an example of addressing the PUF cell utilizing the PN junction.
Figure 62:
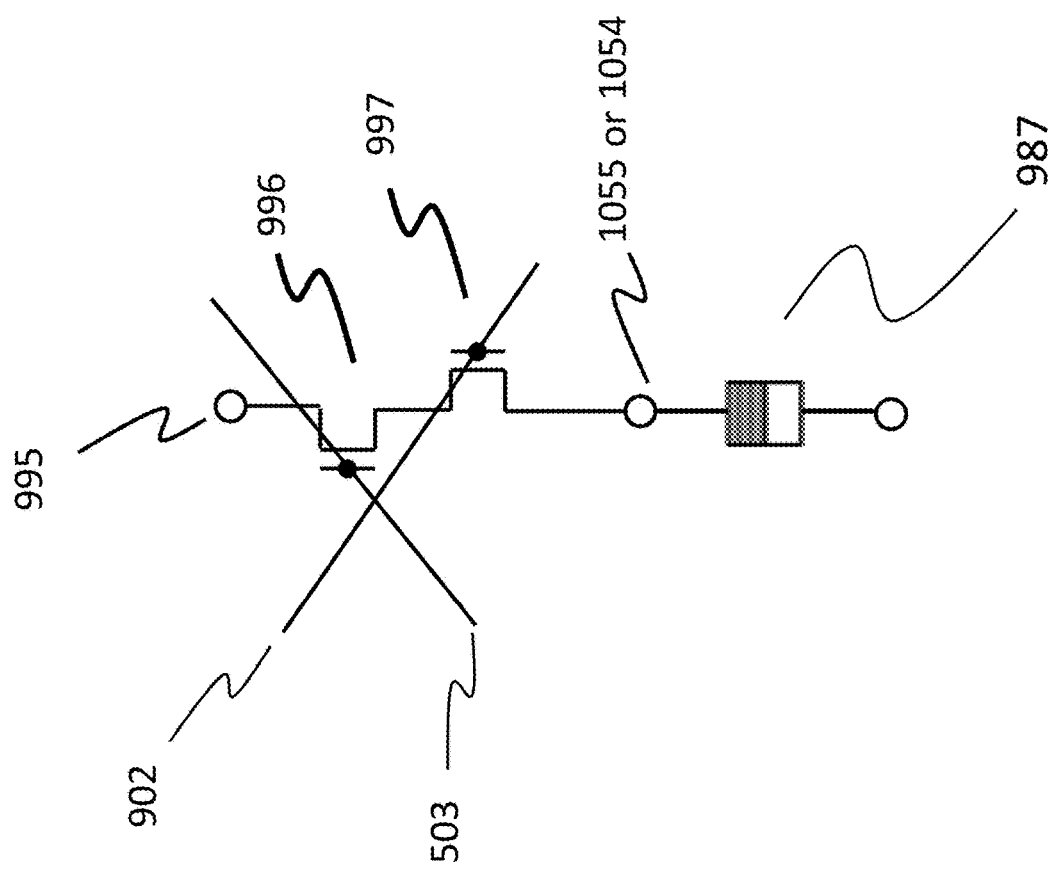
FIG. 62 illustrates an example of addressing the PUF cell utilizing a Schottky junction.
Figure 63:
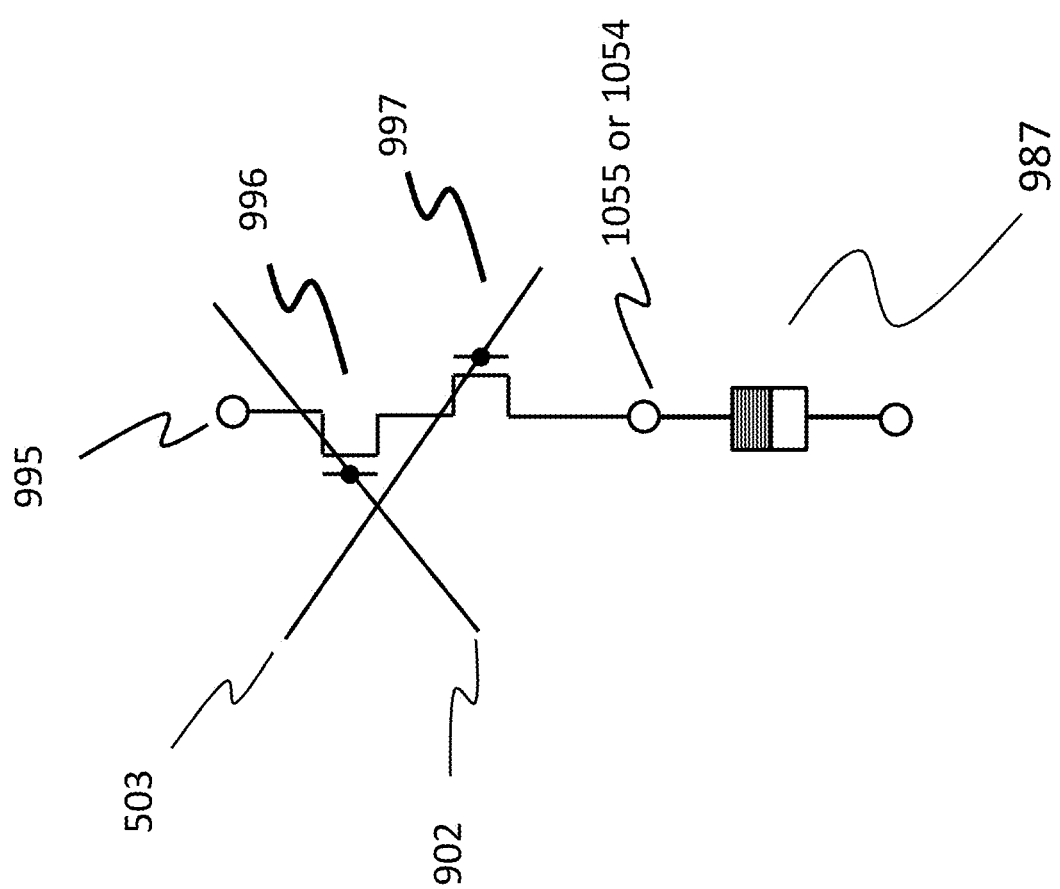
FIG. 63 illustrates an example of addressing the PUF cell utilizing the Schottky junction.
Figure 64:
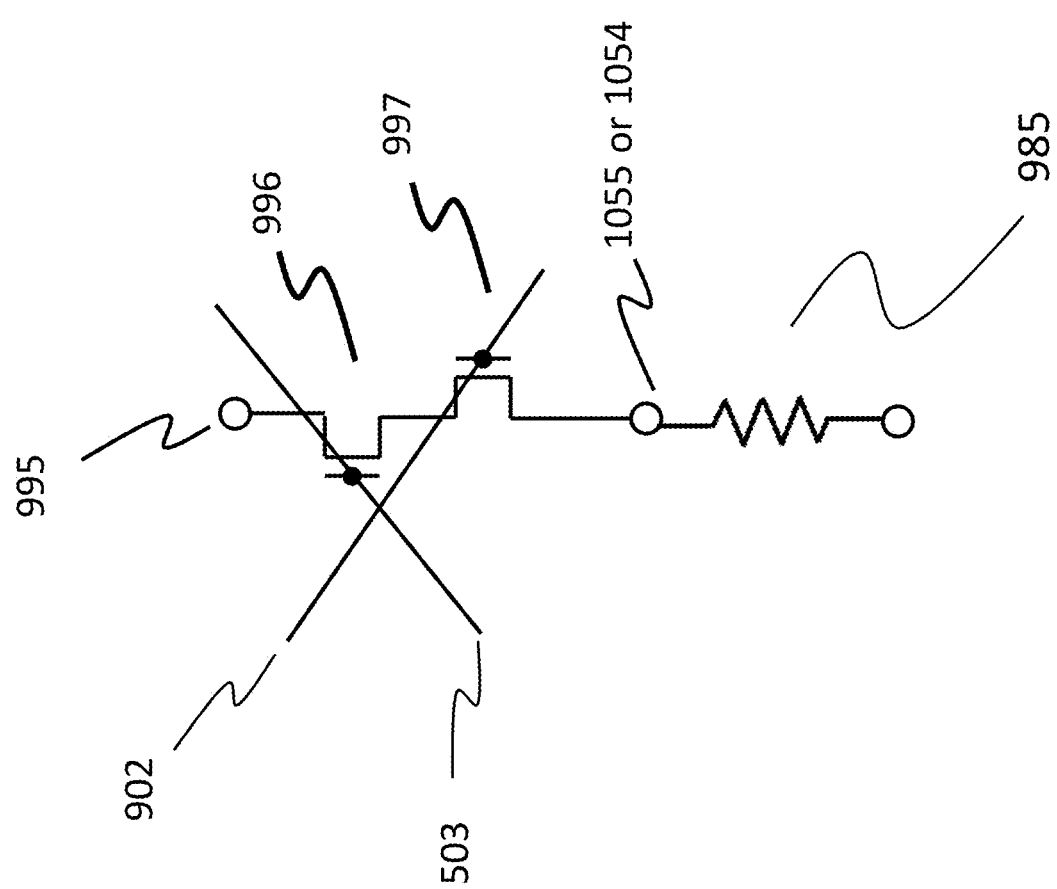
FIG. 64 illustrates an example of addressing the PUF cell utilizing a resistor.
Figure 65:
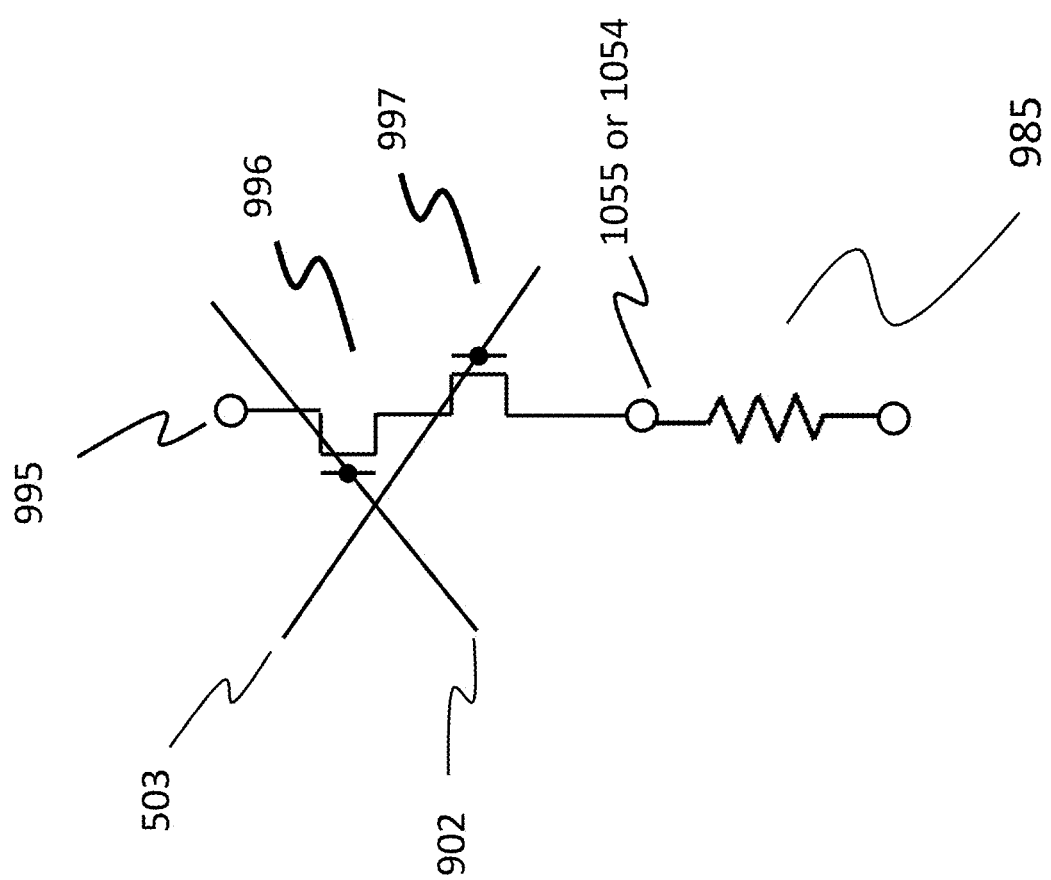
FIG. 65 illustrates an example of addressing the PUF cell utilizing the resistor.
Figure 66:
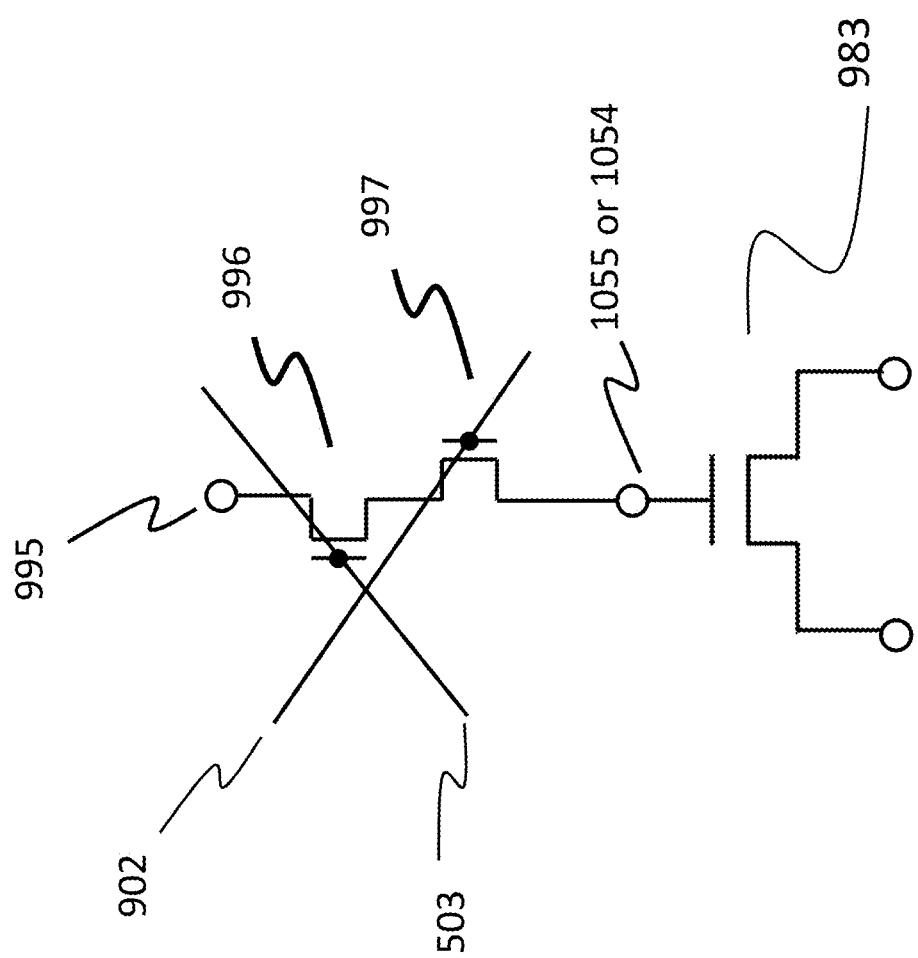
FIG. 66 illustrates an example of addressing the PUF cell utilizing a MOSFET.
Figure 67:
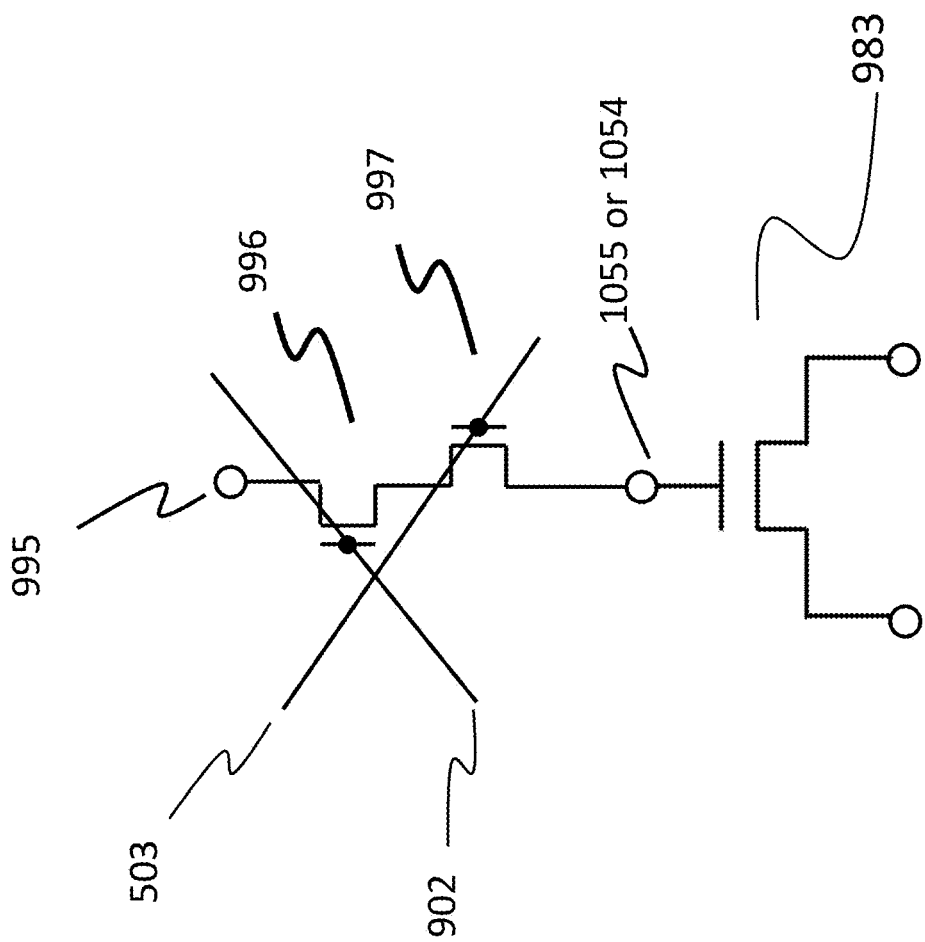
FIG. 67 illustrates an example of addressing the PUF cell utilizing the MOSFET.
Figure 68:
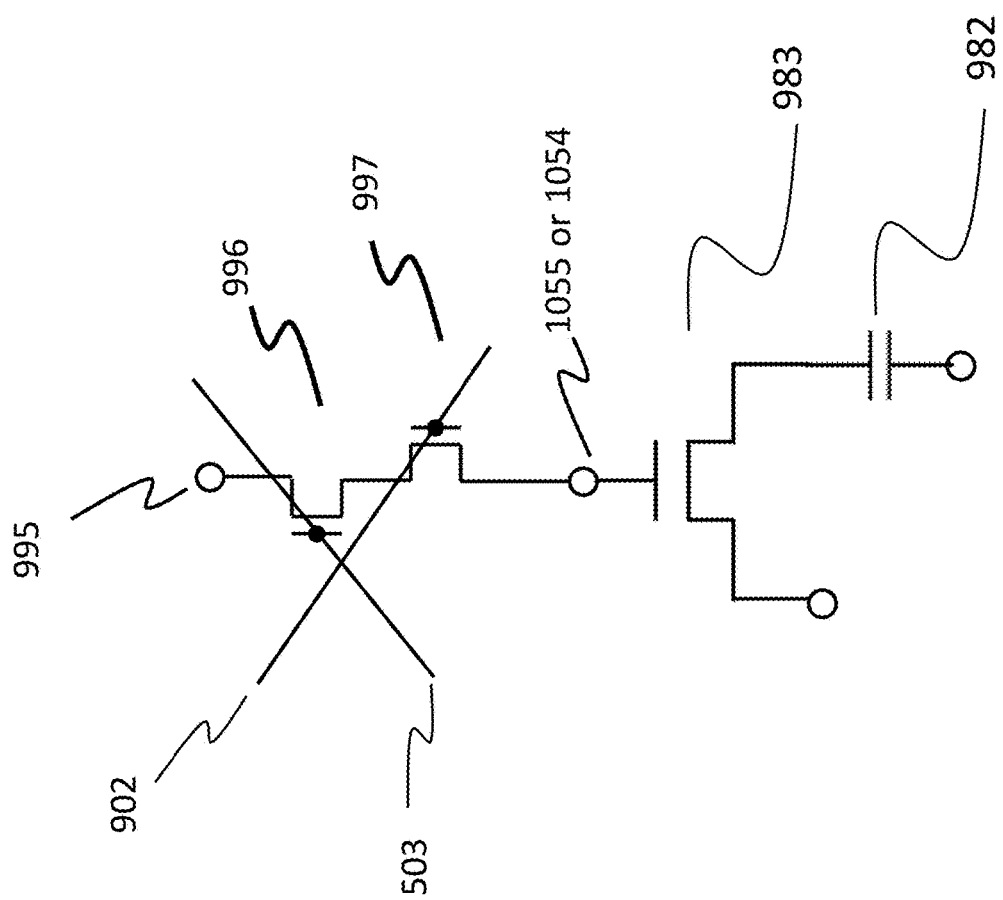
FIG. 68 illustrates an example of addressing the PUF cell utilizing a DRAM cell.
Figure 69:
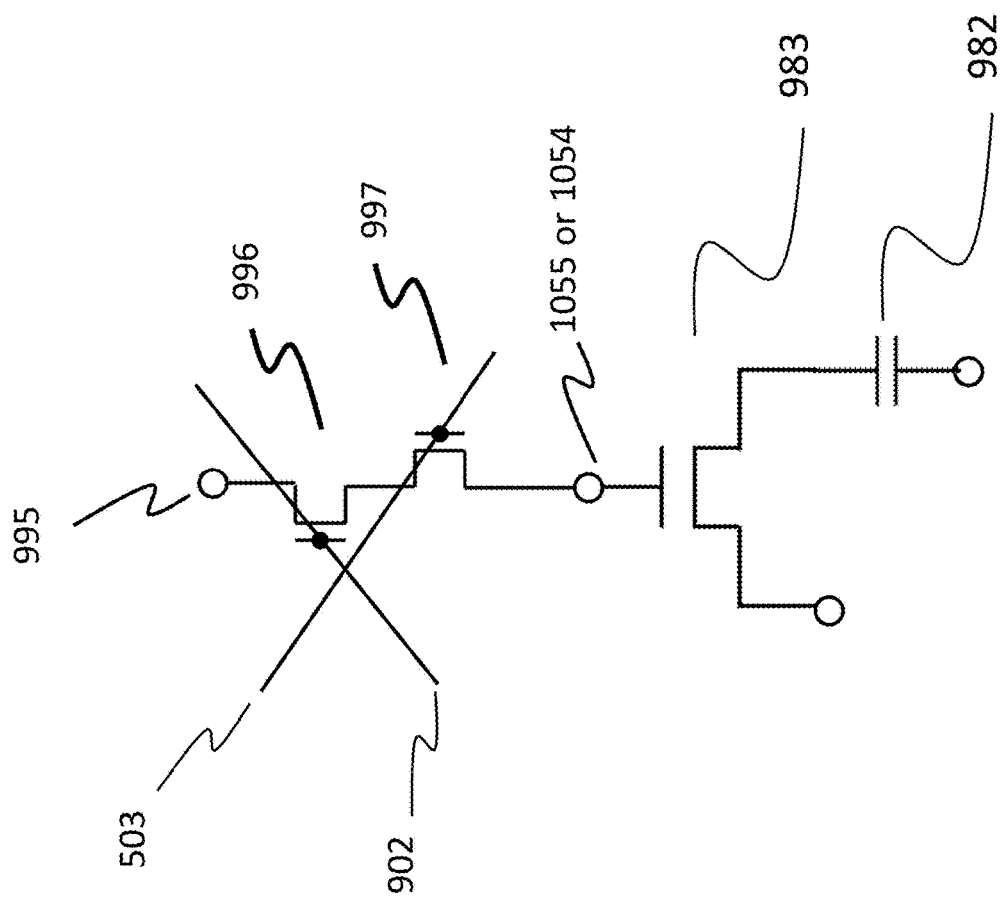
FIG. 69 illustrates an example of addressing the PUF cell utilizing the DRAM cell.
Figure 70:
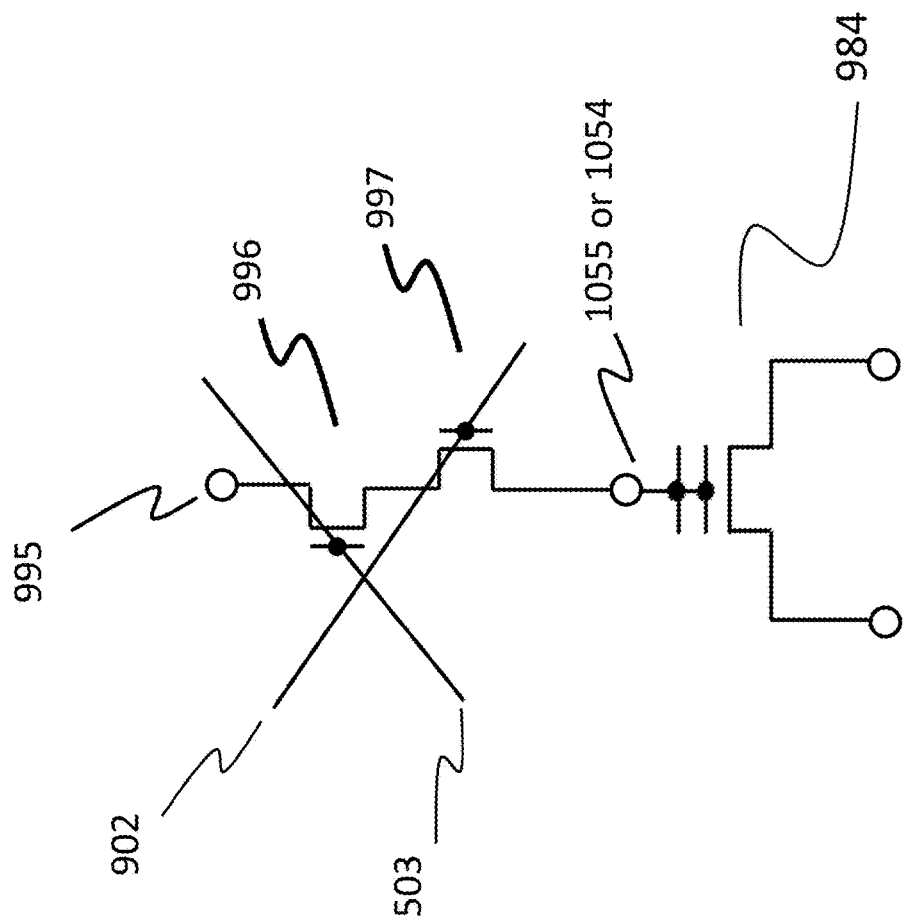
FIG. 70 illustrates an example of addressing the PUF cell utilizing a select transistor of a non-volatile memory.
Figure 71:
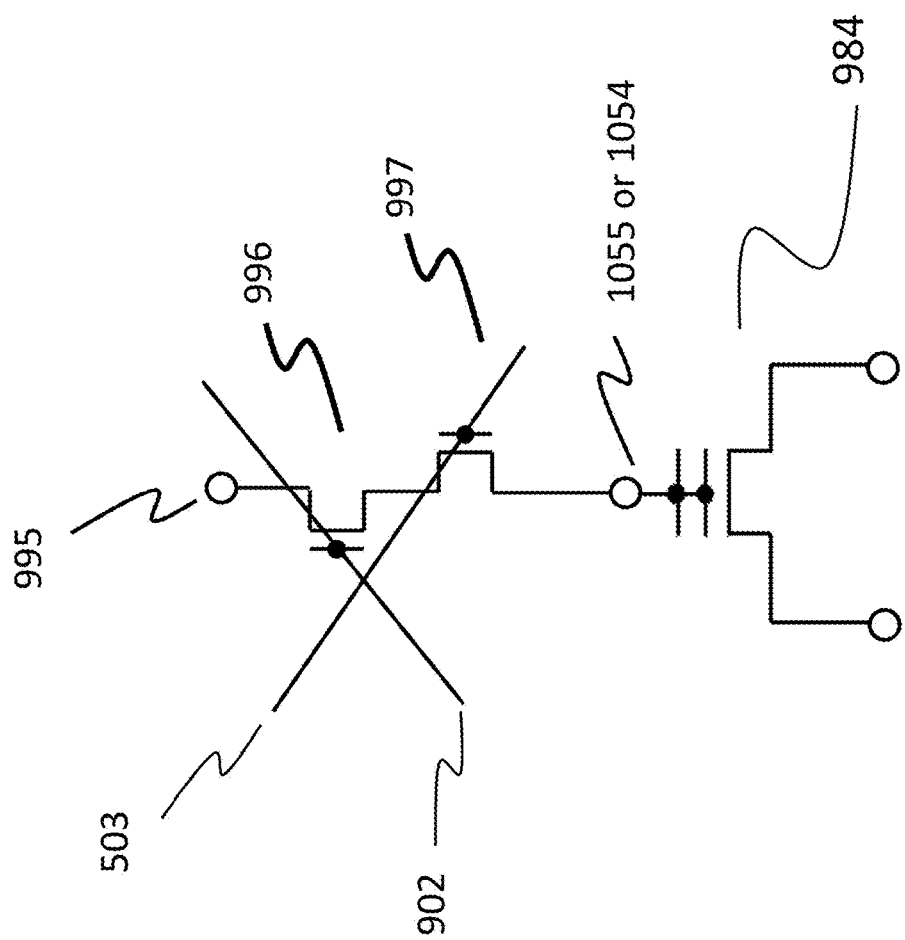
FIG. 71 illustrates an example of addressing the PUF cell utilizing the select transistor of the non-volatile memory.
Figure 72:
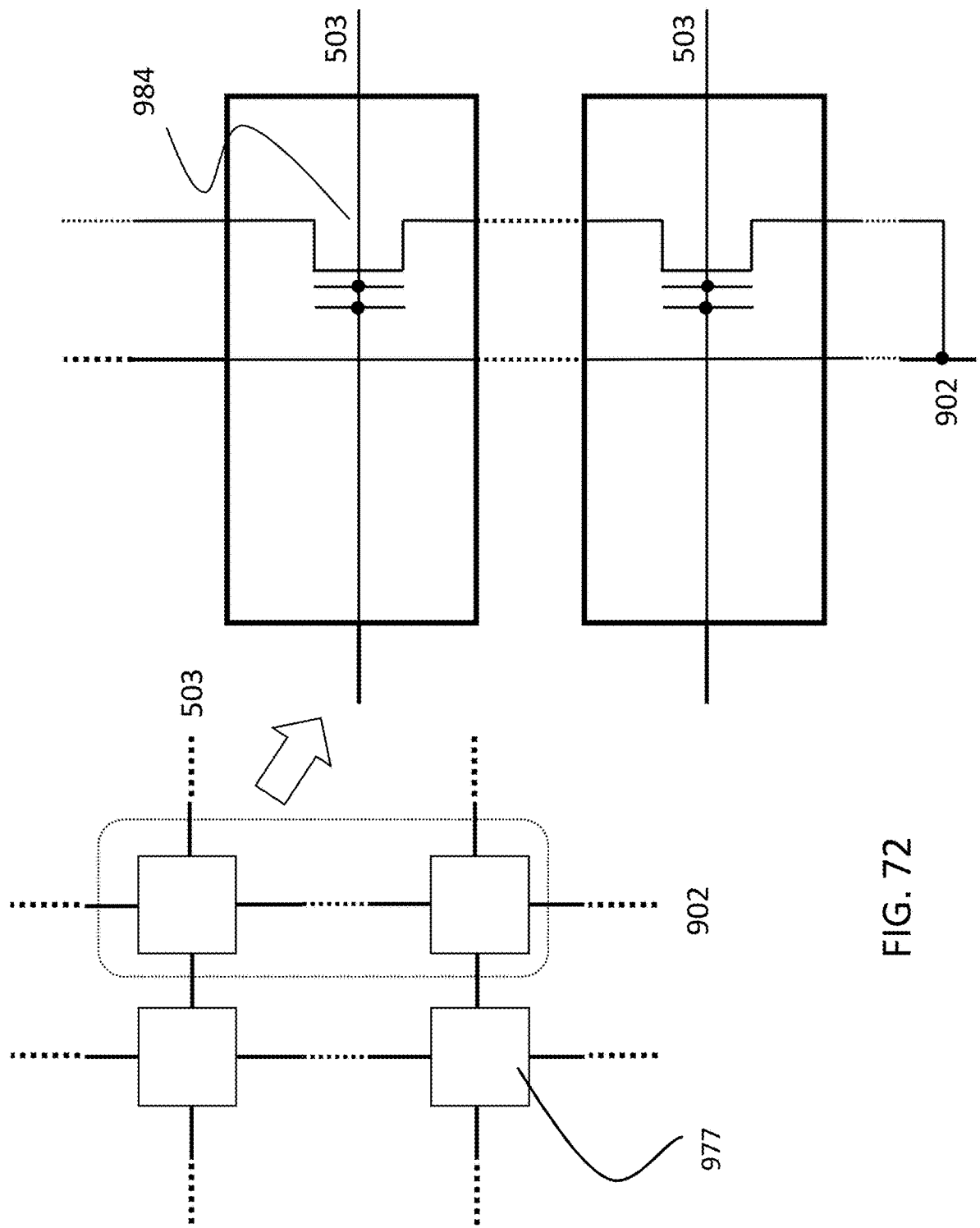
FIG. 72 illustrates an example of the PUF cells which are select transistors arranged in the NAND-type array.
Figure 73:
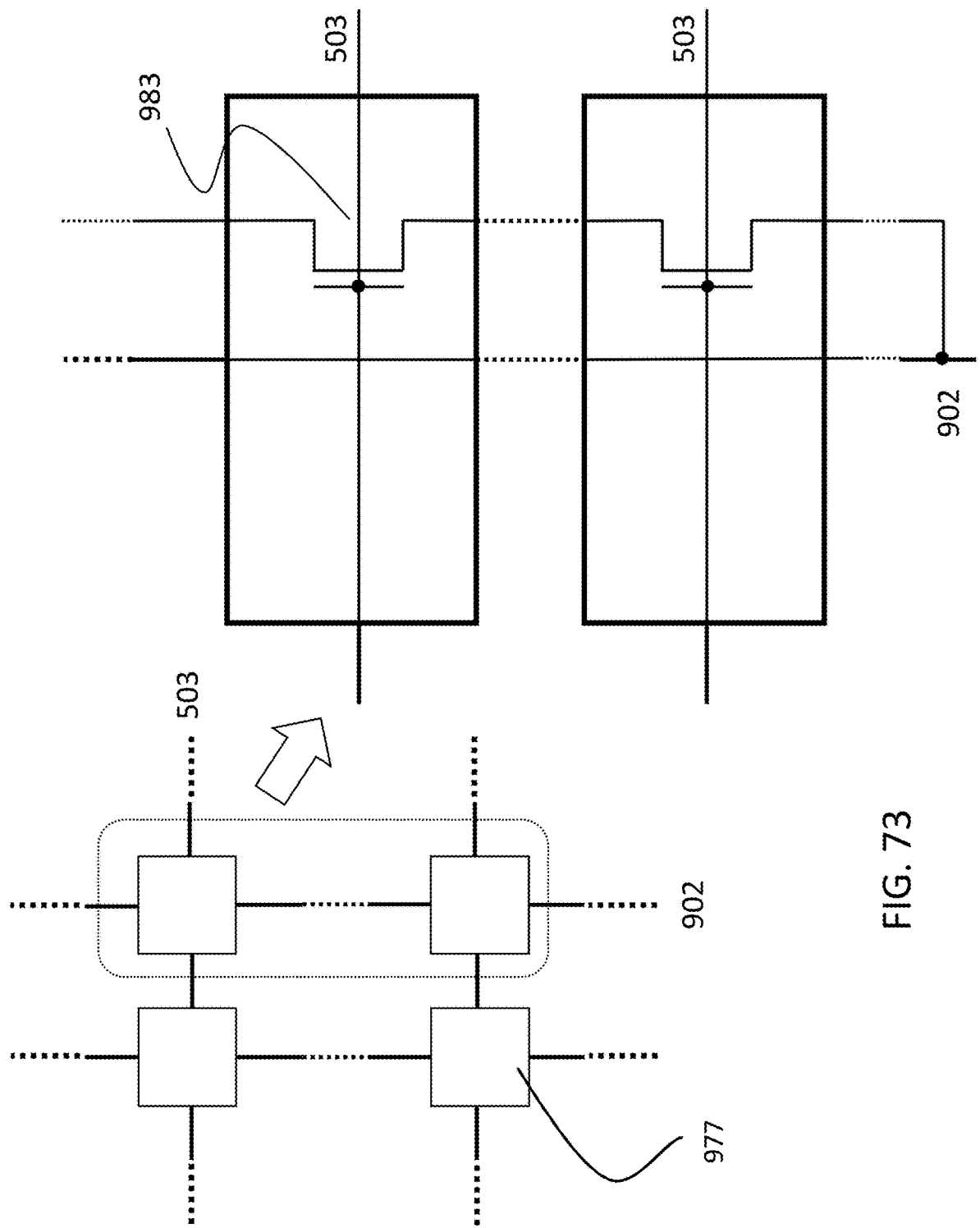
FIG. 73 illustrates an example of the PUF cells which are MOSFETs arranged in the NAND-type array.
Figure 74:
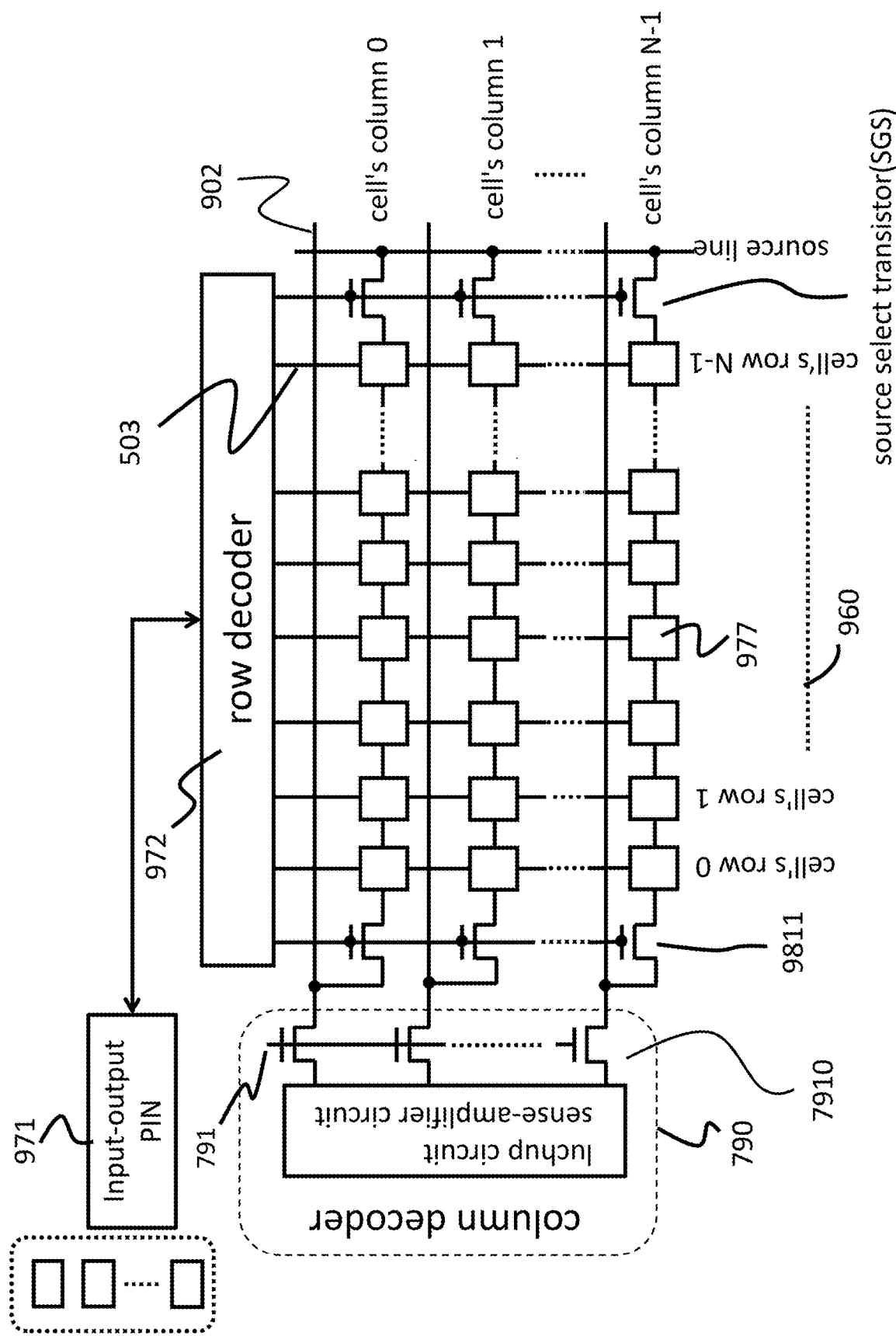
FIG. 74 illustrates an example of a read method of the PUF cells arranged in the NAND-type array.
Figure 75:
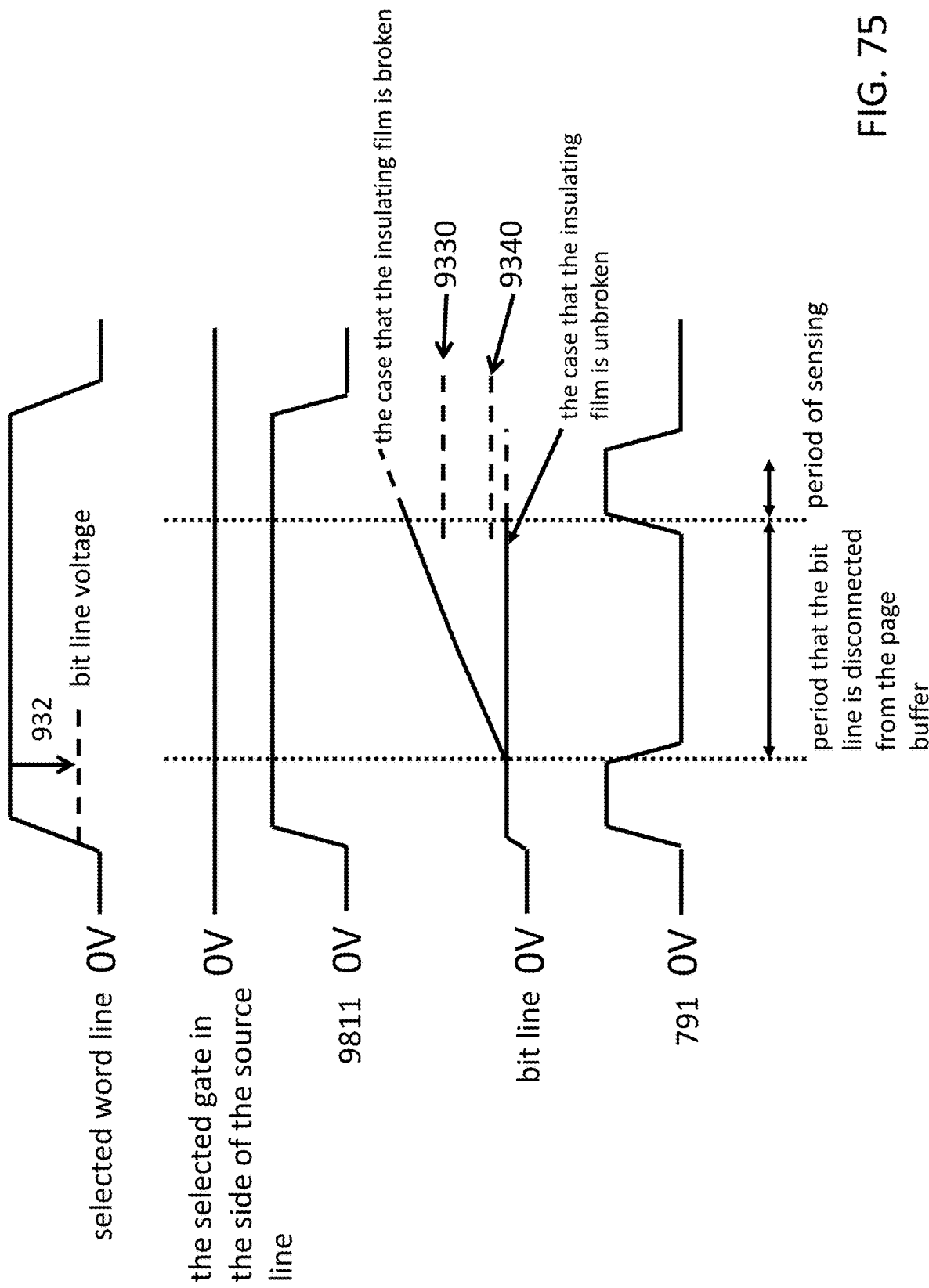
FIG. 75 illustrates an example of a pulse to read the PUF cells arranged in the NAND-type array.
Figure 76:
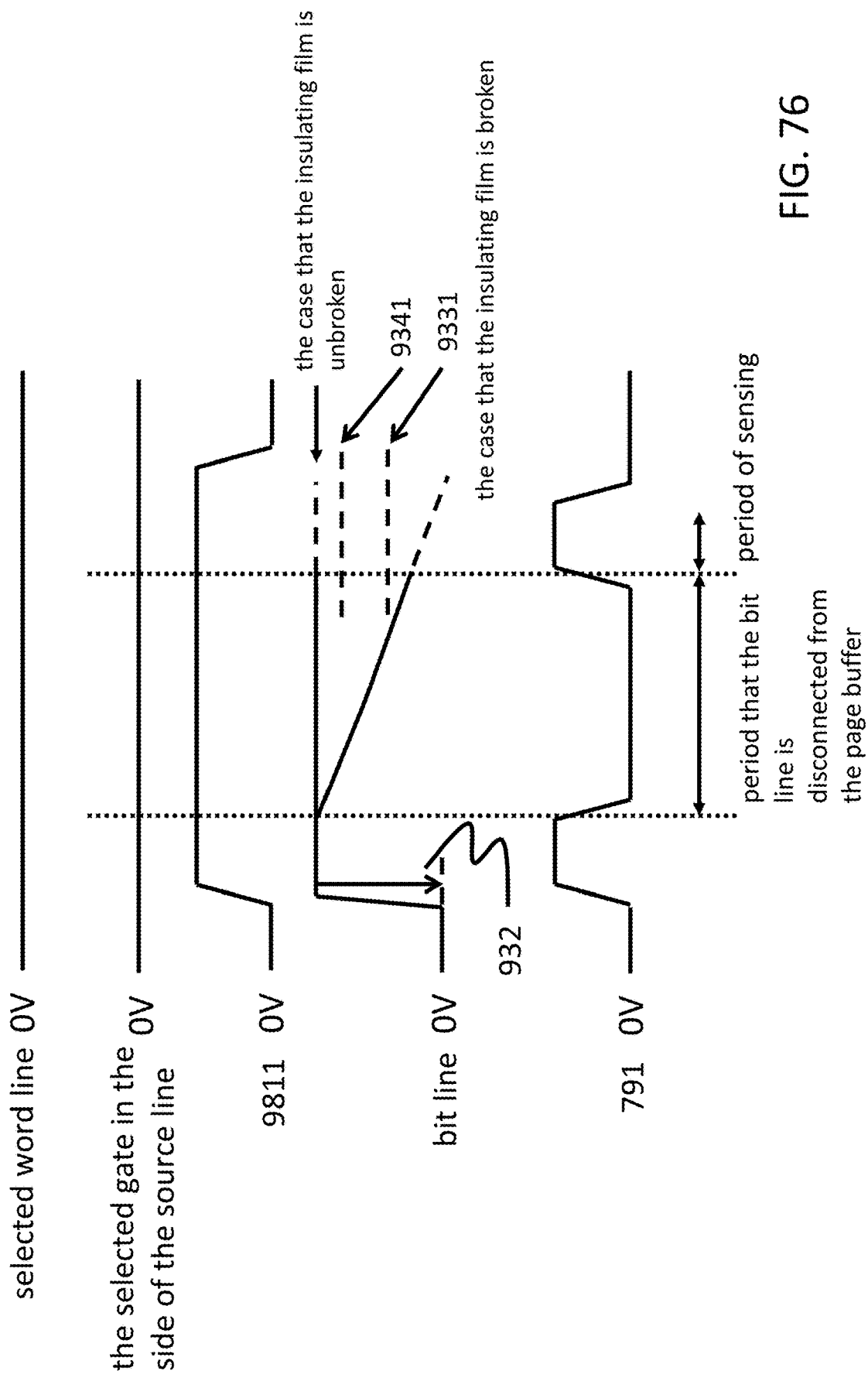
FIG. 76 illustrates an example of the pulse to read the PUF cells arranged in the NAND-type array.
Figure 77:
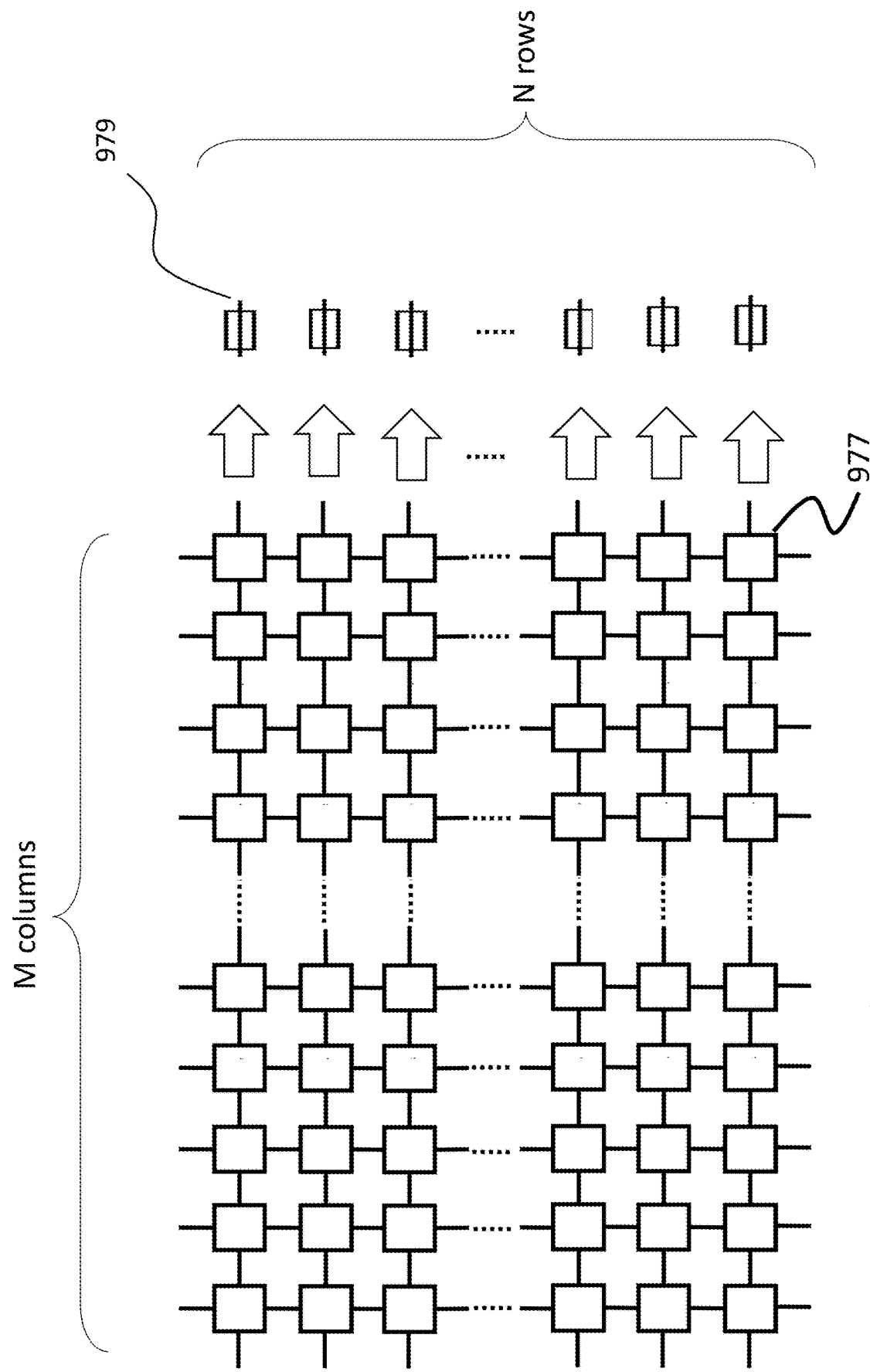
FIG. 77 illustrates a cell array for the PUF devices utilizing hypallage cells.

This input-output control module 810 may include an input-output control circuit and a buffer for data input-output but not the word line control circuit and the bit line control circuit. The scramble device module 890 includes the scramble device 604 of FIG. 32. The temporal code generated by the scramble device 604 is stored in the buffer module for temporal code 900, which is independent from the input-output control module 810. The temporal code is not output to the exterior of the chip 10 even though it is requested from the exterior. This is for confining the temporal code within the chip. The PUF control module 880 may include the word line control circuit, the bit line control circuit and the data buffer. Moreover, as illustrated in FIG. 40, the PUF control module 880 may also include an inner storage to recode the addresses corresponding to the mode "X". The similar storage to recode the mode "X" may be included in the scramble device module 890 as necessary.

If a set of input code $\{a(i)\}$ and $\{b(j)\}$ is input via the external input-output 50, the input-output control module 810 forwards the set of the input code $\{a(i)\}$ and $\{b(j)\}$ to the scramble device module 890. Here, the temporal code $\{f(i, j)\}$ generated according to the equation 2 is temporarily stored by the buffer module for temporal code 900 and then forwarded to the PUF control module 880. The PUF control module 880 has a command of the inner word line control circuit, the inner bit line control circuit, the inner data buffer and so forth to generate the output code {c(i, j)} in response to the random number code {d(i, j)} obtained from the PUF module 6000 and the temporal code {f(i, j)} according to the equation 3. The generated output code {c(i, j)} serves as a private key in the examples of FIGS. 85-88 and 95-98. The output code {c(i, j)} is input to the key generation module 891 to generate a public key. The input-output control module 810 outputs the public key to the exterior of the chip 10 via the external input-output 50. In this way, the private key can be confined in the chip.

Or, if the input code {a(i)} is input via the external input-output 50, the input-output control module 810 forwards the input code {a(i)} to the scramble module 890. Here, the temporal code {f(i)} generated according to the equation 5 is temporarily stored in the buffer module for temporal code 900 and then forwarded to the PUF control module 880. The PUF control module 880 has a command of the inner word line control circuit, the inner bit line control circuit, the inner data buffer and so forth to generate the output code {c(i)} in response to the random number code {d(i)} obtained from the PUF module 6000 and the temporal code {f(i)} according to the equation 6. The generated output code {c(i)} serves as a private key in the examples of FIGS. 85-88 and 95-98. The output code {c(i)} is input to the key generation module 891 to generate a public key. The input-output control module 810 outputs the public key to the exterior of the chip 10 via the external input-output 50. On the other hand, the private key can be confined in the chip.

Figure 112:
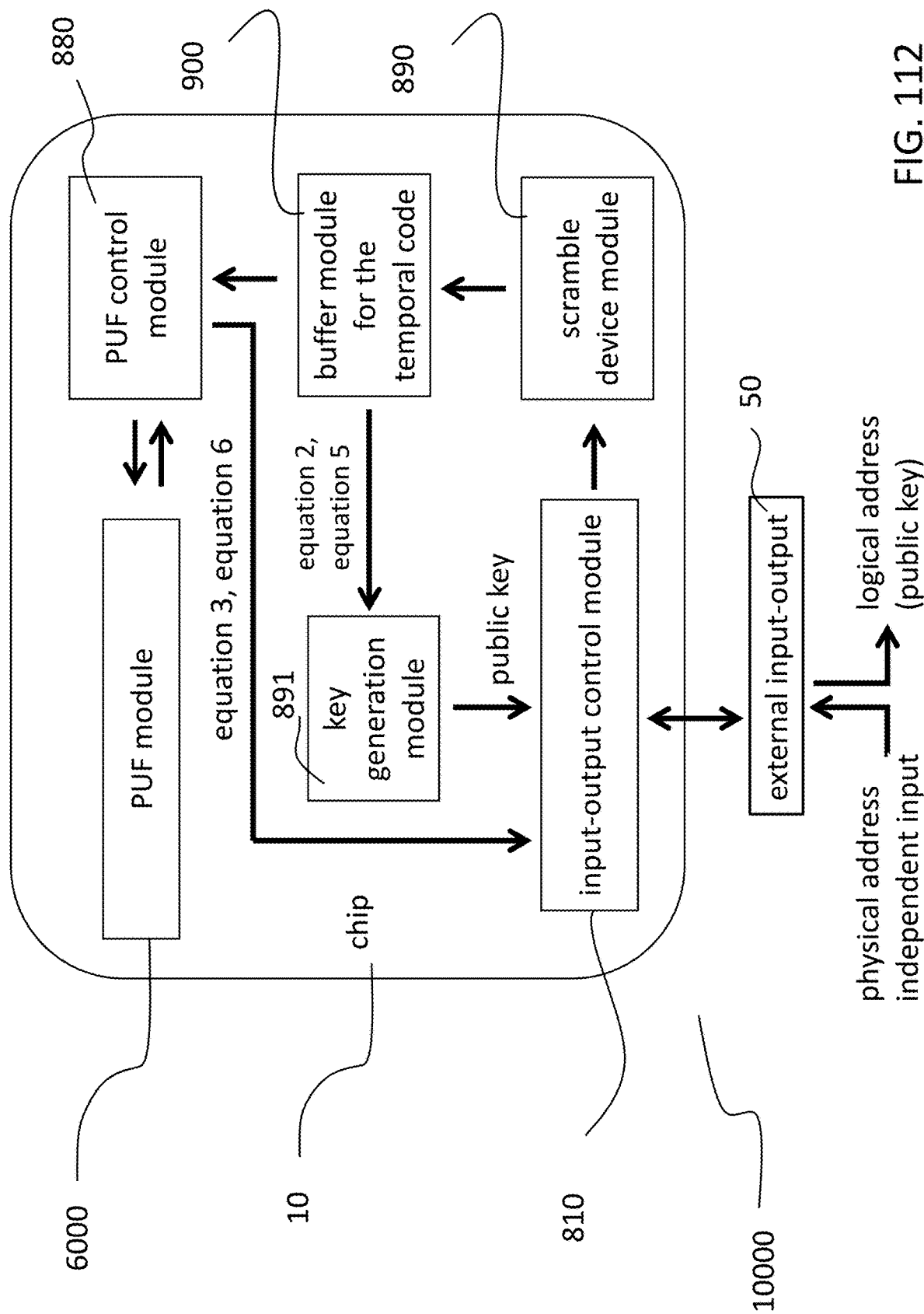
FIG. 112 illustrates an example of a configuration that the identification core related to the present invention confines the private key and generates the public key forming a unique pair with the private key, and outputs the public key to the exterior of the identification core.

The identification core 10000 related to the present invention, as illustrated in FIG. 112 as an example, includes at least the input-output control module 810, the scramble device module 890, the buffer module for temporal code 900, and the key generation module 891. Then, they are equipped in the chip 10.

This input-output control module 810 may include an input-output control circuit and a buffer for data input-output but not the word line control circuit and the bit line control circuit. The scramble device module 890 includes the scramble device 604 of FIG. 32. The temporal code generated by the scramble device 604 is stored in the buffer module for temporal code 900, which is independent from the input-output control module 810. The temporal code is not output to the exterior of the chip 10 even though it is requested from the exterior. This is for confining the temporal code within the chip. The scramble device module 890 may include the word line control circuit, the bit line control circuit and the data buffer. Moreover, as illustrated in FIG. 40, the scramble device module 890 may also include an inner storage to recode the addresses corresponding to the mode "X" as necessary.

If a set of the input code {a(i)} and {b(j)} is input via the external input-output 50, the input-output control module 810 forward the set of the input code {a(i)} and {b(j)} to the scramble device module 890. Here, the temporal code {f(i, j)} generated according to the equation 2 is temporarily stored by the buffer module for temporal code 900. The generated temporal code {f(i, j)} serves as a private key in the examples of FIGS. 85-88 and 95-98. The temporal code {f(i, j)} is input to the key generation module 891 to generate a public key. The input-output control module 810 outputs the public key to the exterior of the chip 10 via the external input-output 50. On the other hand, the private key can be confined in the chip. Moreover, the output code {c(i, j)} generated in a similar manner to FIG. 84 may be used for different purposes from the private key for the block chain. For example, it may be used for physical address.

Or, if the input code {a(i)} is input via the external input-output 50, the input-output control module 810 forwards the input code {a(i)} to the scramble module 890. Here, the temporal code {f(i)} generated according to the equation 5 is temporarily stored in the buffer module for temporal code 900. The generated temporal code {f(i)} serves as a private key in the examples of FIGS. 85-88 and 95-98. The temporal code {f(i)} is input to the key generation module 891 to generate a public key. The input-output control module 810 outputs the public key to the exterior of the chip 10 via the external input-output 50. On the other hand, the private key can be confined in the chip. Moreover, the output code {c(i)} generated in a similar manner to FIG. 84 may be used for different purposes from the public key for the block chain. For example, it may be used for physical address.

Figure 113:
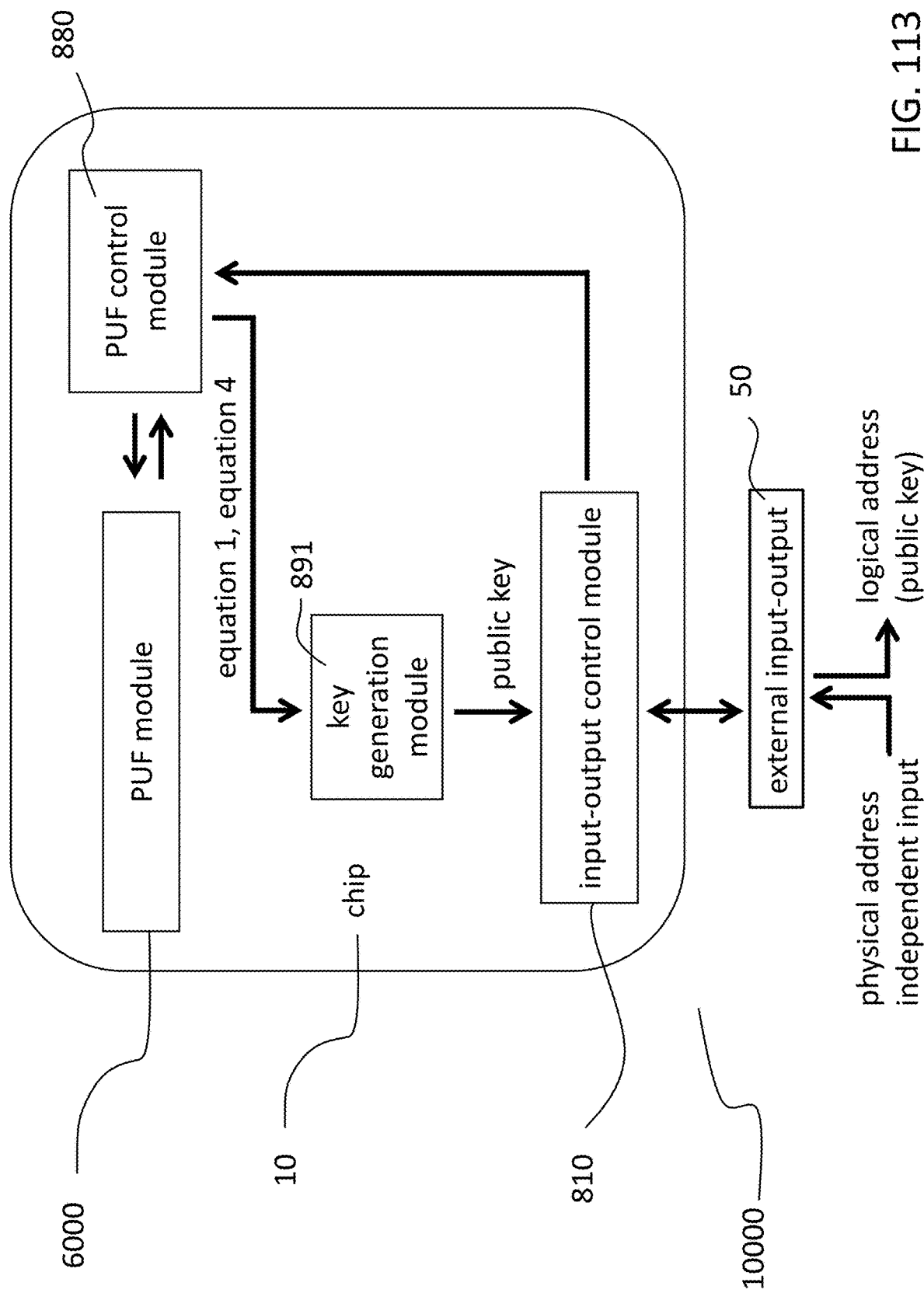
FIG. 113 illustrates an example of a configuration that the identification core related to the present invention confines the private key and generates the public key forming a unique pair with the private key, and outputs the public key to the exterior of the identification core.

The identification core 10000 related to the present invention, as illustrated in FIG. 113 as an example, includes at least a PUF module 6000, a PUF control module 880, an input-output control module 810, and a key generation module 891. Then, they are equipped in the chip 10.

This input-output control module 810 may include an input-output control circuit and a buffer for data input-output but not the word line control circuit and the bit line control circuit. The PUF control module 880 may include the word line control circuit, the bit line control circuit and the data buffer. Moreover, as illustrated in FIG. 40, the PUF control module 880 may also include an inner storage to recode the addresses corresponding to the mode "X" as necessary.

If a set of the input code {a(i)} and {b(j)} is input via the external input-output 50, the input-output control module 810 forwards the set of the input code {a(i)} and {b(j)} to the PUF control module 880. The PUF control module 880 has a command of the inner word line control circuit, the inner bit line control circuit, the inner data buffer and so forth to generate the output code {c(i, j)} in response to the random number code {d(i, j)} obtained from the PUF module 6000 and the set of the input codes {a(i)} and {b(j)} according to the equation 1. The generated output code {c(i, j)} serves as a private key in the examples of FIGS. 85-88 and 95-98. The output code {c(i, j)} is input to the key generation module 891 to generate a public key. The input-output control module 810 outputs the public key to the exterior of the chip 10 via the external input-output 50. On the other hand, the private key can be confined in the chip.

Or, if the input code {a(i)} is input via the external input-output 50, the input-output control module 810 forwards the input code {a(i)} to the PUF control module 880. The PUF control module 880 has a command of the inner word line control circuit, the inner bit line control circuit, the inner data buffer and so forth to generate the output code {c(i)} in response to the random number code {d(i)} obtained from the PUF module 6000 and the input code {a(i)} according to the equation 4. The generated output code {c(i)} serves as a private key in the examples of FIGS. 85-88 and 95-98. The output code {c(i)} is input to the key generation module 891 to generate a public key. The input-output control module 810 outputs the public key to the exterior of the chip 10 via the external input-output 50. On the other hand, the private key can be confined in the chip.

In FIG. 112, the PUF module 6000 and the PUF control module 880 may be omitted. In this event, the scramble device module 890 and the buffer module for temporal code 900 may take a place of the PUF module 6000 and the PUF control module 880. Then, FIG. 112 may be the same as FIG. 113.

The sixth embodiment is described.

Figure 114:
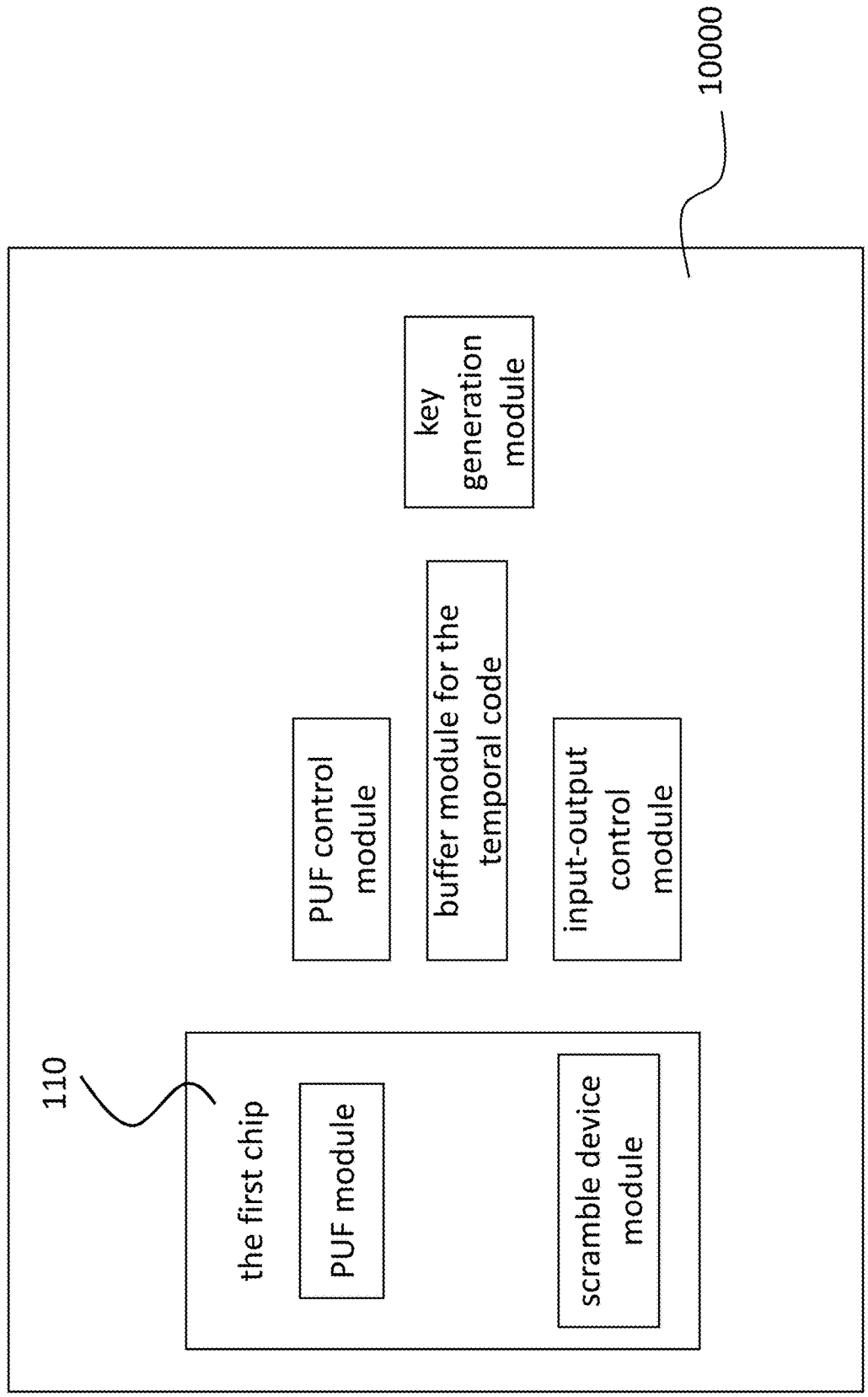
FIG. 114 illustrates an example of a method that at least the PUF module and the scramble device module, which are related to the present invention, are integrated in the same chip.
Figure 115:
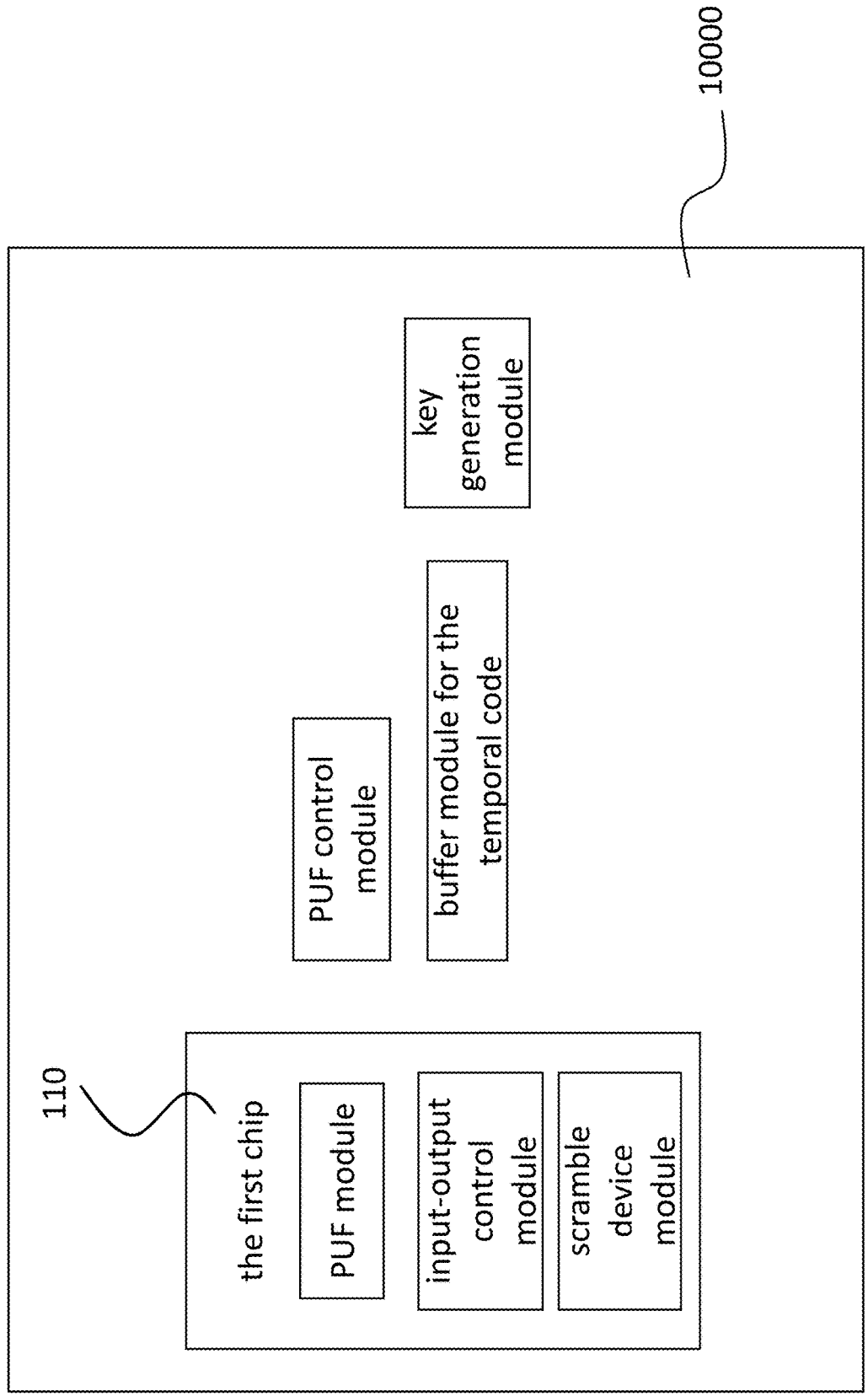
FIG. 115 illustrates an example of a method that at least the PUF module and the scramble device module, which are related to the present invention, are integrated in the same chip.
Figure 116:
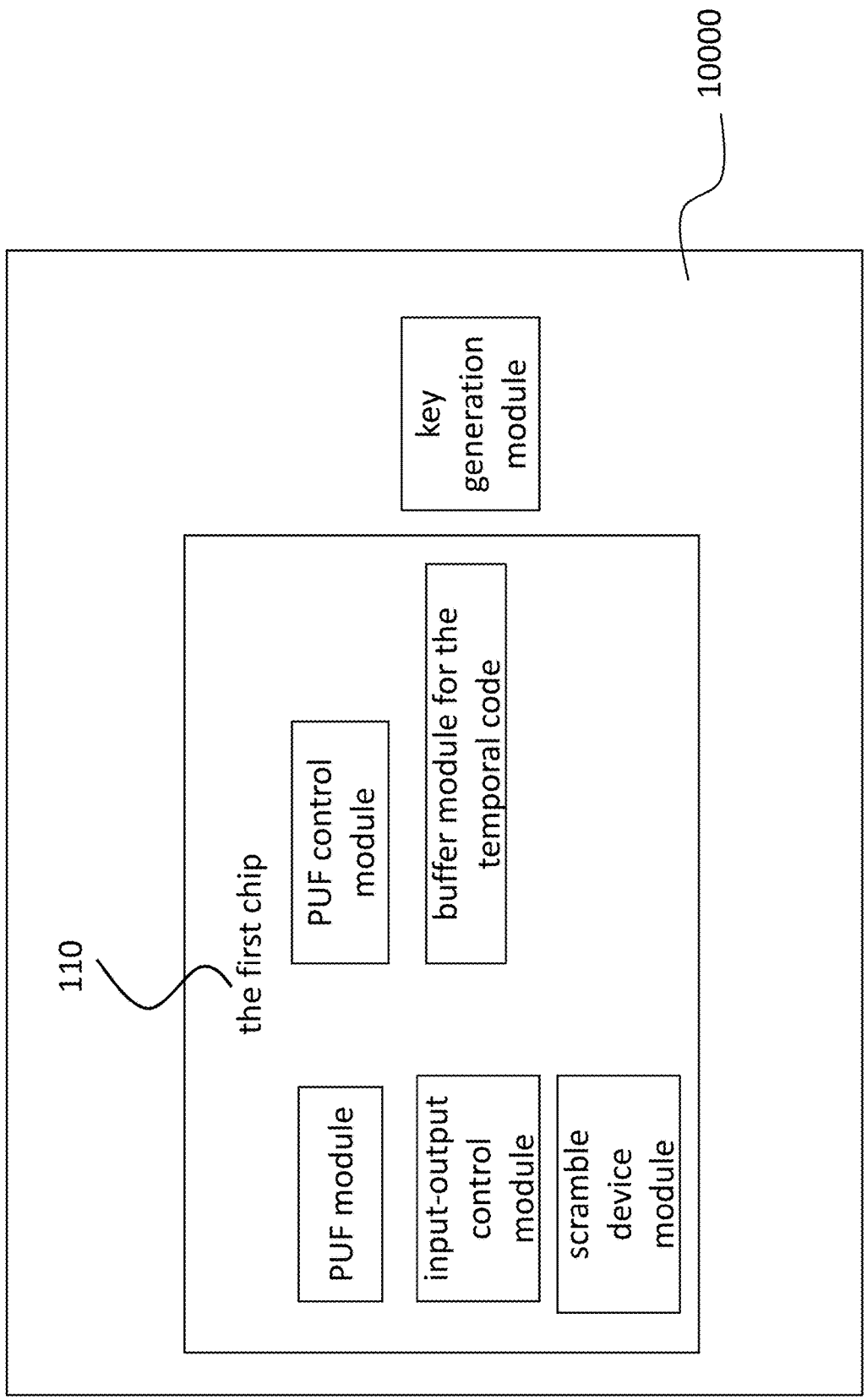
FIG. 116 illustrates an example of a method that at least the PUF module and the scramble device module, which are related to the present invention, are integrated in the same chip.
Figure 117:
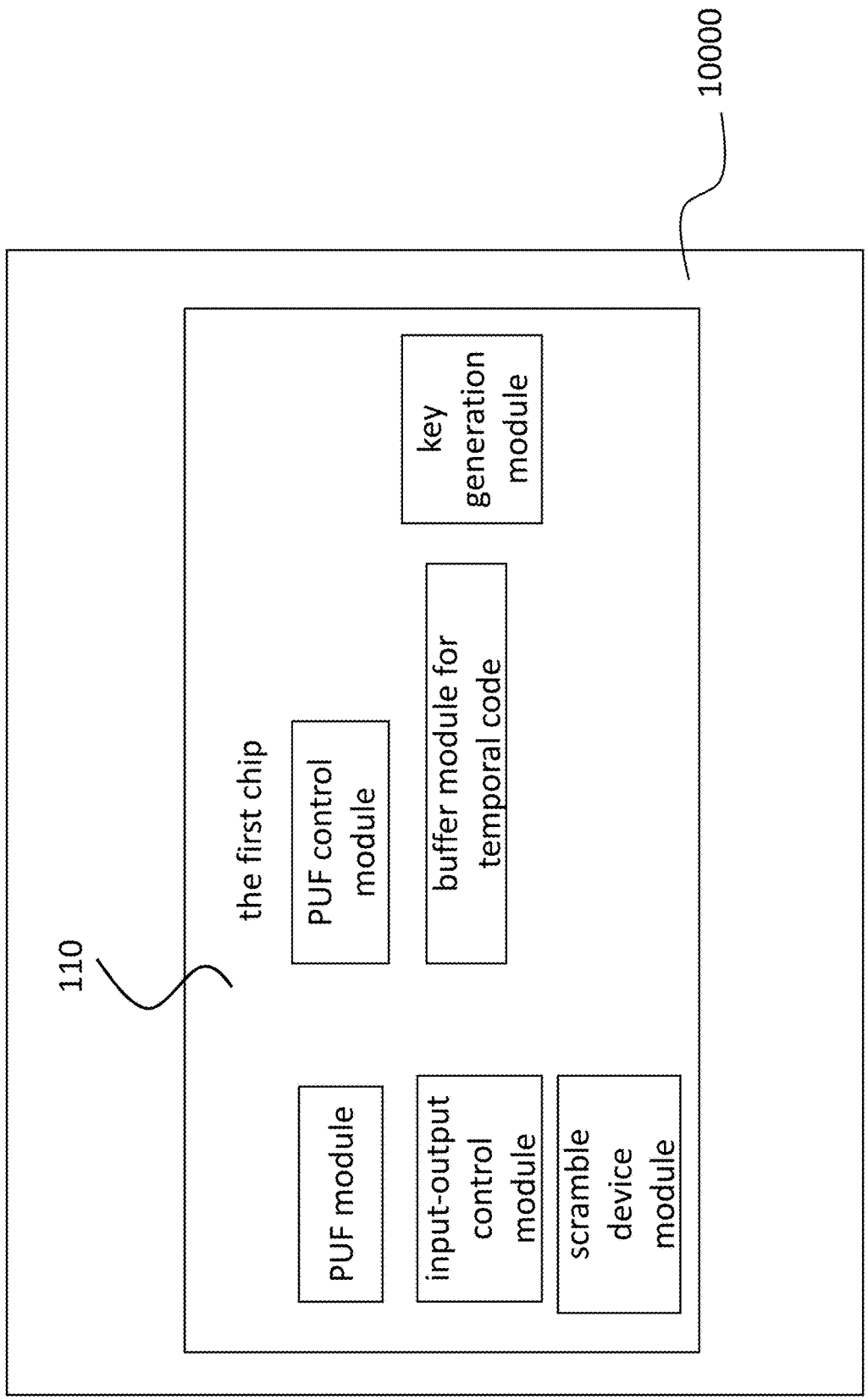
FIG. 117 illustrates an example of the one-chip identification core.

As illustrated in FIG. 114, the PUF module 6000 and the scramble device module 890 which are related to the present invention may be integrated in the same chip (e.g., the first chip 110). The other modules, for example, the PUF control module 880, the buffer module for temporal code 900, the input-output control module 810, the key generation module 891 and so forth may be equipped in the first chip 110 and can also be equipped in different electronic apparatuses configuring the identification core 10000 other than the first chip 110. FIG. 115 illustrates an example that the input-output control module 810 is equipped in the first chip. FIG. 116 illustrates an example that the PUF control module 880 and the buffer module for temporal code 900 are also equipped in the first chip 110. FIG. 117 illustrates an example that the key generation module 891 is also equipped in the first chip 110. In other words, this may result in an one-chip identification core.

Figure 118:
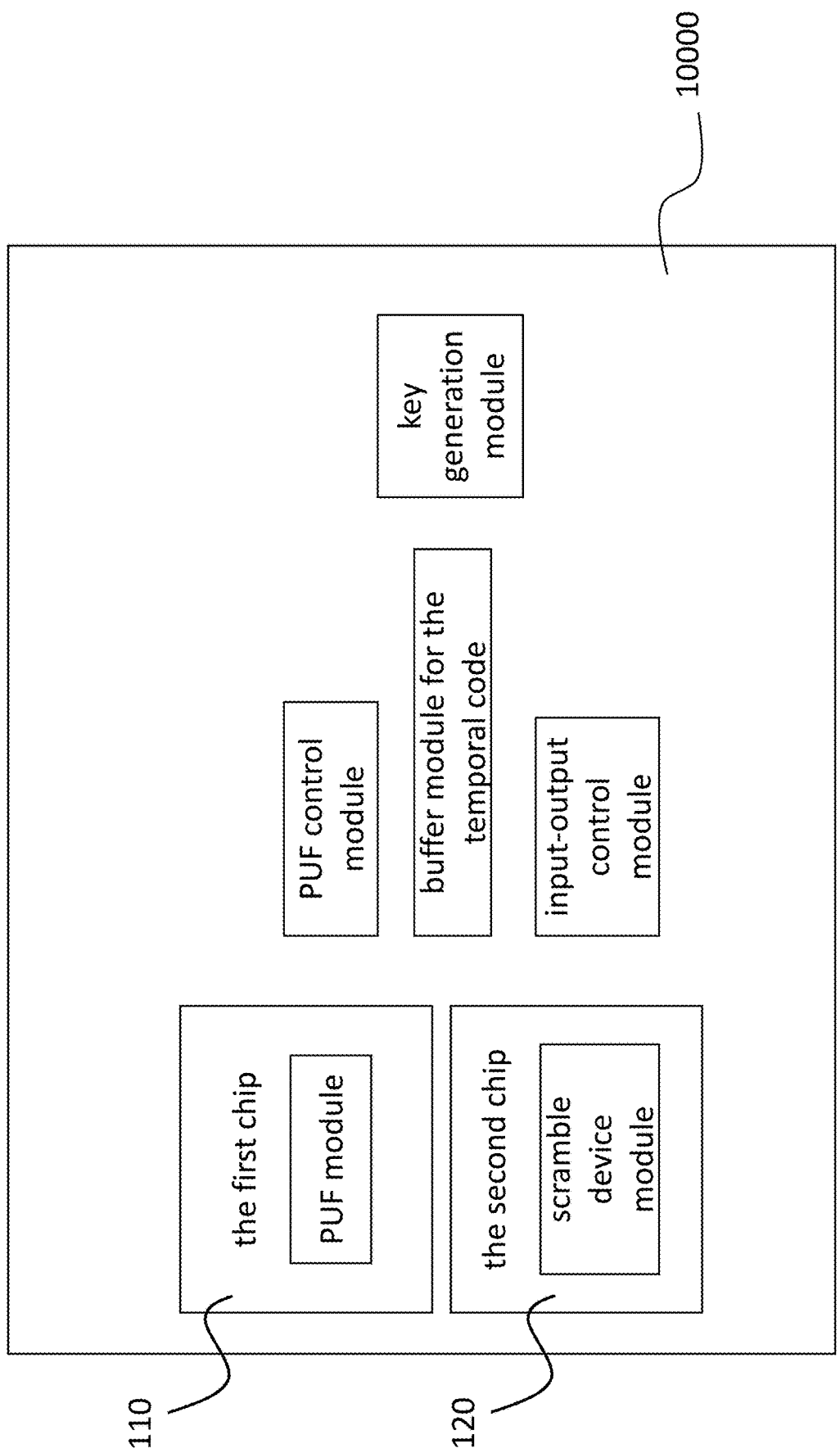
FIG. 118 illustrates an example of a method that the PUF module and the scramble module, which are related to the present invention, are respectively integrated in two different chips to compose the identical identification core together.

As illustrated in FIG. 118, the PUF module 6000 and the scramble device module 890 may be separately integrated in two different chips (the first chip 110 and the second chip 120). The other modules, for example, the PUF control module 880, the buffer module for temporal code 900, the input-output control module 810, the key generation module 891 and so forth, may be equipped in the first chip 110 or the second chip 120, and can also be equipped in different electronic apparatuses configuring the identification core 10000, other than the first chip 110 and the second chip 120.

According to the present invention like this, the identification cores including the PUF devices, which are specific to the semiconductor chips having the physical substances, and the logical addresses are linked by the public key cryptography, so as to organically cooperate the networks of hardware and software.

The way to link the semiconductor chips to the logical addresses is more concretely that a private key is confined in the chip by using the PUF device, and then the public keys respectively forming sets with the private keys by the public key cryptography may serve as logical addresses in logical network.

Furthermore, it may be possible to organically link the hardware and the block chain with the electronic signature technology. As a result, this may provide an excellent method to reinforce the security and the reliability of the network system.

Moreover, the scope of the technologies related to the present invention may not be limited to the above-mentioned embodiments and can be modified in various forms within the scope of the present invention.

What is claimed is:

1. A network comprising:
a logical network comprising a plurality of logical nodes, wherein each of the plurality of logical nodes is connected to a respective one of the plurality of identification cores, wherein each of the plurality of identification cores comprises at least one semiconductor chip having a physical randomness, wherein each of the at least one semiconductor chip generates one of a plurality of pairs of private keys and public keys based on the physical randomness thereof according to an input received by the one of the at least one semiconductor chip under a public key cryptography, wherein one of the public keys is regarded as a logical address of one of the plurality of logical nodes, which is connected to one of the plurality of identification cores; and
a physical network comprising a plurality of physical nodes, wherein each of the plurality of identification cores is one of components in each of the plurality of physical nodes, and wherein the logical network is uniquely linked to the physical network by the plurality of the pairs of private keys and public keys,
wherein each of the at least one semiconductor chip includes a physical chip identification (PCID) device to reproduce a function, wherein an input code to each of the plurality of identification cores is a sequence whose elements are expressed in first and second values obtained by converting the input in binary notation, wherein an output reflecting a physical randomness which is specific to each of the at least one semiconductor chip is generated from an output code of the physical chip identification (PCID) device in response to the input code, wherein the physical chip identification (PCID) device responds two different ones of the output codes in response to two different ones of the input codes, wherein the physical chip identification (PCID) device disables for predicting the output code in response to an unknown input code with the physical randomness which is specific to each of the at least one semiconductor chip, wherein an absolute value of a difference between the two different ones of the output codes respectively corresponding to the two different ones of the input codes is larger than an amplitude of an uncontrollable noise related to a circuit controlling the two different ones of the output codes and is larger than maximums of absolute values of errors in the two different ones of the output codes, as long as an absolute value of a difference between the two different ones of the input codes is larger than maximums of absolute values of errors in the two different ones of the input codes, wherein the maximums of the absolute values of the errors in the two different ones of the output codes are involved due to uncontrollable noise related to a circuit controlling the two different ones of the input codes and errors in the two different ones of the input codes, and wherein the maximums of the absolute values of the errors in the two different ones of the input codes are involved due to an uncontrollable noise related to a circuit controlling the two different ones of the input codes.

2. The network as claimed in claim 1, wherein each of the at least one semiconductor chip includes a physical chip identification (PCID) device to reproduce a function, wherein an input code to each of the plurality of identification cores is a sequence whose elements are expressed in first and second values obtained by converting the input in binary notation, wherein an output reflecting a physical randomness which is specific to each of the at least one semiconductor chip is generated from an output code of the physical chip identification (PCID) device in response to the input code, and wherein two different ones of the physical chip identification (PCID) devices respectively respond to two different ones of the output codes in response to a same one of the input codes.

3. The network as claimed in claim 1, wherein each of the at least one semiconductor chip includes a physical chip identification (PCID) device to reproduce a function, wherein an input code to each of the plurality of identification cores is a sequence whose elements are expressed in first and second values obtained by converting the input in binary notation, and wherein an output reflecting a physical randomness which is specific to each of the at least one semiconductor chip is generated from an output code of the physical chip identification (PCID) device in response to the input code.

4. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein each of the plurality of physical chip identification (PCID) cells includes at least two terminals, wherein, if an electric current flowing between the at least two terminals with regard to a read voltage of a predetermined electrical input has a higher value than a value of a first threshold current, then a first value is regarded as being output, or if the electric current has a lower value than a value of a second threshold current, then a second value is regarded as being output, wherein the value of the first threshold current is higher than the value of the second threshold current, wherein, if the electric current has a value higher than the value of the second threshold current and lower than the value of the first threshold current, then a third value is regarded as being output, and wherein the address of each of the plurality of physical chip identification (PCID) cells outputting the third value is stored in a part of a memory area of a corresponding one of the plurality of identification cores.

5. The network as claimed in claim 4, wherein, if a number of the plurality of physical chip identification (PCID) cells in a first state outputting the first value is larger than a number of the plurality of physical chip identification (PCID) cells in a second state outputting the second value, then a part of or all of the physical chip identification (PCID) cells in the first state are selected to be applied with an electrical stress, wherein, if the number of the plurality of physical chip identification (PCID) cells in the first state outputting the first value is smaller than the number of the plurality of physical chip identification (PCID) cells in the second state outputting the second value, then a part of or all of the physical chip identification (PCID) cells in the second state is selected to be applied with the electrical stress.

6. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein each of the plurality of physical chip identification (PCID) cells includes a first conductor region, a second conductor region and an insulating film sandwiched between the first and second conductor regions, wherein at least one of the first and second conductor regions is selected by one of the plurality of word lines and one of the plurality of bit lines which define the address of each of the plurality of physical chip identification (PCID) cells, wherein the insulating film of each of the plurality of physical chip identification (PCID) cells of the physical chip identification (PCID) device is probabilistically broken by applying a pulse voltage at least one time to either of the first and second conductor regions, and wherein an electrical property of the plurality of physical chip identification (PCID) cells of the physical chip identification (PCID) device is made physically random.

7. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein each of the plurality of physical chip identification (PCID) cells includes a first conductor region, a second conductor region, and a diode region sandwiched between the first and second conductor regions, wherein at least one of the first and second conductor regions is selected by one of the plurality of word lines and one of the plurality of bit lines which define the address of each of the plurality of physical chip identification (PCID) cells, wherein the diode region of each of the plurality of physical chip identification (PCID) cells of the physical chip identification (PCID) device is probabilistically broken by applying a pulse voltage at least one time to either of the first and second conductor regions, wherein an electrical property of the plurality of physical chip identification (PCID) cells of the physical chip identification (PCID) device is made physically random, wherein the diode region includes a junction including at least two conductive regions having different electrical properties from each other, wherein the first conductive region forming the junction is a first conductive type semiconductor, and wherein the second conductive region forming the junction is either a second conductive type semiconductor or a metal type conductor.

8. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein each of the plurality of physical chip identification (PCID) cells includes a first conductor region, a second conductor region, an insulating film sandwiched between the first and second conductor regions, and a conductive junction element piercing through the insulating film from the first conductor region to the second conductor region, wherein at least one of the first and second conductor regions is selected by one of the plurality of word lines and one of the plurality of bit lines which define the address of each of the plurality of physical chip identification (PCID) cells, wherein the conductive junction element of each of the plurality of physical chip identification (PCID) cells of the physical chip identification (PCID) device is probabilistically broken by applying a pulse voltage at least one time to either of the first and second conductor regions, and wherein an electrical property of the plurality of physical chip identification (PCID) cells of the physical chip identification (PCID) device is made physically random.

9. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PUF) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein each of the plurality of physical chip identification (PCID) cells includes a first conductor region, a second conductor region, an insulating film sandwiched between the first and second conductor regions, and a metal via formed by a hole forming step and a conductive material filling step, wherein the hole forming step includes forming a hole penetrating the insulating film from the first conductor region to the second conductor region, wherein the conductive material filling step includes filling the hole with a conductive material, wherein at least one of the first and second conductor regions is selected by one of the plurality of word lines and one of the plurality of bit lines which define the address of each of the plurality of physical chip identification (PCID) cells, wherein a manufacturing target value of a length of the metal via equals to a distance between the first and second conductor regions, wherein the length of the metal via formed by the hole forming step and the conductive material filling step is probabilistically larger or smaller than the distance between the first and second conductor regions due to a manufacturing fluctuation, and wherein an electrical property of the plurality of physical chip identification (PCID) cells of the physical chip identification (PCID) device is made physically random.

10. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein each of the plurality of physical chip identification (PCID) cells includes a first conductor region, a second conductor region, a conductive thin wire bridging the first and second conductor regions, and an insulating film sandwiched between the first and second conductor regions and covering the conductive thin wire, wherein at least one of the first and second conductor regions is selected by one of the plurality of word lines and one of the plurality of bit lines which define the address of each of the plurality of physical chip identification (PCID) cells, wherein the conductive thin wire is probabilistically broken with regard to a manufacturing fluctuation that occurs in a manufacturing process of the conductive thin wire or a manufacturing process of the insulating film covering the conductive thin wire, and wherein an electric property of the plurality of physical chip identification (PCID) cells of the physical chip identification (PCID) device is made physically random.

11. The network as claimed in claim 1, wherein an input code to each of the plurality of identification cores is a sequence whose elements are expressed in first and second values obtained by converting the input in binary notation, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein each of the plurality of physical chip identification (PCID) cells includes at least two terminals, wherein, if an electric current flowing between the at least two terminals with regard to a read voltage of a predetermined electrical input has a higher value than a value of a first threshold current, then a first value is regarded as being output, or if the electric current has a lower value than a value of a second threshold current, then a second value is regarded as being output, wherein the value of the first threshold current is higher than the value of the second threshold current, wherein a part of the plurality of physical chip identification (PCID) cells is probabilistically broken with an electrical stress applied to the part of the plurality of physical chip identification (PCID) cells, or the plurality of physical chip identification (PCID) cells probabilistically varies due to a manufacturing variance of each of the at least one semiconductor chip, wherein the first and second values respectively output by the plurality of physical chip identification (PCID) cells are allocated to addresses on the at least one cell area so as to generate a physically random pattern which is specific to each of the at least one semiconductor chip, wherein an output code from the identification core is generated by compounding the physically random pattern specific to each of the at least one semiconductor chip and the input code with a given method.

12. The network as claimed in claim 1, wherein an input code to each of the plurality of identification cores is a sequence whose elements are expressed in first and second values obtained by converting the input in binary notation, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein the first and second values output by the plurality of physical chip identification (PCID) cells are respectively allocated to addresses on the at least one cell area so as to generate a physically random pattern which is specific to each of the at least one semiconductor chip, wherein the input code is divided into a first sequence associated to the word line group and a second sequence associated to the bit line group, wherein a plurality of sums are respectively generated by adding a plurality of elements of the first sequence, a plurality of elements of the second sequence and a plurality of elements of the random number code at each of the addresses of the physical chip identification (PCID) cells, and wherein an output code from the identification core is a matrix whose elements are remainders obtained by dividing each of the plurality of sums by two.

13. The network as claimed in claim 12, wherein the output code is used as the private key and is sealed in a corresponding one of the plurality of identification cores, and wherein the private key is further input to a key generator to generate the public key to be output by the corresponding one of the plurality of identification cores.

14. The network as claimed in claim 1, wherein an input code to each of the plurality of identification cores is a sequence whose elements are expressed in first and second values obtained by converting the input in binary notation, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one chip, wherein the physical chip identification (PCID) device includes the plurality of physical chip identification (PCID) cells integrated in at least first and second cell areas on a semiconductor substrate composing the at least one semiconductor chip, wherein the first cell array is defined by a first word line group comprising a plurality of word lines and a first bit line group comprising a plurality of bit lines, wherein the second cell array is defined by a second word line group comprising a plurality of word lines and a second bit line group comprising a plurality of bit lines, wherein the first word line group is identical to the second word line group or the first bit line group is identical to the second bit line group, wherein numbers of the word lines that are allocated to the first and second word line groups are row numbers and numbers of the bit lines that are allocated to the first and second bit line groups are column numbers, or the numbers of the word lines that are allocated to the first and second word line groups are the column numbers and the numbers of the bit lines that are allocated to the first and second bit line groups are the row numbers, wherein an address of each of the at least one physical chip identification (PCID) cells in the first cell array is defined by one of the row numbers and one of the column numbers, wherein the first and second values output by the plurality of physical chip identification (PCID) cells in the first cell array are respectively allocated to the addresses in the first cell array, so as to generate a first random number code which is physically random and specific to each of the at least one semiconductor chip, wherein an address of each of the at least one physical chip identification (PCID) cells in the second cell array is defined by one of the row numbers and one of the column numbers, wherein the first and second values output by plurality of physical chip identification (PCID) cells in the second cell array are respectively allocated to the addresses in the second cell array, so as to generate a second random number code which is physically random and specific to each of the at least one semiconductor chip, wherein, at given column numbers, a plurality of first sums is obtained by respectively adding elements of the first random number code with regard to the row numbers, and a plurality of first remainders is respectively obtained by dividing each of the plurality of first sums by two, wherein the input code is divided into a first sequence associated to the first word line group and a second sequence associated to the second word line group, wherein element numbers of the first and second sequences respectively correspond to column numbers of the first random number code, wherein, at given element numbers, a plurality of second sums is obtained by respectively adding elements of the first sequence to elements of the second sequence, wherein, at given column numbers, a plurality of second remainders is obtained by dividing sums of the plurality of first remainders and the plurality of second sums by two, respectively, wherein a temporal code is a sequence wherein the plurality of second reminders is arrayed with regard to the column numbers, wherein, at given row numbers and column numbers in the second cell array, a plurality of third sums is generated by adding elements of the first sequence, elements of the temporal code and elements of the second random number code, respectively, wherein the element numbers of the first sequence correspond to the given row numbers in the second cell array, wherein the element numbers of the temporal code correspond to the given column numbers in the second cell array, wherein the column lines and the row lines have a same quantity in the second cell array, wherein, at the given row numbers and column numbers, a plurality of third remainders is obtained by respectively dividing each of the plurality of third remainders by two, and wherein an output code from the identification core is a matrix whose elements are the plurality of third remainders obtained with regard to the given row numbers and column numbers in the second cell array.

15. The network as claimed in claim 14, wherein the temporal code is used as the private key and is sealed in a corresponding one of the plurality of identification cores, and wherein the private key is further input to a key generator to generate the public key to be output by the corresponding one of the plurality of identification cores.

16. The network as claimed in claim 14, wherein the output code is used as the private key and is sealed in a corresponding one of the plurality of identification cores, and wherein the private key is further input to a key generator to generate the public key to be output by the corresponding one of the plurality of identification cores.

17. The network as claimed in claim 1, wherein an input code to each of the plurality of identification cores is a sequence whose elements are expressed in first and second values obtained by converting the input in binary notation, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing each of the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein the plurality of physical chip identification (PCID) cells is associated to each of the row numbers, wherein the first or second value is allocated to each of the row numbers according to collective characteristics of the plurality of physical chip identification (PCID) cells associated to each of the row numbers, respectively, wherein the first and second values are respectively stored in a plurality of hypallage cells, wherein a physical random pattern which is specific to each of the at least one semiconductor chip is generated according to the first and second values stored in the plurality of hypallage cells, and wherein an output code is generated by compounding the physically random pattern which is specific to each of the at least one semiconductor chip and the input code with a given method.

18. The network as claimed in claim 17, wherein the output code is used as the private key and is sealed in a corresponding one of the plurality of identification cores, and wherein the private key is further input to a key generator to generate the public key to be output by the corresponding one of the plurality of identification cores.

19. The network as claimed in claim 1, wherein an input code to each of the plurality of identification cores is a sequence whose elements are expressed in first and second values obtained by converting the input in binary notation, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein a plurality of physical chip identification (PCID) cells is associated to each of the row numbers, wherein the first or second value is allocated to each of the row numbers according to collective characteristics of the plurality of physical chip identification (PCID) cells associated to each of the row numbers, respectively, wherein the first and second values are respectively stored in a plurality of hypallage cells, wherein a physical random pattern which is specific to each of the at least one semiconductor chip is generated according to the first and second values stored in the plurality of hypallage cells, wherein a random number code is generated by distributing elements of the hypallage cells with regard to the row numbers, wherein a plurality of sums is generated by adding the input code and the random number code at element numbers, respectively, and wherein a plurality of remainders which are respectively generated by respectively dividing the plurality of sums by two at the element numbers are elements of an output code from the identification core.

20. The network as claimed in claim 19, wherein the temporal code is used as the private key and is sealed in a corresponding one of the plurality of identification cores, and wherein the private key is further input to a key generator to generate the public key to be output by the corresponding one of the plurality of identification cores.

21. The network as claimed in claim 19, wherein the output code is used as the private key and is sealed in a corresponding one of the plurality of identification cores, and wherein the private key is further input to a key generator to generate the public key to be output by the corresponding one of the plurality of identification cores.

22. The network as claimed in claim 1, wherein an input code to each of the plurality of identification cores is a sequence whose elements are expressed in first and second values obtained by converting the input in binary notation, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein a plurality of physical chip identification (PCID) cells is associated to each of the row numbers, wherein the first or second value is allocated to each of the row numbers according to collective characteristics of the plurality of physical chip identification (PCID) cells associated to each of the row numbers, respectively, wherein the first and second values are respectively stored in a plurality of hypallage cells, wherein a physical random pattern which is specific to each of the at least one semiconductor chip is generated according to the first and second values stored in the plurality of hypallage cells, wherein a random number code is generated by distributing elements of the plurality of hypallage cells with regard to the row numbers, wherein, at element numbers, the input code and the random number code are added to each other and then divided by two to respectively generate a plurality of first remainders, wherein a temporal code is generated by distributing the plurality of first remainders with regard to the element numbers, wherein, at element numbers, the temporal code and the random number code are added to each other and then divided by two to respectively generate a plurality of second remainders, wherein an output code is generated by distributing the plurality of second remainders with regard to the element numbers, and wherein an output code is generated by compounding the physically random pattern which is specific to each of the at least one semiconductor chip and the input code with a given method.

23. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein if a part of plurality of physical chip identification (PCID) cells associated to a row number exhibits irreversible errors, the row number is stored in a redundancy memory which is prepared independently, wherein an input code to be input to the identification core is a test code to uniquely determine a method for selecting a row to be replaced with a row corresponding to the row number stored in the redundancy memory among all of the row numbers throughout an entire cell array, wherein a physical random pattern which is specific to each of the at least one semiconductor chip is a distribution pattern of row numbers to be stored and not to be stored in the redundancy memory among all of the row numbers throughout the entire cell array, which is generated by inputting the test code, wherein an output code from the identification core is generated by compounding the physical random pattern which is specific to each of the at least one semiconductor chip and the input code with a given method.

24. The network as claimed in claim 23, wherein the output code is used as the private key and is sealed in a corresponding one of the plurality of identification cores, and wherein the private key is further input to a key generator to generate the public key to be output by the corresponding one of the plurality of identification cores.

25. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein, if a part of a plurality of physical chip identification (PCID) cells associated to a row number exhibits irreversible errors, the row number is stored in a redundancy memory which is prepared independently, wherein an input code to be input to the identification core is a test code to uniquely determine a method for selecting a row to be replaced with a row corresponding to the row number stored in the redundancy memory among all of the row numbers throughout the entire cell array, wherein a physical random pattern which is specific to each of the at least one semiconductor chip is a distribution pattern of row numbers to be stored and not to be stored in the redundancy memory among all of the row numbers throughout an entire cell array, which is generated by inputting the test code, wherein the row numbers stored in the redundancy memory are allocated with a first value and the other row numbers are allocated with a second value, and a random number code is generated by distributing the first and second values along the row numbers, wherein an input code to be input to the identification core is represented by binary and then converted into a sequence whose elements are first and second values, wherein a plurality of sums is generated by adding the input code and the random number code at element numbers, respectively, and wherein a plurality of remainders that are respectively generated by dividing the plurality of sums by two at the element numbers are elements of an output code from the identification core.

26. The network as claimed in claim 25, wherein the temporal code is used as the private key and is sealed in a corresponding one of the plurality of identification cores, and wherein the private key is further input to a key generator to generate the public key to be output by the corresponding one of the plurality of identification cores.

27. The network as claimed in claim 25, wherein the output code is used as the private key and is sealed in a corresponding one of the plurality of identification cores, and wherein the private key is further input to a key generator to generate the public key to be output by the corresponding one of the plurality of identification cores.

28. The network as claimed in claim 1, wherein each of the at least one semiconductor chip includes a physical chip identification (PCID) device to reproduce a function, wherein the physical chip identification (PCID) device includes a plurality of physical chip identification (PCID) cells which are semiconductor elements made simultaneously in a same manufacturing process with at least one semiconductor chip, wherein the physical chip identification (PCID) device includes the plurality of physical chip identification (PCID) cells integrated in at least one cell area on a semiconductor substrate composing the at least one semiconductor chip, wherein each of the at least one cell area is defined by a word line group including a plurality of word lines and a bit ling group including a plurality of bit lines, wherein an address of each of the plurality of physical chip identification (PCID) cells is defined by a row number allocated to one of the plurality of word lines and the plurality of bit lines, as well as a column number allocated to another of the plurality of word lines and the plurality of bit lines, wherein, if a part of the plurality of physical chip identification (PCID) cells associated to a row number exhibits irreversible errors, the row number is stored in a redundancy memory which is prepared independently, wherein an input code to be input to the identification core is a test code to uniquely determine a method for selecting a row to be replaced with a row corresponding to the row number stored in the redundancy memory among all of the row numbers throughout an entire cell array, wherein a physical random pattern which is specific to each of the at least one semiconductor chip is a distribution pattern of the row numbers to be stored and not to be stored in the redundancy memory among all of the row numbers throughout the entire cell array, which is generated by inputting the test code, wherein the row numbers stored in the redundancy memory are allocated with a first value and the other row numbers are allocated with a second value, wherein a random number code is generated by distributing the first and second values along the row numbers, wherein an input code to be input to the identification core is represented by binary and then converted into a sequence whose elements are the first and second values, wherein a plurality of sums is generated by adding the input code and the random number code at element numbers, respectively, wherein a plurality of first remainders which are respectively generated by dividing the plurality of sums by two at the element numbers are elements of an output code from the identification core, wherein, at element numbers, the temporal code and the random number code are added to each other and then divided by two to respectively generate a plurality of second remainders, and wherein an output code is generated by distributing the plurality of second remainders with regard to the element numbers.

29. A network comprising:
a logical network comprising a plurality of logical nodes, wherein each of the plurality of logical nodes is connected to a respective one of the plurality of identification cores, wherein each of the plurality of identification cores comprises at least one semiconductor chip having a physical randomness, wherein each of the at least one semiconductor chin generates one of a plurality of pairs of private keys and public keys based on the physical randomness thereof according to an input received by the one of the at least one semiconductor chip under a public key cryptography, wherein one of the public keys is regarded as a logical address of one of the plurality of logical nodes, which is connected to one of the plurality of identification cores; and
a physical network comprising a plurality of physical nodes, wherein each of the plurality of identification cores is one of components in each of the plurality of physical nodes, and wherein the logical network is uniquely linked to the physical network by the plurality of the pairs of private keys and public keys,
wherein each of the at least one semiconductor chip includes a physical chip identification (PCID) device to reproduce a function, wherein an input code to each of the plurality of identification cores is a sequence whose elements are expressed in first and second values obtained by converting the input in binary notation, wherein an independent input is adapted to boot an application executing in the network, is adapted to boot an information terminal in which the application executing in the network is installed, or is to be input by a user as required by a predetermined application executing in the network, wherein the independent input comprises a digital code information, a finger print information, a finger vein information, a retina information, a deoxyribonucleic acid (DNA) information, a biometric information adapted to identify a regular user of the application, a voice and image information extracted from a voice and a picture of the regular user for identifying an identity of the user, a physical information obtained from a physical characteristic of the regular user for identifying the identity of the user, or a personal information for identifying the identity of the user, wherein the digital code information is a passcode, a PIN code, a barcode or a QR code, wherein an input code input to each of the at least one physical chip identification (PCID) device is a sequence of first and second values, which is obtained by converting the independent input in binary notation, and wherein an output reflecting a physical randomness which is specific to each of the at least one semiconductor chip is generated from an output code of the physical chip identification (PCID) device in response to the input code.

30. A network comprising:
a logical network comprising a plurality of logical nodes, wherein each of the plurality of logical nodes is connected to a respective one of the plurality of identification cores, wherein each of the plurality of identification cores comprises at least one semiconductor chip having a physical randomness, wherein each of the at least one semiconductor chip generates one of a plurality of pairs of private keys and public keys based on the physical randomness thereof according to an input received by the one of the at least one semiconductor chip under a public key cryptography, wherein one of the public keys is regarded as a logical address of one of the plurality of logical nodes, which is connected to one of the plurality of identification cores; and
a physical network comprising a plurality of physical nodes, wherein each of the plurality of identification cores is one of components in each of the plurality of physical nodes, and wherein the logical network is uniquely linked to the physical network by the plurality of the pairs of private keys and public keys, wherein each of the at least one semiconductor chip includes a physical chip identification (PCID) device to reproduce a function, wherein an input code to each of the plurality of identification cores is a sequence whose elements are expressed in first and second values obtained by converting the input in binary notation, wherein one of the private keys reflective of the physical randomness of a respective one of the at least one semiconductor chip is generated from an output code of the physical chip identification (PCID) device in response to the input code, wherein a public key that is used with the one of the private keys to form one of the plurality of pairs of private keys and public keys is generated using the public key cryptography, wherein information is exchangeable among the plurality of logical nodes, wherein a second hash value is generated by collectively hashing a first hash value, a first electronic signature and a first one of the public keys, wherein the first hash value includes a trajectory that a data arrives at a first one of the plurality of logical nodes, wherein the first electronic signature is appended to the first hash value, wherein the first one of the public keys is the logical address of the first one of the plurality of logical nodes, wherein the second hash value and a second one of the public keys are encrypted to generate a second electronic signature using a first one of the private keys, which is used with the first one of the public keys to form one of the plurality of pairs of private keys and public keys, according to the public key cryptography, and wherein the second hash value and the second electronic signature are transferred to a second one of the plurality of logical nodes whose logical address is the second one of the public keys.

31. A network comprising:
a logical network comprising a plurality of logical nodes, wherein each of the plurality of logical nodes is connected to a respective one of the plurality of identification cores, wherein each of the plurality of identification cores comprises at least one semiconductor chin having a physical randomness, wherein each of the at least one semiconductor chin generates one of a plurality of pairs of private keys and nubile keys based on the physical randomness thereof according to an input received by the one of the at least one semiconductor chip under a public key cryptography, wherein one of the public keys is regarded as a logical address of one of the plurality of logical nodes, which is connected to one of the plurality of identification cores; and
a physical network comprising a plurality of physical nodes, wherein each of the plurality of identification cores is one of components in each of the plurality of physical nodes, and wherein the logical network is uniquely linked to the physical network by the plurality of the pairs of private keys and public keys,
wherein each of the at least one semiconductor chip includes a physical chip identification (PCID) device to reproduce a function, wherein an input code to each of the plurality of identification cores is a sequence whose elements are expressed in first and second values obtained by converting the input in binary notation, wherein one of the private keys reflective of the physical randomness of a respective one of the at least one semiconductor chip is generated from an output code of the physical chip identification (PCID) device in response to the input code, wherein a public key that is used with the one of the private keys to form one of the plurality of pairs of private keys and public keys is generated using the public key cryptography, wherein information is exchangeable among the plurality of logical nodes, wherein a second hash value is generated by collectively hashing a first hash value, a first electronic signature and a first one of the public keys, wherein the first hash value includes a trajectory that a data arrives at a first one of the plurality of logical nodes, wherein the first electronic signature is appended to the first hash value, wherein the first one of the public keys is the logical address of the first one of the plurality of logical nodes, wherein the first hash value and the first one of the public keys are encrypted to generate a second electronic signature using a first one of the private keys, which is used with the first one of the public keys to form one of the plurality of pairs of private keys and public keys, according to the public key cryptography, wherein the second hash value and the second electronic signature are transferred to a second one of the plurality of logical nodes whose logical address is the second one of the public keys, and wherein the logical network includes a trajectory node which records a part or all of a plurality of hash values respectively related to the plurality of logical nodes.

* * * * *